US011207607B2

(12) United States Patent
Binder

(10) Patent No.: US 11,207,607 B2
(45) **Date of Patent: *Dec. 28, 2021**

(54) SEQUENTIALLY OPERATED MODULES

(71) Applicant: May Patents Ltd., Hod Hasharon (IL)

(72) Inventor: Yehuda Binder, Ramat Gan (IL)

(73) Assignee: May Patents Ltd., Hod-Hasharon (IL)

( * ) Notice: Subject to any disclaimer, the term of this patent is extended or adjusted under 35 U.S.C. 154(b) by 36 days.

This patent is subject to a terminal disclaimer.

(21) Appl. No.: 16/782,166

(22) Filed: Feb. 5, 2020

(65) Prior Publication Data

US 2020/0254354 A1 Aug. 13, 2020

Related U.S. Application Data

(63) Continuation of application No. 15/415,926, filed on Jan. 26, 2017, now Pat. No. 10,569,181, which is a (Continued)

(51) Int. Cl.
*H02J 1/00* (2006.01)
*H01J 13/00* (2006.01)
(Continued)

(52) U.S. Cl.
CPC ................ *A63H 5/00* (2013.01); *A63F 9/24* (2013.01); *A63F 13/211* (2014.09); (Continued)

(58) Field of Classification Search
CPC .... A63H 33/042; A63H 33/04; A63H 33/086; A63H 5/00; A63H 33/26;
(Continued)

(56) References Cited

U.S. PATENT DOCUMENTS

| | | | |
|---|---|---|---|
| 2,493,697 | A | 1/1950 | Raczkowski |
| 2,879,685 | A | 3/1959 | Page |

(Continued)

FOREIGN PATENT DOCUMENTS

| | | |
|---|---|---|
| EP | 0135633 | 4/1985 |
| EP | 0976430 | 2/2000 |

(Continued)

OTHER PUBLICATIONS

Duff, D. G. et al, "Evolution of PolyBot: A Modular reconfigurable Robot", 2002 (7 pages).

(Continued)

*Primary Examiner* — Toan T Vu
*Assistant Examiner* — Elim Ortiz

(57) ABSTRACT

Method, modules and a system formed by connecting the modules for controlling payloads are disclosed. An activation signal is propagated in the system from a module to the modules connected to it. Upon receiving an activation signal, the module (after a pre-set or random delay) activates a payload associated with it, and transmits the activation signal (after another pre-set or random delay) to one or more modules connected to it. The system is initiated by a master module including a user activated switch producing the activation signal. The activation signal can be propagated in the system in one direction from the master to the last module, or carried bi-directionally allowing two way propagation, using a module which revert the direction of the activation signal propagation direction. A module may be individually powered by an internal power source such as a battery, or connected to external power source such as AC power. The system may use remote powering wherein few or all of the modules are powered from the same power source connected to the system in a single point. The power may be carried over dedicated wires or concurrently with the con-
(Continued)

ductors carrying the activation signal. The payload may be a visual or an audible signaling device, and can be integrated within a module or external to it. The payload may be powered by a module or using a dedicated power source, and can involve randomness associated with its activation such as the delay, payload control or payload activation.

91 Claims, 156 Drawing Sheets

Related U.S. Application Data continuation of application No. 15/190,589, filed on Jun. 23, 2016, now Pat. No. 9,583,940, which is a continuation of application No. 15/003,823, filed on Jan. 22, 2016, now Pat. No. 10,164,427, which is a continuation of application No. 14/268,058, filed on May 2, 2014, now Pat. No. 9,293,916, which is a continuation of application No. 12/712,673, filed on Feb. 25, 2010, now Pat. No. 8,742,814.

(60) Provisional application No. 61/267,595, filed on Dec. 8, 2009, provisional application No. 61/254,882, filed on Oct. 26, 2009, provisional application No. 61/225,756, filed on Jul. 15, 2009.

(51) Int. Cl.

| | |
|---|---|
| ***A63H 5/00*** | (2006.01) |
| ***A63H 33/04*** | (2006.01) |
| ***A63H 33/26*** | (2006.01) |
| ***A63F 13/30*** | (2014.01) |
| ***A63F 13/35*** | (2014.01) |
| ***H04W 4/80*** | (2018.01) |
| ***G09B 19/00*** | (2006.01) |
| ***H01R 13/717*** | (2006.01) |
| ***H01R 24/64*** | (2011.01) |
| ***H04L 5/14*** | (2006.01) |
| ***H04R 3/00*** | (2006.01) |
| ***H02J 13/00*** | (2006.01) |
| ***H02J 3/00*** | (2006.01) |
| ***H04L 12/28*** | (2006.01) |
| ***A63F 9/24*** | (2006.01) |
| ***A63F 13/211*** | (2014.01) |
| ***A63F 13/235*** | (2014.01) |
| ***A63F 13/332*** | (2014.01) |
| ***A63F 13/54*** | (2014.01) |
| ***B25J 9/16*** | (2006.01) |
| ***A63H 3/28*** | (2006.01) |
| ***H01R 13/66*** | (2006.01) |
| ***A63H 33/08*** | (2006.01) |
| ***G09B 5/06*** | (2006.01) |
| ***G09B 17/00*** | (2006.01) |
| ***G09B 19/02*** | (2006.01) |
| ***G05B 15/02*** | (2006.01) |
| ***H04R 1/02*** | (2006.01) |
| ***H04R 17/00*** | (2006.01) |
| ***H01R 9/16*** | (2006.01) |
| *H01R 107/00* | (2006.01) |
| *H04W 84/12* | (2009.01) |
| *H04W 84/04* | (2009.01) |

(52) U.S. Cl.

CPC ............ *A63F 13/235* (2014.09); *A63F 13/30* (2014.09); *A63F 13/332* (2014.09); *A63F 13/35* (2014.09); *A63F 13/54* (2014.09); *A63H 3/28* (2013.01); *A63H 33/042* (2013.01); *A63H 33/08* (2013.01); *A63H 33/26* (2013.01); *B25J 9/1656* (2013.01); *B25J 9/1694* (2013.01); *G05B 15/02* (2013.01); *G09B 5/06* (2013.01); *G09B 17/003* (2013.01); *G09B 19/00* (2013.01); *G09B 19/0023* (2013.01); *G09B 19/025* (2013.01); *H01R 9/16* (2013.01); *H01R 13/6691* (2013.01); *H01R 13/7175* (2013.01); *H01R 13/7177* (2013.01); *H01R 24/64* (2013.01); *H02J 1/00* (2013.01); *H02J 1/001* (2020.01); *H02J 3/00* (2013.01); *H02J 13/00* (2013.01); *H02J 13/0003* (2013.01); *H04L 5/14* (2013.01); *H04L 12/2803* (2013.01); *H04R 1/028* (2013.01); *H04R 3/00* (2013.01); *H04R 17/00* (2013.01); *H04W 4/80* (2018.02); *A63F 2009/247* (2013.01); *A63F 2250/50* (2013.01); *H01R 2107/00* (2013.01); *H04W 84/042* (2013.01); *H04W 84/12* (2013.01); *Y10S 901/09* (2013.01)

(58) Field of Classification Search

CPC .. A63F 2250/1068; A63F 3/00; A63F 9/0415; A63F 9/12; A63F 9/24; G09B 17/003; G09B 1/40; G09B 5/02; H04L 12/2803; H04W 4/80; Y10S 901/09

USPC ....... 307/41; 327/261, 276, 284; 463/31, 35; 446/91; 901/9

See application file for complete search history.

(56) References Cited

U.S. PATENT DOCUMENTS

| | | | | |
|---|---|---|---|---|
| 2,947,914 A | | 8/1960 | Simons | |
| 3,005,282 A | | 10/1961 | Christiansen | |
| 3,034,254 A | | 5/1962 | Christiansen | |
| 3,205,407 A | | 9/1965 | Thompson | |
| 3,237,341 A | | 1/1966 | Janning | |
| 3,553,438 A | | 1/1971 | Blitz et al. | |
| 3,556,529 A | | 1/1971 | Noriega | |
| 3,576,936 A | | 5/1971 | Fischer | |
| 3,594,689 A | | 7/1971 | Hopt et al. | |
| 3,640,018 A | | 2/1972 | Light | |
| 3,654,706 A | * | 4/1972 | Perrella | G09B 5/02 434/176 |
| 3,659,219 A | | 4/1972 | Rueff, Jr. | |
| 3,696,548 A | | 10/1972 | Teller | |
| 3,803,531 A | | 4/1974 | Sorensen | |
| 3,862,512 A | | 1/1975 | Vogel | |
| 3,863,931 A | | 2/1975 | Forsyth et al. | |
| 3,877,028 A | | 4/1975 | Thomas | |
| 3,970,805 A | | 7/1976 | Thomas | |
| 4,038,775 A | | 2/1977 | Sato | |
| 4,021,252 A | | 5/1977 | Banczak et al. | |
| D244,632 S | | 6/1977 | Christiansen | |
| 4,053,159 A | | 10/1977 | Kulak | |
| 4,064,377 A | | 12/1977 | Regan | |
| 4,118,888 A | | 10/1978 | Ogawa | |
| 4,158,921 A | | 6/1979 | Stolpen | |
| 4,181,824 A | | 1/1980 | Seidel | |
| 4,183,173 A | | 1/1980 | Ogawa | |
| 4,211,456 A | | 7/1980 | Sears | |
| 4,212,118 A | | 7/1980 | Baldwin et al. | |
| 4,233,778 A | | 11/1980 | Lemelson | |
| 4,284,123 A | | 8/1981 | Plockinger et al. | |
| 4,285,563 A | | 8/1981 | Crosier et al. | |
| 4,306,373 A | | 12/1981 | Chatani et al. | |
| 4,314,236 A | | 2/1982 | Mayer et al. | |
| 4,323,243 A | | 6/1982 | Hanson et al. | |
| 4,348,191 A | | 9/1982 | Lipsitz et al. | |
| 4,376,538 A | | 3/1983 | Keenan | |
| D267,895 S | | 8/1983 | Petrie | |
| 4,449,942 A | | 5/1984 | Salit | |
| 4,456,321 A | | 6/1984 | Jones et al. | |

(56) References Cited

U.S. PATENT DOCUMENTS 4,496,149 A 1/1985 Schwartzberg
4,510,210 A 4/1985 Hunt
4,516,260 A 5/1985 Breedlove et al.
4,532,579 A 7/1985 Merryman
4,538,675 A 9/1985 Welsh
4,542,784 A 9/1985 Welsh
4,546,267 A 10/1985 Urfirer
4,547,027 A 10/1985 Scheibenreif
4,552,541 A 11/1985 Bolli
4,556,272 A 12/1985 Briones
4,556,393 A 12/1985 Bolli
4,578,649 A 3/1986 Shupe
4,606,732 A 8/1986 Lyman
4,712,184 A 12/1987 Haugerud
4,736,367 A 4/1988 Wroblewski et al.
4,743,202 A 5/1988 Bach
4,820,233 A 4/1989 Weiner
4,838,794 A 6/1989 Coddington
4,840,602 A 6/1989 Rose
4,846,687 A 7/1989 White et al.
4,878,848 A 7/1989 Ingalsbe
4,853,884 A 8/1989 Brown et al.
4,796,891 A 10/1989 Milner
4,874,176 A 10/1989 Auerbach
4,883,440 A 11/1989 Bolli
4,890,241 A 12/1989 Hoffman et al.
4,893,817 A 1/1990 Shilo
4,905,176 A 2/1990 Schulz
4,910,396 A 3/1990 Grove
4,936,780 A 6/1990 Cogliano
4,937,811 A 6/1990 Harris
4,964,833 A 10/1990 Suzuki
4,968,255 A 11/1990 Lee et al.
4,969,827 A 11/1990 Hahs, Jr.
4,978,317 A 12/1990 Pocrass
5,009,625 A 4/1991 Longuet-Higgins
5,013,276 A 5/1991 Garfinkel
5,013,245 A 7/1991 Benedict
5,088,951 A 2/1992 Majurinen
D324,551 S 3/1992 Skov
5,172,534 A 12/1992 Milner et al.
5,190,287 A 3/1993 Ishiyama
5,191,276 A 3/1993 Zainaleain
5,203,711 A 4/1993 Bogiel
5,205,758 A 4/1993 Comerci et al.
D335,508 S 5/1993 Skov
5,227,232 A 7/1993 Lim
5,236,375 A 8/1993 Kachlic
D339,613 S 9/1993 Pirnat
5,244,403 A 9/1993 Smith et al.
5,275,567 A 1/1994 Whitfield
5,281,154 A 1/1994 Comerci et al.
5,304,069 A 4/1994 Brunker et al.
5,319,241 A 6/1994 Lim
5,345,221 A 6/1994 Pons et al.
5,346,399 A 9/1994 Sakow
5,349,129 A 9/1994 Wisniewski et al.
D352,750 S 11/1994 Kushner et al.
5,371,355 A 12/1994 Wodecki
D354,318 S 1/1995 Ryaa et al.
5,380,951 A 1/1995 Comerci et al.
5,385,344 A 1/1995 Miller et al.
5,409,227 A 4/1995 Walker
5,409,236 A 4/1995 Therrien
5,423,684 A 6/1995 Ishikawa
5,445,552 A 8/1995 Hine
5,447,433 A 9/1995 Perry, Jr.
5,451,178 A 9/1995 Yorozu et al.
5,452,201 A 9/1995 Pieronek et al.
5,455,749 A 10/1995 Ferber
5,459,283 A 10/1995 Birdwell, Jr.
5,462,443 A 10/1995 Kurbjuhn et al.
5,463,486 A 10/1995 Stevens
5,467,102 A 11/1995 Kuno et al.
5,469,331 A 11/1995 Conway et al.
D365,756 S 1/1996 Rask et al.
5,512,710 A 4/1996 Schroeder
D370,035 S 5/1996 Olsen
5,520,396 A 5/1996 Therrien
D371,583 S 7/1996 Knudsen
5,547,399 A 8/1996 Naghi et al.
5,547,933 A 8/1996 Lin
5,563,771 A 8/1996 Bethurum
5,558,542 A 9/1996 O'Sullivan et al.
D374,257 S 10/1996 Schmidt et al.
5,574,312 A 11/1996 Bayerer et al.
5,580,283 A 12/1996 O'Sullivan et al.
5,596,233 A 1/1997 Leiber et al.
5,607,336 A 3/1997 Lebensfeld et al.
5,610,931 A 3/1997 Huang
D378,837 S 4/1997 Olsen et al.
5,645,463 A 7/1997 Olsen
5,648,892 A 7/1997 Wieloch et al.
5,651,685 A 7/1997 Brinkman et al.
5,658,155 A 8/1997 McFarlane et al.
5,661,470 A 8/1997 Karr
5,663,938 A 9/1997 Dang et al.
5,667,411 A 9/1997 O'Sullivan et al.
D385,926 S 11/1997 Nielsen
5,697,829 A 12/1997 Chainani et al.
5,703,761 A 12/1997 Heiss
D389,408 S 1/1998 Rask et al.
5,705,853 A 1/1998 Faller et al.
5,721,496 A 2/1998 Farnworth et al.
5,722,861 A 3/1998 Wetter
5,724,074 A 3/1998 Chainani et al.
5,739,050 A 4/1998 Farnworth
5,742,169 A 4/1998 Akram et al.
5,746,638 A 5/1998 Shiraishi
5,747,940 A 5/1998 Openiano
5,766,077 A 6/1998 Hongo
5,779,515 A 7/1998 Chung
5,799,067 A 8/1998 Kikinis et al.
RE35,896 E 9/1998 Brunker et al.
5,812,397 A 9/1998 Pech et al.
5,823,782 A 10/1998 Marcus et al.
5,833,456 A 10/1998 Davis et al.
5,838,161 A 11/1998 Akram et al.
5,841,360 A 11/1998 Binder
5,845,503 A 12/1998 Choi
5,848,503 A * 12/1998 Toft .................... A63H 33/042
52/173.1
5,850,581 A 12/1998 Roller
5,853,327 A 12/1998 Gilboa
5,872,354 A 2/1999 Hanson
5,901,263 A 5/1999 Gaio et al.
5,902,155 A 5/1999 Polgar et al.
5,921,864 A 7/1999 Walker et al.
5,941,714 A 8/1999 Gorbet et al.
5,947,787 A 9/1999 Cyrus et al.
5,949,010 A 9/1999 Hacker
5,956,046 A 9/1999 Kehlet et al.
5,966,526 A 10/1999 Yokoi
5,971,855 A 10/1999 Ng
5,984,756 A 11/1999 Krog
6,024,626 A 2/2000 Mendelsohn
6,030,270 A 2/2000 Krog
6,062,937 A 5/2000 Kikuchi
6,099,353 A 8/2000 Wu
6,102,766 A 8/2000 Leadbetter et al.
6,110,000 A 8/2000 Ting
6,132,281 A 10/2000 Klitsner et al.
6,147,552 A 11/2000 Sauer
6,165,068 A 12/2000 Sonoda et al.
6,168,494 B1 1/2001 Engel et al.
6,171,168 B1 1/2001 Jessop
6,190,174 B1 2/2001 Lam
6,206,745 B1 3/2001 Gabai et al.
6,213,871 B1 4/2001 Yokoi
6,222,665 B1 4/2001 Neuner et al.
6,227,931 B1 5/2001 Shackelford
6,227,966 B1 5/2001 Yokoi
6,233,502 B1 5/2001 Yim
6,236,796 B1 5/2001 Tamura et al.

(56) References Cited

U.S. PATENT DOCUMENTS

| | | | |
|---|---|---|---|
| 6,237,914 | B1 | 5/2001 | Saltanov et al. |
| 6,249,009 | B1 | 6/2001 | Kim |
| 6,255,800 | B1 | 7/2001 | Bork |
| 6,271,453 | B1 | 8/2001 | Hacker |
| 6,280,278 | B1 | 8/2001 | Wells |
| 6,290,565 | B1 | 9/2001 | Galyean, III et al. |
| 6,297,785 | B1 | 10/2001 | Sommer et al. |
| 6,306,039 | B1 | 10/2001 | Kaji et al. |
| 6,380,844 | B2 | 4/2002 | Pelekis |
| 6,386,979 | B1 | 5/2002 | Ho et al. |
| 6,422,941 | B1 | 7/2002 | Thorner et al. |
| 6,425,581 | B1 | 7/2002 | Barrett |
| 6,431,936 | B1 | 8/2002 | Kiribuchi |
| 6,438,456 | B1 | 8/2002 | Feddema et al. |
| 6,443,796 | B1 | 9/2002 | Shackelford |
| 6,454,624 | B1 | 9/2002 | Duff et al. |
| 6,469,901 | B1 | 10/2002 | Costner |
| 6,477,444 | B1 | 11/2002 | Bennett, III et al. |
| 6,480,510 | B1 | 11/2002 | Binder |
| 6,478,583 | B1 | 12/2002 | Standiford et al. |
| 6,535,907 | B1 | 3/2003 | Hachiya et al. |
| D473,849 | S | 4/2003 | Yeh |
| 6,527,611 | B2 | 4/2003 | Cummings |
| 6,540,606 | B1 | 4/2003 | Matsukata |
| 6,540,614 | B1 | 4/2003 | Nishino et al. |
| 6,560,511 | B1 | 5/2003 | Yokoo et al. |
| 6,563,413 | B1 | 5/2003 | Ponweiser et al. |
| 6,569,018 | B2 | 5/2003 | Jaffe |
| 6,574,234 | B1 | 6/2003 | Myer et al. |
| 6,575,802 | B2 | 6/2003 | Yim et al. |
| 6,579,178 | B1 | 6/2003 | Walker et al. |
| 6,505,087 | B1 | 7/2003 | Lucas et al. |
| 6,585,553 | B1 | 7/2003 | Fetridge et al. |
| 6,605,914 | B2 | 8/2003 | Yim et al. |
| 6,611,537 | B1 | 8/2003 | Edens et al. |
| 6,628,244 | B1 | 9/2003 | Hirosawa et al. |
| 6,629,771 | B2 | 10/2003 | Chiu |
| 6,634,920 | B1 | 10/2003 | Michaelsen |
| 6,652,383 | B1 | 11/2003 | Sonoda et al. |
| 6,679,751 | B1 | 1/2004 | Maxwell et al. |
| 6,682,230 | B1 | 1/2004 | Demangone et al. |
| 6,682,392 | B2 | 1/2004 | Chan |
| 6,687,128 | B2 | 2/2004 | Tokuhara |
| 6,692,001 | B2 | 2/2004 | Romano |
| 6,692,310 | B2 | 2/2004 | Zaderej et al. |
| 6,719,603 | B2 | 4/2004 | Chan |
| 6,725,128 | B2 | 4/2004 | Hogg et al. |
| 6,727,177 | B1 | 4/2004 | Catabay et al. |
| 6,752,680 | B1 | 6/2004 | Hansen |
| 6,761,609 | B1 | 7/2004 | Anderson |
| 6,773,322 | B2 | 8/2004 | Gabai et al. |
| 6,795,318 | B2 | 9/2004 | Haas et al. |
| 6,805,605 | B2 | 10/2004 | Reining et al. |
| 6,819,304 | B2 | 11/2004 | Branson |
| 6,850,426 | B2 | 2/2005 | Kojori et al. |
| 6,893,315 | B2 | 5/2005 | Barri |
| 6,893,316 | B2 | 5/2005 | Maxwell et al. |
| 6,902,461 | B1 | 6/2005 | Munch et al. |
| 6,931,656 | B1 | 8/2005 | Eshelman et al. |
| 6,939,192 | B1 | 9/2005 | Munch et al. |
| 6,940,783 | B2 | 9/2005 | Fox et al. |
| 6,952,196 | B2 | 10/2005 | Weil et al. |
| 6,956,826 | B1 | 10/2005 | Binder |
| 6,965,298 | B2 | 11/2005 | Feinberg |
| 6,967,274 | B2 | 11/2005 | Hanington |
| 6,970,145 | B1 | 11/2005 | Aoki |
| 6,979,245 | B1 | 12/2005 | Goodwin |
| 6,988,008 | B2 | 1/2006 | Hudson et al. |
| 7,008,324 | B1 | 3/2006 | Johnson et al. |
| 7,018,213 | B2 | 3/2006 | Marcus et al. |
| 7,044,825 | B2 | 5/2006 | Glickman et al. |
| 7,066,778 | B2 | 6/2006 | Kretzschmar |
| 7,089,083 | B2 | 8/2006 | Yokoo et al. |
| 7,089,333 | B2 | 8/2006 | Marinescu et al. |
| 7,104,863 | B2 | 9/2006 | Mimlitch, III et al. |
| 7,124,157 | B2 | 10/2006 | Ikake |
| 7,144,255 | B2 | 12/2006 | Seymour |
| 7,145,933 | B1 | 12/2006 | Szajnowski |
| 7,170,468 | B2 | 1/2007 | Knopf |
| 7,184,718 | B2 | 2/2007 | Newman et al. |
| 7,196,676 | B2 | 3/2007 | Nakamura et al. |
| 7,234,941 | B2 | 6/2007 | Shuler et al. |
| 7,238,026 | B2 | 7/2007 | Brown et al. |
| 7,242,369 | B2 | 7/2007 | Huang |
| 7,252,572 | B2 | 7/2007 | Wright et al. |
| 7,273,377 | B2 | 9/2007 | Seymour |
| 7,275,937 | B2 | 10/2007 | Ellison |
| 7,297,045 | B2 | 11/2007 | Pierson et al. |
| 7,316,567 | B2 | 1/2008 | Hsieh et al. |
| 7,322,873 | B2 | 1/2008 | Rosen et al. |
| 7,331,793 | B2 | 2/2008 | Hernandez et al. |
| 7,333,328 | B2 | 2/2008 | Funawatar et al. |
| 7,347,760 | B2 | 3/2008 | Wood et al. |
| 7,358,929 | B2 | 4/2008 | Mueller et al. |
| 7,369,399 | B2 | 5/2008 | Richardson |
| 7,370,974 | B2 | 5/2008 | Yamada et al. |
| 7,371,177 | B2 | 5/2008 | Ellis et al. |
| 7,413,493 | B2 | 8/2008 | Toht et al. |
| 7,414,186 | B2 | 8/2008 | Scarpa et al. |
| D576,208 | S | 9/2008 | Quercetti |
| 7,427,066 | B1 | 9/2008 | Goodwin |
| D585,096 | S | 1/2009 | Lin |
| 7,481,692 | B2 | 1/2009 | Bruder |
| 7,541,907 | B2 | 2/2009 | Wang et al. |
| 7,507,136 | B2 | 3/2009 | Patton |
| 7,508,141 | B2 | 3/2009 | Wong |
| 7,510,457 | B2 | 3/2009 | Hussa-Lietz |
| 7,511,454 | B1 | 3/2009 | Legg |
| 7,568,963 | B1 | 4/2009 | Atsmon et al. |
| 7,555,409 | B1 | 6/2009 | Bhaskar et al. |
| 7,555,658 | B2 | 6/2009 | Vahid et al. |
| 7,556,563 | B2 | 7/2009 | Ellis et al. |
| 7,567,854 | B2 | 7/2009 | Desmond |
| 7,584,565 | B2 | 9/2009 | Zebersky |
| 7,585,216 | B2 | 9/2009 | Foster |
| 7,596,473 | B2 | 9/2009 | Hansen et al. |
| 7,607,962 | B2 | 10/2009 | Hardin |
| 7,611,357 | B2 | 11/2009 | Han et al. |
| 7,641,477 | B2 | 1/2010 | DiFonzo et al. |
| 7,645,143 | B2 | 1/2010 | Rohrbach et al. |
| 7,653,757 | B1 | 1/2010 | Fernald et al. |
| 7,666,054 | B2 | 2/2010 | Glickman et al. |
| D614,250 | S | 4/2010 | Frederiksen |
| 7,695,338 | B2 | 4/2010 | Dooley et al. |
| 7,708,615 | B2 | 5/2010 | Munch |
| 7,781,979 | B2 | 8/2010 | Lys |
| 7,785,179 | B2 | 8/2010 | Ionescu |
| 7,794,272 | B1 | 9/2010 | Hiatt et al. |
| 7,811,150 | B2 | 10/2010 | Amireh et al. |
| 7,819,114 | B2 | 10/2010 | Augenbraun et al. |
| 7,828,556 | B2 | 11/2010 | Rodrigues |
| 7,846,002 | B1 | 12/2010 | Mikesell et al. |
| 7,887,056 | B2 | 2/2011 | Tenorio |
| D635,190 | S | 3/2011 | Merrill et al. |
| 7,909,697 | B2 | 3/2011 | Zheng |
| 7,942,717 | B2 | 5/2011 | Chou |
| 7,952,322 | B2 | 5/2011 | Partovi et al. |
| 7,961,113 | B2 | 6/2011 | Rabiner et al. |
| 7,988,561 | B1 | 8/2011 | Lenkarski et al. |
| 7,996,111 | B2 | 8/2011 | Cheng et al. |
| 8,016,636 | B2 | 9/2011 | Park |
| 8,038,532 | B2 | 10/2011 | Neervoort et al. |
| 8,047,889 | B2 | 11/2011 | Ishii |
| 8,052,299 | B2 | 11/2011 | Lin |
| 8,057,233 | B2 | 11/2011 | Owen |
| 8,061,713 | B2 | 11/2011 | Cook |
| 8,079,890 | B2 | 12/2011 | Seligman |
| D658,586 | S | 1/2012 | Lin |
| 8,087,939 | B2 | 1/2012 | Rohrbach et al. |
| 8,091,892 | B2 | 1/2012 | Sternberg |
| 8,100,735 | B2 | 1/2012 | Park |
| 8,187,006 | B2 | 5/2012 | Rudisill et al. |
| 8,221,182 | B2 | 7/2012 | Seymour et al. |
| 8,239,597 | B2 | 7/2012 | Wishneusky |

(56) References Cited

U.S. PATENT DOCUMENTS 8,243,438 B2 8/2012 Wang et al.
8,321,782 B1 11/2012 Broucek
8,576,031 B2 5/2013 Lauder et al.
8,491,312 B2 7/2013 Rudisill et al.
8,573,596 B2 11/2013 Gearty
8,651,913 B1 2/2014 Lin
8,742,814 B2 6/2014 Binder
8,753,163 B2 6/2014 Gaute
8,753,164 B2 6/2014 Hansen et al.
8,851,953 B2 7/2014 Oschuetz et al.
9,128,661 B2 8/2015 Zilber
9,144,749 B2 9/2015 Munch et al.
9,168,464 B2 10/2015 Karunaratne
10,164,427 B2 12/2018 Binder
2002/0058235 A1 5/2002 Dinnerstein
2002/0061701 A1 5/2002 Chan
2002/0107075 A1 8/2002 Stephan
2002/0111203 A1 8/2002 Chi
2002/0186302 A1 12/2002 Pulkinnen
2002/0196250 A1 12/2002 Anderson et al.
2003/0021455 A1 1/2003 Dixon et al.
2003/0148249 A1 8/2003 Marcus et al.
2003/0148700 A1* 8/2003 Arlinsky .................. G09B 1/40 446/91
2003/0162160 A1 8/2003 Horchler et al.
2005/0003885 A1 1/2005 Rhoten
2005/0191932 A1 1/2005 Lin
2005/0049023 A1 3/2005 Foster
2005/0184459 A1 8/2005 Marantz et al.
2005/0234592 A1 10/2005 McGee et al.
2005/0243489 A1 11/2005 Seymour
2005/0245103 A1 11/2005 Ellison
2006/0041394 A1 2/2006 Kuwayama
2006/0041730 A1 2/2006 Larson
2006/0046605 A1 2/2006 Piretti et al.
2006/0172787 A1 3/2006 Ellis et al.
2006/0100739 A1 5/2006 Raffle et al.
2006/0136180 A1 6/2006 Hansen et al.
2006/0154711 A1 7/2006 Ellis et al.
2006/0215476 A1 9/2006 Owen
2007/0062852 A1 3/2007 Zachut et al.
2007/0072442 A1 3/2007 DiFonzo et al.
2007/0205962 A1 6/2007 Thompson
2007/0173095 A1 7/2007 Bin-Nun et al.
2007/0173202 A1 7/2007 Binder
2007/0184722 A1 8/2007 Doherty
2007/0256337 A1 11/2007 Segan
2007/0262984 A1 11/2007 Pruss
2007/0278740 A1 12/2007 Mao
2008/0037310 A1 2/2008 Kasahara
2008/0052439 A1 2/2008 Young
2008/0083149 A1 4/2008 Zebersky
2008/0166926 A1 7/2008 Seymour et al.
2008/0224396 A1 9/2008 Cocis et al.
2008/0232061 A1 9/2008 Wang et al.
2008/0259551 A1 10/2008 Gavenda et al.
2008/0139077 A1 12/2008 Patton
2009/0019224 A1 2/2009 Pocrass
2009/0034169 A1 2/2009 Richardson et al.
2009/0298382 A1 3/2009 Ochi
2009/0102442 A1 4/2009 Lai
2009/0127785 A1 5/2009 Kishon
2009/0273560 A1 5/2009 Kalanithi et al.
2009/0181595 A1 7/2009 Song et al.
2009/0189348 A1* 7/2009 Kucharski ................ A63F 3/00 273/288
2009/0214051 A1 8/2009 Lockett et al.
2009/0215357 A1 8/2009 Seligman
2009/0093182 A1 9/2009 Jacobs et al.
2009/0305602 A1 10/2009 Gaute
2009/0297136 A1 12/2009 Lin
2010/0017654 A1 1/2010 Wishneusky
2010/0033127 A1 2/2010 Griffin, Jr. et al.
2010/0077229 A1 3/2010 Yu
2010/0087119 A1 4/2010 Vicentelli
2010/0151738 A1 6/2010 Chou
2010/0197148 A1 8/2010 Rudisill et al.
2010/0214747 A1 8/2010 Jacobs et al.
2010/0259001 A1 10/2010 Muller, III et al.
2010/0311300 A1 12/2010 Hansen et al.
2010/0330867 A1 12/2010 Fogel et al.
2011/0059652 A1 3/2011 Hoyack et al.
2011/0097996 A1 4/2011 Kalanithi et al.
2011/0127718 A1 6/2011 Wescom et al.
2011/0151743 A1* 6/2011 Munch ................ A63H 33/086 446/91
2011/0215998 A1 9/2011 Fitzgerald et al.
2011/0221129 A1 9/2011 Sisson et al.
2011/0031689 A1 10/2011 Binder
2011/0263145 A1 10/2011 Kim
2011/0263177 A1 10/2011 Lemchen
2011/0292618 A1 12/2011 Naukkarinen et al.
2011/0300772 A1 12/2011 Risvig
2012/0069502 A1 3/2012 Lauder et al.
2012/0122059 A1 5/2012 Schweikardt et al.
2012/0135613 A1 5/2012 Chatterjee et al.
2012/0169748 A1 7/2012 Merrill et al.
2012/0200034 A1 8/2012 Braha et al.
2012/0223479 A1 9/2012 Pabon
2012/0262301 A1 10/2012 Davidson et al.
2012/0270479 A1 10/2012 Batty
2012/0329359 A1 12/2012 Capriola
2013/0016483 A1 1/2013 Chuang et al.
2013/0050958 A1 2/2013 Bdeir
2013/0069305 A1 3/2013 Lee et al.
2013/0072082 A1 3/2013 Wizenberg et al.
2013/0217294 A1 8/2013 Karunaratne
2013/0234390 A1 9/2013 Pabon
2013/0301224 A1 11/2013 Chu
2013/0343025 A1 12/2013 Bdeir
2014/0038466 A1 6/2014 Karodi et al.
2014/0349545 A1 11/2014 Paulson et al.
2014/0378023 A1 12/2014 Muthyala et al.
2015/0182869 A1 7/2015 Karunaratne

FOREIGN PATENT DOCUMENTS

EP 1616607 1/2006
EP 2 163 998 3/2010
EP 2163998 3/2010
FR 2629731 A1 10/1989
FR 2709427 A1 10/1995
GB 2267041 11/1993
GB 2360469 9/2001
GB 2398257 8/2004
GB 2465339 5/2010
WO 9428348 12/1994
WO 9712349 4/1997
WO 0191867 12/2001
WO 2011007349 1/2011
WO 2013175269 11/2013
WO 2014032043 2/2014
WO 2015117099 6/2015

OTHER PUBLICATIONS

Jantapremjit, P. and Austin, D., "Design of a Modular Self-Reconfigurable Robot", Proc. 2001 Australian Conference on Robotics and Automation, Sydney, Nov. 14-15, 2001 (6 pages).

Schweikardt E. and Gross M. D., "roBlocks: A Robotic Construction Kit for Mathematics and Science Education" ICMI '06, Nov. 2-4, 2006, Banff, Alberta, Canada (4 pages).

Schweikardt E. and Gross M. D., "A Brief Survey of Distributed Compytational Toys", 2007, The First IEEE int'l Workshop on, IEEE, PI, Mar. 1, 2007 (8 pages).

Yim, M., White P., Park M., and Sastra J., "Modular Self-Reconfiguable Robots", Encyclopedia of Complexity and Systems Science, 2009, pp. 19-32 (15 pages).

Schweikardt E. and Gross M. D., "Learning about Complexity with Modular Robots", 2008 Second IEEE int'l Conference on, IEEE, Piscataway, NJ, USA, Nov. 17, 2008 (8 pages).

(56) References Cited

OTHER PUBLICATIONS

Schweikardt E. and Gross M. D., "The Robot is the Program: Interacting with roBlocks", 2008 (2 pages).
International Preliminary Report on Patentability (IPRP) of PCT/IL2010/000559 dated Jan. 12, 2012.
Communication from the EPO Examining Division in EP No. 10751716.1 dated Jun. 7, 2013.
Data Book '82C931 Plug and Play Integrated Audio Controller', OPTi Inc., Milpitas, CA, USA, Doc. 912-3000-035 Revision 2.1 Aug. 1, 1997 (64 pages).
Application Note 'RS-422/485 Application Note', B&B Electronics Mfg. Co. Inc., Ottawa, IL, USA, Revised 2506 Jun. 2006 (43 pages).
Application Note—Integrated Circuits 'AN170—NE555 and NE556 applications', Philips Semiconductors, Dec. 1988 (19 pages).
Application Note 1031 'TIA/EIA-422-B Overview', National Semiconductor Corporation AN012598, Jan. 2000 (7 pages).
Application Note 1057 'Ten Ways to Bulletproof RS-485 Interfaces', National Semiconductor Corporation AN012882, Oct. 1996 (10 pages).
Data-sheet ICS9120-8 ICS9120-09 'Frequency Generator for Multimedia Audio Synthesis', Integrated Circuit Systems, Inc. 9120-08 9120-09 Rev C 052297P, downloaded from the Internet on 2009 (7 pages).
Catalog data-sheet 'True Random Number Generation IC RPG100 / RPG100B', FDK Corporation, Sep. 2005 (4 pages).
Data-sheet MAX202E-MAX213E, MAX232E-MAX241-E '±15kV ESD-Protected, +5V RS-232 Transceivers', Maxim Integrated Products, Inc. Sunnyvale, CA, USA, 19-0175; Rev 6; Mar. 2005 (25 pages).
Data-sheet MAX3030E-MAX3033E '±15kV ESD-Protected, 3.3V Quad RS-422 Transmitters', Maxim Integrated Products, Inc. Sunnyvale, CA, USA, 19-2671; Rev 0; Oct. 2002 (14 pages).
Data-sheet MAX3080-MAX3089 'Fail-Safe, High-Speed (10Mbps), Slew-Rate-Limited RS-485/RS-422 Transceivers', Maxim Integrated Products, Inc. Sunnyvale, CA, USA, 19-1138; Rev 3; Dec. 2005 (20 pages).
Data-sheet MAX3095-MAX3096 '±15kV ESD-Protected, 10Mbps, 3V/5V, Quad RS-422/RS-485 Receivers', Maxim Integrated Products, Inc. Sunnyvale, CA, USA, 19-0498; Rev 1; Oct. 2000 (12 pages).
Universal Serial Bus Specifications, Revision 1.0, Jan. 15, 1996, NTGR-SERC 012327-012594 (268 pages).
YMF721 Catalog No. LSI-4MF721A20 'YMF721 OPL4-ML2 FM+Wavetable Synthesizer LSI', Yamaha Corporationm, Shizuoka, Japan, Jul. 10, 1997 (41 pages).
IEEE Std. 802.3af—2003, "Part 3: Carrier sense Multiple Access with Collision Detection (CSMA/CD) Access Method and Physical Layer Specifications, Amendment: Data Terminal Equipment (DTE) Power via Media Dependent Interface (MDI)", 2003 (133 pages).
IEEE Std. 802.3at—2009, "Part 3: Carrier sense Multiple Access with Collision Detection (CSMA/CD) Access Method and Physical Layer Specifications, Amendment 3: Data Terminal Equipment (DTE) Power via Media Dependent Interface (MDI) Enhancements", 2009 (141 pages).
White Paper "All You Need To Know About Power over Ethernet (PoE) and the IEEE 802.3af Standard", by PowerDsine Ltd., 06-0002-082 May 20, 2004 (24 pages).
User's Manual Revision 1.0 Magnevation LLC Magnevation SpeakJet chip 'Natural Speech & Complex Sound Synthesizer' Jul. 27, 2004 (17 pages).
Data-sheet "General Purpose Timers", Maxim Integrated Products, Inc. publication No. 19-0481 Rev.2 Nov. 1992 (8 pages).
Data-sheet Rev. 1.00 Holtek Semiconductor Inc. HT3834 CMOS VLSI Integrated Circuit (IC) '36 Melody Music Generator' dated Nov. 2, 2006 (16 pages).
Data-sheet PF226-04 EPSON 7910 series 'Multi-Melody IC' Seiko-Epson Corporation, Electronic Devices Marketing Division dated 1998 (4 pages).
IBM Corporation, International Technical Support Organization Redbook Document No. GG24-4756-00 "Local area Network Concepts and Products: LAN Operation Systems and management", 1st Edition May 1996, (216 pages).
Cisco Systems, Inc. publication No. 1-587005-001-3 (Jun. 1999), "Internetworking Technologies Handbook", Chapter 7 "Ethernet Technologies", pp. 7-1 to 7-38 (38 pages).
Cisco Systems, Inc. publication No. 1-587005-001-3 (Jun. 1999), "Internetworking Technologies Handbook", Chapter 20: "Wireless Technologies", pp. 20-21 to 20-42 (42 pages).
'SIDACtor Data Book and Design Guide', Teccor electyronics Irving, Texas, USA, 2002 (212 pages).
Ben Erwin et al., "Lego Engineer and RoboLab: Teaching Engineering with LabVIEW from kindergarten to Graduate School", Center for Engineering Education Outeach, Int. J. Engng Ed. vol. 16, No. 3, pp. 181-192, 2000 (12 pages).
Jim Gindling et al, "LEGOsheets: A Rule-Based Programminf, Simulation and Manipolation Environment for the LEGO Programmable Brick", University of Colorado, (8 pages).
Hideyuki Suzuki and Hiroshi Kato, AlgoBlock: a Tangible Programming Language—a Tool for Collaborative Learning, Retrieved on Jun. 27, 2016 (10 pages).
David W. Hogg et al, Braitenberg Creatures, Massachusetts Institute of Technology, Media Laboratory, E&L Memo No. 13, Jun. 1991 (11 pages).
Perlman Radia, TORTIS (Toddler's Own Recursive Turtle Interpreter System), Massachusetts Institute of Technology, LOGO-9, Mar. 1974 (11 pages).
Michael S. Horn and Robert J.K. Jacob, Designing Tangible Programming Languages for Classroom Use, ACM, 2007 (3 pages).
Michael Horn and Robert J.K. Jacob, Tangible Programming in the Classroom with Tern, CHI 2007, Apr. 28-May 3, 2007, San Jose, USA, ACM 978-1-59593-642-4/07/0004 (6 pages).
Seymour Papert, Mindstorms, Cambridge, Massachusetts, Apr. 1980 (99 pages).
Hayes Solos Raffl e, Amanda J. Parkes and Hiroshi Ishii, Topobo: A Constructive Assembly System with Kinetic Memory, CHI 2004, Apr. 24-29, 2004, Vienna, Austria, ACM 1-58113-702-8/04/0004 (8 pages).
Arnan Sipitakiat, Nusarin Nusen, Robo-Blocks: designing debugging abilities in a tangible programming system for early primary school children, Jan. 2012, Retrieved on: Jun. 30, 2016.
Daniel Gallardo, Carles F. Julia and Sergi Jorda, TurTan: a Tangible Programming Language for Creative Exploration, Music Technology Group, Universitat Pompeu Fabra, Ocata 1, 08003 Barcelona (4 pages).
Timothy S. McNemey, Tangible Computation Bricks: Building-blocks for physical Microworlds, CHI 2001, Version Sep. 11, 2000 (6 pages).
Mitchel Resnick et al., Digital Manipulatives: New Toys to Think With, CHI '98 conference (12 pages).
Data-sheet LS 1356 IC Bowin Electronic Company Hong-Kong, LSI-LS1356 '4 Digit Time with Colon Default' Version 1.2 (Oct. 24, 2003) (6 pages).
Data-sheet ML2215 FEDL2215-01 OKI Semiconductor 'Speech synthesizer plus Music LSI with On-Chip 3 Mbit Mask ROM' May 2001 (26 pages).
Data-sheet UM3481 Bowin Electronic Company Hong-Kong, 'UM3481 Series—UM3481A A Multi-Instrument Melody Generator' REV.6-03 (4 pages).
Hynix Semiconductor Inc., HMS30C7202 Highly Integrated MPU (ARM based 32-bit Microprocessor) Datasheet version 1.3, copyright 2002, pp. vi, and 9.
International Search Report of PCT\IL2010\000627 dated Feb. 24, 2011.
Gilpin et al "Miche: Modular shape Formation by Self-Disassembly" The International Journal of Robotics Research, 27:3-4 (Mar. 2008).
Stoy et al "Modular Robotics: The State of the Art" Proceedings of the IEEE 2010 International Conference on Robotics and Automation Workshop 1-115 (May 2010).

(56) References Cited

OTHER PUBLICATIONS

International Search Report of PCT/IL2010/000559 dated Nov. 16, 2010.

* cited by examiner

65

| | TIME (62a) | #1 (62b) | #2 (62c) | #3 (62d) | #4 (62e) |
|---|---|---|---|---|---|
| 61a | 0 | OFF | OFF | OFF | OFF |
| 61b | 1 | ON | OFF | OFF | OFF |
| 61c | 2 | OFF | ON | OFF | OFF |
| 61d | 3 | OFF | OFF | ON | OFF |
| 61e | 4 | OFF | OFF | OFF | ON |
| 61f | 5 | OFF | OFF | OFF | OFF |
| 61g | 6 | OFF | OFF | OFF | OFF |

| TIME | #1 | #2 | #3 | #4 |
| --- | --- | --- | --- | --- |
| 0 | OFF | OFF | OFF | OFF |
| 1 | ON | OFF | OFF | OFF |
| 2 | OFF | ON | OFF | OFF |
| 3 | ON | OFF | ON | OFF |
| 4 | OFF | ON | OFF | ON |
| 5 | OFF | OFF | ON | OFF |
| 6 | OFF | OFF | OFF | ON |

| | 62a | 62b | 62c | 62d | 62e |
|---|---|---|---|---|---|
| | TIME | #1 | #2 | #3 | #4 |
| 61a | 0 | OFF | OFF | OFF | OFF |
| 61b | 1 | ON | OFF | OFF | OFF |
| 61c | 2 | ON | ON | OFF | OFF |
| 61d | 3 | ON | ON | ON | OFF |
| 61e | 4 | ON | ON | ON | ON |
| 61f | 5 | ON | ON | ON | ON |
| 61g | 6 | ON | ON | ON | ON |

| | 62a | 62b | 62c | 62d | 62e |
|---|---|---|---|---|---|
| | TIME | #1 | #2 | #3 | #4 |
| 61a | 0 | OFF | OFF | OFF | OFF |
| 61b | 1 | ON | OFF | OFF | OFF |
| 61c | 2 | ON | ON | OFF | OFF |
| 61d | 3 | OFF | ON | ON | OFF |
| 61e | 4 | OFF | OFF | ON | ON |
| 61f | 5 | OFF | OFF | OFF | ON |
| 61g | 6 | OFF | OFF | OFF | OFF |

| | 62a | 62c | 62d | 62e |
|---|---|---|---|---|
| | TIME | #1 | #2 | #3 |
| 61a | 0 | OFF | OFF | OFF |
| 61b | 1 | ON | OFF | OFF |
| 61c | 2 | OFF | ON | OFF |
| 61d | 3 | OFF | OFF | ON |
| 61e | 4 | OFF | OFF | OFF |
| 61f | 5 | OFF | OFF | ON |
| 61g | 6 | OFF | ON | OFF |
| 61h | 7 | ON | OFF | OFF |
| 61i | 8 | OFF | OFF | OFF |
| 61j | 9 | OFF | OFF | OFF |

| | TIME | #1 | #2 | #3 |
|---|---|---|---|---|
| 61a | 0 | OFF | OFF | OFF |
| 61b | 1 | ON1 | OFF | OFF |
| 61c | 2 | ON1 | ON1 | OFF |
| 61d | 3 | ON1 | ON1 | ON1 |
| 61e | 4 | ON1 | ON1 | ON1 |
| 61f | 5 | ON1 | ON1 | ON12 |
| 61g | 6 | ON1 | ON12 | ON12 |
| 61h | 7 | ON12 | ON12 | ON12 |
| 61i | 8 | ON12 | ON12 | ON12 |
| 61j | 9 | ON12 | ON12 | ON12 |

| | 62a | 62c | 62d | 62e |
|---|---|---|---|---|
| | TIME | #1 | #2 | #3 |
| 61a | 0 | OFF | OFF | OFF |
| 61b | 1 | ON | OFF | OFF |
| 61c | 2 | ON | ON | OFF |
| 61d | 3 | ON | ON | ON |
| 61e | 4 | ON | ON | ON |
| 61f | 5 | ON | ON | OFF |
| 61g | 6 | ON | OFF | OFF |
| 61h | 7 | OFF | OFF | OFF |
| 61i | 8 | OFF | OFF | OFF |
| 61j | 9 | OFF | OFF | OFF |

| | 62a | 62g | 62c | 62d | 62e | 62h |
|---|---|---|---|---|---|---|
| | TIME | #1 | #2 | #3 | #4 | #5 |
| 61a | 0 | OFF | OFF | OFF | OFF | OFF |
| 61b | 1 | ON | OFF | OFF | OFF | OFF |
| 61c | 2 | OFF | ON | OFF | OFF | OFF |
| 61d | 3 | OFF | OFF | ON | OFF | OFF |
| 61e | 4 | OFF | OFF | OFF | ON | OFF |
| 61f | 5 | OFF | OFF | OFF | OFF | ON |
| 61g | 6 | OFF | OFF | OFF | ON | OFF |
| 61h | 7 | OFF | OFF | ON | OFF | OFF |
| 61i | 8 | OFF | ON | OFF | OFF | OFF |
| 61j | 9 | OFF | OFF | OFF | OFF | OFF |

| | TIME (62a) | #1 (62g) | #2 (62c) | #3 (62d) | #4 (62e) | #5 (62h) |
|---|---|---|---|---|---|---|
| 61a | 0 | OFF | OFF | OFF | OFF | OFF |
| 61b | 1 | ON | OFF | OFF | OFF | OFF |
| 61c | 2 | ON | ON | OFF | OFF | OFF |
| 61d | 3 | ON | ON | ON | OFF | OFF |
| 61e | 4 | ON | ON | ON | ON | OFF |
| 61f | 5 | ON | ON | ON | ON | ON |
| 61g | 6 | ON | ON | ON | ON | ON |
| 61h | 7 | ON | ON | ON | ON | ON |
| 61i | 8 | ON | ON | ON | ON | ON |
| 61j | 9 | ON | ON | ON | ON | ON |

| | 62a | 62g | 62c | 62d | 62e | 62h |
|---|---|---|---|---|---|---|
| | TIME | #1 | #2 | #3 | #4 | #5 |
| 61a | 0 | OFF | OFF | OFF | OFF | OFF |
| 61b | 1 | ON | OFF | OFF | OFF | OFF |
| 61c | 2 | ON | ON | OFF | OFF | OFF |
| 61d | 3 | ON | ON | ON | OFF | OFF |
| 61e | 4 | ON | ON | ON | ON | OFF |
| 61f | 5 | ON | ON | ON | ON | ON |
| 61g | 6 | ON | ON | ON | OFF | OFF |
| 61h | 7 | ON | ON | OFF | OFF | OFF |
| 61i | 8 | ON | OFF | OFF | OFF | OFF |
| 61j | 9 | ON | OFF | OFF | OFF | OFF |

| | 62a | 62g | 62c | 62d | 62e | 62h | 62i | 62j |
|---|---|---|---|---|---|---|---|---|
| | TIME | #1 | #2 | #3 | #4 | #5 | #6 | #7 |
| 61a | 0 | OFF | OFF | OFF | OFF | OFF | OFF | OFF |
| 61b | 1 | ON | OFF | OFF | OFF | OFF | OFF | OFF |
| 61c | 2 | OFF | ON | OFF | OFF | OFF | OFF | OFF |
| 61d | 3 | OFF | OFF | OFF | OFF | OFF | ON | OFF |
| 61e | 4 | OFF | OFF | ON | OFF | OFF | OFF | ON |
| 61f | 5 | OFF | OFF | OFF | ON | OFF | OFF | OFF |
| 61g | 6 | OFF | OFF | OFF | OFF | ON | OFF | OFF |
| 61h | 7 | OFF | OFF | OFF | ON | OFF | OFF | OFF |
| 61i | 8 | OFF | OFF | ON | OFF | OFF | OFF | OFF |
| 61j | 9 | OFF | OFF | OFF | OFF | OFF | ON | OFF |
| 61k | 10 | OFF | ON | OFF | OFF | OFF | OFF | OFF |

| | 62a | 62g | 62c | 62d | 62e | 62h | 62i | 62j |
|---|---|---|---|---|---|---|---|---|
| | TIME | #1 | #2 | #3 | #4 | #5 | #6 | #7 |
| 61a | 0 | OFF | OFF | OFF | OFF | OFF | OFF | OFF |
| 61b | 1 | ON | OFF | OFF | OFF | OFF | OFF | OFF |
| 61c | 2 | OFF | ON | OFF | OFF | OFF | OFF | OFF |
| 61d | 3 | OFF | OFF | OFF | OFF | OFF | ON | OFF |
| 61e | 4 | OFF | OFF | ON | OFF | OFF | OFF | ON |
| 61f | 5 | OFF | OFF | OFF | ON | OFF | OFF | OFF |
| 61g | 6 | OFF | OFF | OFF | OFF | ON | OFF | OFF |
| 61h | 7 | OFF | OFF | OFF | ON | OFF | OFF | OFF |
| 61i | 8 | OFF | OFF | ON | OFF | OFF | OFF | OFF |
| 61j | 9 | OFF | OFF | OFF | OFF | OFF | ON | OFF |
| 61k | 10 | OFF | ON | OFF | OFF | OFF | OFF | ON |

| | 62a | 62g | 62c | 62d | 62e | 62h |
|---|---|---|---|---|---|---|
| | TIME | #1 | #2 | #3 | #4 | #5 |
| 61a | 0 | OFF | OFF | OFF | OFF | OFF |
| 61b | 1 | ON | OFF | OFF | OFF | OFF |
| 61c | 2 | OFF | ON | OFF | OFF | OFF |
| 61d | 3 | OFF | OFF | ON | OFF | OFF |
| | ⋮ | | | | | |
| 61h | 7 | OFF | OFF | ON | OFF | OFF |
| 61i | 8 | OFF | ON | OFF | OFF | OFF |
| 61j | 9 | ON | OFF | OFF | OFF | OFF |
| 61k | 10 | OFF | ON | OFF | OFF | OFF |
| 61l | 11 | OFF | OFF | ON | OFF | OFF |

| | 62a | 62g | 62c | 62d | 62e | 62h |
|---|---|---|---|---|---|---|
| | TIME | #1 | #2 | #3 | #4 | #5 |
| 61a | 0 | OFF | OFF | OFF | OFF | OFF |
| 61b | 1 | ON | OFF | OFF | OFF | OFF |
| 61c | 2 | ON | ON | OFF | OFF | OFF |
| 61d | 3 | ON | ON | ON | OFF | OFF |
| | ⋮ | | | | | |
| 61h | 7 | ON | ON | OFF | OFF | ON |
| 61i | 8 | ON | OFF | OFF | OFF | ON |
| 61j | 9 | OFF | OFF | OFF | OFF | ON |
| 61k | 10 | OFF | ON | OFF | OFF | ON |
| 61l | 11 | OFF | ON | ON | OFF | ON |

FIG. 29b

SEQUENTIALLY OPERATED MODULES

FIELD OF THE INVENTION

The present invention relates generally to a system including interconnected modules, and, more particularly, to a system wherein a signal, such as a payload control or activation signal, is propagated sequentially from a module to another module connected thereto for controlling a payload or payloads.

BACKGROUND OF THE INVENTION

Examples of a distributed control system having modules connected for distributed control of payloads are disclosed in U.S. Pat. No. 5,841,360 to Binder entitled: "Distributed Serial Control System", in U.S. Pat. No. 6,480,510 to the same inventor entitled: "Local area network of serial intelligent cells", and in U.S. Pat. No. 6,956,826 to the same inventor entitled: "Local area network for distributing data communication, sensing and control signals", which are all incorporated in their entirety for all purposes as if fully set forth herein.

Toys are known in the art for providing amusement, education and entertainment particularly for children. Toy building sets and building blocks known as LEGO® bricks are disclosed in U.S. Pat. No. 3,034,254 to Christiansen entitled: "Toy Building Sets and Building Blocks". Examples of electrically conductive toys such as conductive LEGO® bricks are disclosed in U.S. Pat. No. 6,805,605 to Reining et al. entitled: "Electrically Conductive Block Toy", in U.S. Pat. No. 4,883,440 to Bolli entitled: "Electrified Toy Building Block with Zig-Zag Current Carrying Structure", and in U.S. Pat. No. 5,848,503 to Toft et al. entitled: "Constructional Building Set Having an Electric Conductor", which are all incorporated in their entirety for all purposes as if fully set forth herein. Three-dimensional conductive building block toys are disclosed in U.S. Patent Application Publication Number 2007/0184722 to Doherty entitled: "Powered Modular Building Block Toy", which is incorporated in its entirety for all purposes as if fully set forth herein.

In consideration of the foregoing, it would be an advancement in the art to provide a method and system that is simple, cost-effective, faithful, reliable, has a minimum part count, minimum hardware, and/or uses existing and available components for providing additional functionalities, amusement, education, entertainment and a better user experience relating to control of one or more payloads.

SUMMARY OF THE INVENTION

In one aspect of the present invention, a module or modules each having payload (or payloads) and related methods are described, and a system formed by plurality of connected modules. The payload (or payloads) in the system are activated or controlled based on a logic embedded in the modules or the system. The payloads may be activated or controlled sequentially, wherein a payload in a module is activated based on an activation signal propagated in the system according to the modules connection scheme.

A module may include a payload functionality, which includes receiving an activation signal, waiting for a pre-set time period and then activating (or controlling) a payload associated with the module. Further, the module may transmit the activation signal to another connected module concurrently with the payload activation (or control), or after a pre-set time period (independent from the former time period). A payload functionality may include two timers, one used for the initial delay from receiving the activation signal until generating an activation of the payload via an activation or control port, and another timer triggered at the end of the initial delay and active until transmitting the activation signal to a connected module. Each of the timers may be delay-line or monostable based. The payload may be part of the payload functionality and may be integrated within the module housing, or can be external to the module and activated or controlled via a corresponding connector. Further, payload activation may use either level activation (active low' or 'active high') or edge triggering (riding or trailing edge).

In one aspect, a timer (or both timers) introduces a random time delay selected within a specified range. The delay can be randomly selected upon power up and retained throughout the operation until de-energized, or can be selected each time the activation signal is propagated through the module. The random delay scheme includes a random signal generator coupled to the timer to control its delay. The random signal generator may be based on a digital random signal generator having a digital output. Alternatively, the random signal generator may be based on analog random signal generator having an analog output. Analog random signal generator may use a digital random signal generator which output is converted to analog using analog to digital converter, or can use a repetitive analog signal generator (substantially not synchronized to any other timing in the system) which output is randomly time sampled by a sample and hold. A random signal generator (having either analog or digital output) can be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers.

A module includes one or more connectors for connecting to other modules for forming a system. In one aspect, each connector is used for connecting to a single other module using a point-to-point connection scheme. A connection may be input only, being operative only to receive an activation signal from the connected module, and thus including a line receiver connected to the connector for receiving the activation signal. A connection may be output only, being operative only to transmit an activation signal to the connected module, and thus including a line driver connected to the connector for receiving the activation signal. A connection may double as both input and output functions, being operative both to transmit an activation signal to the connected module by a line driver and to receive an activation signal from the connected module by a line receiver. The connection may use balanced (e.g. RS-422 or RS-485) or single-ended communication (e.g. RS-232 or RS-423), using corresponding line driver and/or line receiver, and may use either level activation (active low' or 'active high') or edge triggering (riding or trailing edge).

A module may include the payload functionality connected to an input (or input/output connection), wherein the activation signal received from the line receiver initiates the payload functionality. Further, a module may include the payload functionality connected to an output (or input/output connection), wherein the activation signal output from the payload functionality is fed to the line driver and transmitted to the connected module. Furthermore, a module that includes two or more connections may include multiple payload functionalities, each connected between an input connection and an output connection of the module.

Modules may have different activation signal routing schemes. A basic slave module includes two connections (with payload functionality connected therebetween), and is operative to propagate an activation signal between these connections. A splitter functionality, included for example in a basic splitter module, involves receiving an activation signal in a single connection and transmitting it (e.g., after a delay and/or payload functionality operation) to two or more connections. A loopback functionality, included for example in a basic loopback module, involves transmitting of an activation signal to the connection it was received from (e.g., after a delay and/or payload functionality operation). A master module include means, such as a manually operated switch, to produce an activation signal without receiving any such activation signal from a connected module, and thus initiates the propagation of the activation signal in a system. A module may double to include various functionalities, such as a slave/splitter module including both slave and splitter functionalities, a master/loopback module including both master and loopback functionalities, and a master/splitter module including both master and splitter functionalities. The signal propagation within a module may use either level activation (active low' or 'active high') or edge triggering (riding or trailing edge), or any combination thereof.

The propagation of the activation signal in the system may be unidirectional (e.g., simplex) using 1-way modules, operative to pass the activation signal only in one direction (from an upstream connection to one or few downstream connections). In such system, the activation signal is initiated in a master module, and then it propagates through the connected modules downstream (away from the master module) until reaching the module (or the modules) connected only upstream, rendering the system idle afterwards. The system remains idle until the sequence is re-initiated by the master module, since each such initiation produces a single propagation from the master module downstream.

The activation signal can be initiated by a switch, such as a human operated mechanical switch, which is housed in the master module or connected thereto via a connector. Alternatively or additionally, the master module may repetitively generate activation signal upon powering up or controlled by the user (e.g. via a switch). Further, the activation signal may be triggered by a physical phenomenon using an appropriate sensor, such as a sensor responsive to temperature, humidity, pressure, audio, vibration, light, motion, sound, proximity, flow rate, electrical voltage, and electrical current. The activation signal may be generated in response to comparing the sensor output (after conditioning) with a set value. The sensor and its related circuits (e.g. amplifier, comparator and reference generator) may be partly or fully housed within the master module enclosure, or external to it.

The propagation of the activation signal in the system may be bidirectional using 2-way modules, operative to pass the activation signal in both directions (from an upstream connection to one or few downstream connections and from a downstream connection to one or few upstream connections). The activation signal passing between two modules may be half-duplex or full duplex. Full duplex transmission may use a dedicated wire pair for each direction, totaling four conductors. Alternatively, a hybrid circuitry may be used providing two-way communication over two conductors. In a 2-way system, the activation signal is initiated in a master module, and then it propagates through the connected modules downstream (away from the master module) until reaching the module (or the modules) having a loopback functionality. The loopback function reverts the propagation direction from downstream to upstream towards the master module. Upon reaching the master module the system remains idle until the sequence is re-initiated by the master module, since each such initiation produces a single propagation cycle from the master module downstream followed by a single upstream sequence ending in the master module. In the case wherein the master module further includes a loopback functionality, the activation signal will be reverted downstream again, causing infinite system cycling downstream and upstream.

A payload may be controlled by a control signal, which may be the activation signal or depend on the activation signal, such that the payload is activated when the control signal is active. Alternatively, the module may be latched and stays activated upon triggered by a control signal. Further, a payload may be toggle controlled, wherein the control signal shifts the payload from a state to another state (or between two states such as 'on' and 'off') each time the control signal is active.

A module may be individually powered from a power source. The power source may be integrated into the module enclosure, and can be a battery, either primary or rechargeable type, which may reside in a battery compartment. Alternatively, the power source may reside external to the module enclosure, such as powering from AC power outlet via common AC/DC adapter containing a step-down transformer and an AC to DC converter (rectifier). A DC/DC converter may be used in order to adapt the power voltage from a source into one or more voltages used by the various module electrical circuits.

Alternatively, a remote powering scheme may be used, wherein a single connection to a power source may be used to power few or all of the modules in the system. A module is powered from the power carrying wires, and may supply the power to other modules connected to it. The power may be carried (either as AC or as DC power) to the modules in the system over wires connecting the modules. Dedicated power conductors may be used, being separated from the wires used for propagating the activation signal. The same connector may be used to connect to both the power and the activation signals wires. Similarly, the same wire pair (or wire pairs) carrying the activation signal (or other data) may be concurrently used to carry the power signal (either as AC or as DC power). The activation signal and the power signal are concurrently carried over the same wires either using multiplexing such as frequency division multiplexing (FDM) wherein filters are used to separate and/or combine the signals, or by using split-tap transformer or by using phantom channel for carrying the power. In the case of remote powering, a powering functionality (either as a dedicated powering module or integrated with another module functionality) is used in order to connect to be fed from the power source, and to the system module (or modules) in order to feed the power signal over the power wires, without interfering with the activation signal propagation.

A payload associated with a module may be either housed within the module enclosure, or be external to the module and connected to it via a connector. Further, a payload may be powered from the same power source as the one powering the associated module, or may be powered from a dedicated or separated power source. Payload activation may include its powering by a switch connected between a power source and the payload, where the switch is activated based on the activation signal.

In one aspect of the invention, the payload control involves randomness. For example, a signal representing a value within a specified range is connected to the payload for controlling it. The value can be randomly selected upon power up and retained throughout the operation until the module is de-energized, or can be selected each time the activation signal is propagated through the module and is operative to activate the payload. The randomness is based on a random signal generator, which may be based on a digital random signal generator having a digital output or an analog output. Analog random signal generator may use a digital random signal generator which output is converted to analog using analog to digital converter, or can use a repetitive analog signal generator (substantially not synchronized to any other timing in the system) which output is randomly time sampled by a sample and hold. A random signal generator (having either analog or digital output) can be hardware based using a physical process, or can be software based, using an processor executing an algorithm for generating pseudo-random numbers which approximates the properties of random numbers.

The payload may be randomly inhibited from being activated (e.g. even in the case of activation signal received in a module). The activation of the payload may dependent upon a random signal generator (analog or digital), which output is compared (using analog or digital comparator) with a specified value (analog or digital reference). The specified value, and the probability of the random signal to generate a signal above or below this value, determines the probability of activating the payload. Further, multiple payload can be used, wherein a single (or few) payloads are selected to be activated based on a random process.

A module may activate or control a single payload or plurality of payloads. The plurality of payloads can be all activated together in response to an activation signal, or alternatively may use different delays associated with each payload, generated by a distinct related timer. Alternatively, one payload may be activated (or controlled) each time an activation signal is received. The activated payload may be selected sequentially or randomly. Further, a different payload may be selected based on the direction of the activation signal propagation in the system.

Few or all the modules in a system can share the control of a single or a plurality of payloads. The wires used to activate or control the shared payload (or payloads) are connected in parallel (or serially) to all modules involved in the payloads control. The payloads control wires can be routed along the system by dedicated connectors used to connect each pair of modules connected for passing the activation signal therebetween. Further, the same connectors used for connecting the modules for passing the activation signal (or the power signal, in the case of remote powering) may be used to connect the payload control/activation wires, as part of the system wiring infrastructure.

The payload may be controlled by an analog signal port, such as analog voltage, current or resistance. The analog signal port may be connected via the system wiring or externally to two or more modules, or to all modules in the system, thus sharing the analog control capability. Upon activation of a module, an analog signal is connected to the analog control port for controlling the payload.

In one aspect of the invention a device for passing a signal from a first device to a second device identical to the first device and for using the signal to control a payload is described, the device comprising a first connector for connecting to the first device, a first line receiver coupled to the first connector for receiving a first signal from the first device, a first timer coupled to the line receiver for producing a second signal that is delayed by a first time period from the first signal, a second connector, capable of mating with the first connector, configured to be connectable to the second device, a first line driver coupled between the first timer and the second connector and operative to transmit the second signal to a line receiver of the same type as the first line receiver in the second device, a control circuit coupled to the first line receiver for generating a control signal is response to the first signal, the control circuit having a control port couplable to control the payload by the control signal, and a single enclosure housing the first and second connectors, the first line receiver, the first line driver, the first timer and the control port. The first line receiver may be operative to receive the first signal in an unbalanced signal form (such as substantially according to RS-232 or RS-423 standards), and the first line driver may be operative to transmit the second signal in an unbalanced signal form (such as substantially according to RS-232 or RS-423 standards). Alternatively or additionally, the first line receiver may be operative to receive the first signal in a balanced signal form (such as substantially according to RS-422 or RS-485 standards), and the first line driver may be operative to transmit the second signal in a balanced signal form (such as substantially according to RS-422 or RS-485 standards). The device may further include a firmware and a processor for executing instruction embedded in the firmware, and the processor may be coupled to control the control port.

The control circuit may comprise a second timer for producing a control signal that is constituted by the first signal delayed by a second time period, and each of the first and second timers may be an RC based monostable circuit or a delay line. Further, each of the first and second time periods may be set by a user.

The device may be used in combination with the payload, and the payload may be housed within the single enclosure and connected to the control port to be controlled by the control signal. The control port may be a connector that is connectable to control the payload.

In one aspect, the device may further comprise a third connector capable of mating with the first connector for connecting to a third device identical to the second device, and a second line driver coupled between the first timer and the third connector, the device may further be operative to transmit the second signal to a line receiver of the same type as the first line receiver in the third device. The device may further comprise in its single enclosure a second timer coupled between the first line receiver and the second line driver for producing a third signal that is delayed by a second time period from the first signal, and the second line driver may be connected for transmitting the third signal to the third device.

The device may further be operative for two way operation, and further may comprise a second line receiver coupled to the second connector for receiving a third signal from the second device, and a second line driver coupled to the first connector and to the second line receiver for transmitting the third signal to the first device. Further, the device may comprise a second timer coupled between the second line receiver and the second line driver for producing a fourth signal that is delayed by a second time period from the first signal, and further the second line driver may be connected for transmitting the third signal to the first device. The control circuit may be coupled to the second line receiver and the control signal may be generated in response to the third signal. The second signal may be carried over a first wire pair and the third signal may be carried over a second wire pair distinct from the first wire pair, or alternatively the second and third signals may be carried over the same single wire pair. In the latter case, the device may comprise a three-port circuit (which may be based on a hybrid circuit) coupled between the first line driver, the second line receiver and the second connector, and the three-port circuit may be operative to substantially pass only the second signal between the first line driver and the second connector and to substantially pass only the third signal between the second connector and the second line receiver.

The device may comprise a power source (which may be housed in the device single enclosure) for powering the first line receiver, the first line driver, and the first timer. The power source may be a primary type battery or a rechargeable type battery, and the battery may be housed in a battery compartment. Further, the battery may feed a DC/DC converter coupled to it. Alternatively or in addition, the device may be powered from an external power source such as domestic AC power outlet, and may further comprise a power connector for connecting to the power source and for powering the first line receiver, the first line driver, and the first timer from the power source. The device may further comprise an AC/DC adapter powered from the AC power outlet, and the AC/DC adapter may comprise a step-down transformer and an AC/DC converter for DC powering the device. Further, a payload (which may be in the single enclosure) may be coupled to the power connector for being powered from the external power source.

Alternatively or in addition, the device may be adapted for remote powering from the first device, wherein the first line receiver, the first line driver, and the first timer are coupled to be powered by a power signal from the first connector. The second connector may be also coupled to the power signal for supplying power to the second device. The power signal may be a DC power signal, and the device further may comprise a DC/DC converter powered by the DC power signal from the first connector. The device may further comprise a power supply powered from the power signal, for powering the first line receiver, the first line driver, and the first timer. The first signal may be carried over a first wire pair and the power signal may be carried over a second wire pair distinct from the first wire pair, or alternatively the first signal and the power signal may be carried concurrently over the same wires. In the latter case, the device may further comprise a power/data splitter/combiner coupled between the first line receiver, the first connector and the power supply, the power/data splitter/combiner being operative to substantially pass only the first signal between the first line receiver and the first connector and to substantially pass only the power signal between the first connector and the power supply.

The power signal and the first signal are carried together over the same wires using Frequency Division Multiplexing (FDM), where the power signal is carried at a single frequency and the first signal is carried in a frequency band distinct from the single frequency. The power/data splitter/combiner may comprise a first filter operative to substantially pass only the single frequency and a second filter operative to substantially pass only the frequency band. Alternatively or in addition, the power/data splitter/combiner may comprise a center tap transformer and a capacitor connected between the transformer windings. In one aspect, the power signal and the first signal may be carried using a phantom channel, where the power signal is carried over the phantom channel formed by two center-tap transformers in the power/data splitter/combiner.

In one aspect of the invention, the device comprises a power source (which may be in the device single enclosure) for powering the first line receiver, the first line driver, and the first timer. The device may further comprise, or can be used with, a payload. The payload may be in the device single enclosure and may be powered from the power source. Alternatively or in addition, the device may comprise a payload connector connectable to the payload and being coupled to the power source for powering the payload from the power source. The device may further comprise electrically activated switch (connected to be activated by the control port) that is connected between the payload and the power source, for powering the payload upon activation of the electrically activated switch by the control port.

The device may further comprise a random signal generator connected for controlling a parameter in the device allowing for device random operation. The random signal generator may be based entirely on hardware and may be based on a physical process such as a thermal noise, a shot noise, decaying nuclear radiation, a photoelectric effect and a quantum phenomenon. Alternatively or in addition, the random signal generator may include software (such as an algorithm for generating pseudo-random numbers) and a processor executing the software, and may be coupled to the first timer for controlling the delay introduced by it. Further, the random signal generator may be coupled for controlling or activating the payload. The random signal generator may be activated only at power up of the device for generating a single output value, or activated upon receiving the first signal from the first line receiver. The random signal generator output may be used to activate a switch in the device. The device may further comprise a reference signal source (having analog or digital output) and a comparator (analog or digital) connected to provide a digital logic signal based on comparing the random signal generator output and the reference signal source output. The random signal generator may provide an analog or digital output, the reference signal source may provide an analog or digital signal output, and the comparator may be an analog or digital comparator. The device may be used to control multiple payloads and may comprise a plurality of reference signal sources and a plurality of comparators, wherein the comparators are connected to provide digital logic signals based on comparing the random signal generator output and the reference signal source outputs, and the digital logic signals may be coupled to control or activate a respective one of the multiple payloads.

In one aspect of the invention, a device for randomly delaying an activation signal to a payload is described. The device may comprise a first connector for connecting to a wiring, a line receiver coupled to the first connector for receiving an activation signal from the wiring, a first timer coupled to the line receiver for producing a delayed activation signal that is delayed by a first time period from the activation signal, a control port couplable to activate the payload by coupling the delayed activation signal to the payload, a random signal generator operative to output a random signal and being coupled to control the delay produced by the first timer, and a single enclosure housing the first connector, the line receiver, the first timer, the random signal generator and the control port. The random signal generator may be based entirely on hardware and may be based on a physical process such as a thermal noise, a shot noise, decaying nuclear radiation, a photoelectric effect and a quantum phenomenon. Alternatively or in addition, the random signal generator may include software (such as an algorithm for generating pseudo-random numbers) and a processor executing the software, and may be coupled to the first timer for controlling the delay introduced by it.

In one aspect of the invention, a device for randomly activating a payload is described. The device may comprise a first connector for connecting to a wiring, a line receiver coupled to the first connector for receiving an activation signal from the wiring, at least one payload, a control port couplable to activate the payload by coupling a control signal to it, a first timer coupled between the line receiver and the control port for producing a control signal in response to the activation signal being delayed by a controlled first time period, a random signal generator operative to output a random signal, the random signal generator being coupled to control the delay of the first timer, a reference signal source for producing a reference signal, a comparator coupled to provide a digital logic signal based on comparing the random signal with the reference signal, the digital logic signal being coupled to the control port, and a single enclosure housing the first connector, the line receiver, the first timer, the reference signal source, the comparator the control port and the random signal generator, wherein the control port is operative to activate the payload in response to the delayed activation signal received by the line receiver and the digital logic signal. The random signal generator may be based entirely on hardware and may be based on a physical process such as a thermal noise, a shot noise, decaying nuclear radiation, a photoelectric effect and a quantum phenomenon. Alternatively or in addition, the random signal generator may include software (such as an algorithm for generating pseudo-random numbers) and a processor executing the software, and may be coupled to the first timer for controlling the delay introduced by it. The random signal generator may provide an analog output or a digital number output, the reference signal source may provide analog signal output or a digital number output, and the comparator may be a digital or analog comparator. The device may be couplable to control multiple payloads, and further comprise a plurality of reference signal sources and plurality of comparators, the comparators are connected to provide digital logic signals based on comparing the random signal generator output and the reference signal source outputs, and the digital logic signals are couplable to control or activate a respective one of the multiple payloads.

In one aspect according to the invention, a set of at least three modules or devices connectable to form a system for sequentially activating payloads is described. The set may comprise first, second and third modules or devices (which may be identical to one another), each module being associated with a respective payload, and being housed in a respective single enclosure, each module may comprise a first type connector and a second type connector, all of the first type connectors being identical to one another, all of the second type connectors being identical to one another, and each of the first type connectors being configured to mate with any one of the second type connectors, and each of the modules further comprises a control port for controlling an associated payload, wherein the second connector of the first module is connectable to the first connector of the second module and the second connector of the second module is connectable to the first connector of the third module to form a system, and further wherein each module in the system may be operative to receive a first signal at the first type connector, to control the associated payload based on the first signal, to produce a second signal that is a time delayed version (which may be randomly selected within a specified range) of the first signal, and to transmit the second signal to the second type connector. The first and second modules may be mechanically attachable to each other and the third and second modules may be mechanically attachable to each other (such as only by the connectors). Each of the payloads is housed within the single enclosure of the associated module, or alternatively the payloads may be external to the single enclosure of each associated module, where each module comprises a third connector for connecting to the associated payload. Each module may comprise, in its single enclosure, a power source for powering the module, such as a primary type battery or a rechargeable type battery. A payload (which may be housed in the module single enclosure) may be powered from the power source.

The system may be formed when the second connector of the first module is connected to the first connector of the second module and the second connector of the second module is connected to the first connector of the third module. The first signals and the second signals may be carried between the modules in the system as balanced or unbalanced signals. The system may support two-way operation where each module may be further operative to receive a third signal at the second connector, to control the associated payload based on the third signal, to produce a fourth signal that is a time delayed version of the third signal, and to transmit the fourth signal to the first connector. The communication between two connected modules may be carried out using four conductors, including two conductors for each direction of communication, or may use only two conductors (e.g., using hybrid circuit). The system may be powered from a single external power source such as domestic AC power, and each module may further comprise in its respective single enclosure a payload that is powered from the external power source. Further, the modules may be connected to supply power from one module to another module connected to the one module.

In one aspect of the invention, the device may comprise or used with a payload (which may be in the device enclosure). The payload may be an annunciator for issuing an to announcement using visual signaling. Such visual signaling device may be a smoke generator or a visible light emitter such as a semiconductor device, an incandescent lamp, or a fluorescent lamp. The visible light emitter may be adapted for a steady illumination and for blinking, and may be mounted for illuminating a theme or shape of the device a part of or all of an image, or be associated with a theme or shape of the device. Alternatively or in addition, the payload may an annunciator for issuing an announcement an audible signaling using an audible signaling device such as an electromechanical or a piezoelectric sound generator (e.g. a buzzer, a chime, or a ringer). Alternatively or in addition, the audible signaling device may comprise a loudspeaker and a digital/analog converter coupled to the loudspeaker, and may be operative to generate a single tone or multiple tones (or musical tunes). Further, the sound emitted from the audible signaling device may be associated with the device theme or shape, or may emit sound which is a characteristic sound a household appliance, a vehicle, an emergency vehicle, an animal or a musical instrument. Furthermore, the sound emitted from the audible signaling device may be a song, a melody, or a human voice talking, such as a syllable, a word, a phrase, a sentence, a short story, or a long story, based on speech synthesis or pre-recorded sound.

The payload may comprise a visual signaling device which may contain a visible light emitter based on a semiconductor device (e.g. LED—Light Emitting Diode), an incandescent lamp or a fluorescent lamp. The illumination may be blinking or steady, and can further be used to illuminate part of the module or the system or both. The visible light emitter positioning, appearance, type, color or steadiness may be associated with the module or system theme or shape.

The payload may comprise an audible signaling device which may be based on electromechanical or piezoelectric means capable of generating single or multiple tones, and can be a buzzer, a chime or a ringer. In one aspect of the invention, the audible signaling device comprising a loudspeaker and a digital to analog converter coupled to the loudspeaker. The volume, type, steadiness, pitch, rhythm, dynamics, timbre or texture of the sound emitted from the audible signaling device may be associated with the module or system theme or shape. Alternatively, the sound emitted from the audible signaling device is a song or a melody, wherein the song or melody name or content relates to the module or system theme or shape. In one aspect, the sound emitted from the audible signaling device is a human voice talking sounding of a syllable, a word, a phrase, a sentence, a short story or a long story, using speech synthesis or being pre-recorded.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

The above and other features and advantages of the present invention will become more fully apparent from the following description, drawings and appended claims, or may be learned by the practice of the invention as set forth hereinafter. It is intended that all such additional apparatus and advantages be included within this description, be within the scope of the present invention, and be protected by the accompanying claims.

The preferred embodiments of the invention presented here are described below in the drawings and detailed specification. Unless specifically noted, it is intended that the words and phrases in the specification and the claims be given the plain, ordinary and accustomed meaning to those of ordinary skill in the applicable arts. If any other special meaning is intended for any word or phrase, the specification will clearly state and define the special meaning.

Likewise, the use of the words "function" or "means" in the Specification or Description of the Drawings is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for," and will clearly recite a function, without also reciting in such phrases any structure, material or act in support of the function. Even when the claims recite a "means for" or "step for" performing a defined function, if the claims also recite any structure, material or acts in support of that means or step, or that perform the function, then the intention is not to invoke the provisions of 35 U.S.C. 112, Paragraph 6. Moreover, even if the provisions of 35 U.S.C. 112, Paragraph 6 are invoked to define the claimed inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

BRIEF DESCRIPTION OF THE FIGURES

The invention is herein described, by way of non-limiting example only, with reference to the accompanying figures and drawings, wherein like designations denote like elements. Understanding that these drawings only provide information concerning typical embodiments of the invention and are not therefore to be considered limiting in scope.

Figure 6:
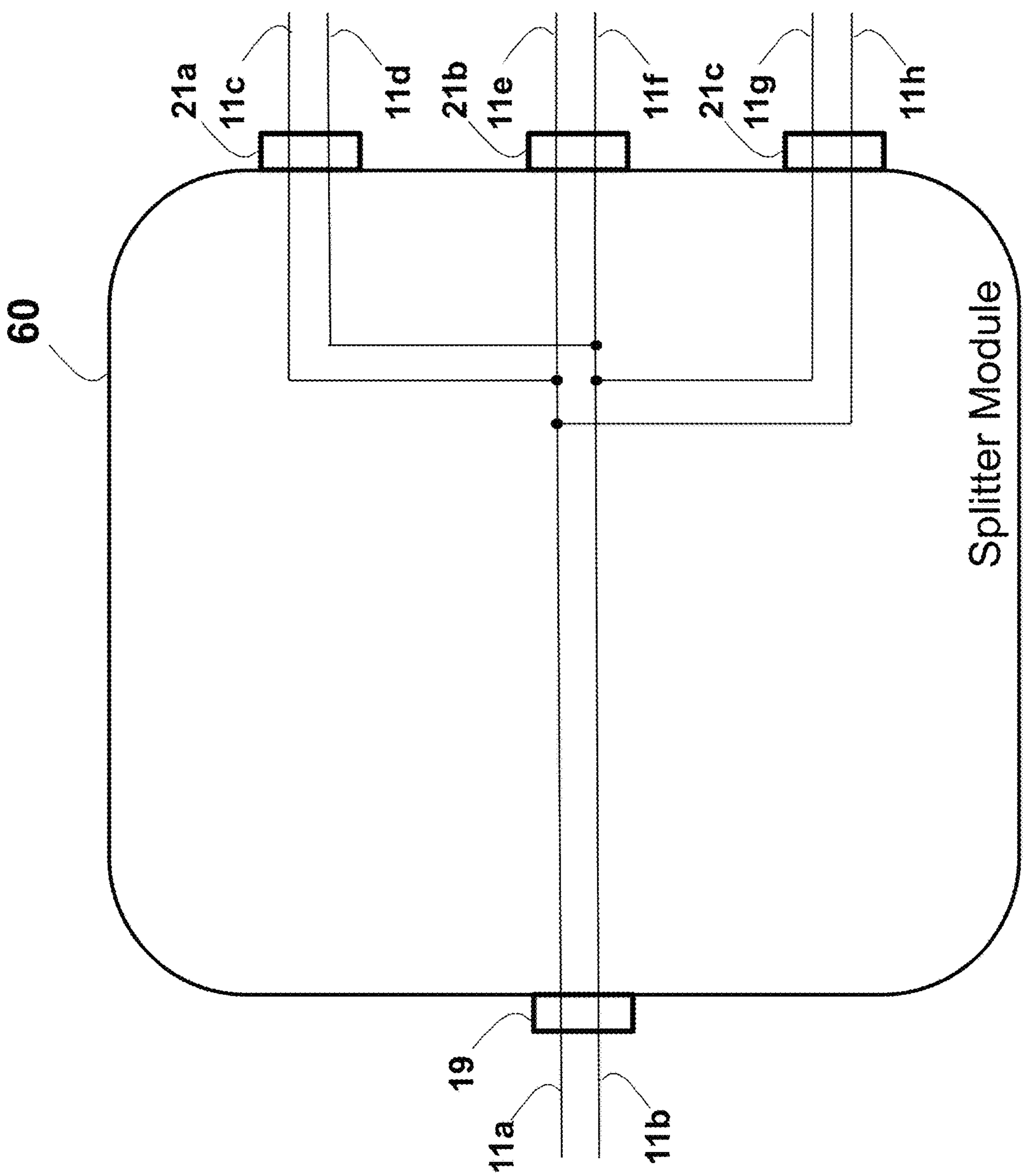
Figure 7:
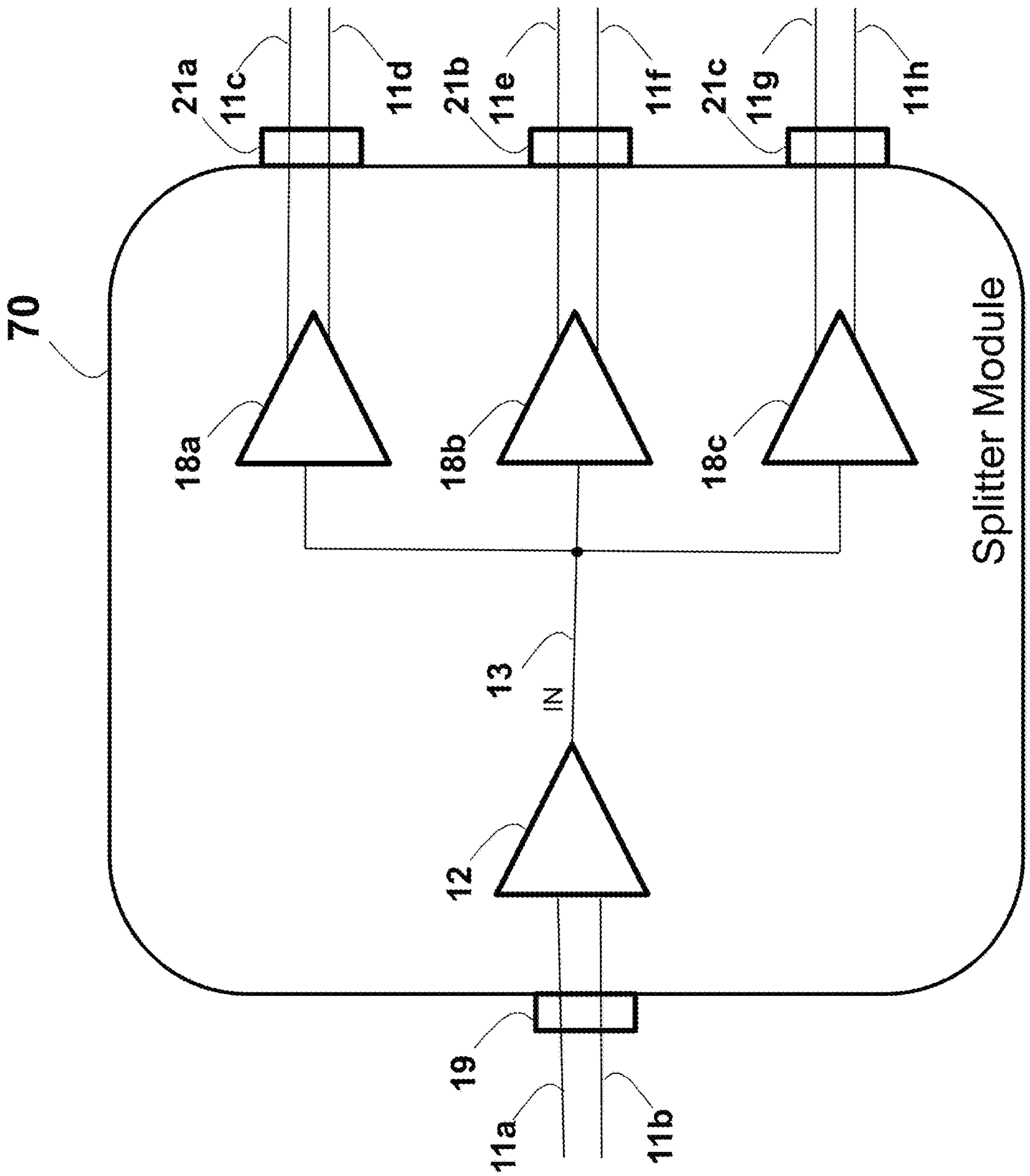
Figure 8:
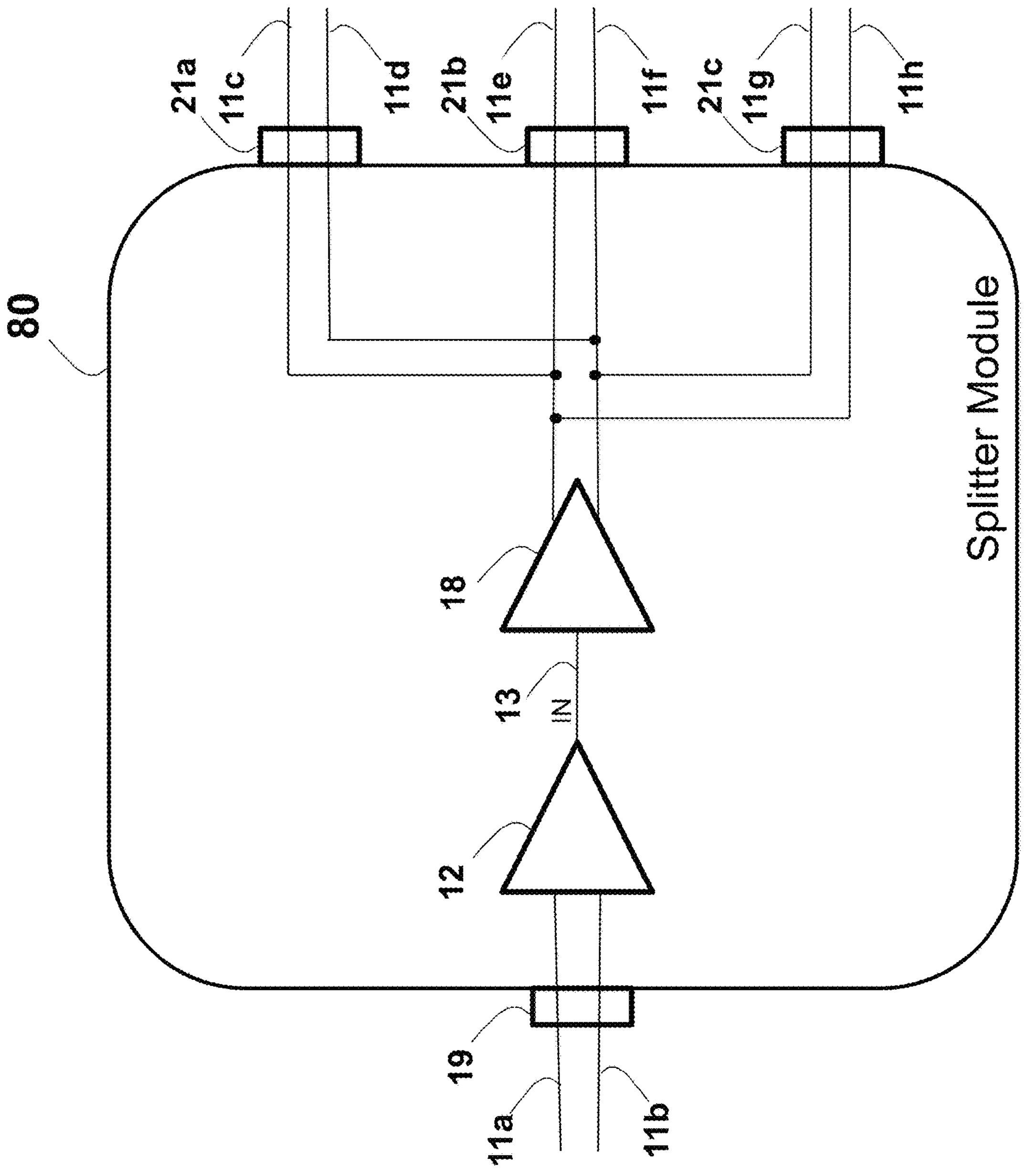
Figure 9:
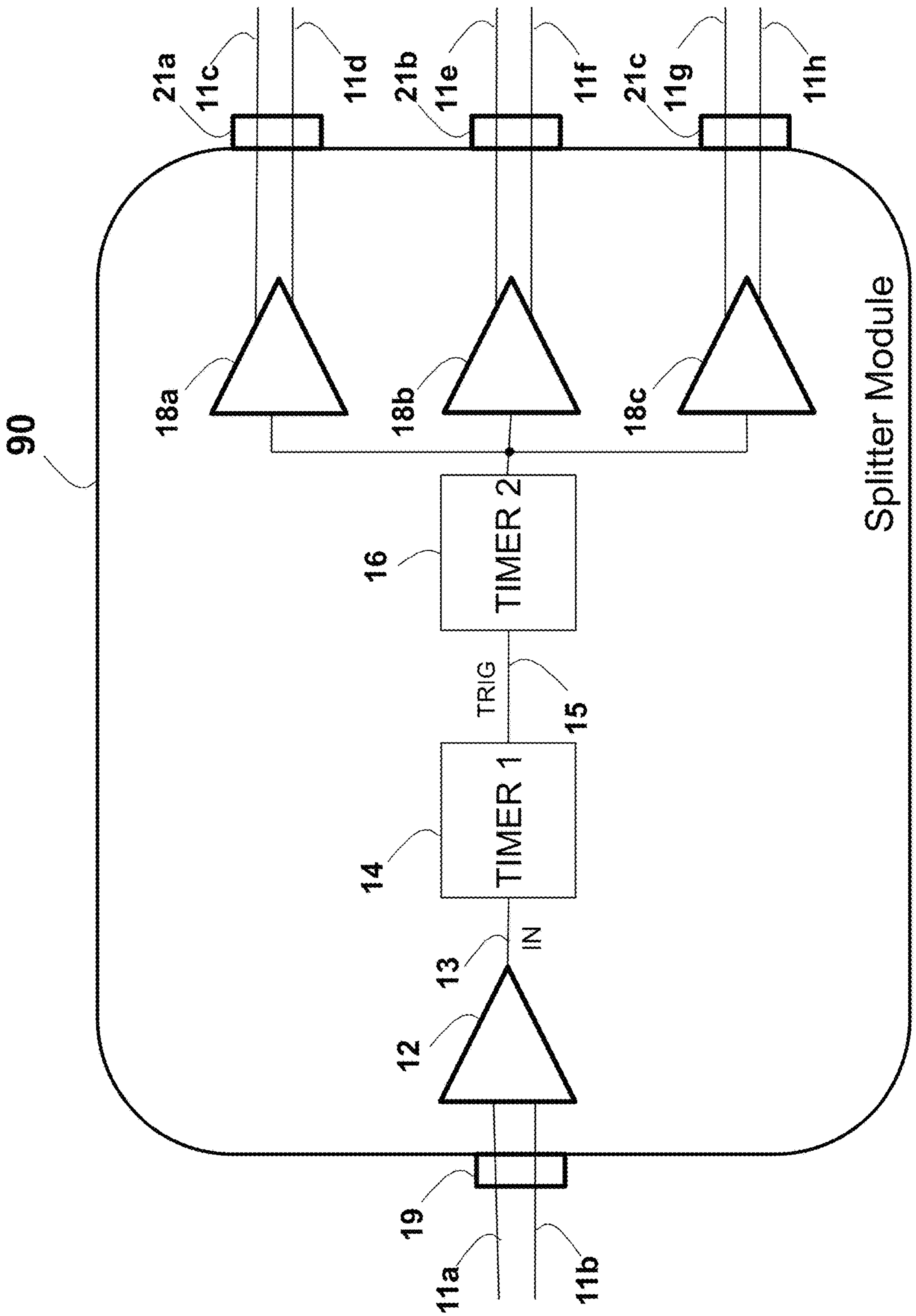
Figure 10:
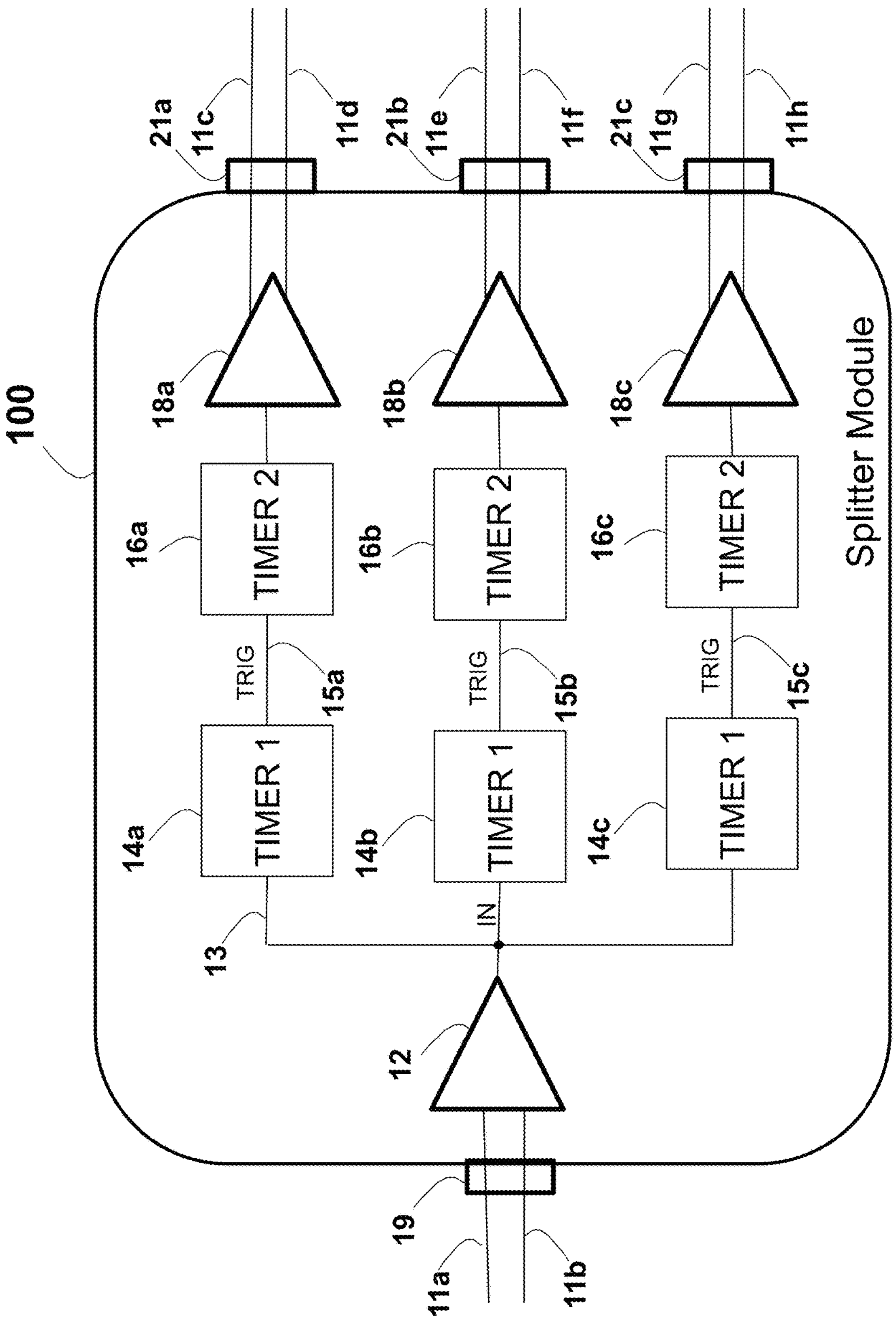
Figure 11:
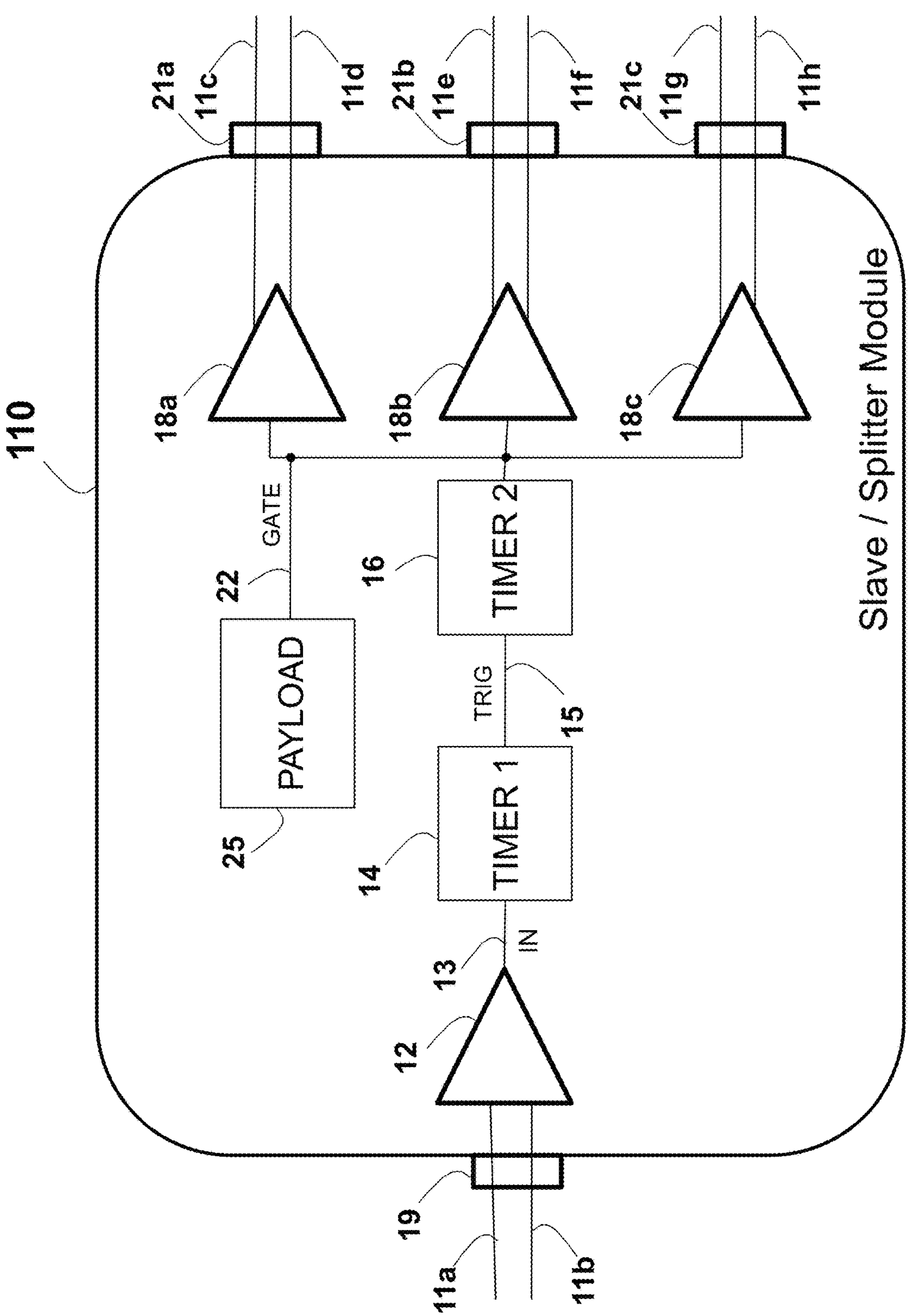
Figure 12:
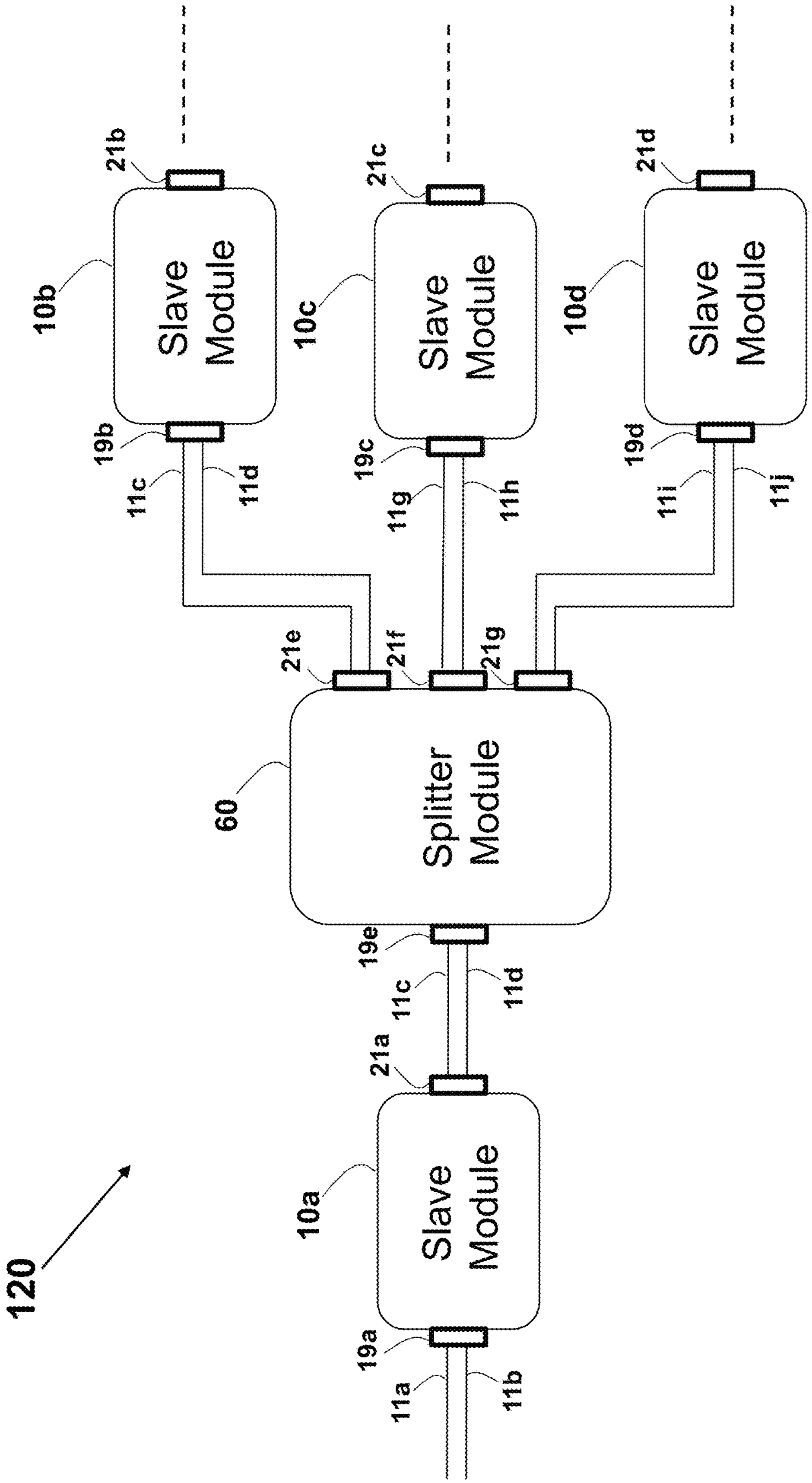
Figure 13:
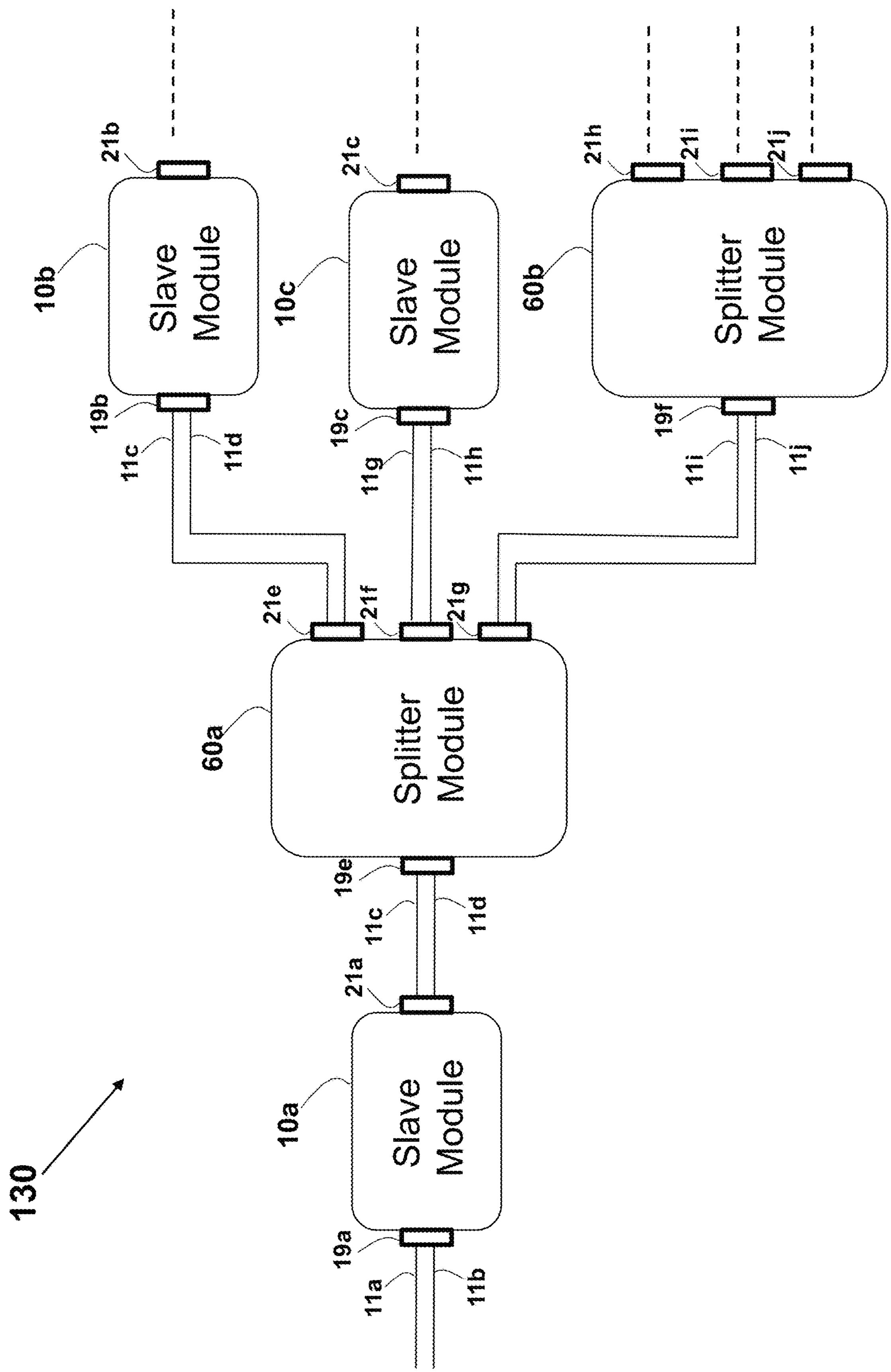
Figure 15:
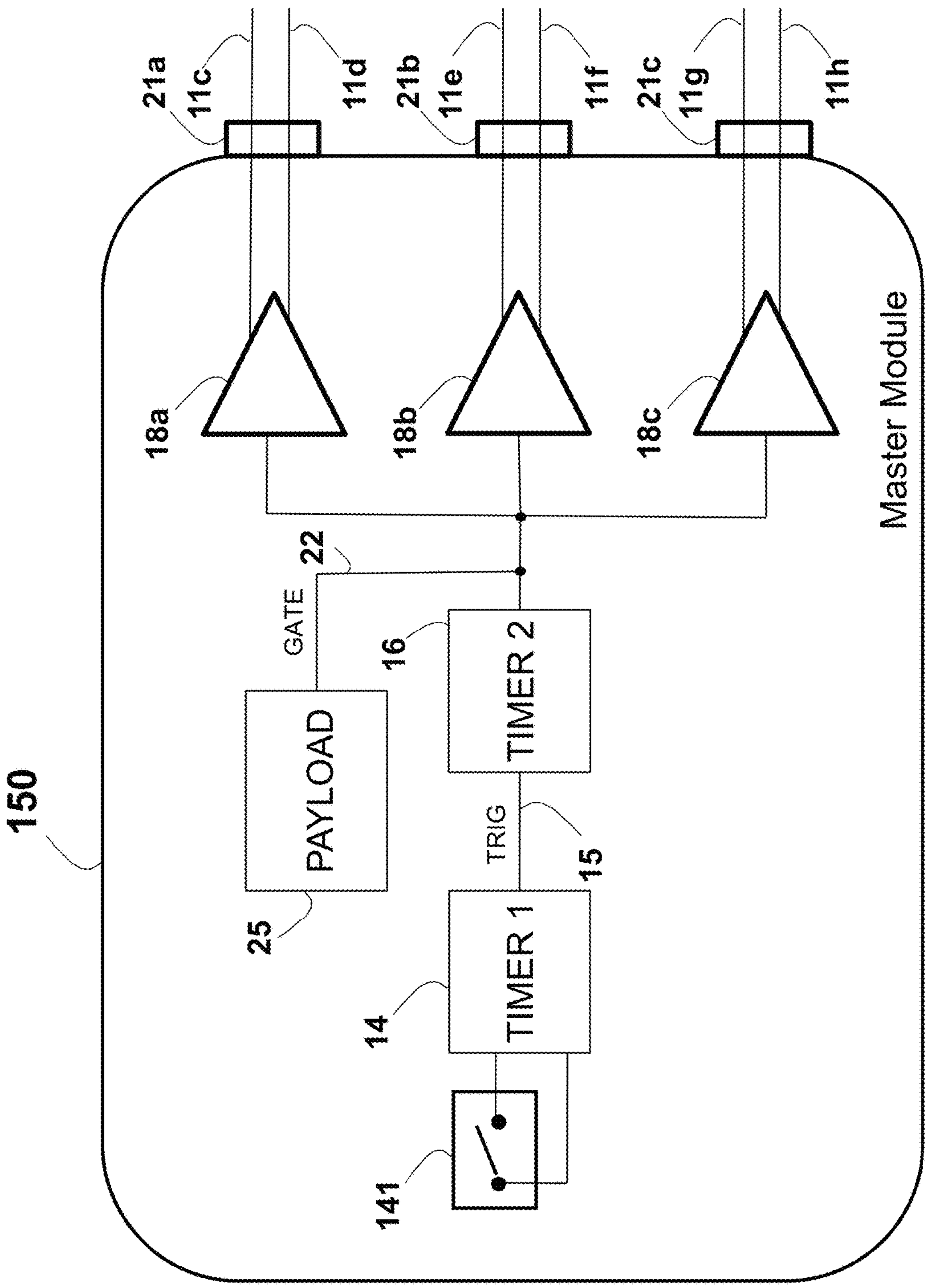
Figure 16:
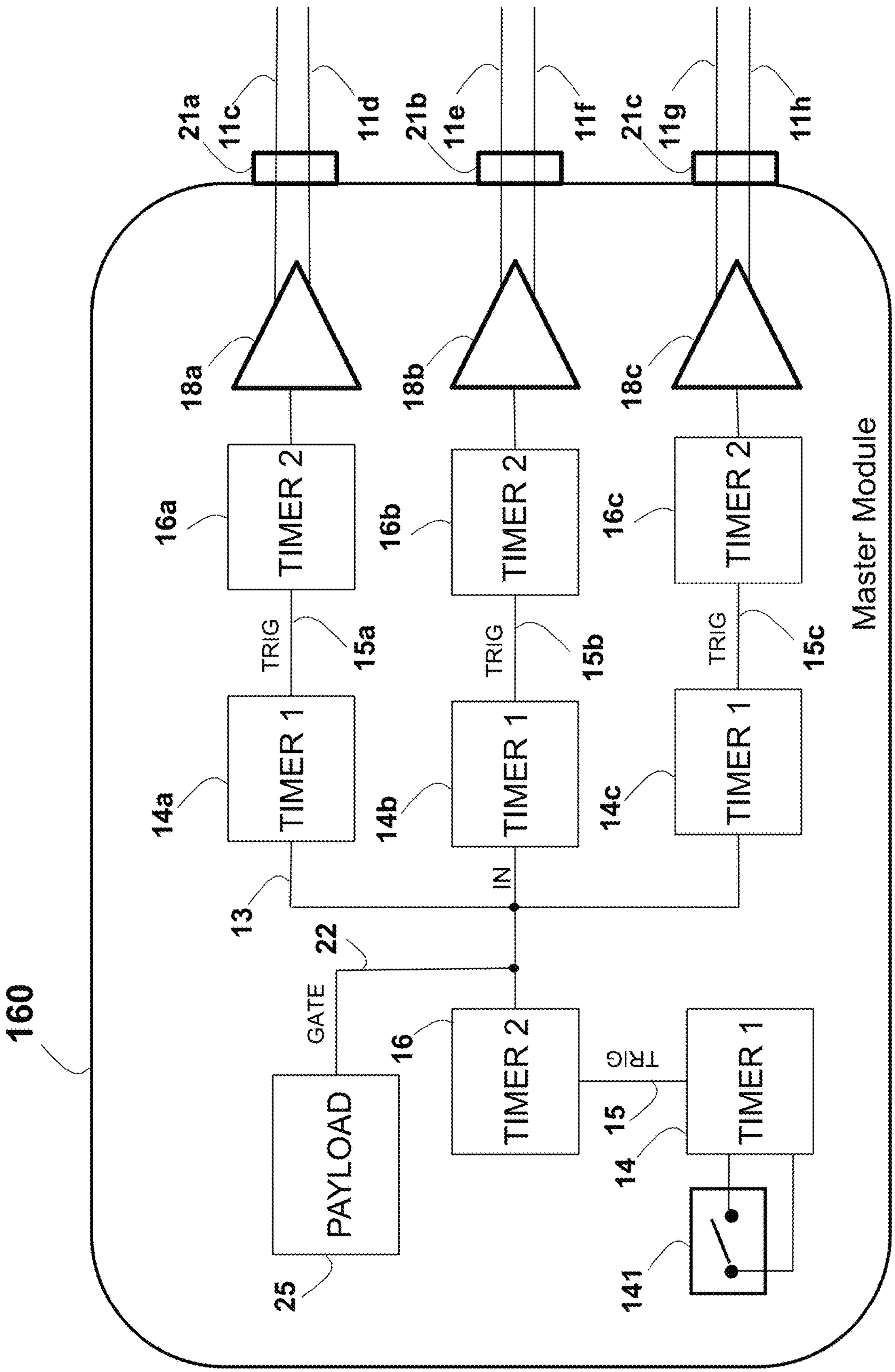
Figure 17:
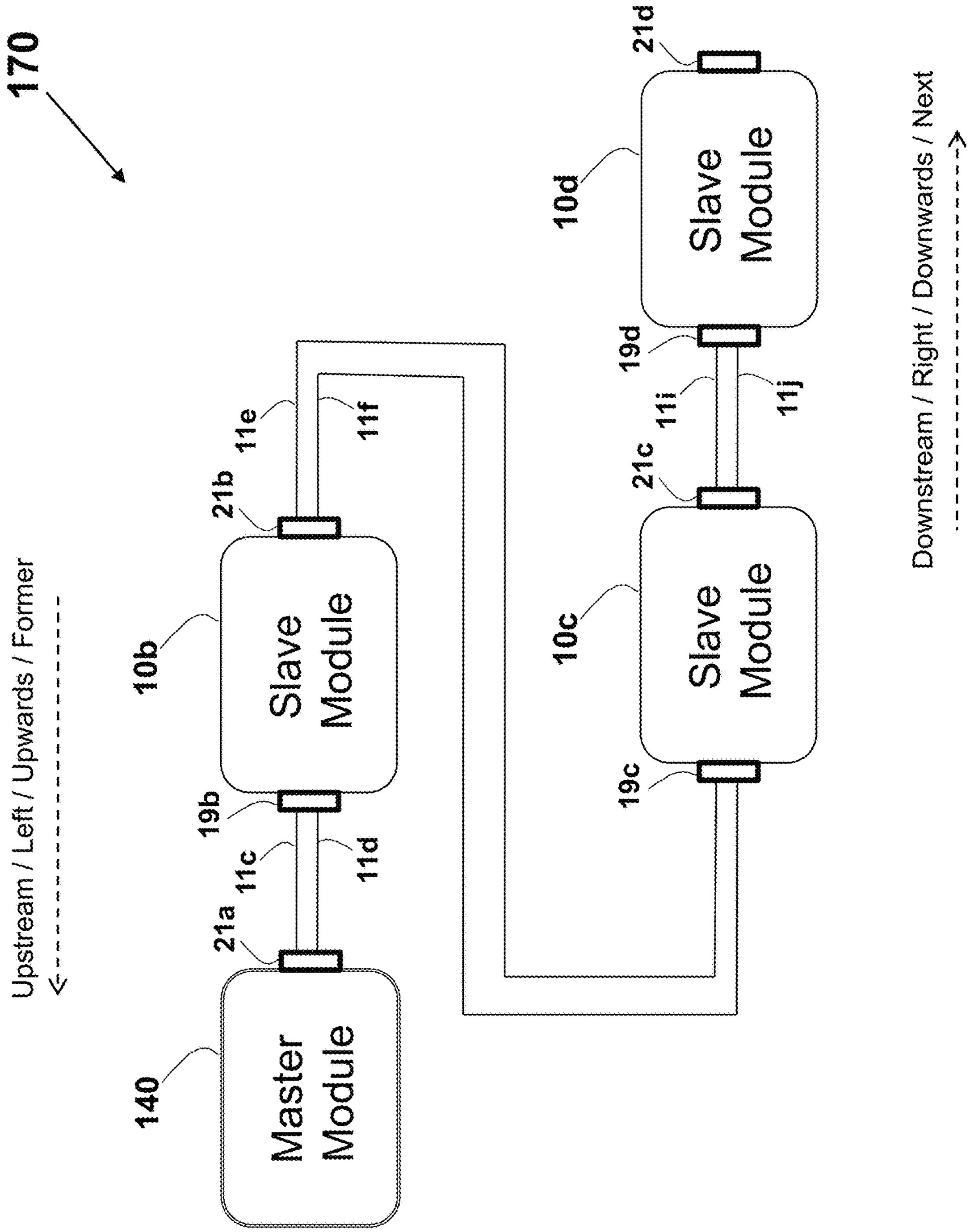
Figure 18:
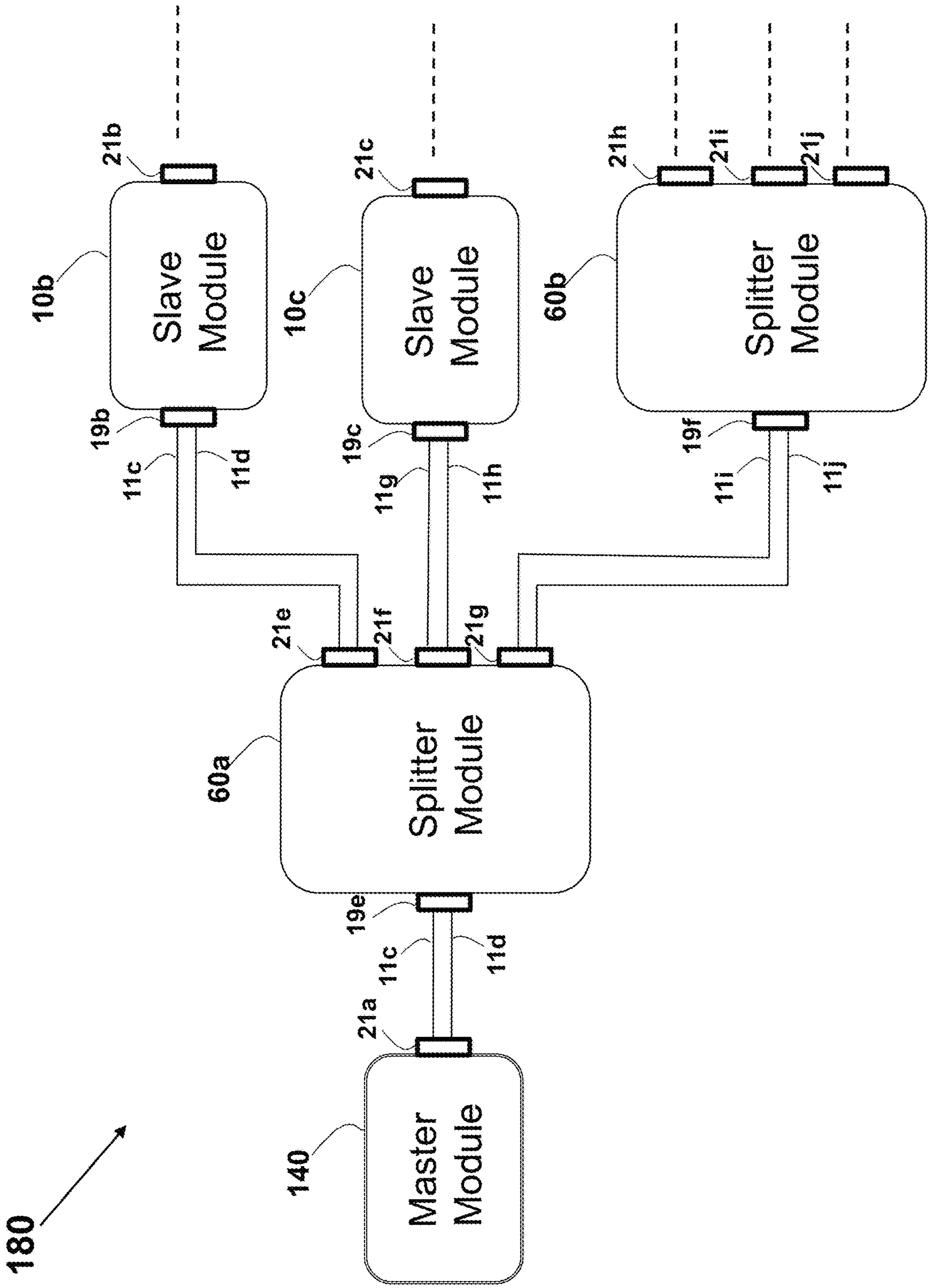
Figure 18A:
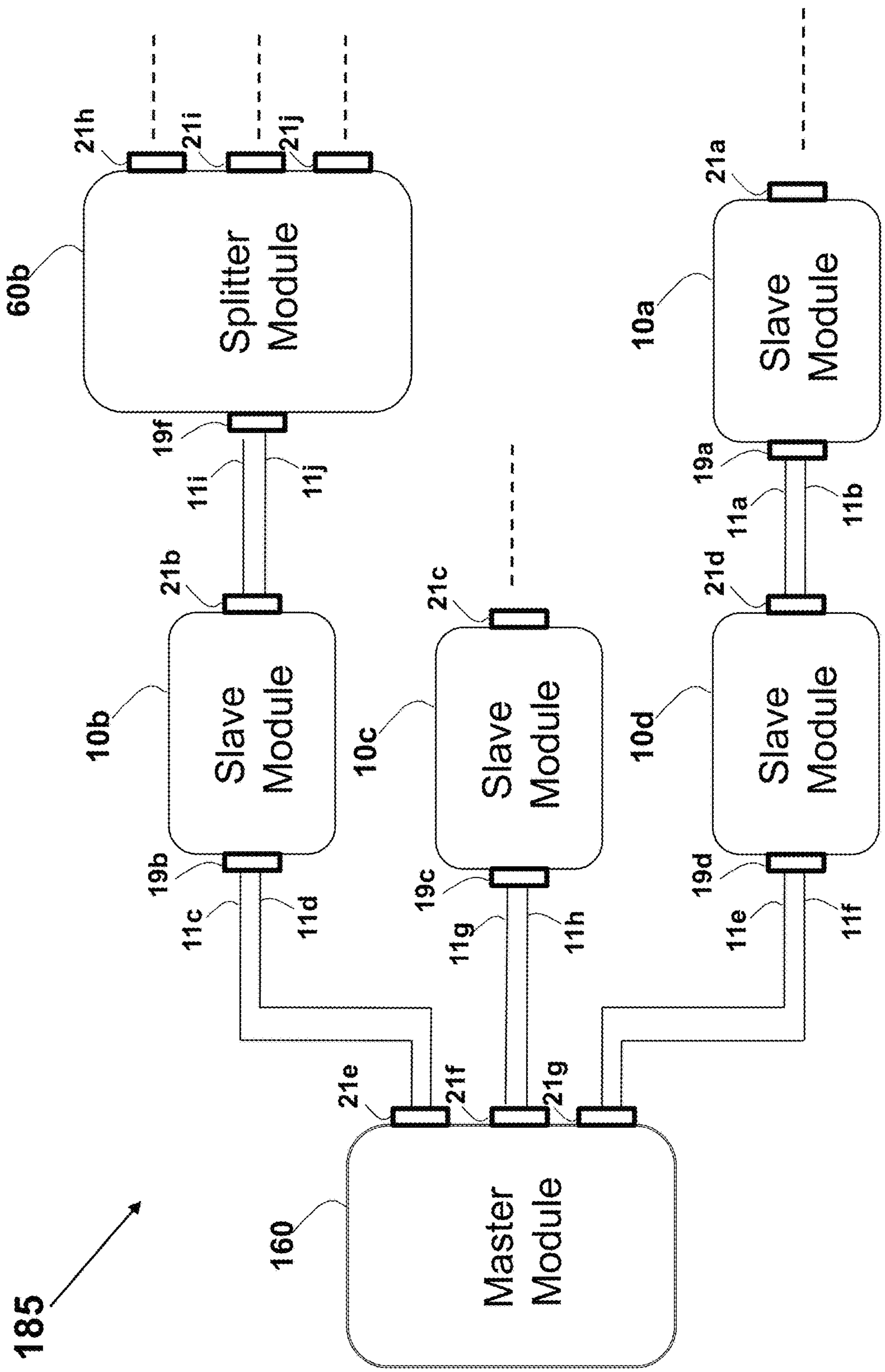
Figure 19:
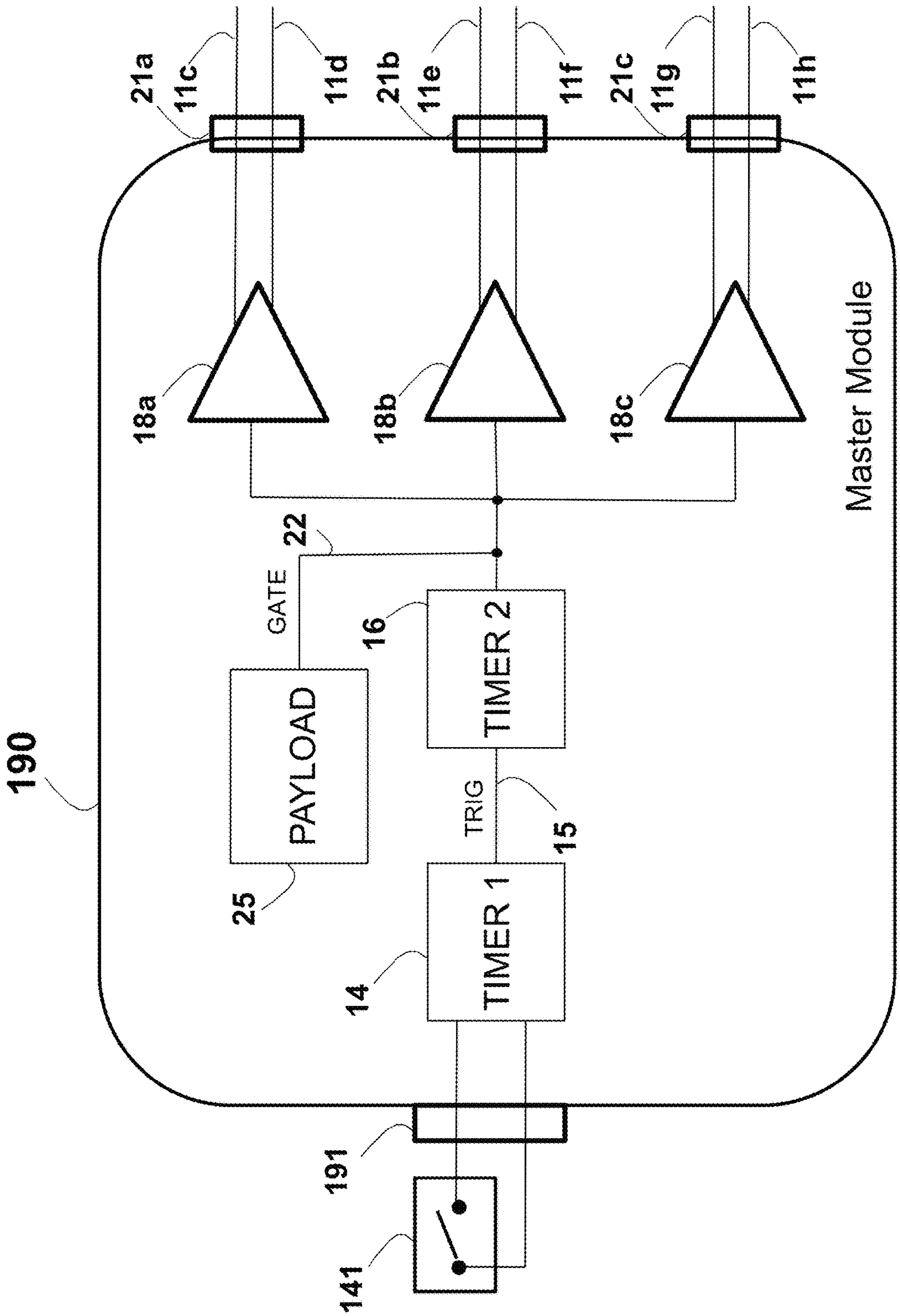
Figure 19A:
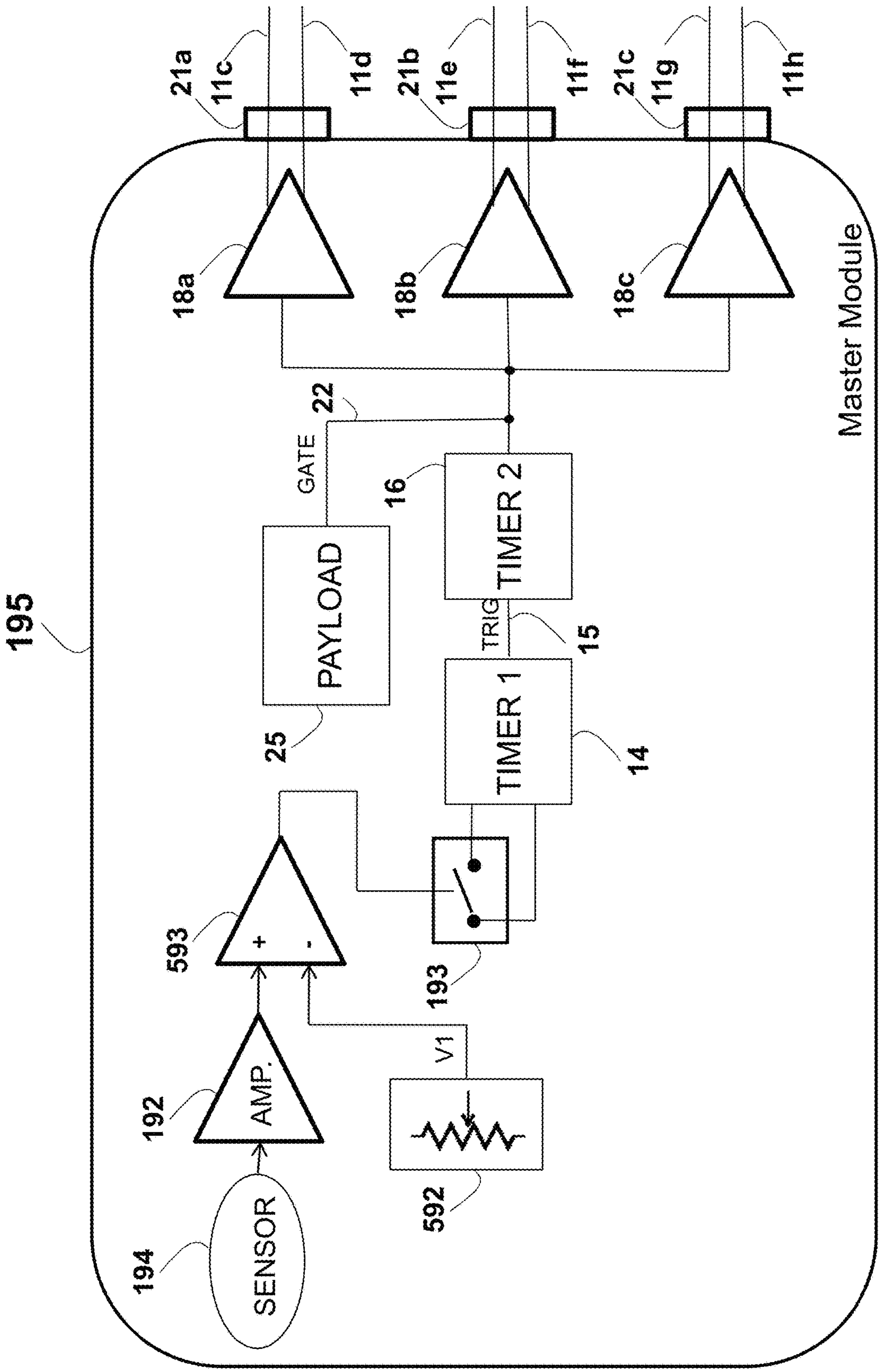
Figure 19B:
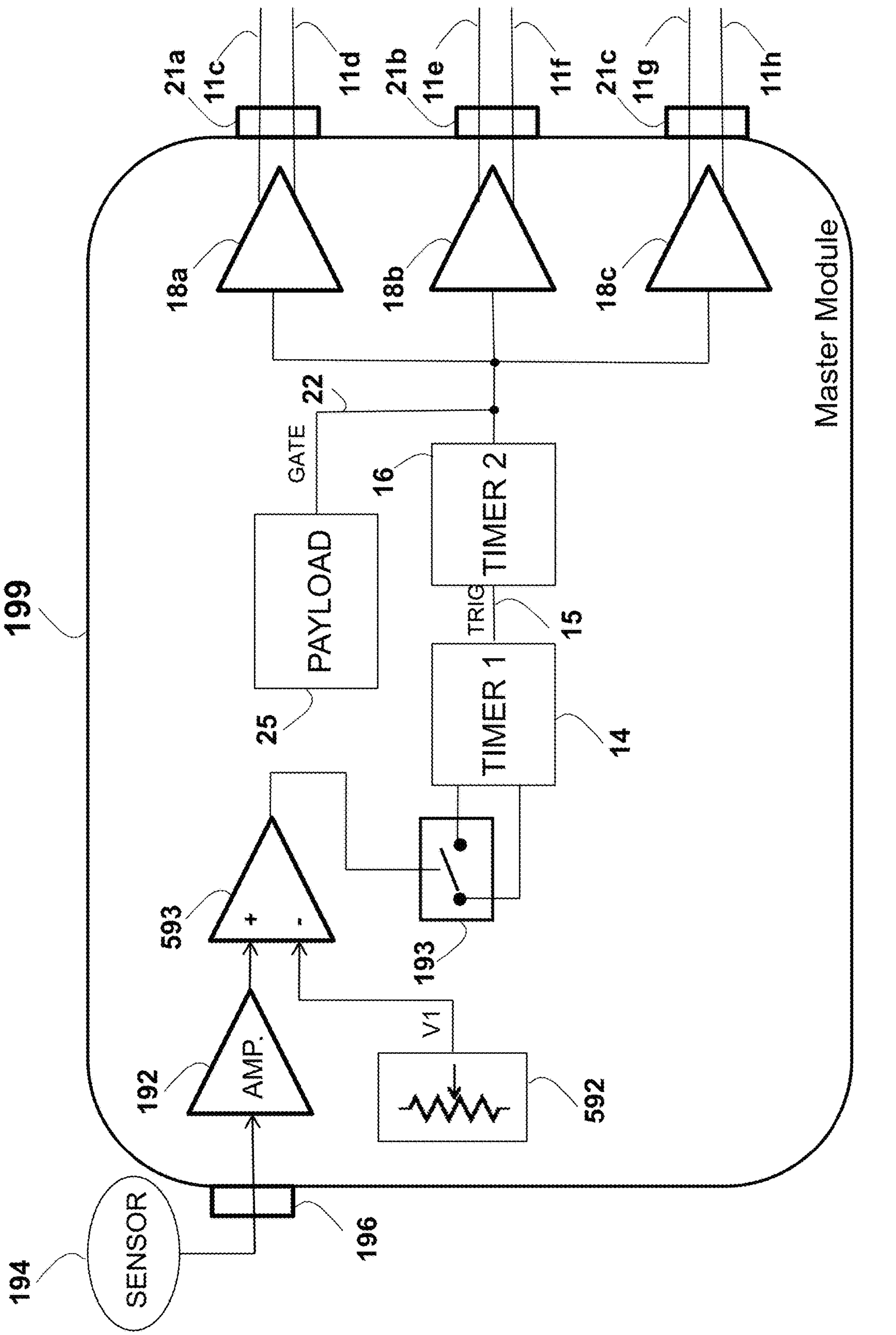
Figure 21:
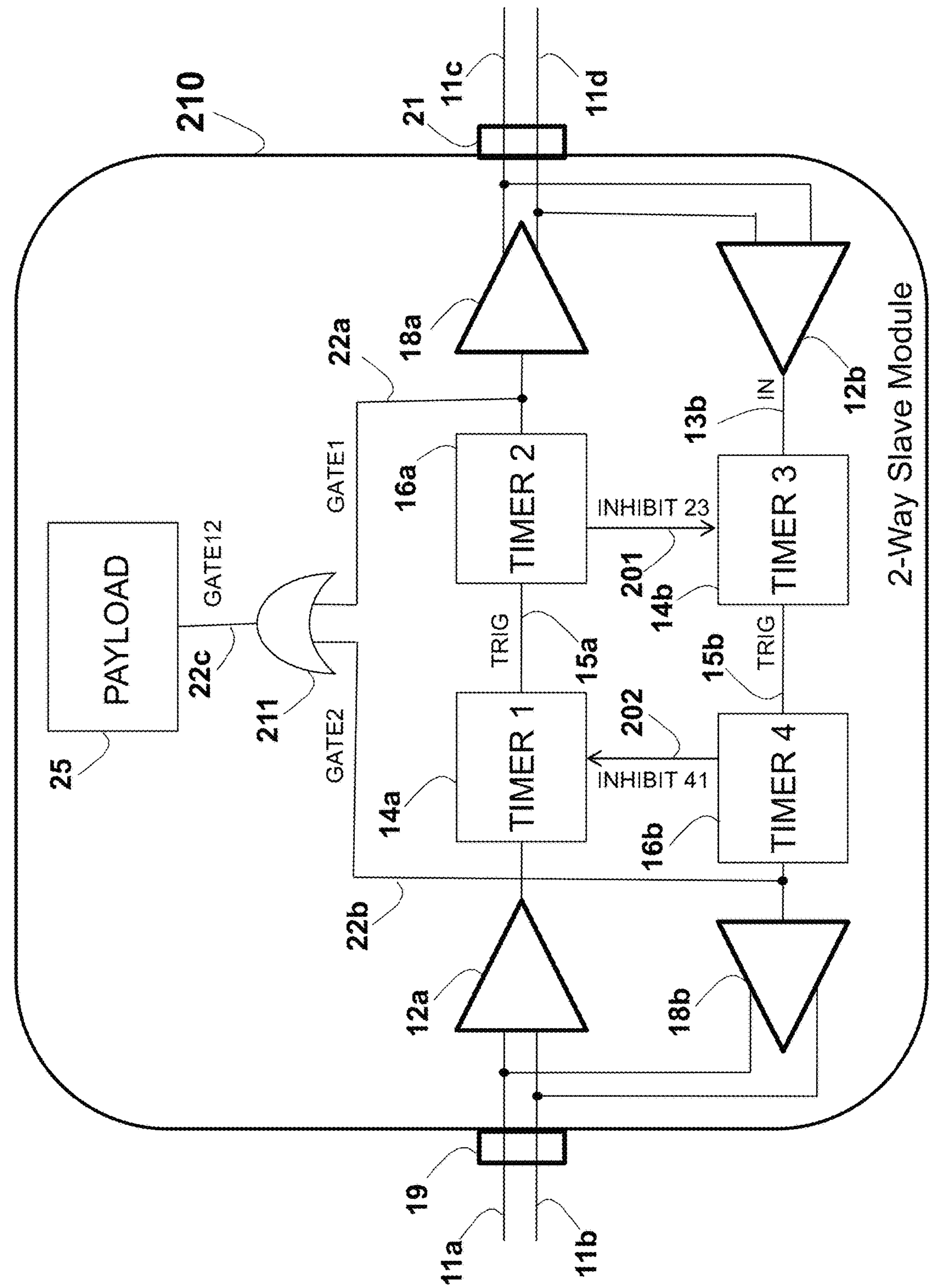
Figure 21A:
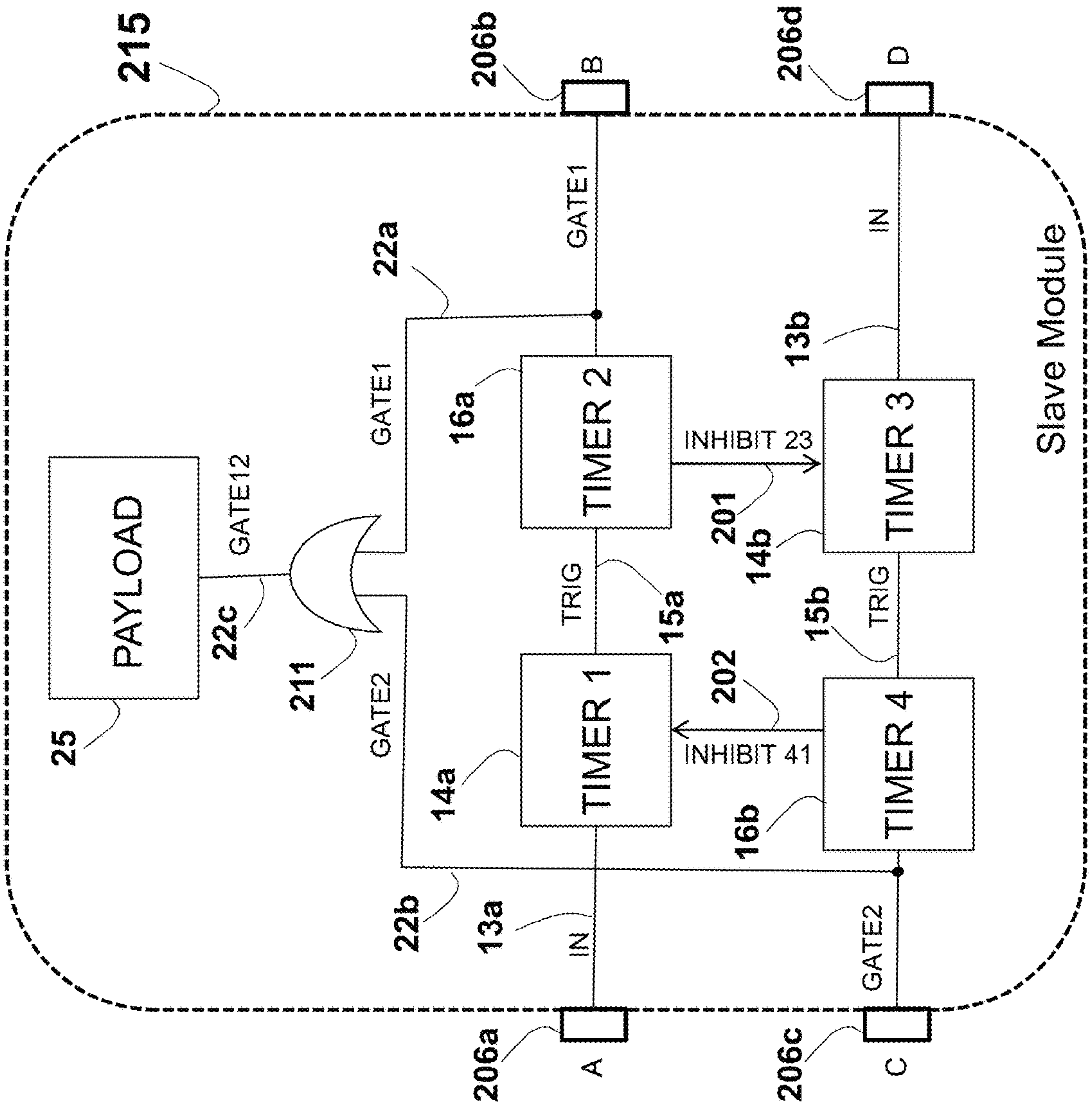
Figure 21B:
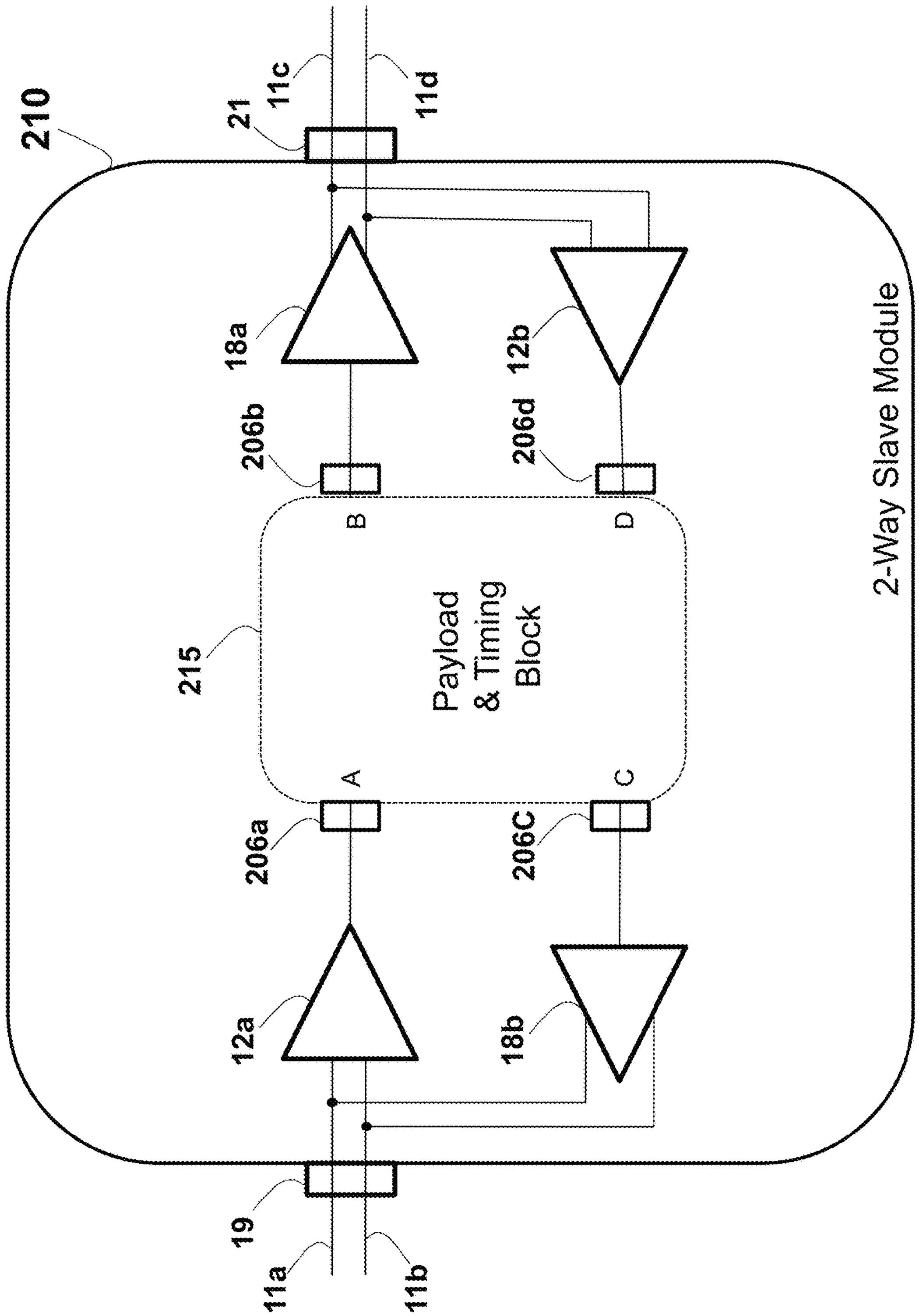
Figure 21C:
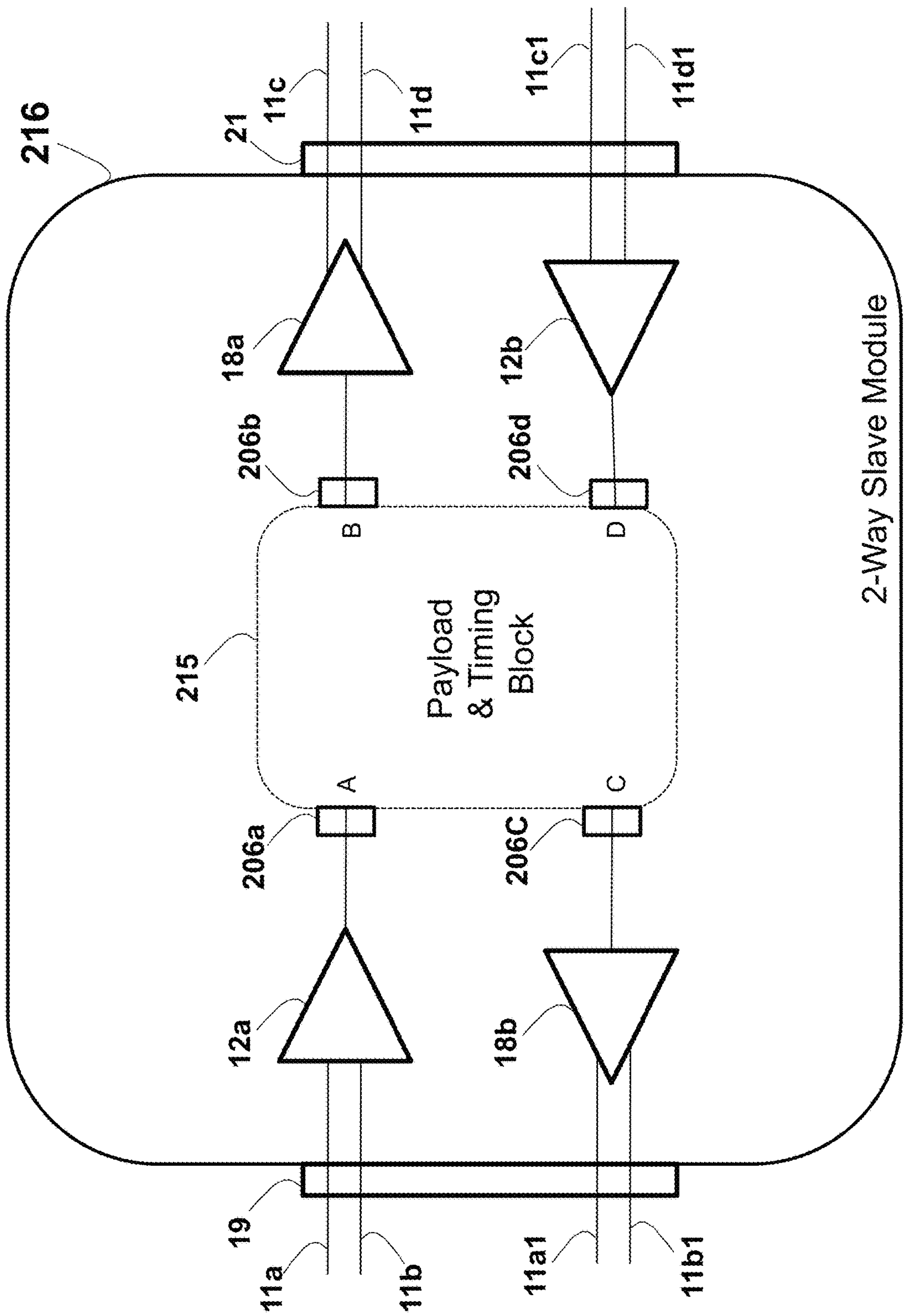
Figure 21D:
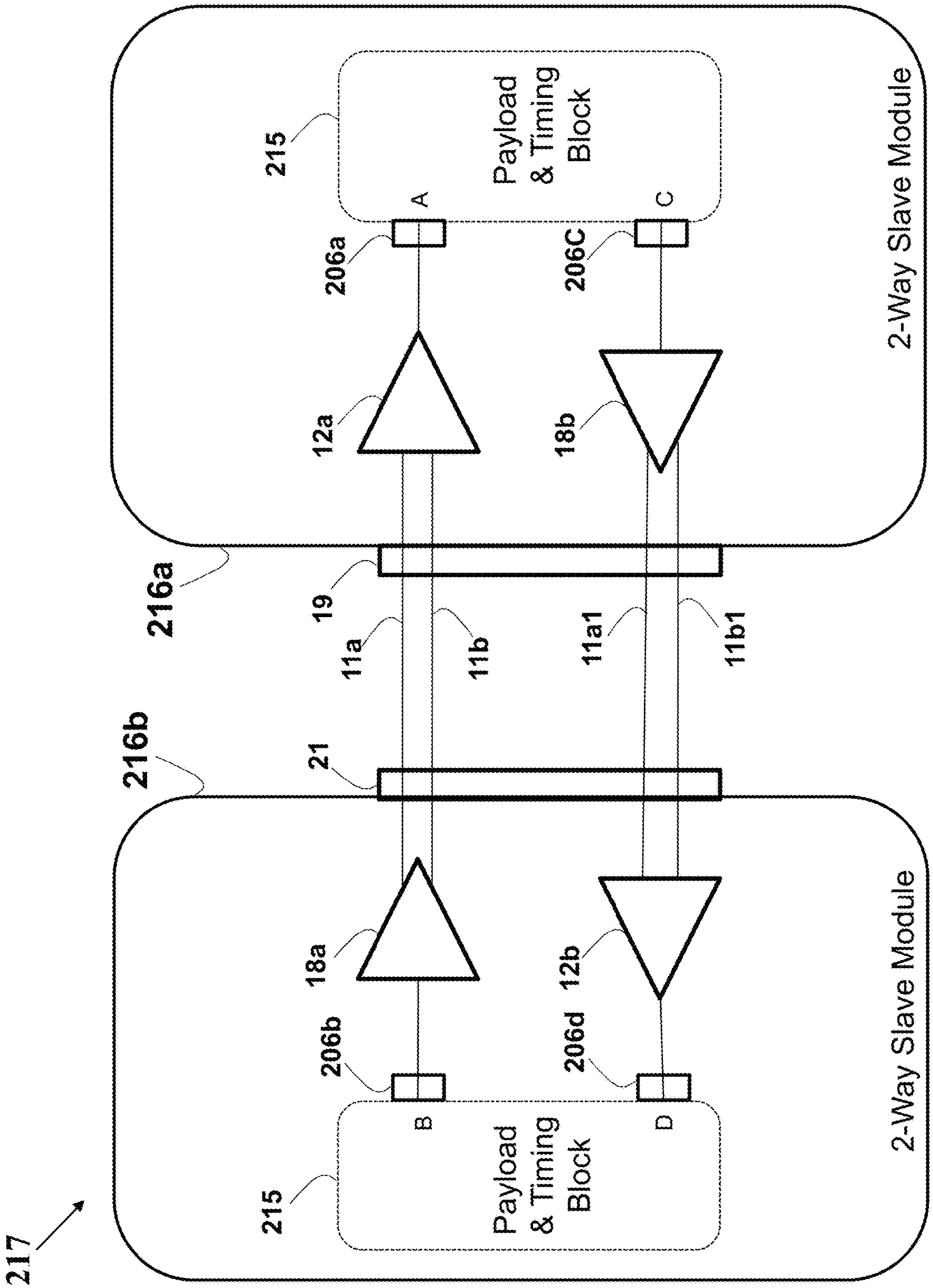
Figure 21E:
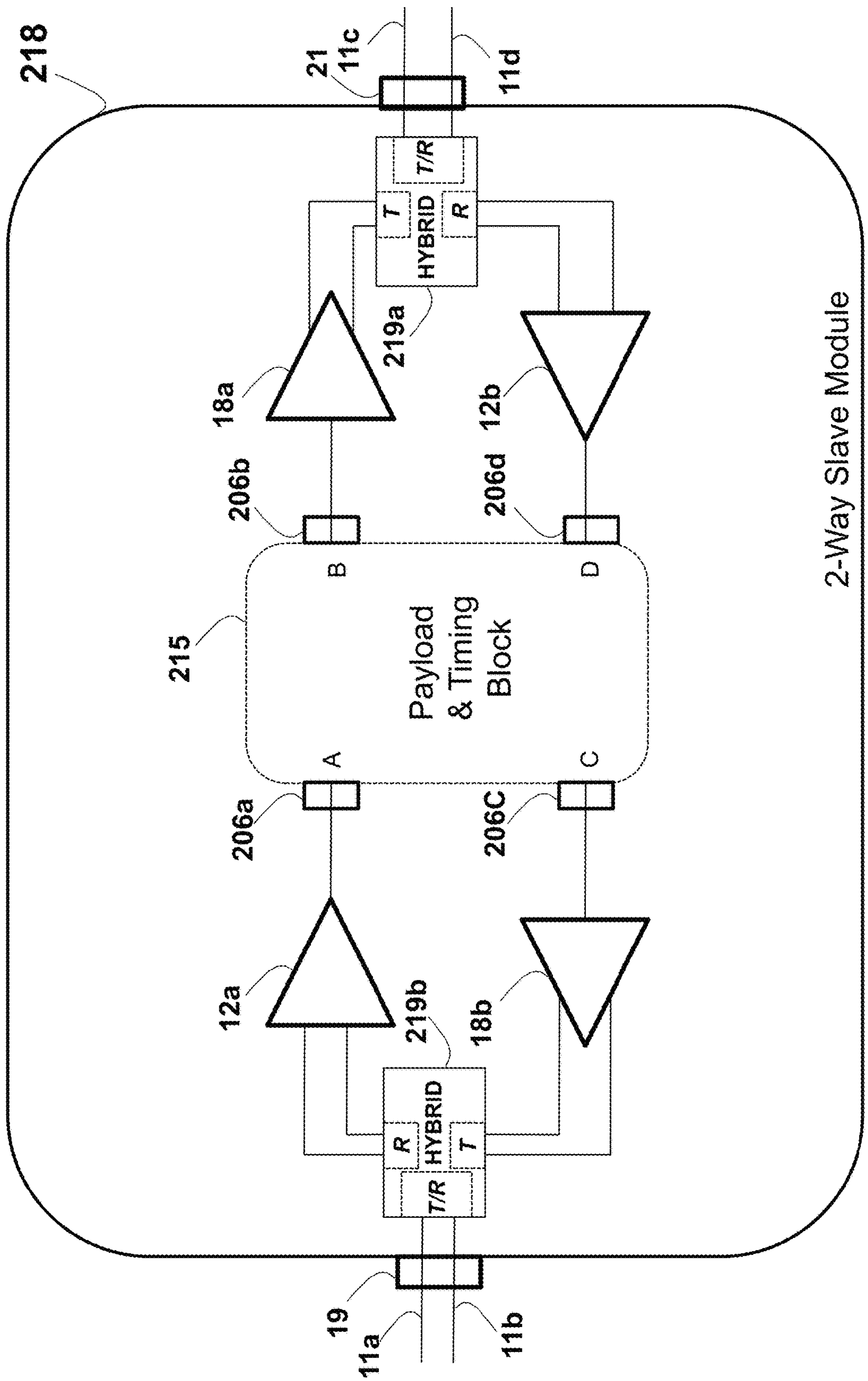
Figure 22:
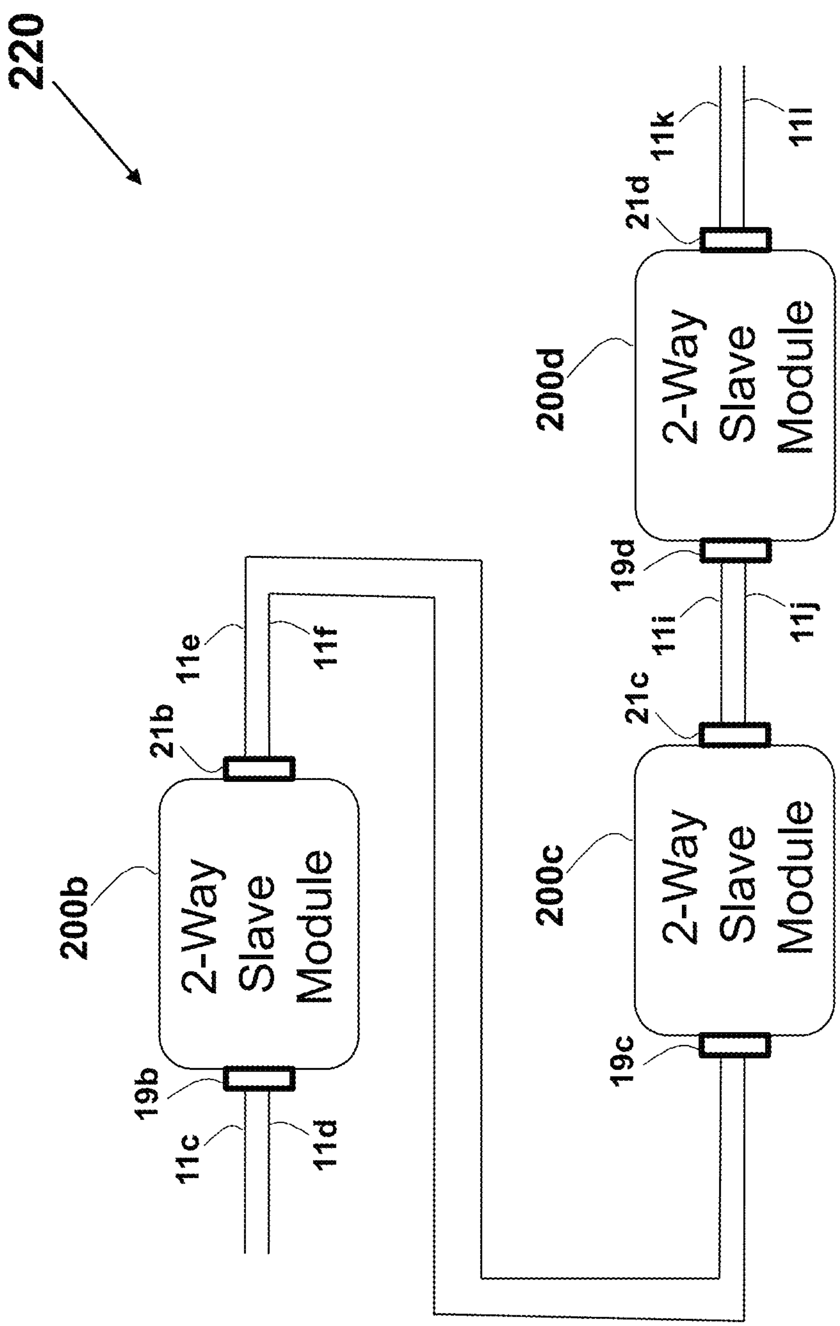
Figure 23:
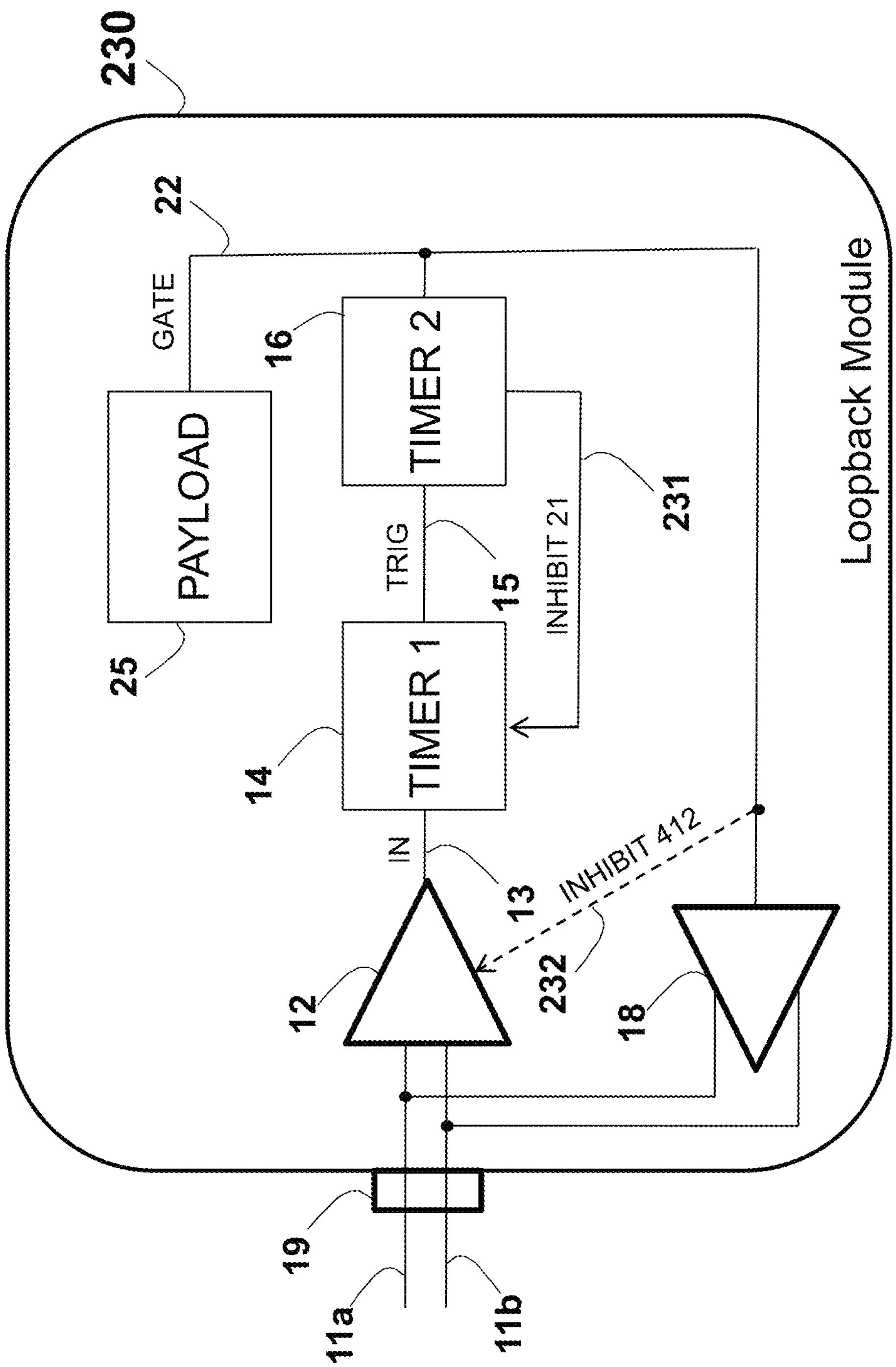
Figure 24:
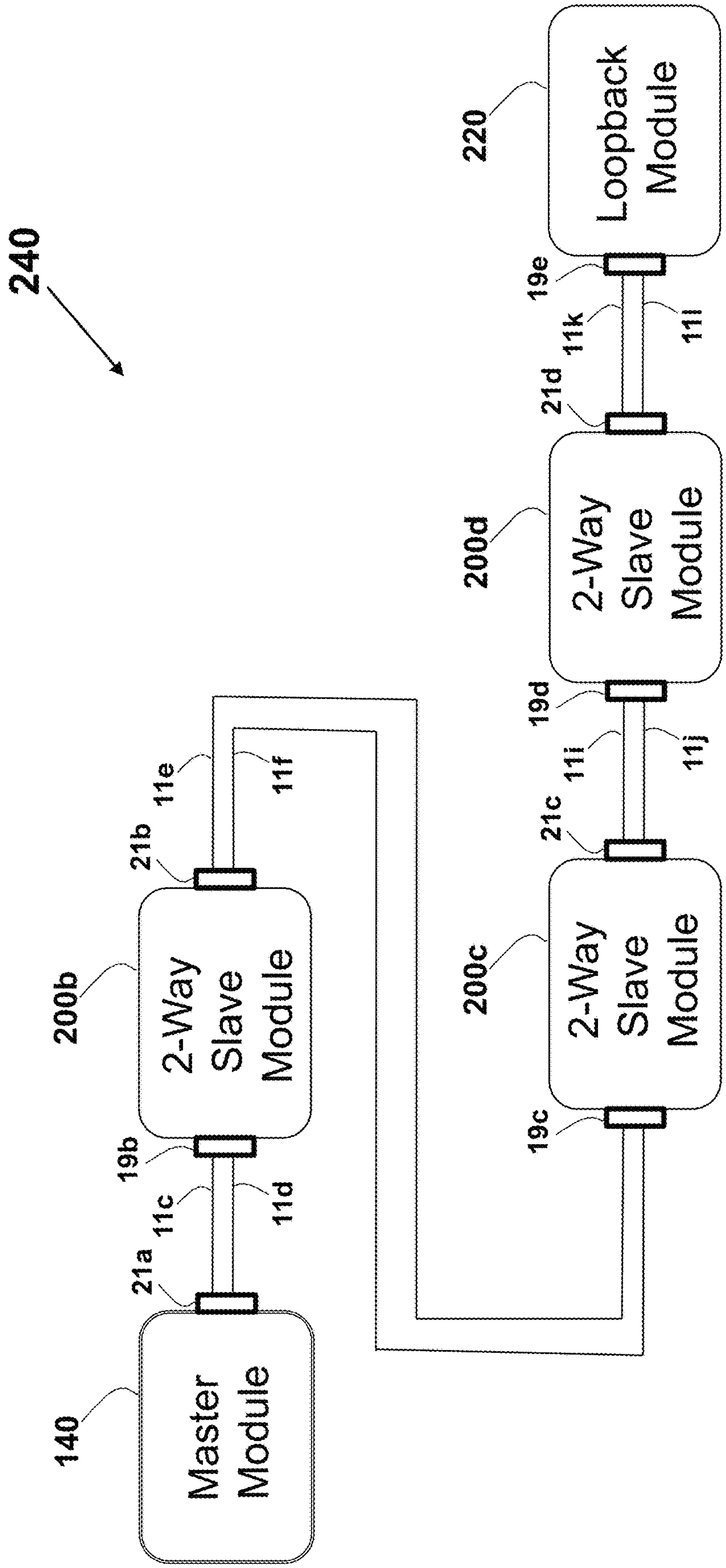
Figure 25:
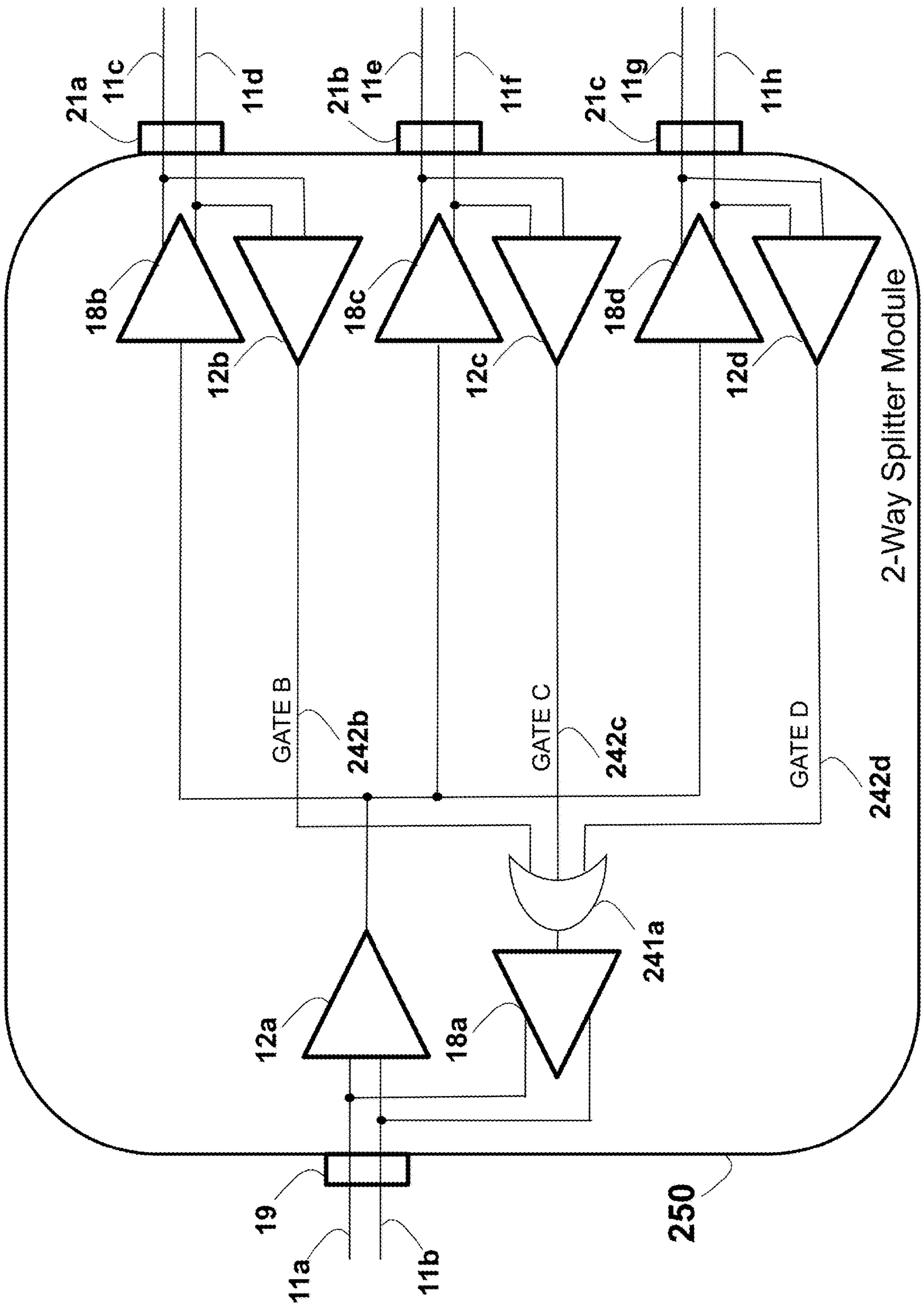
Figure 25A:
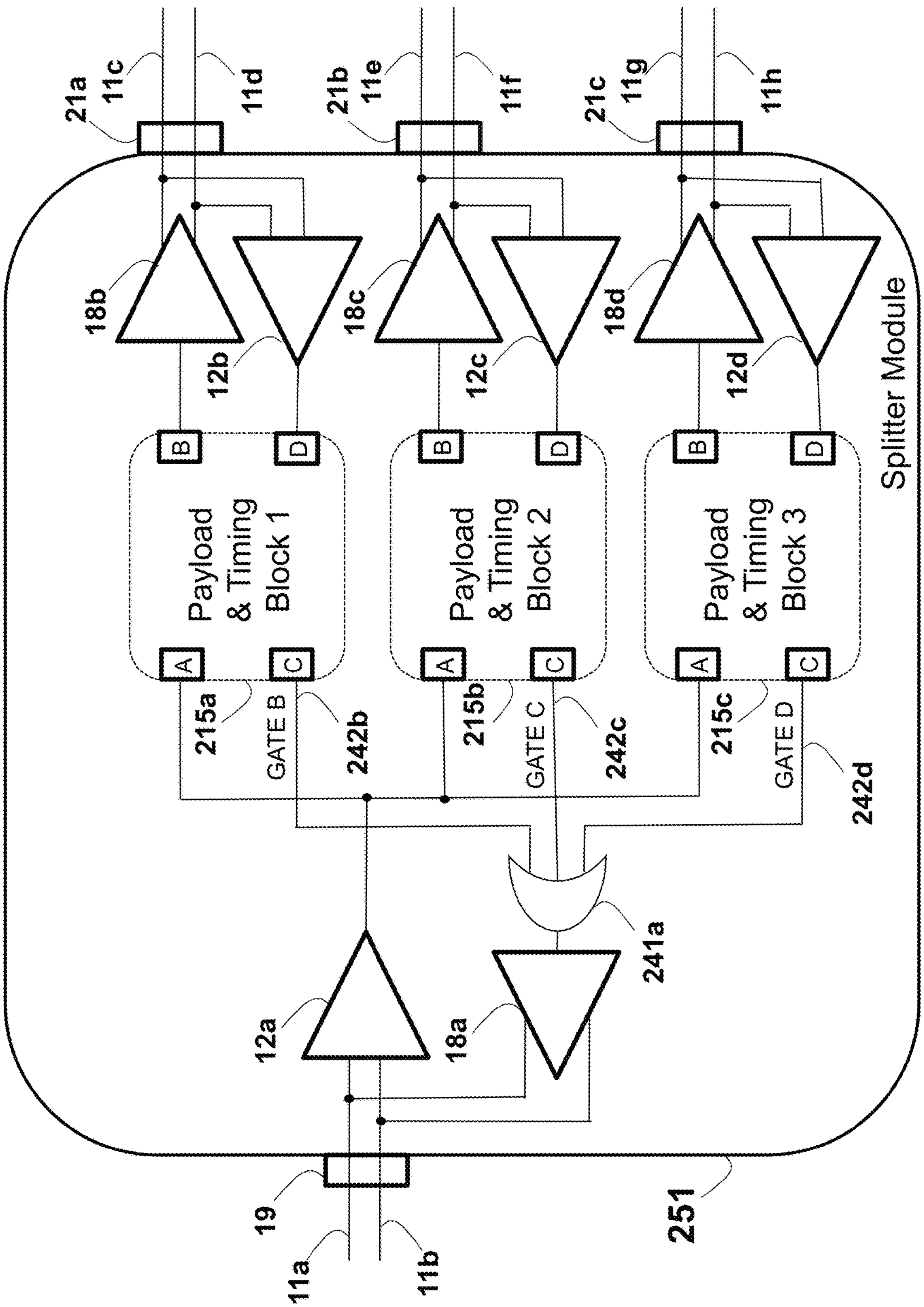
Figure 25B:
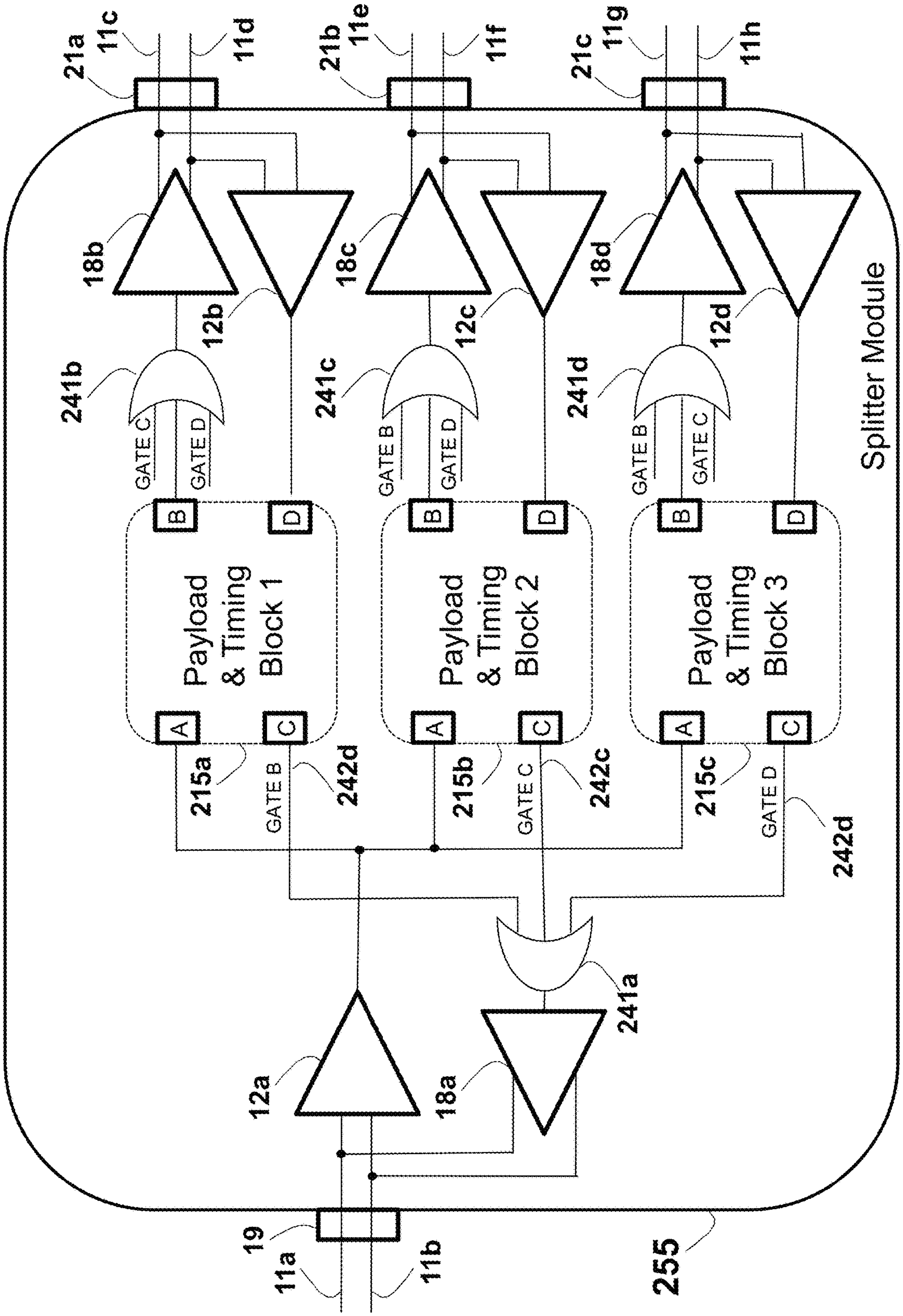
Figure 26:
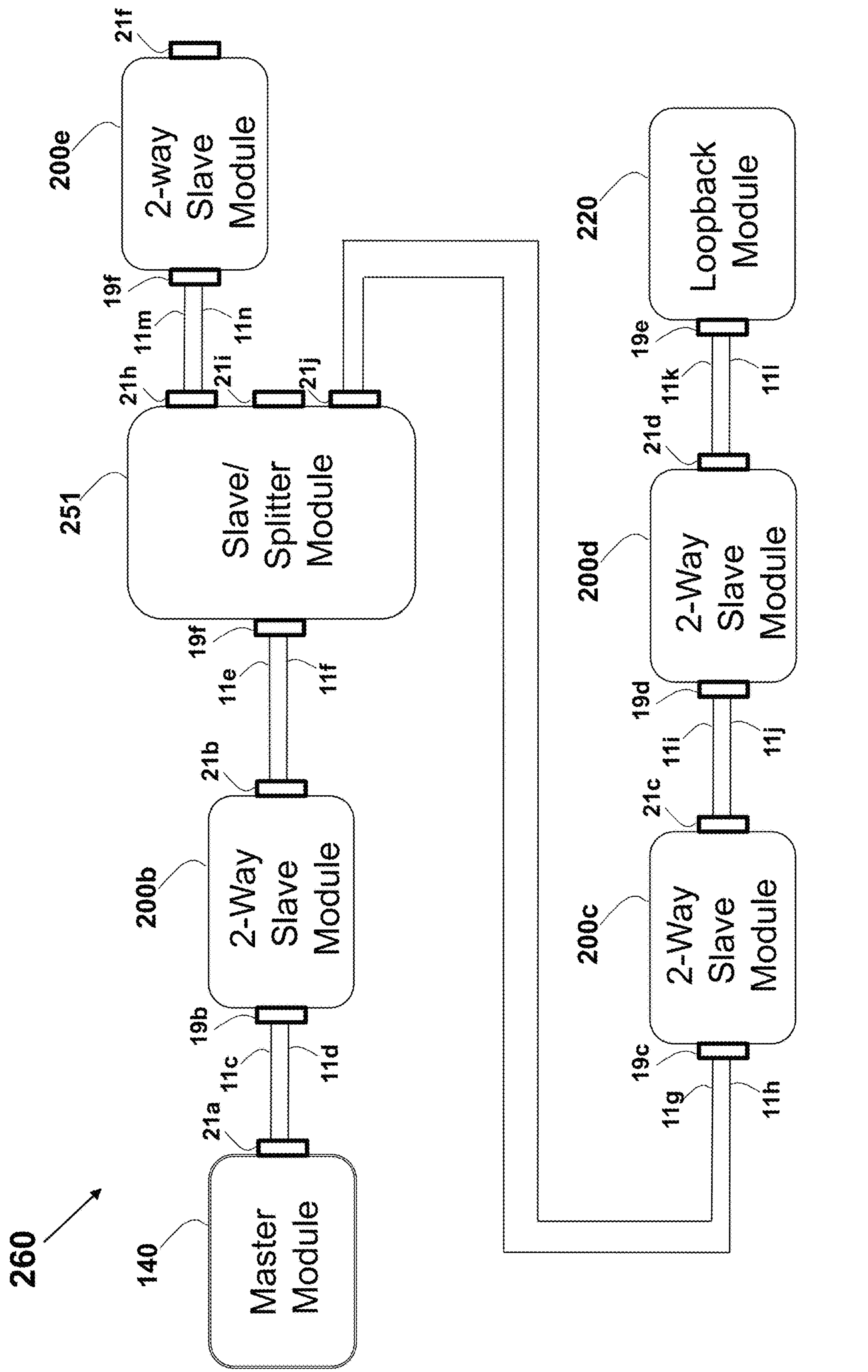
Figure 27:
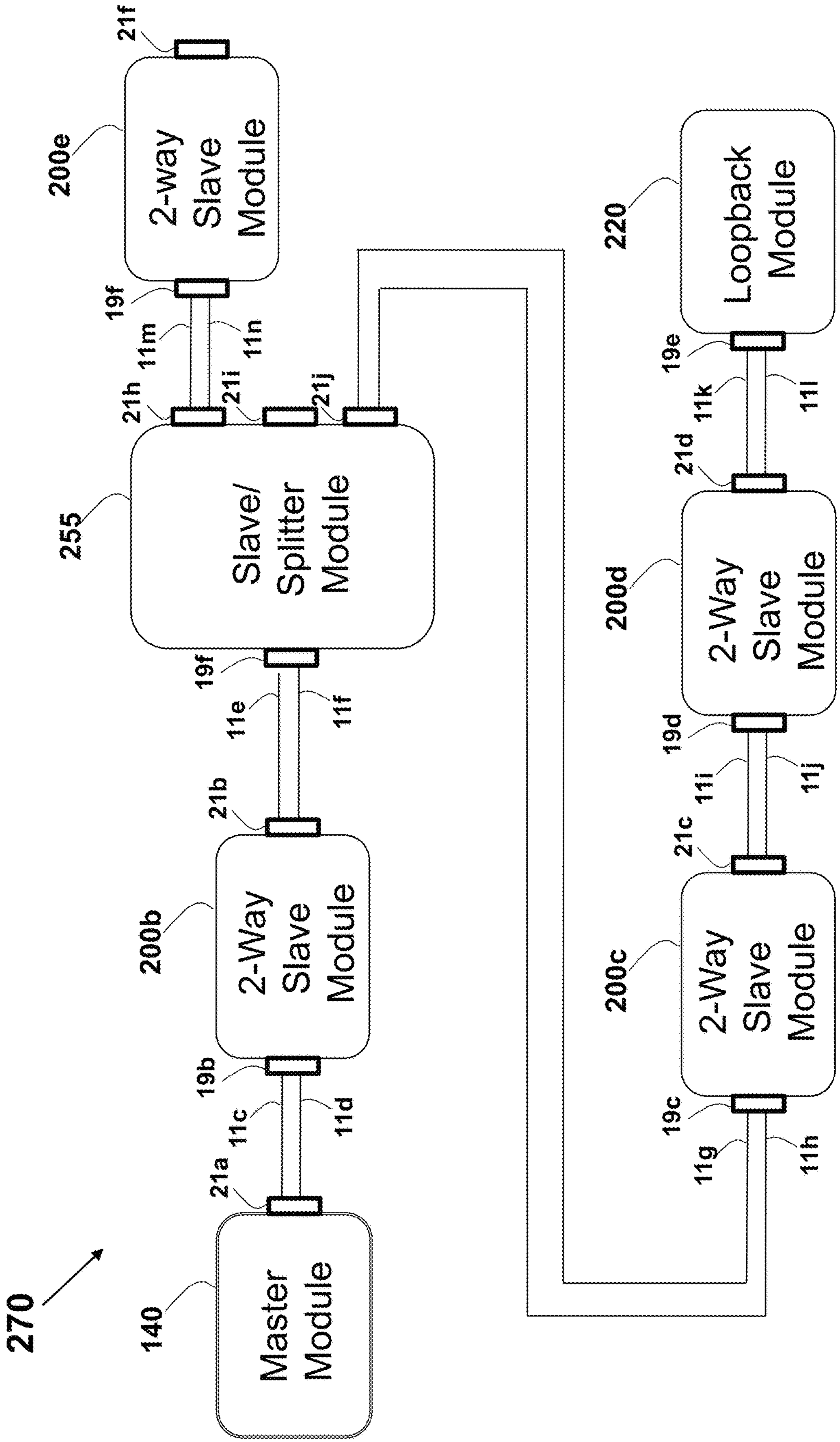
Figure 28:
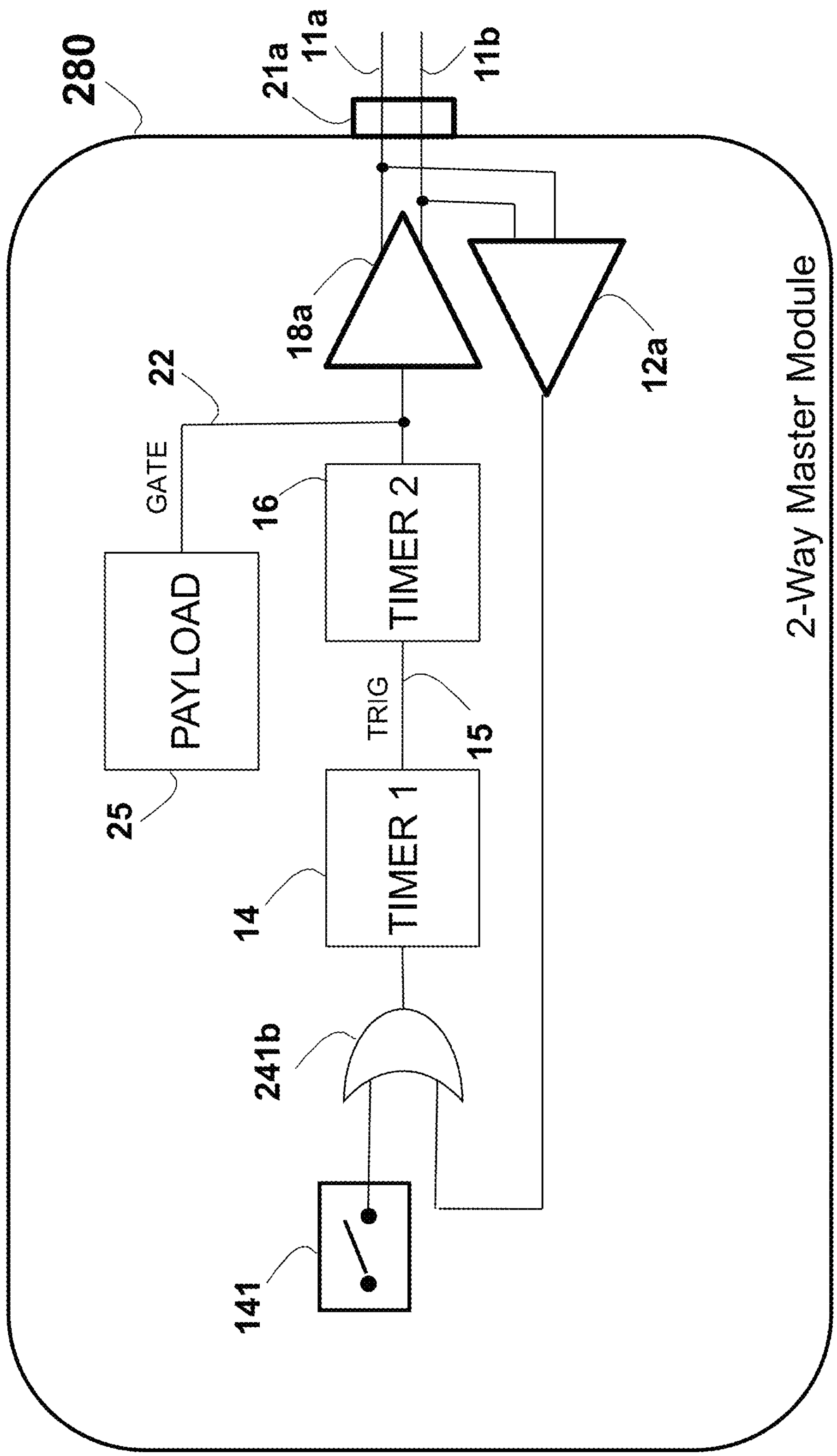
Figure 29:
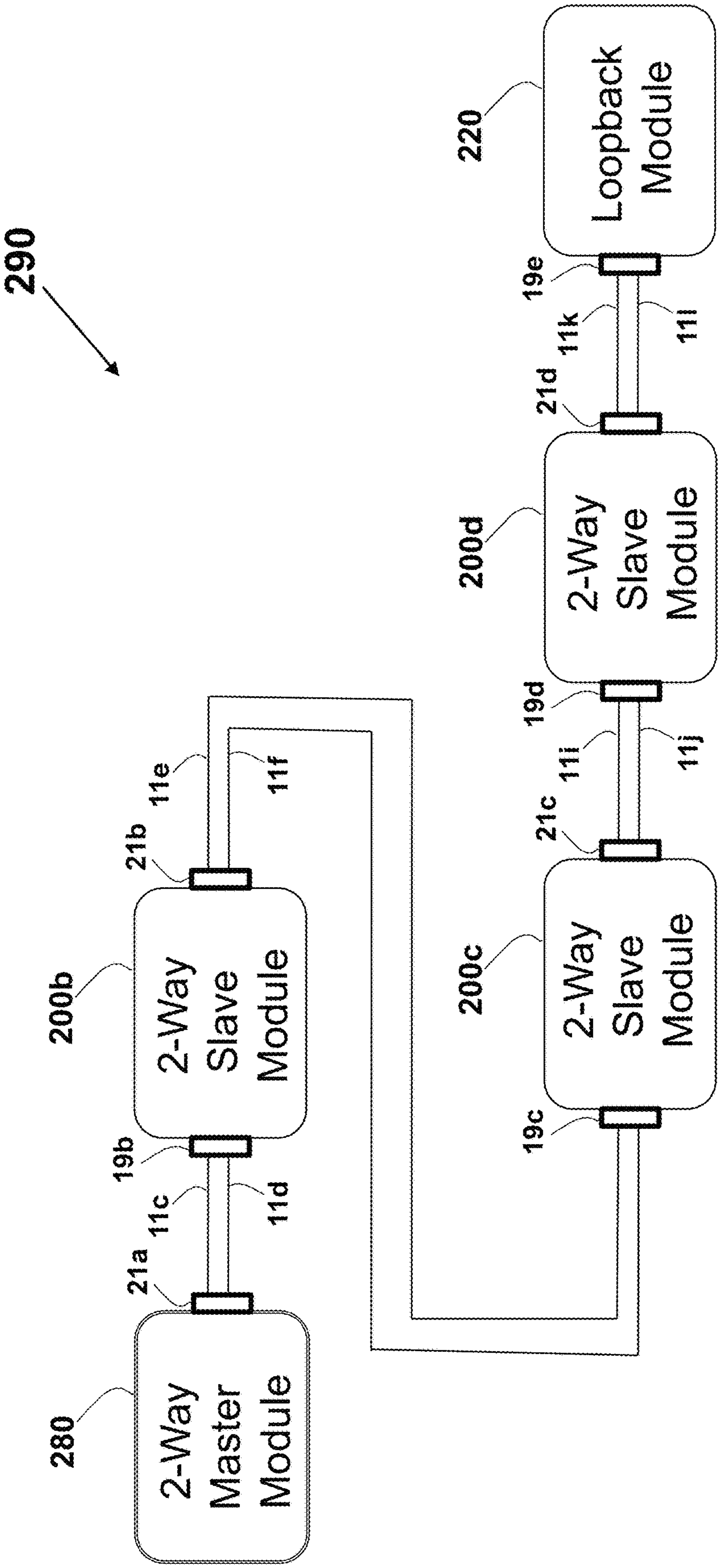
Figure 30:
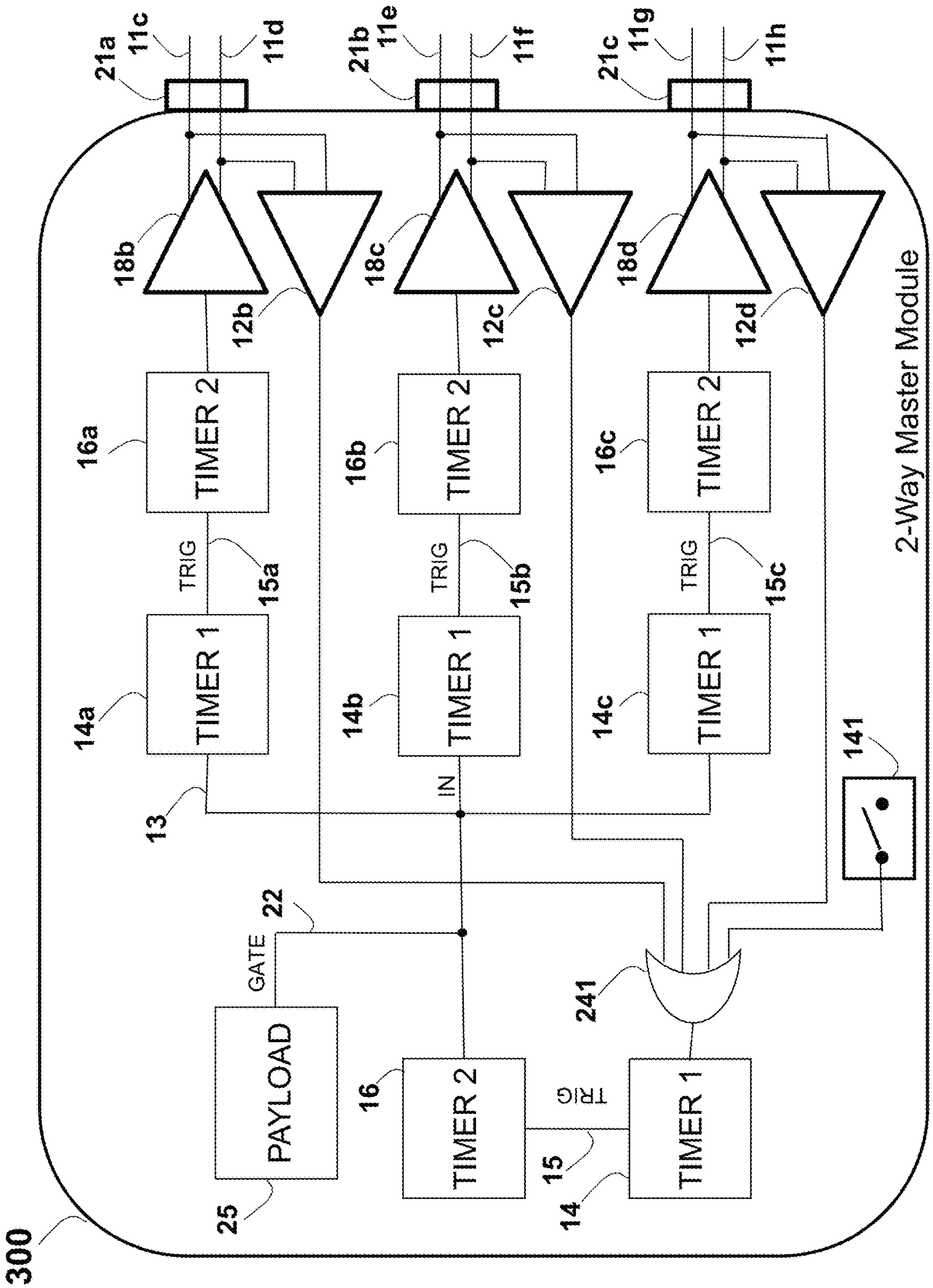
Figure 31:
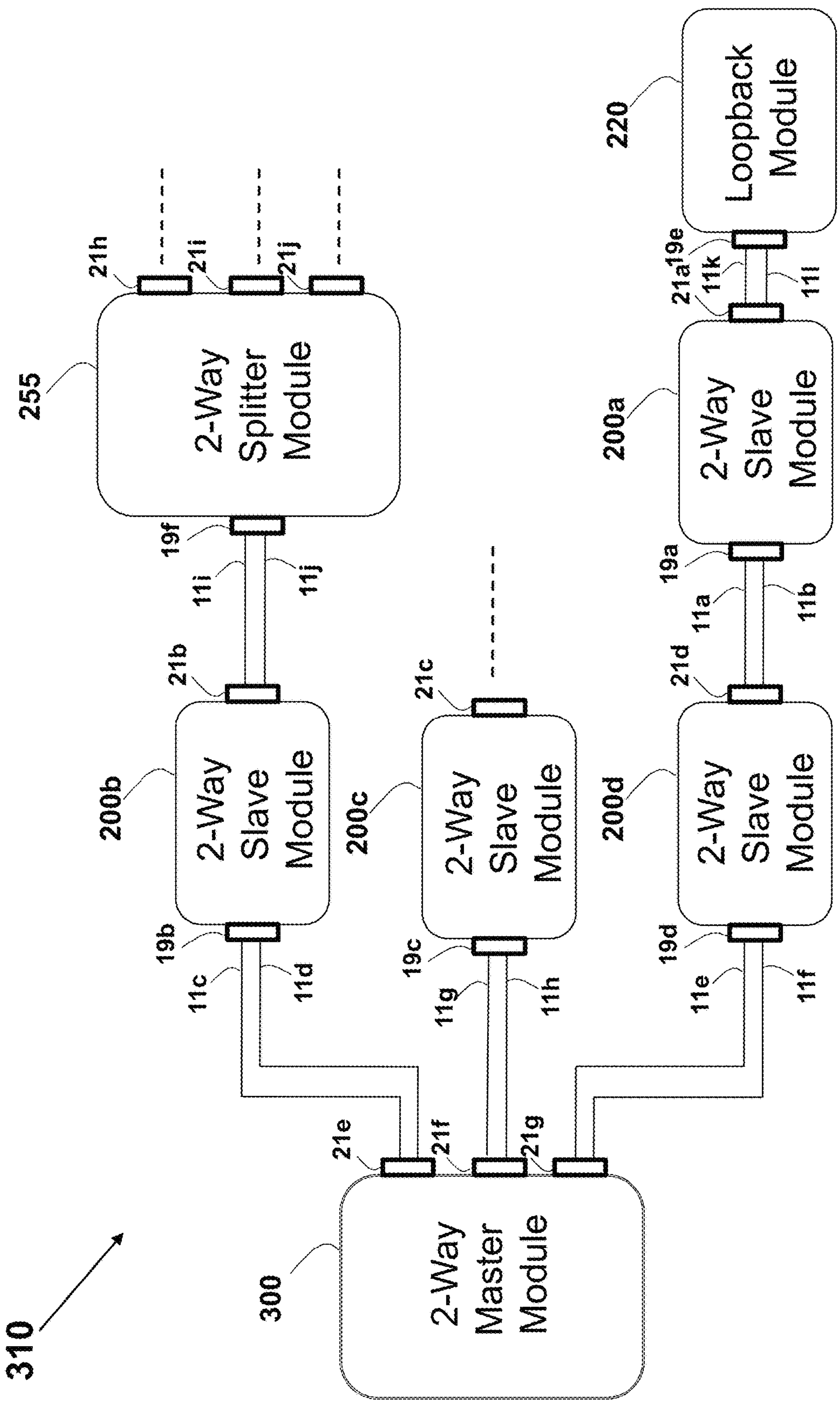
Figure 31A:
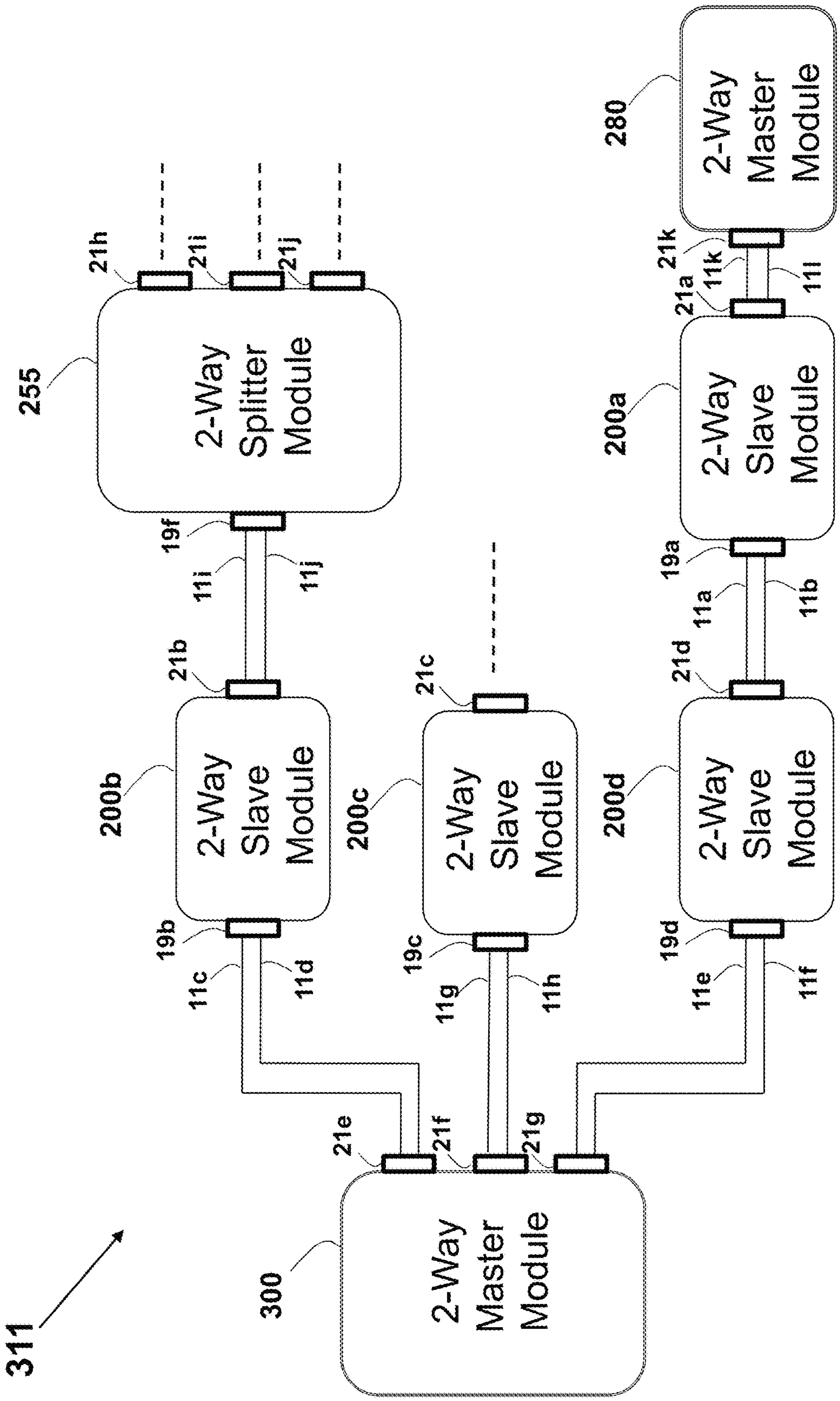
Figure 32:
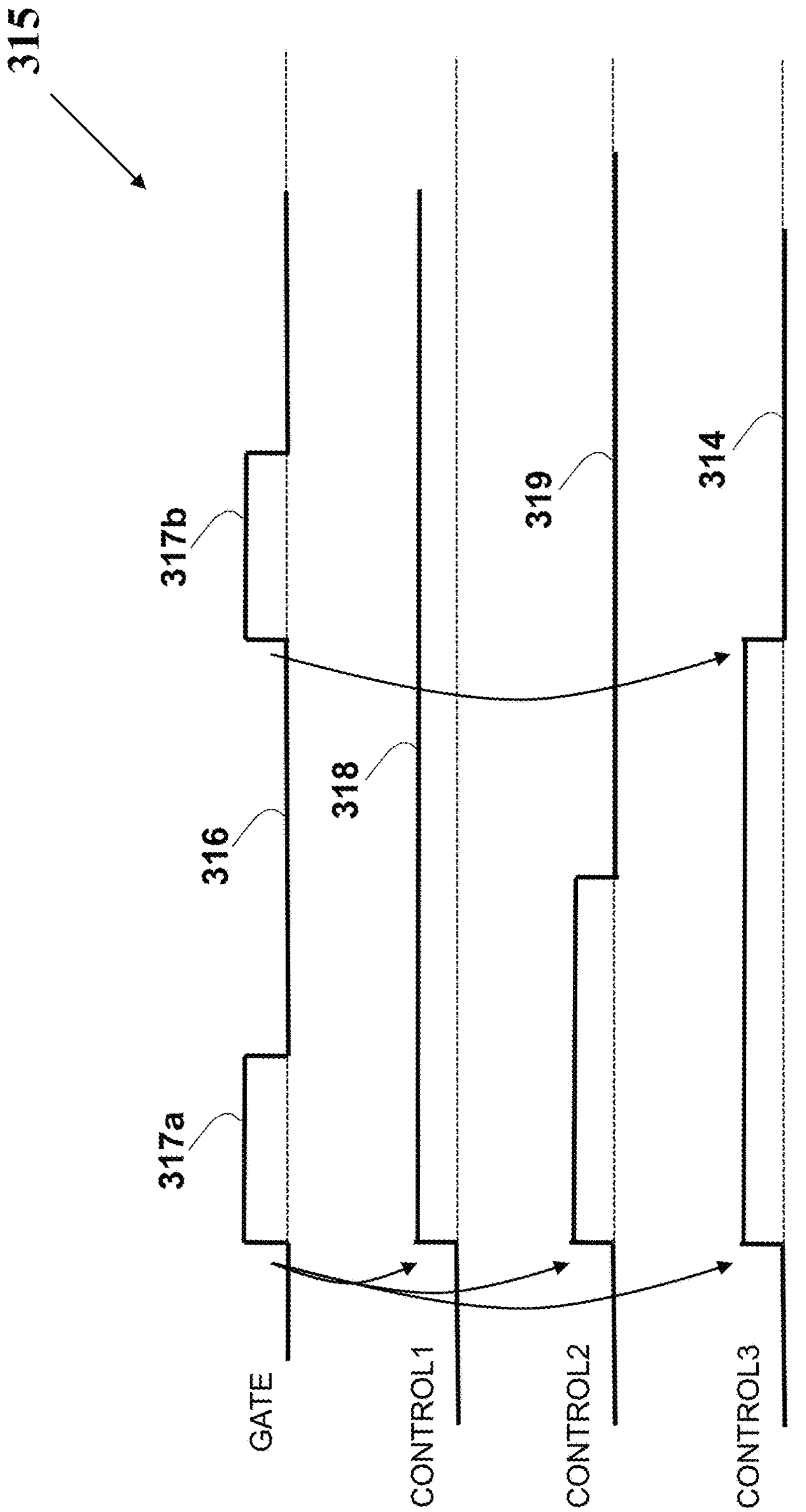
Figure 32A:
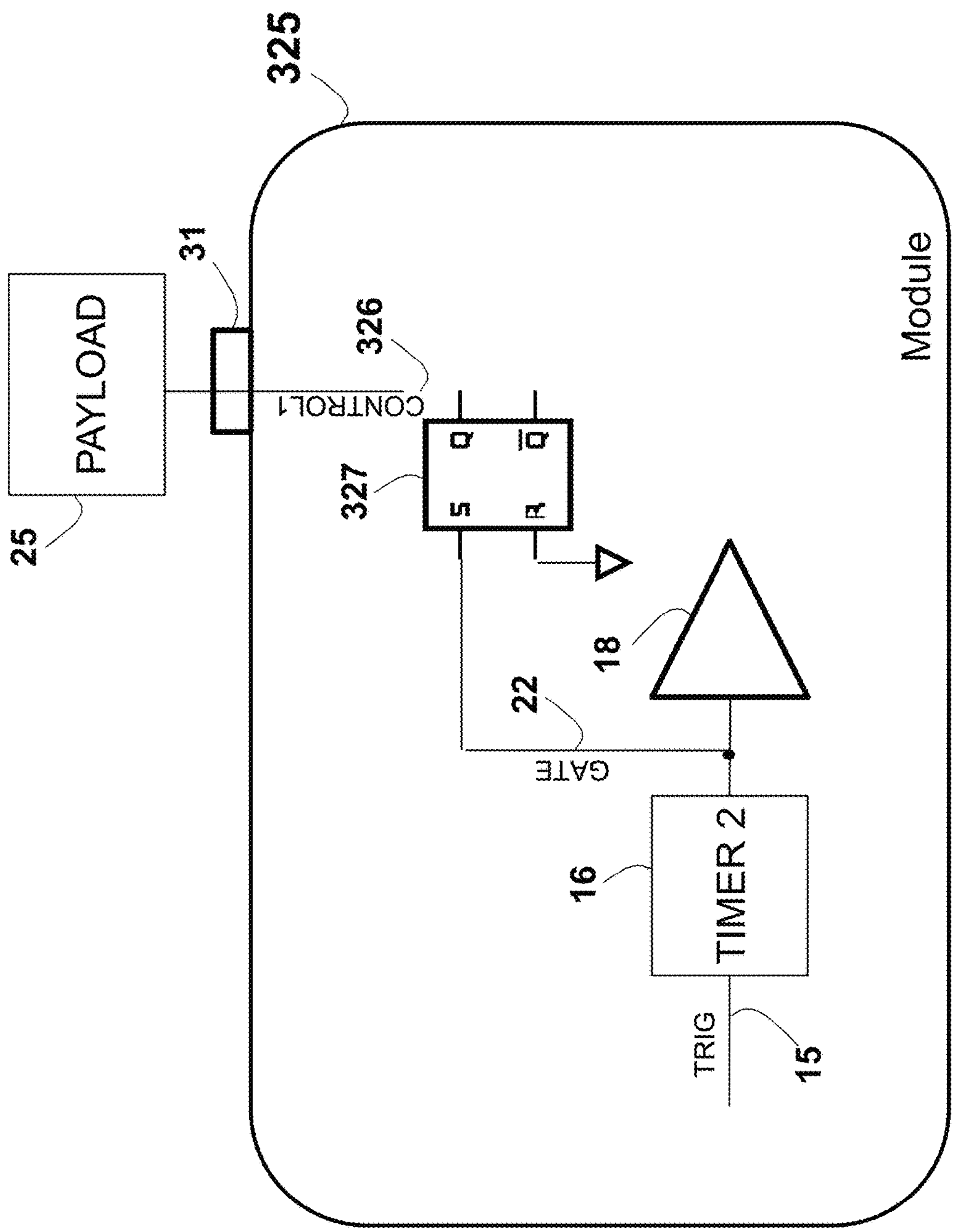
Figure 32B:
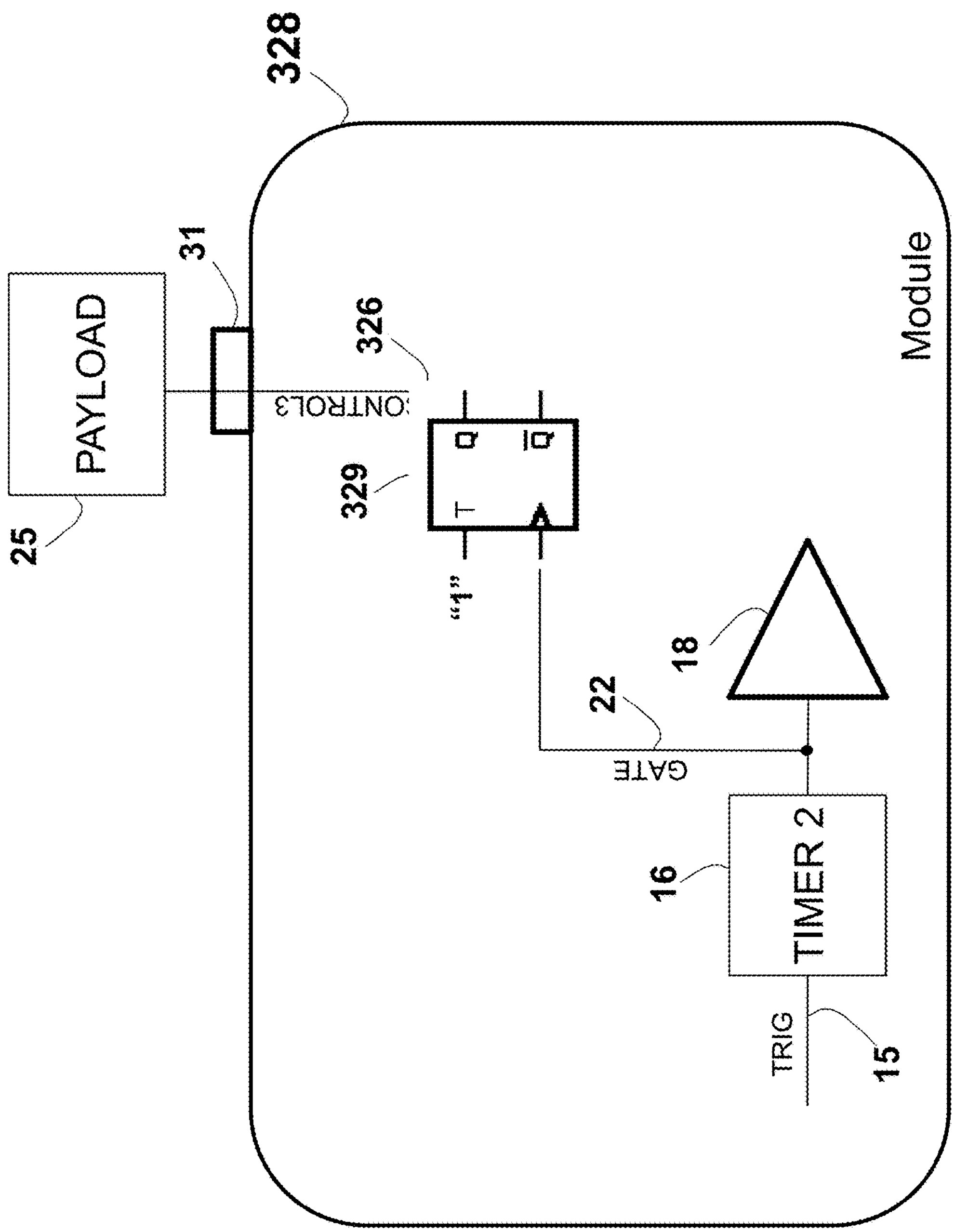
Figure 33:
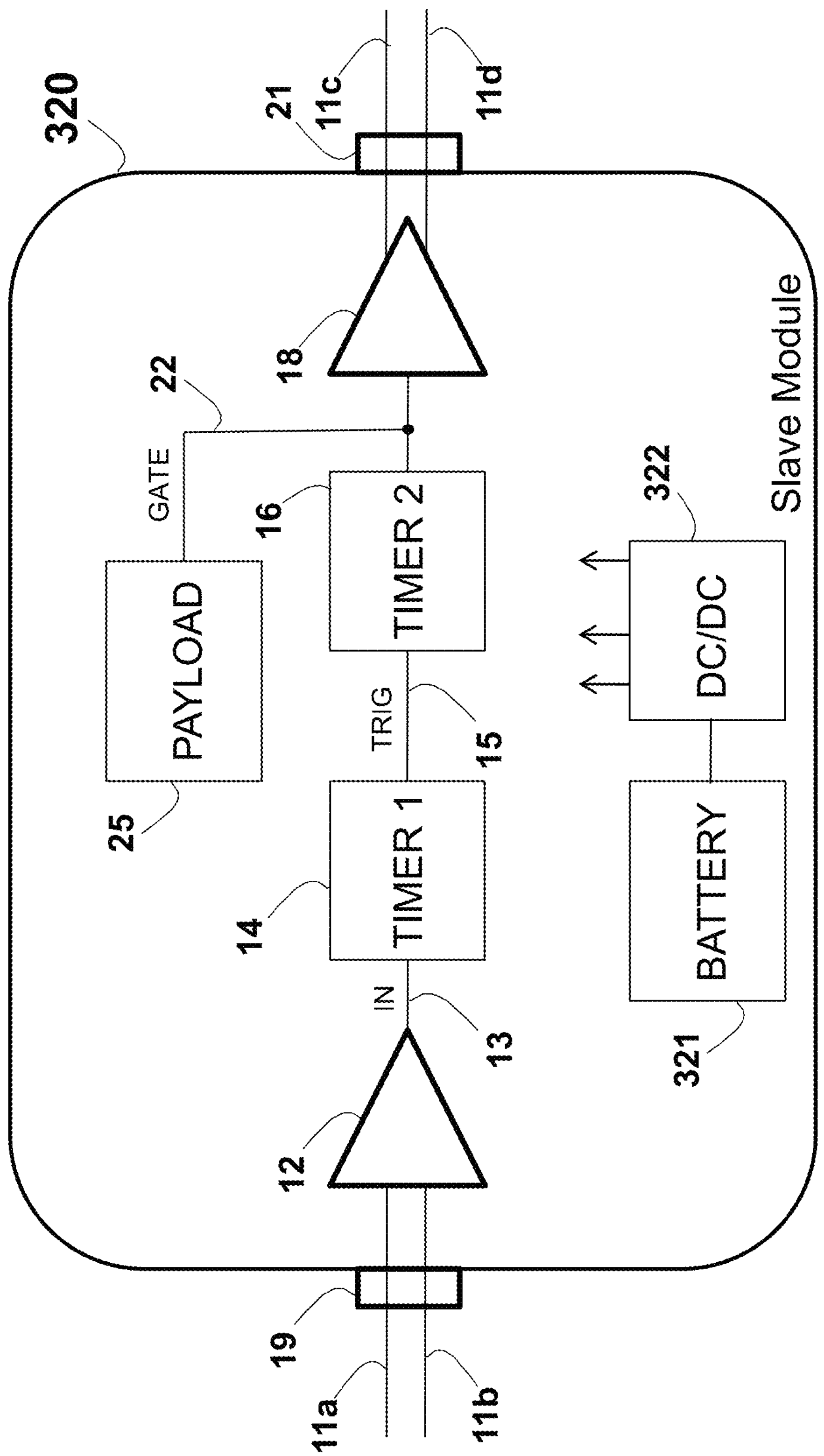
Figure 33A:
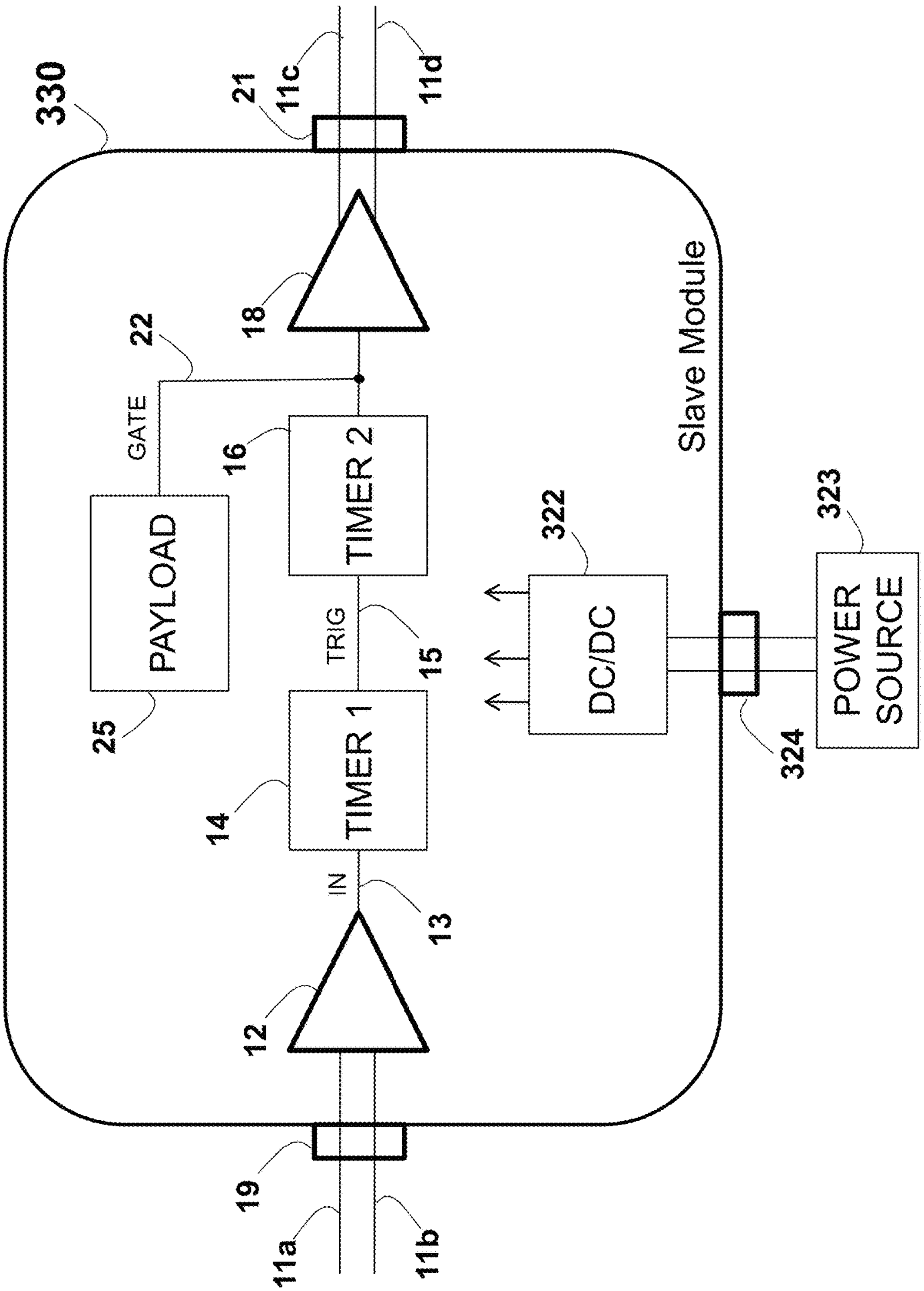
Figure 34:
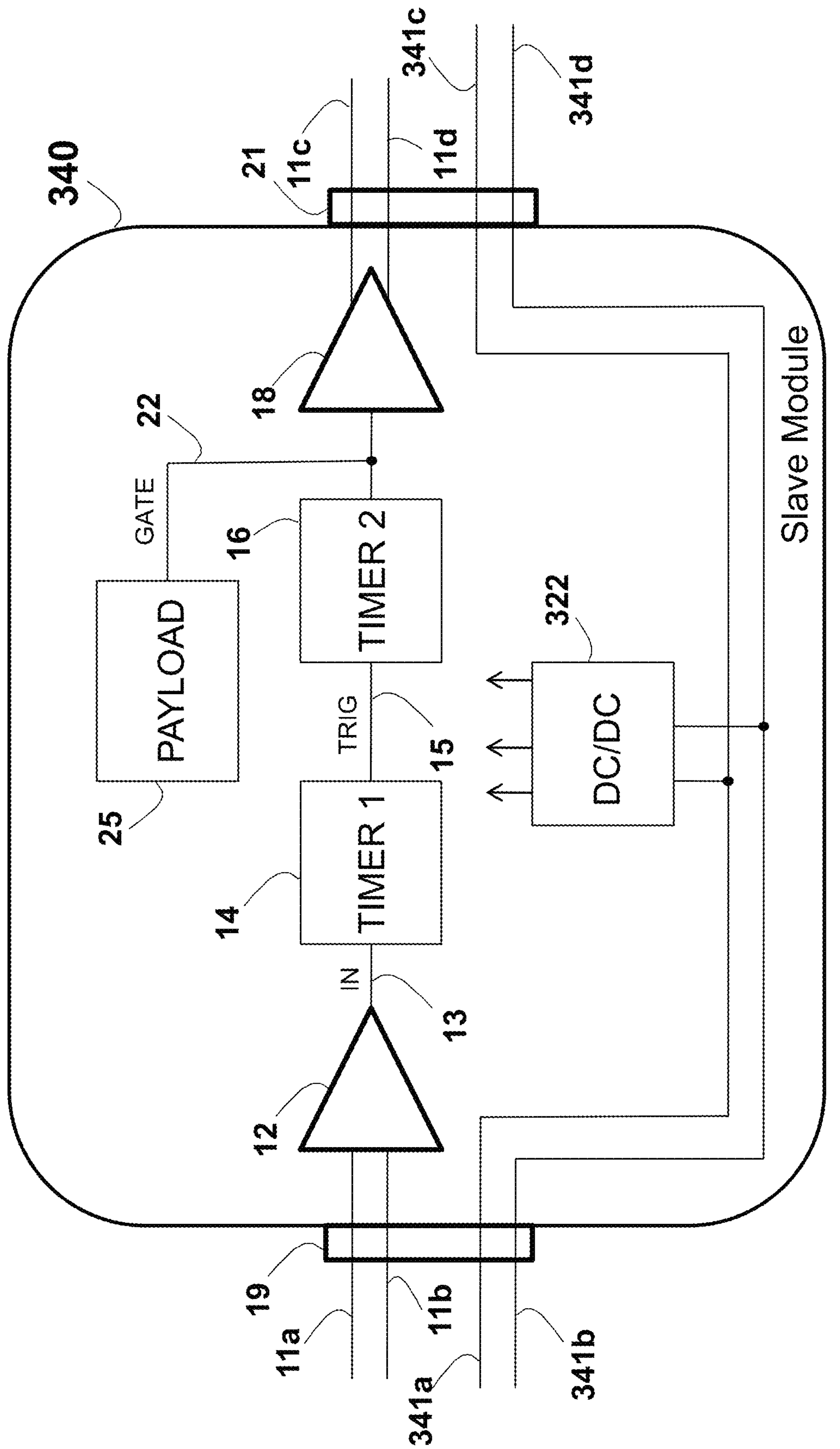
Figure 35:
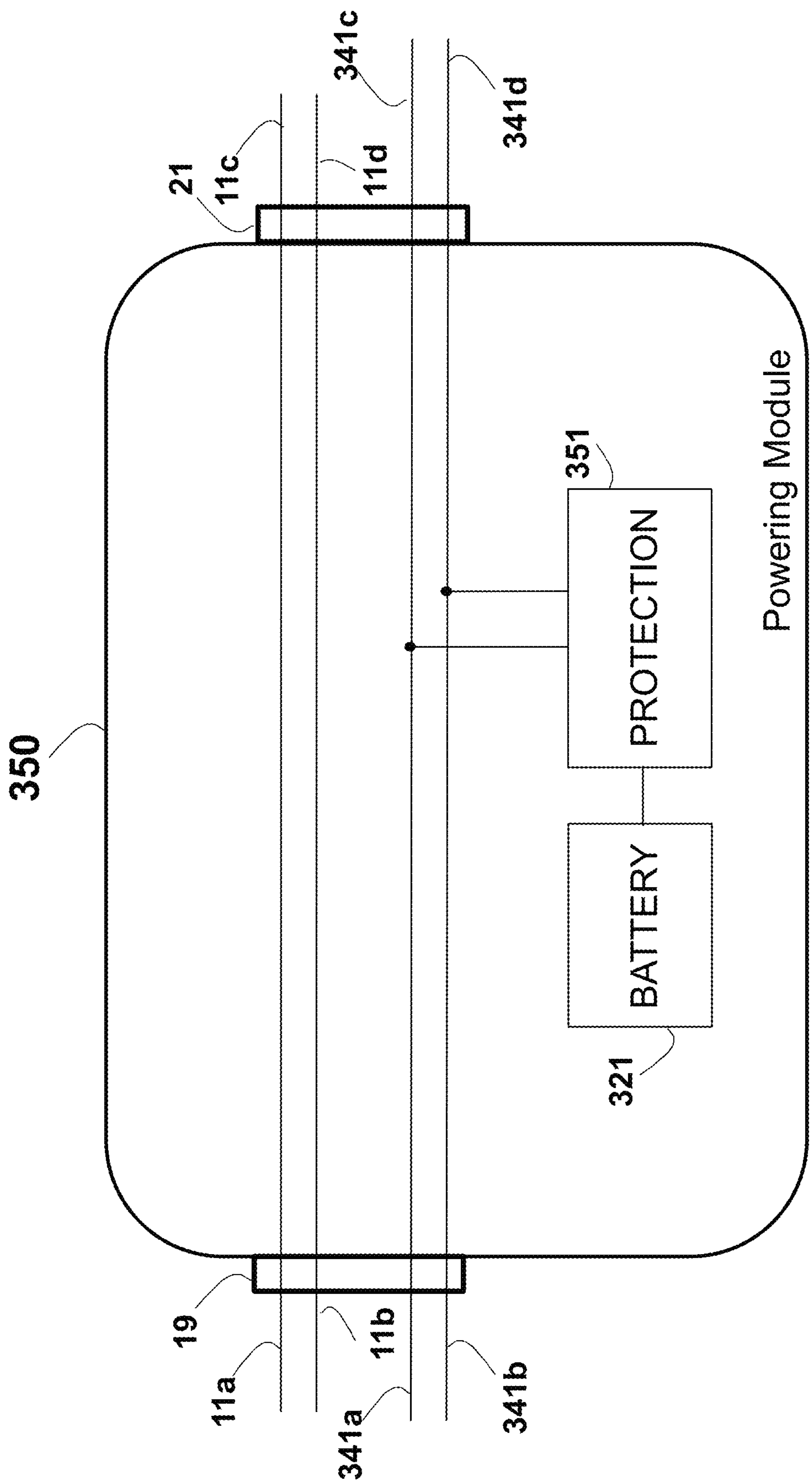
Figure 36:
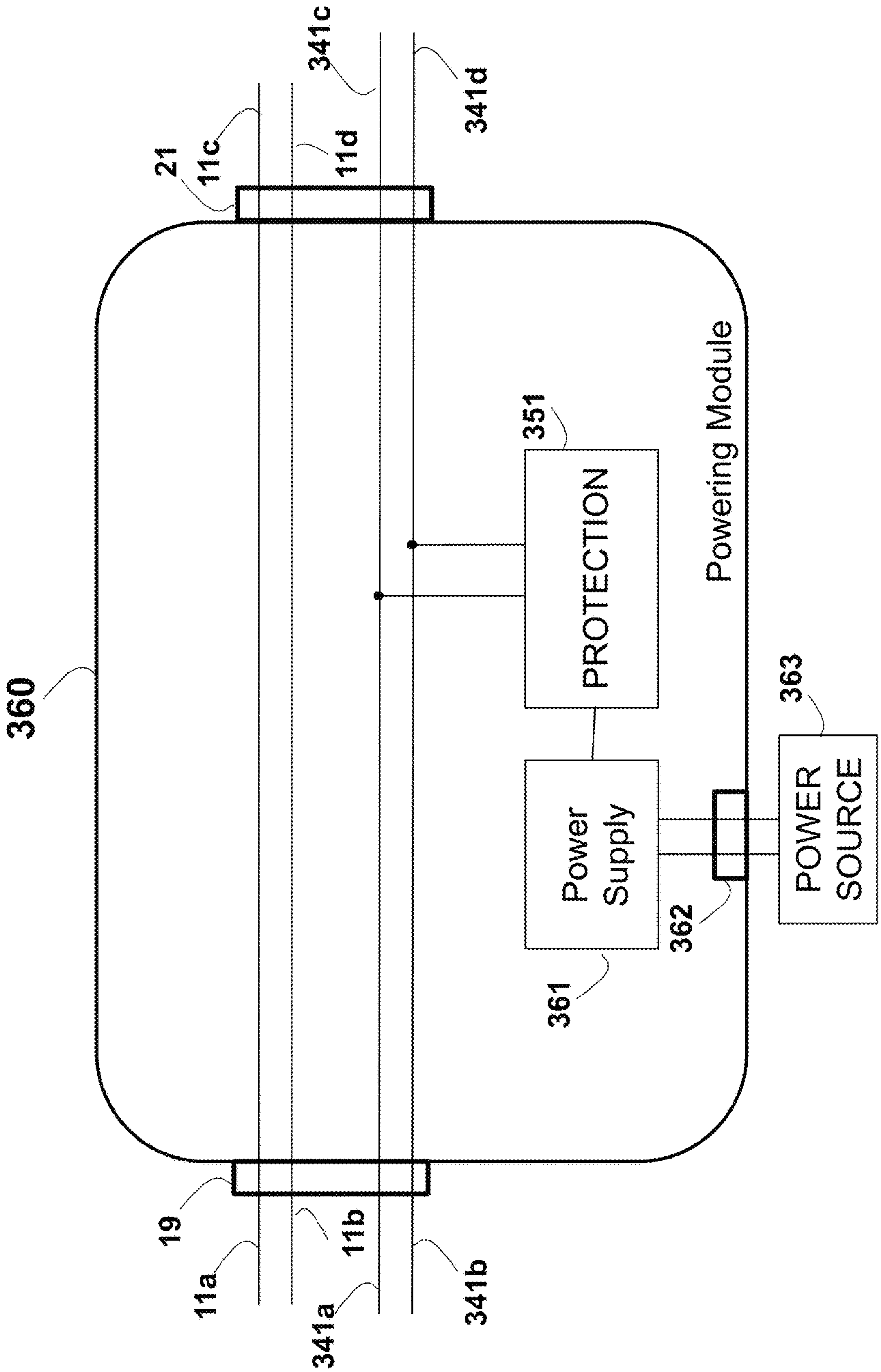
Figure 37:
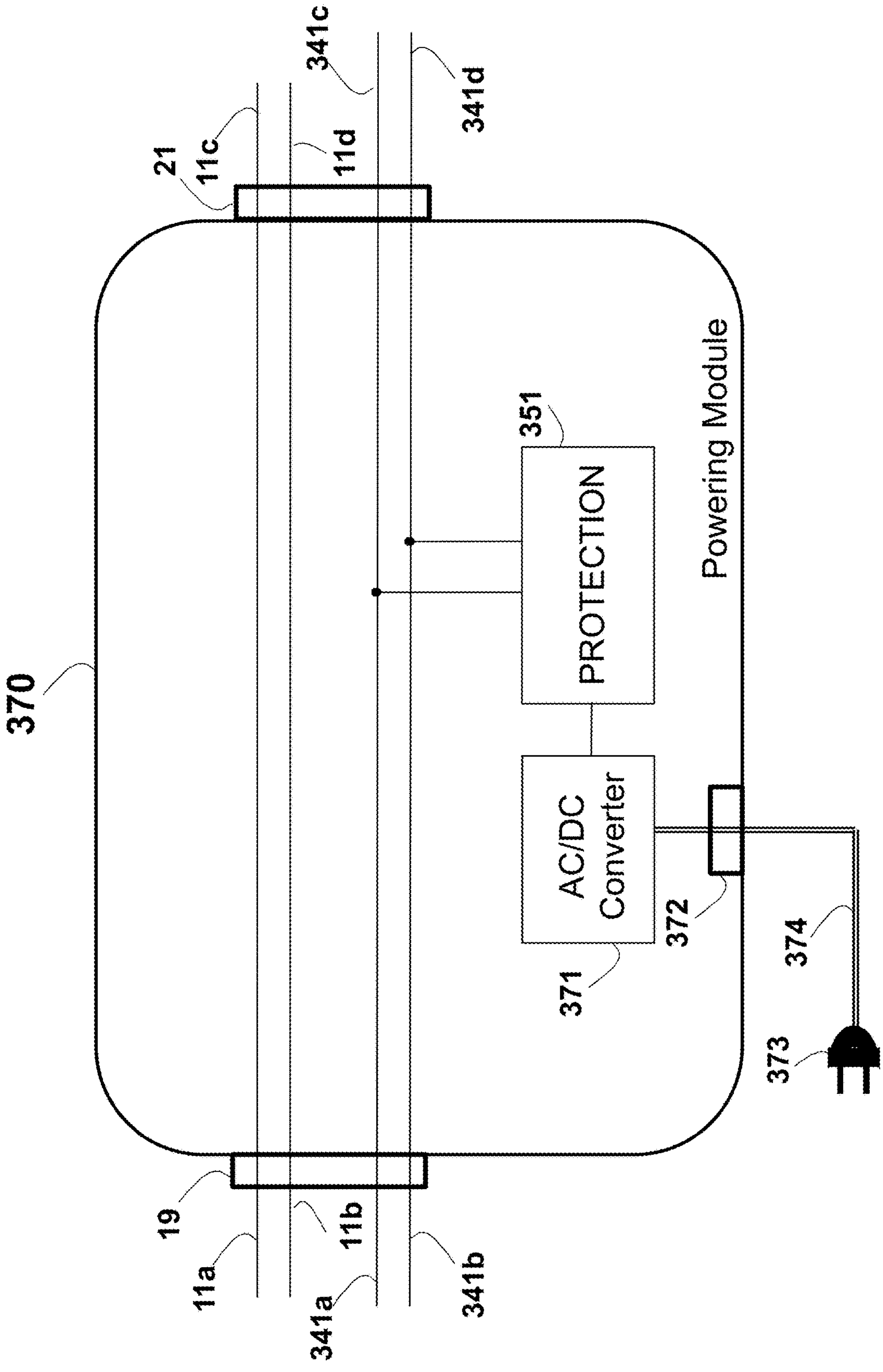
Figure 38:
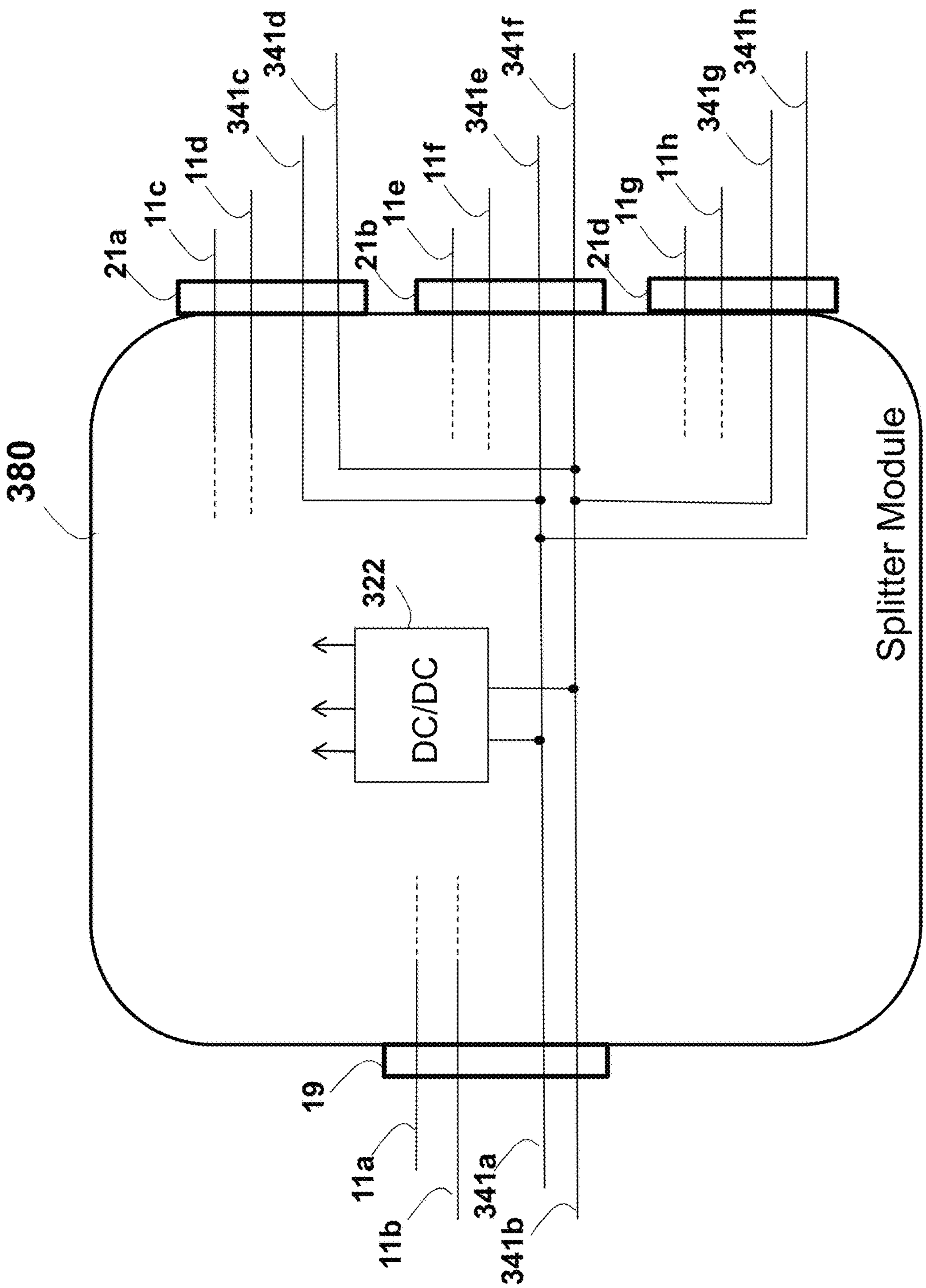
Figure 39:
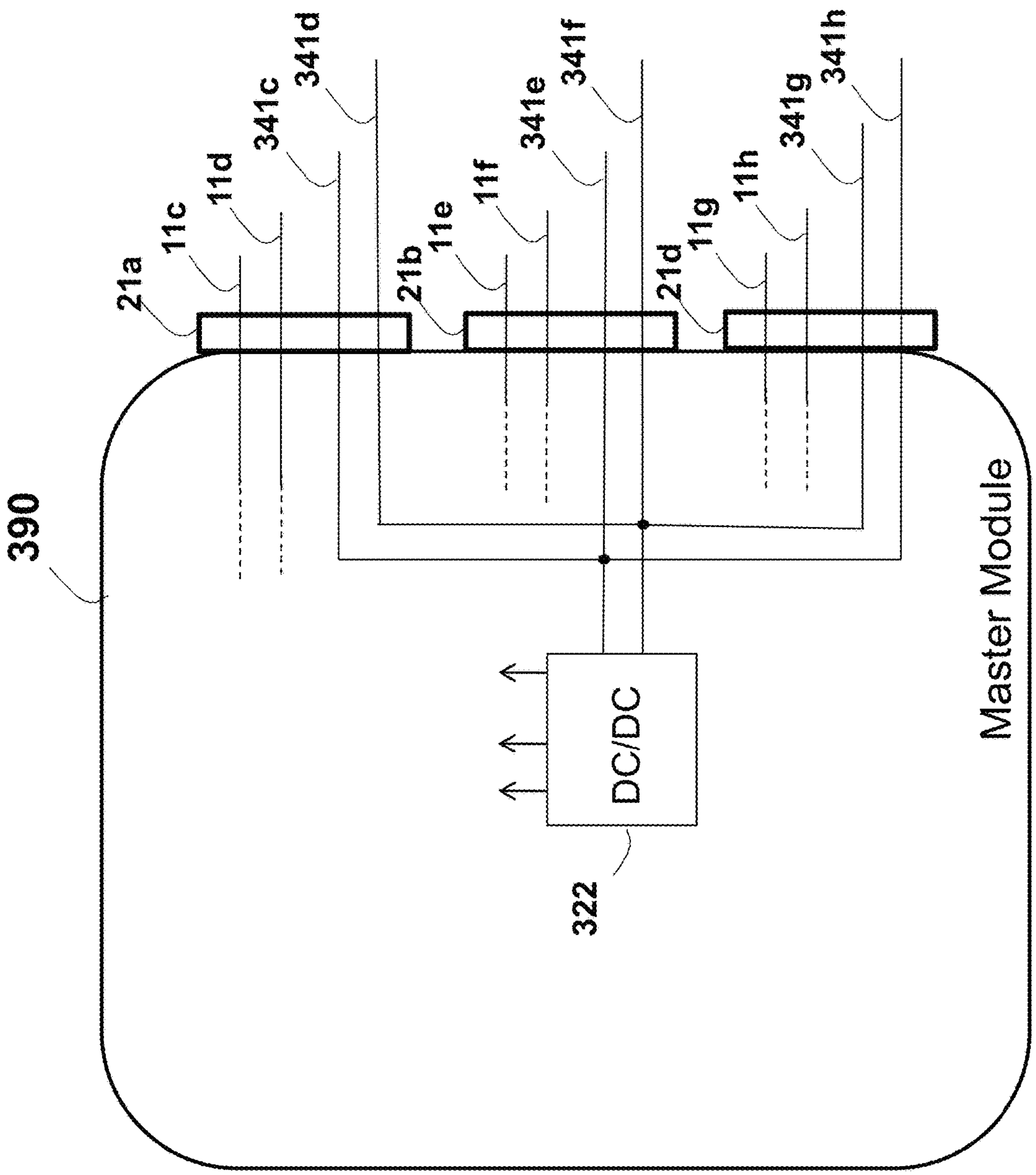
Figure 40:
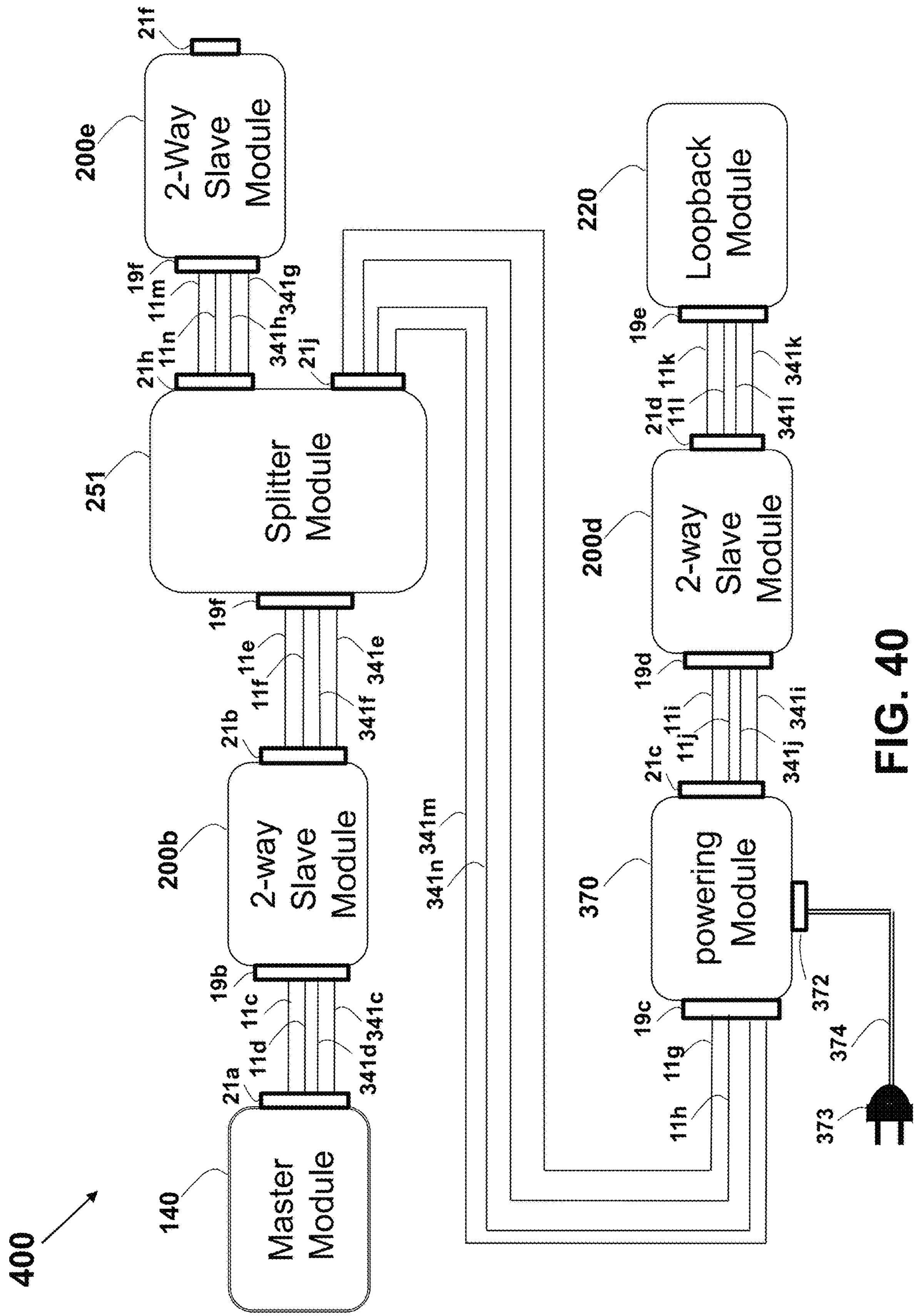
Figure 41:
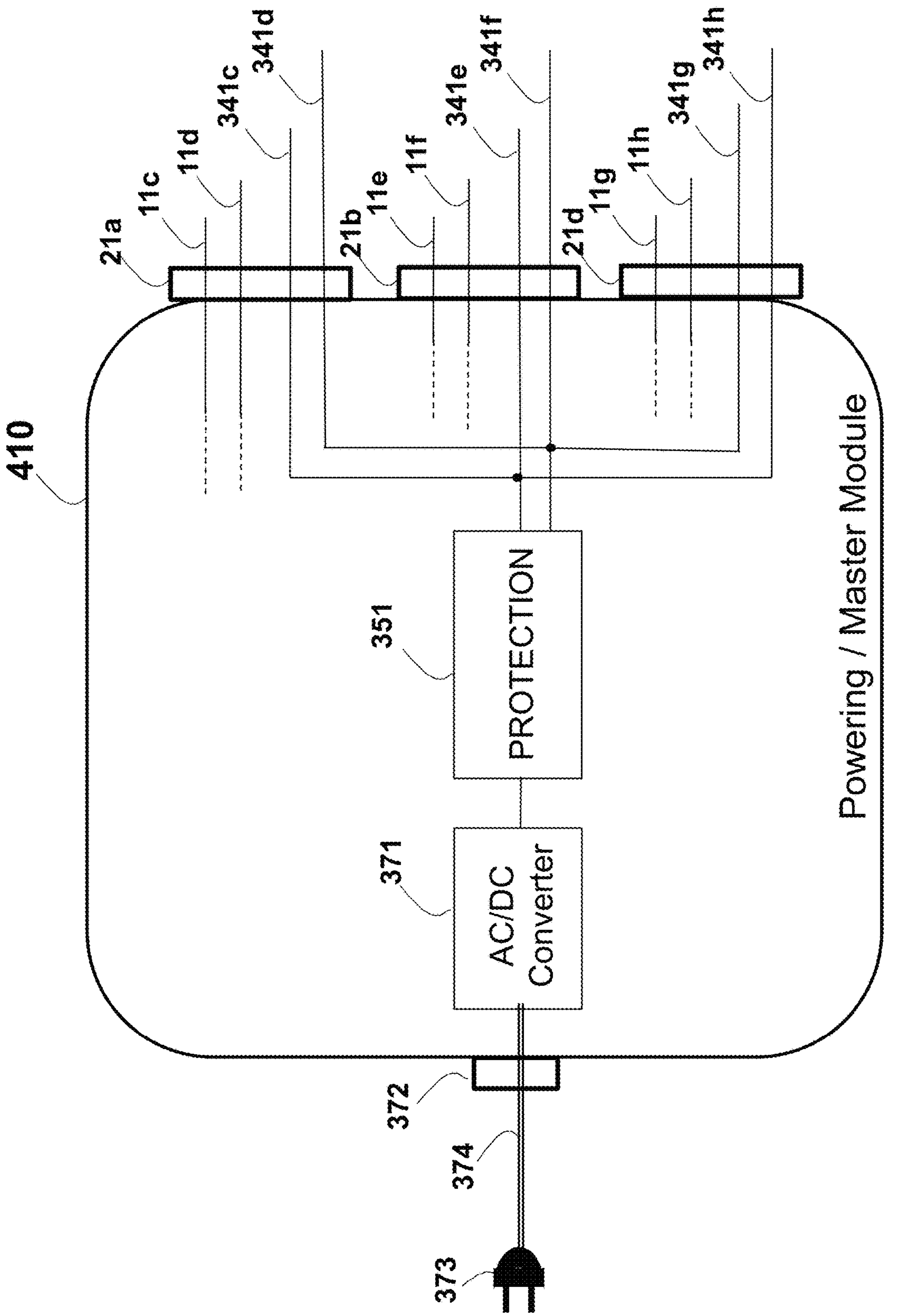
Figure 42:
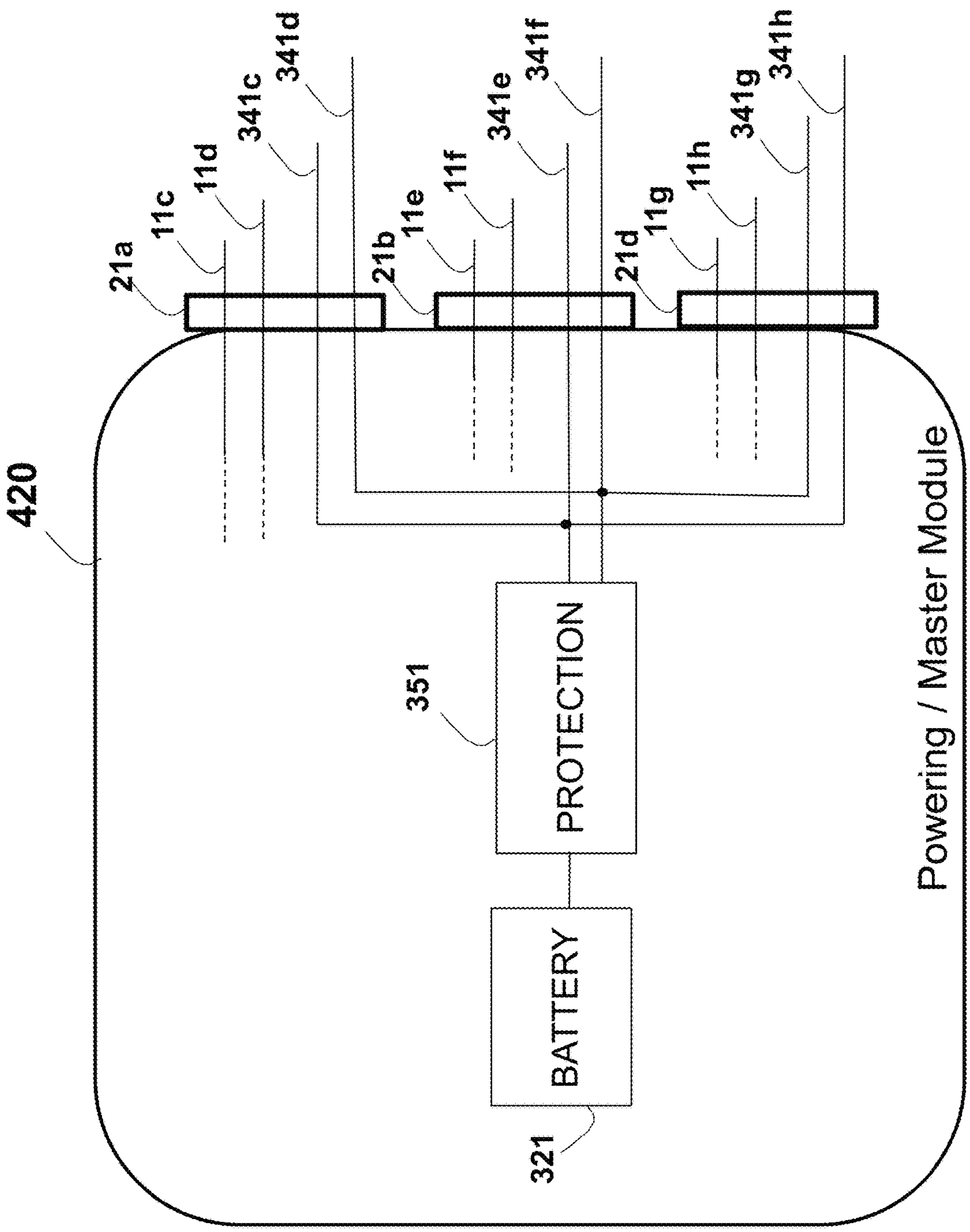
Figure 43:
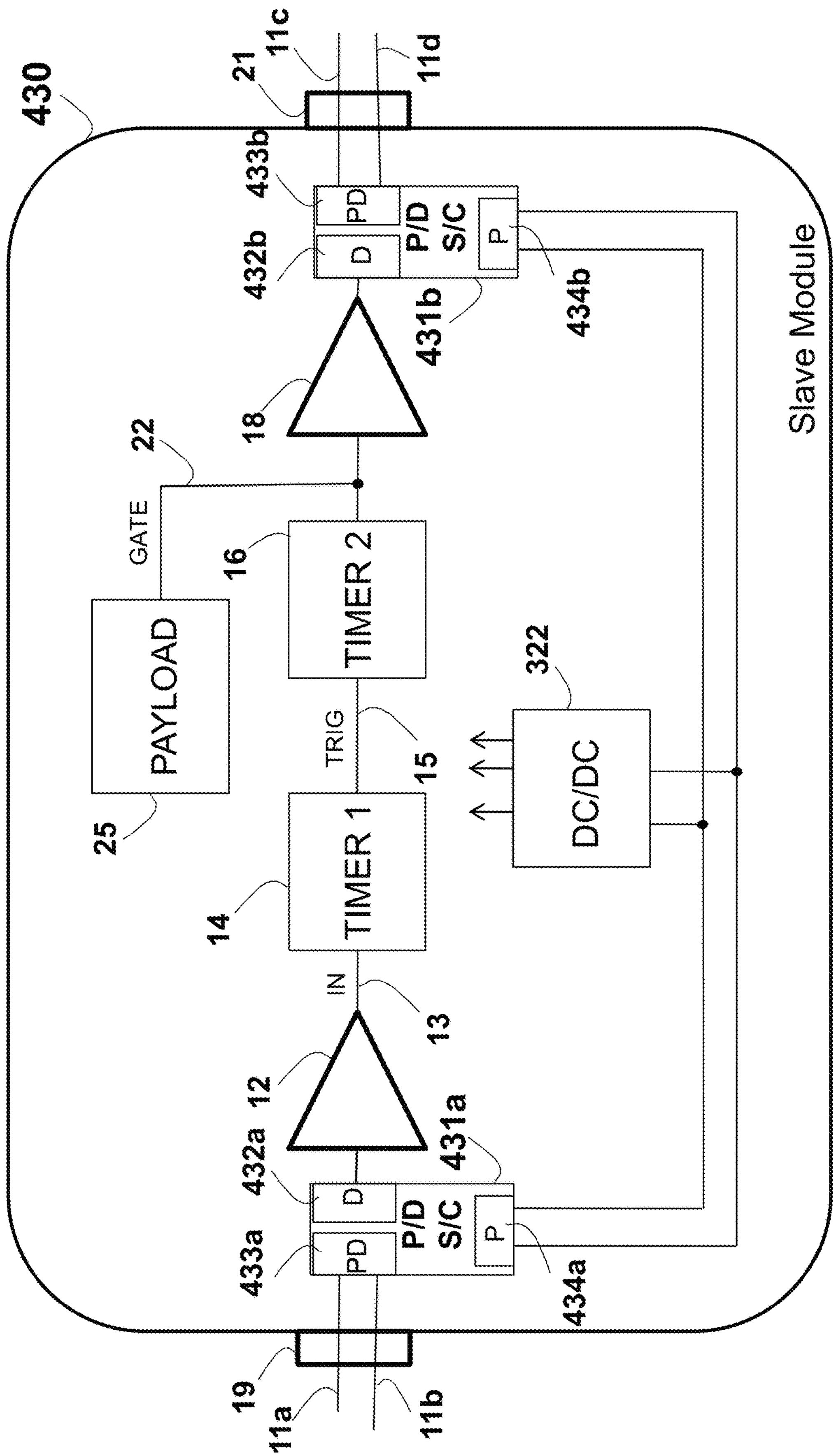
Figure 44:
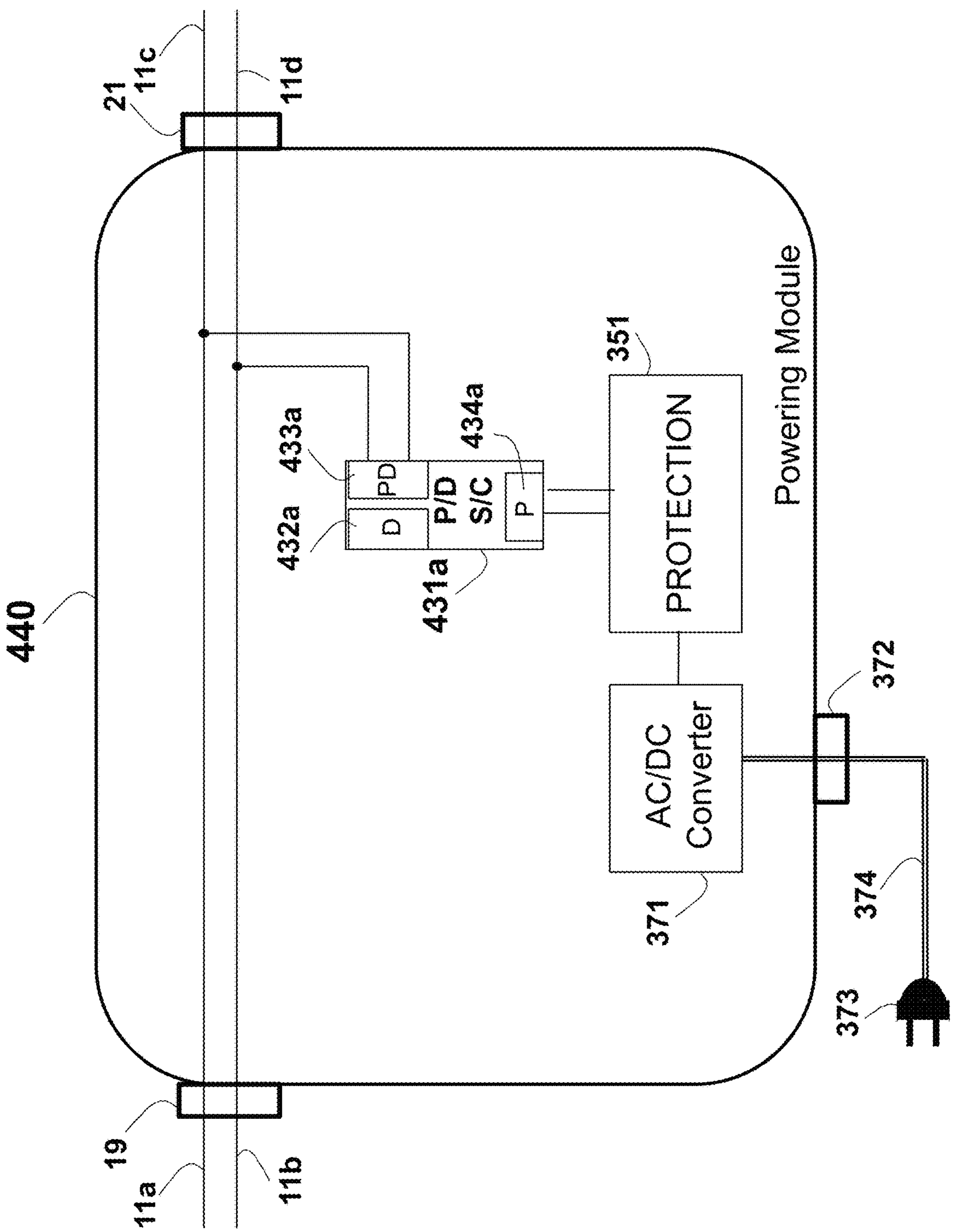
Figure 45:
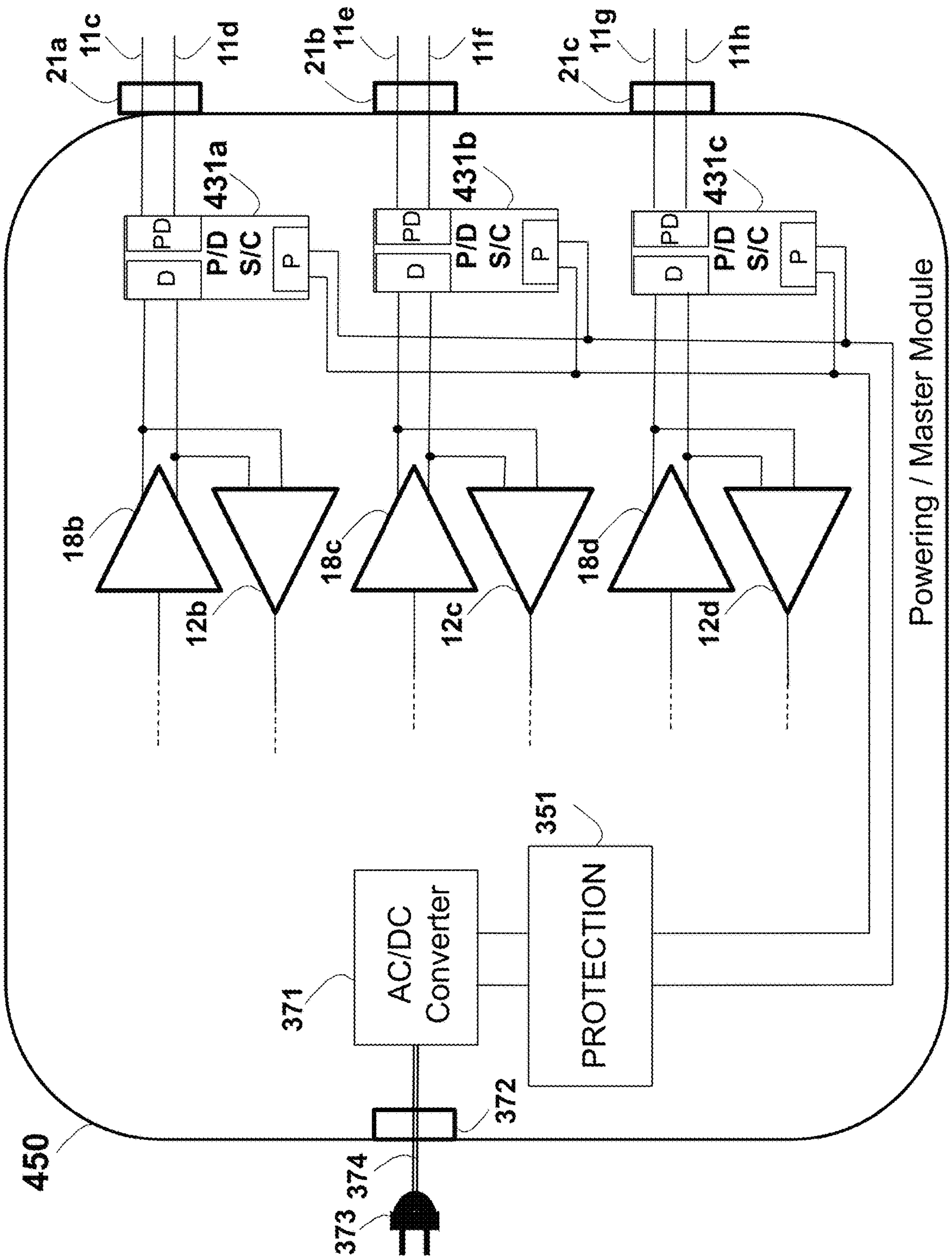
Figure 46:
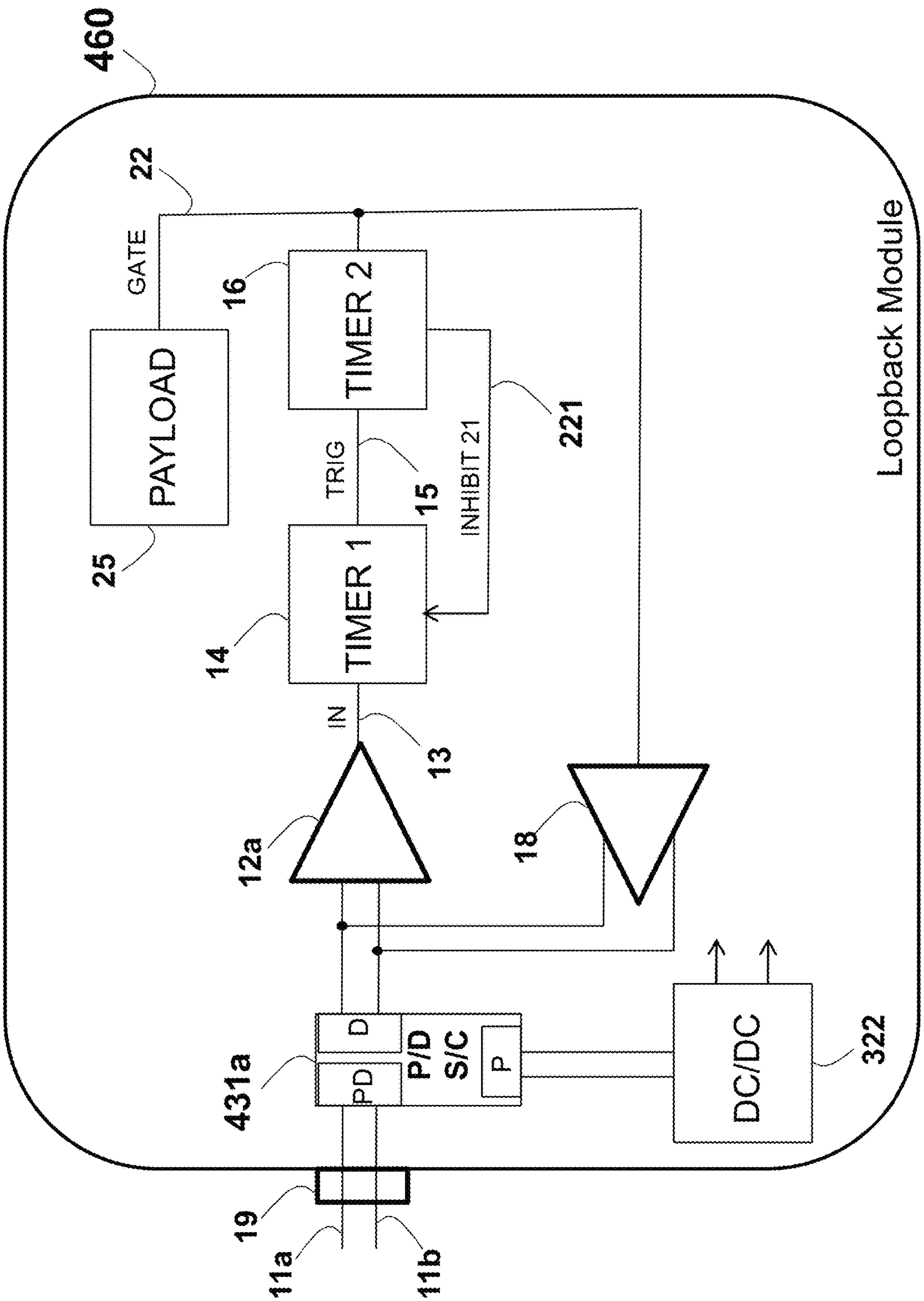
Figure 47:
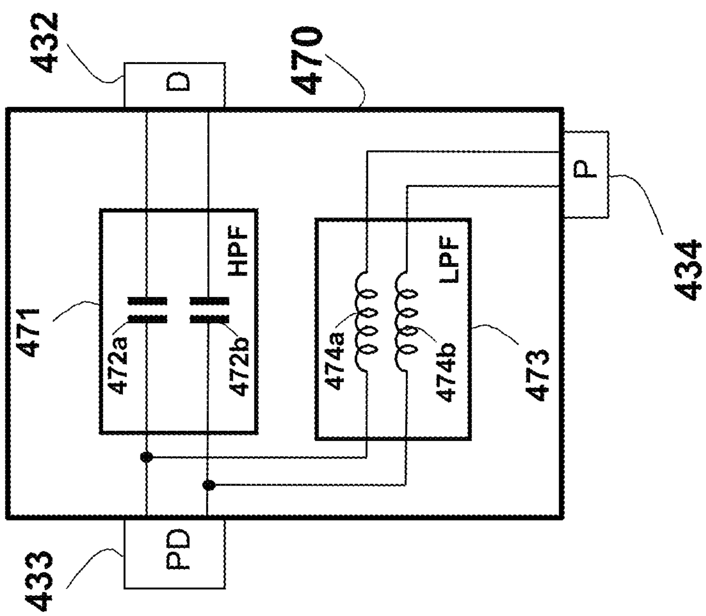
Figure 48:
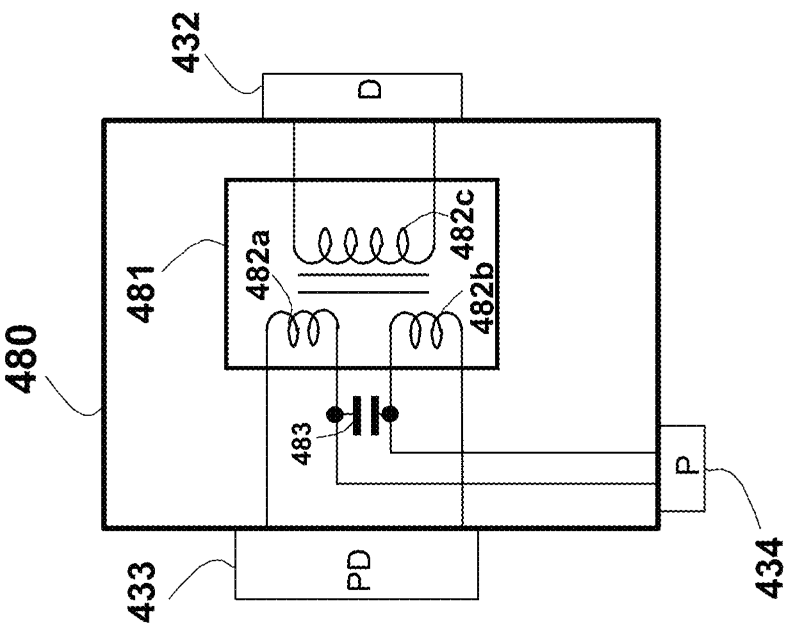
Figure 49:
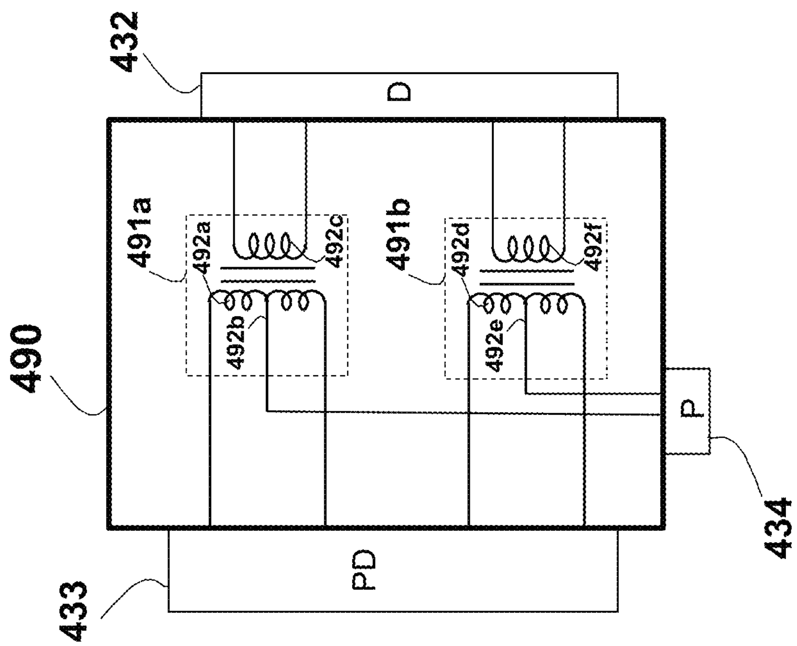
Figure 50:
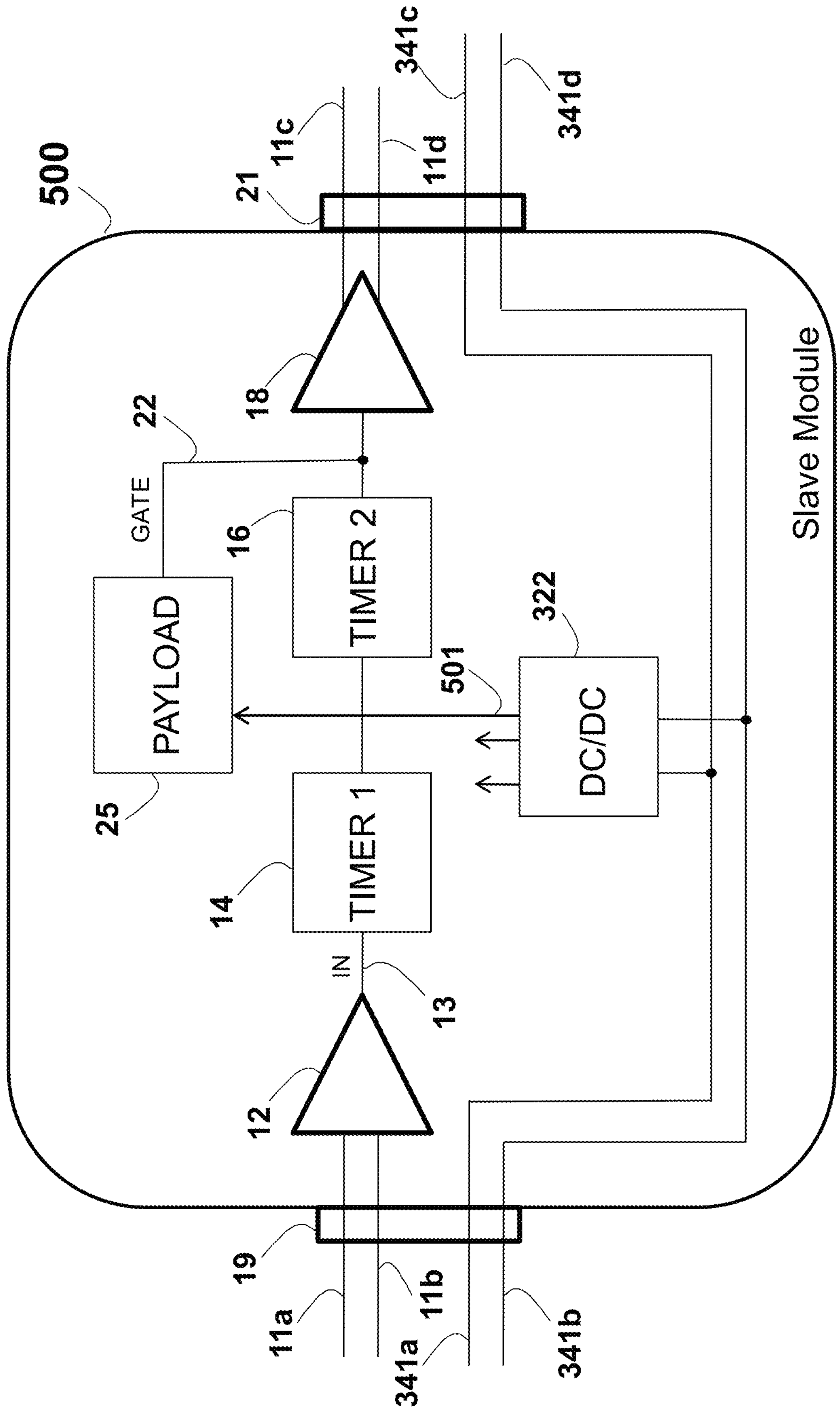
Figure 51:
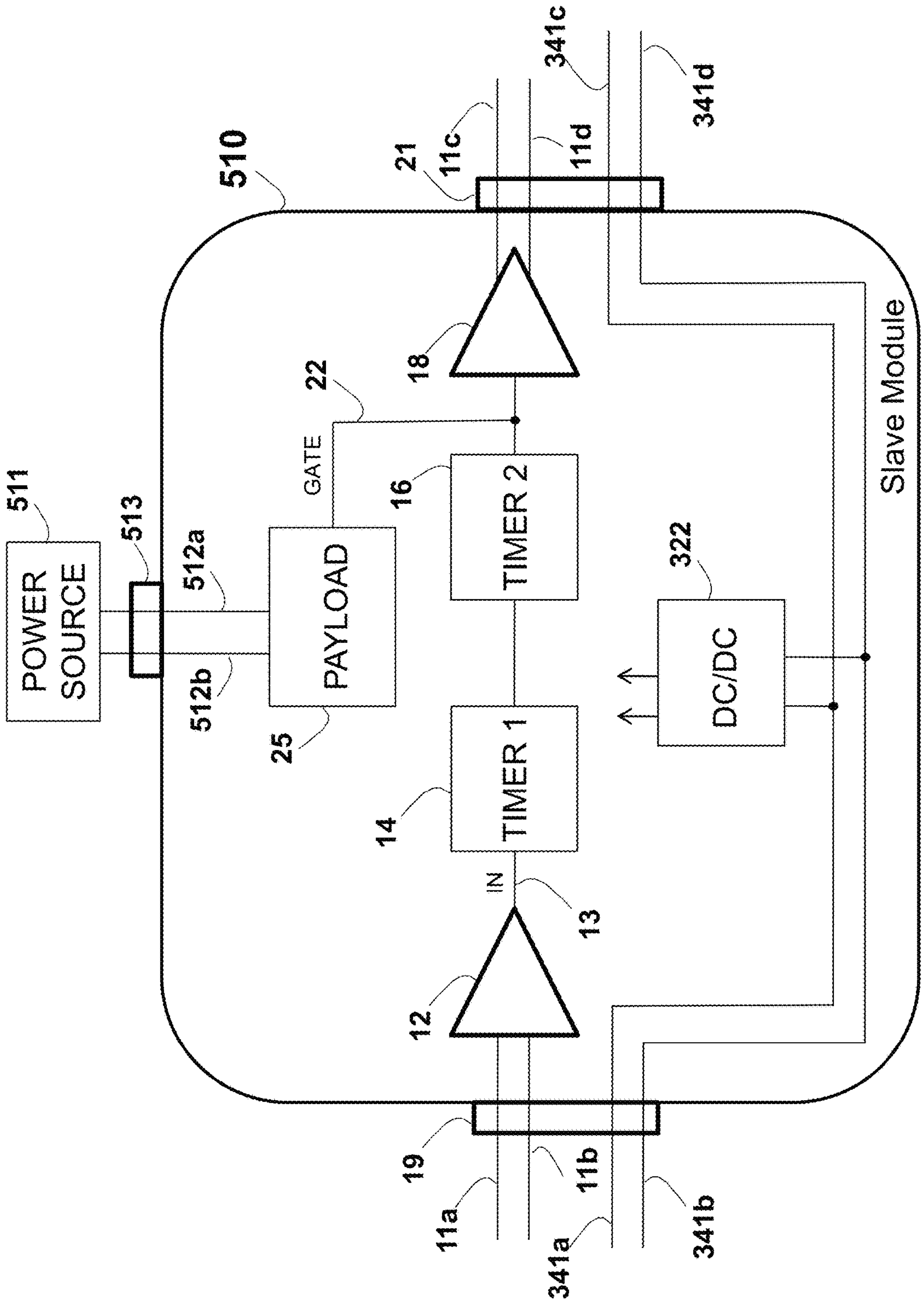
Figure 52:
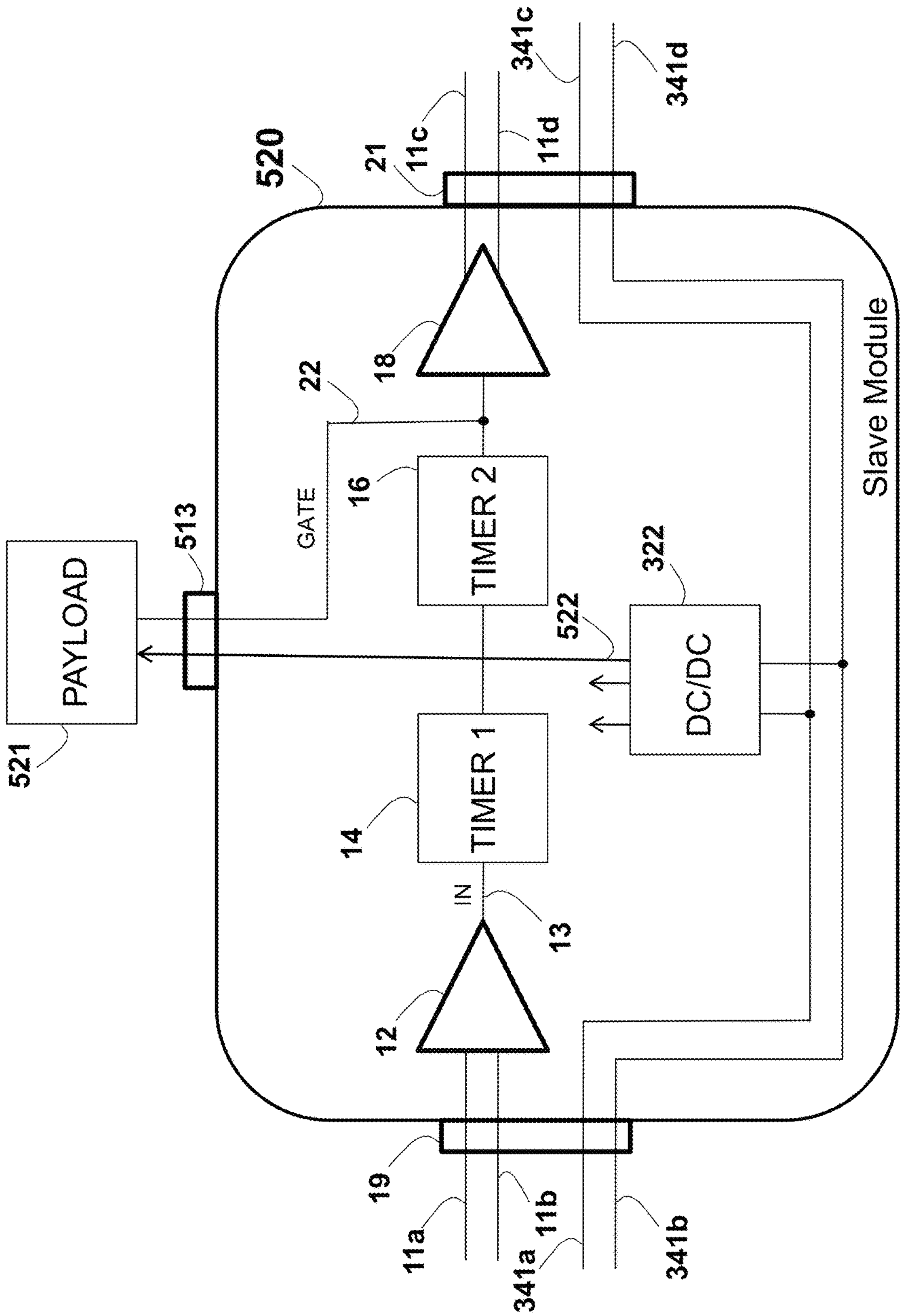
Figure 53:
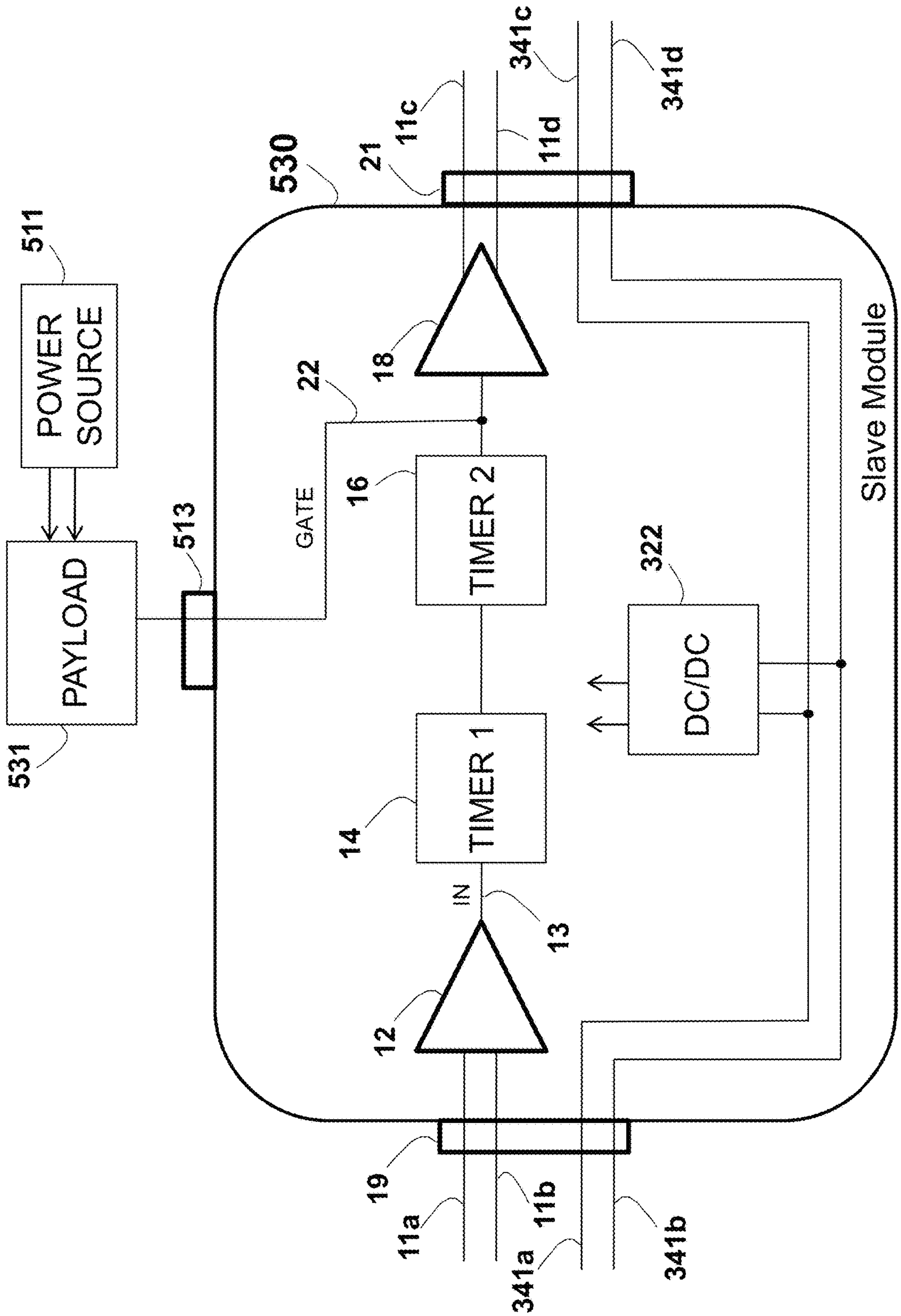
Figure 54:
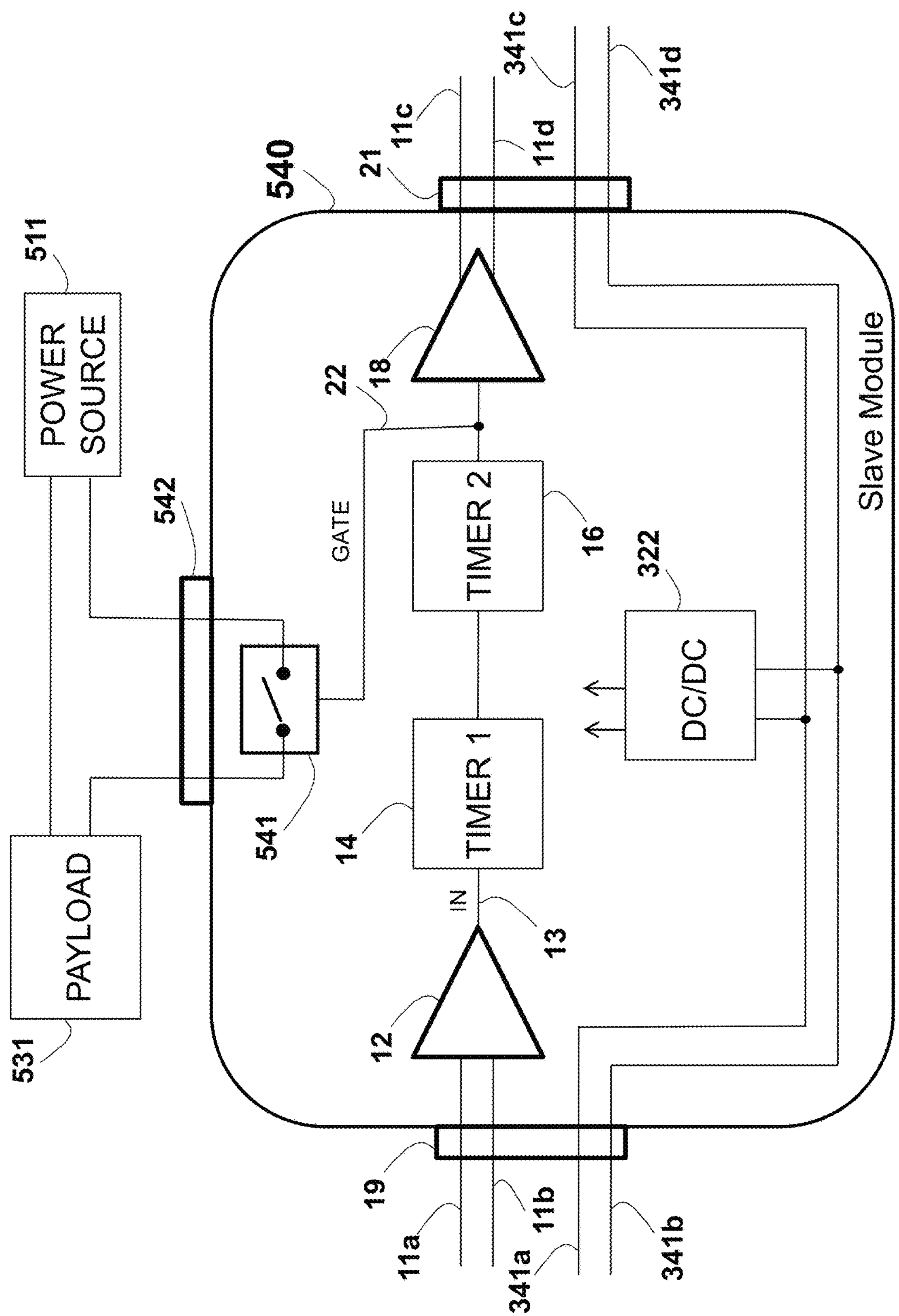
Figure 55:
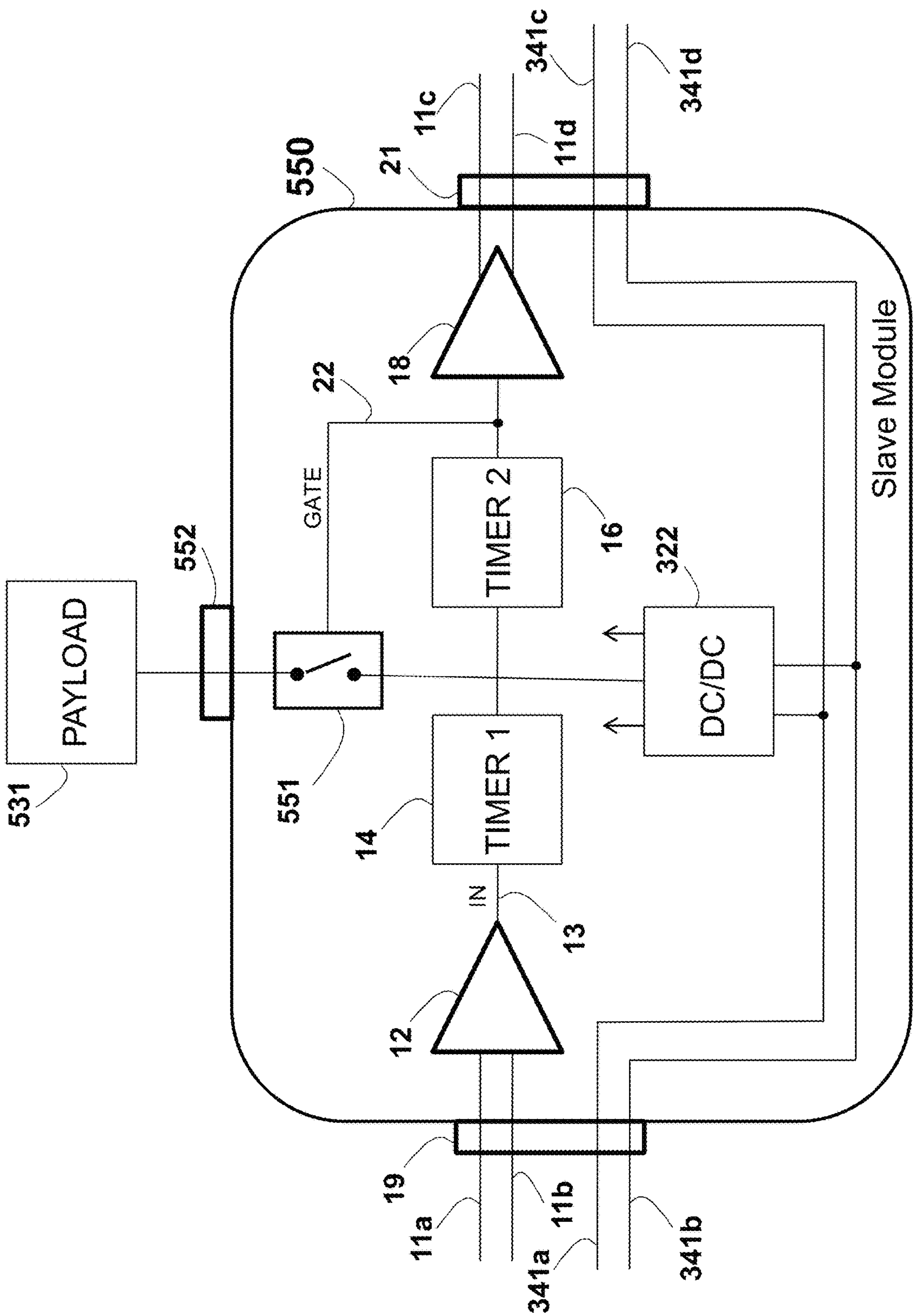
Figure 56:
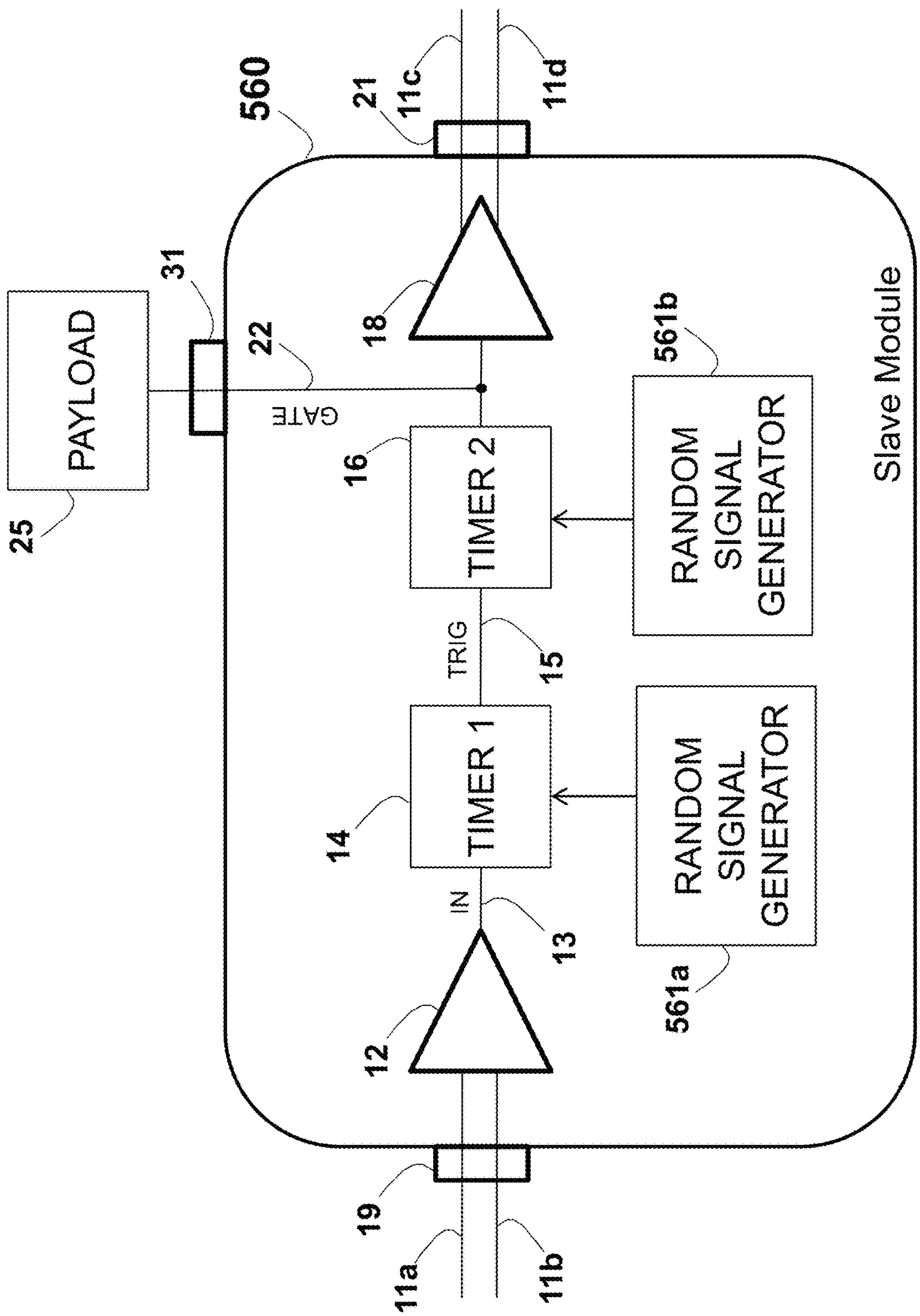
Figure 57:
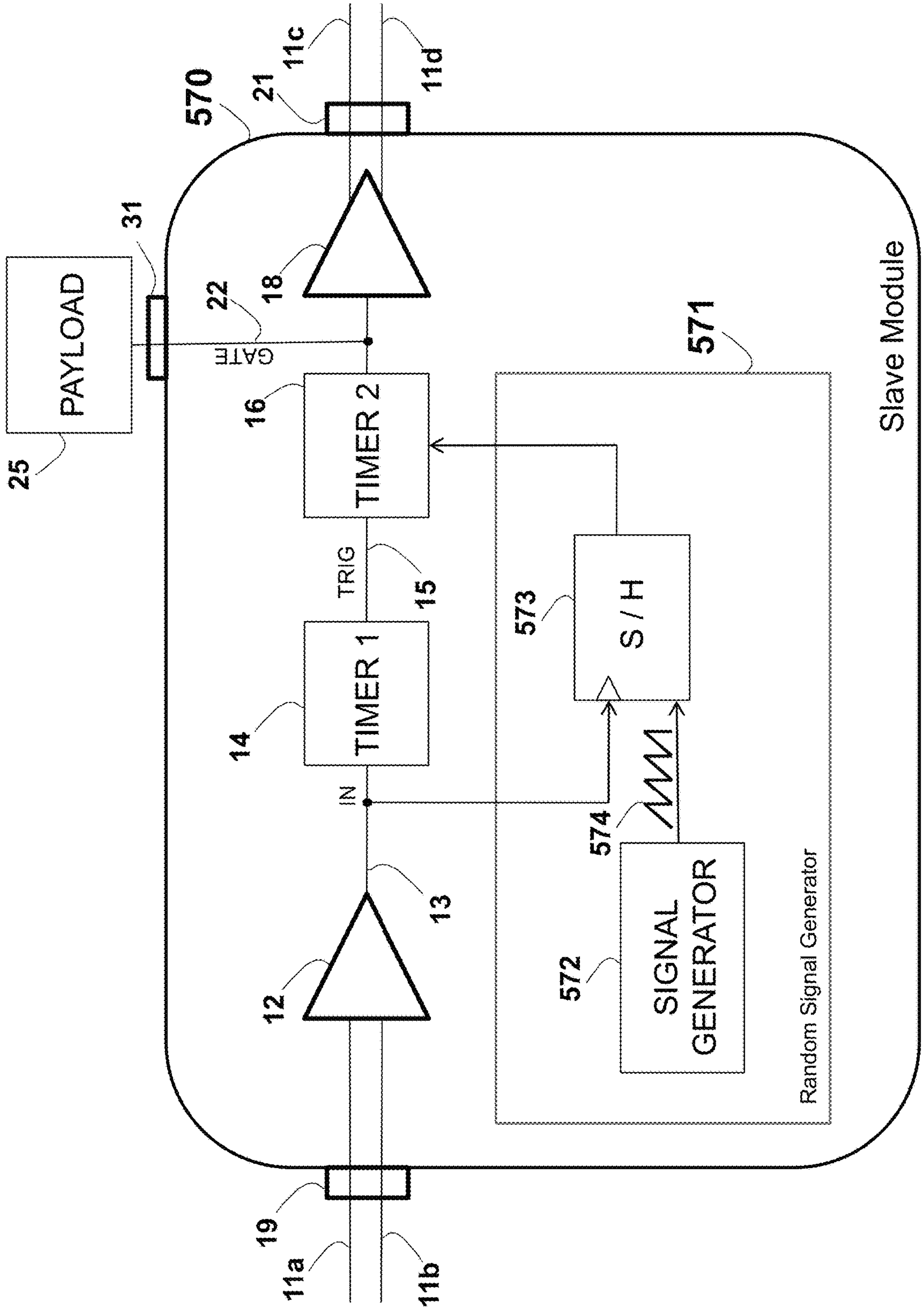
Figure 58:
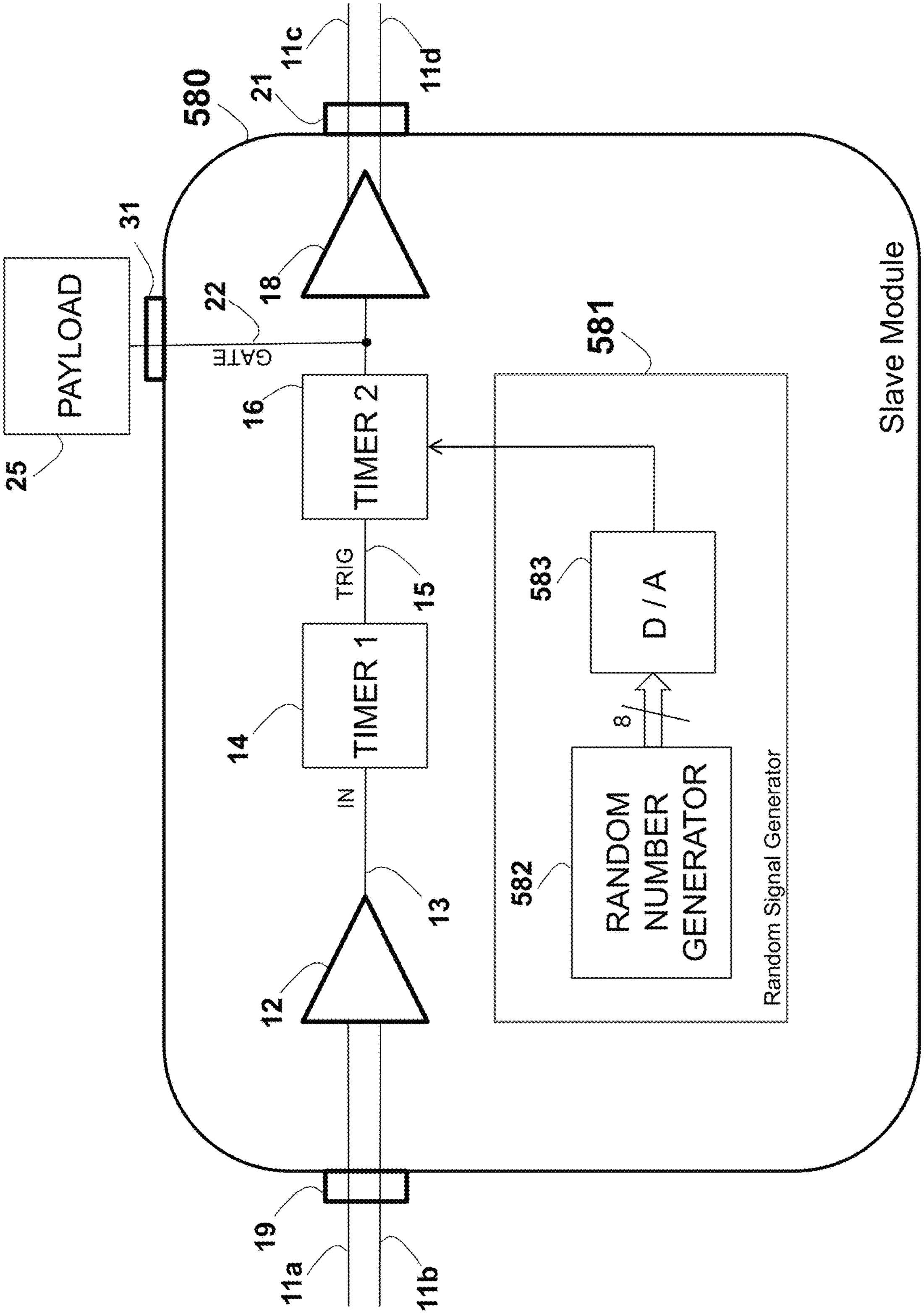
Figure 58A:
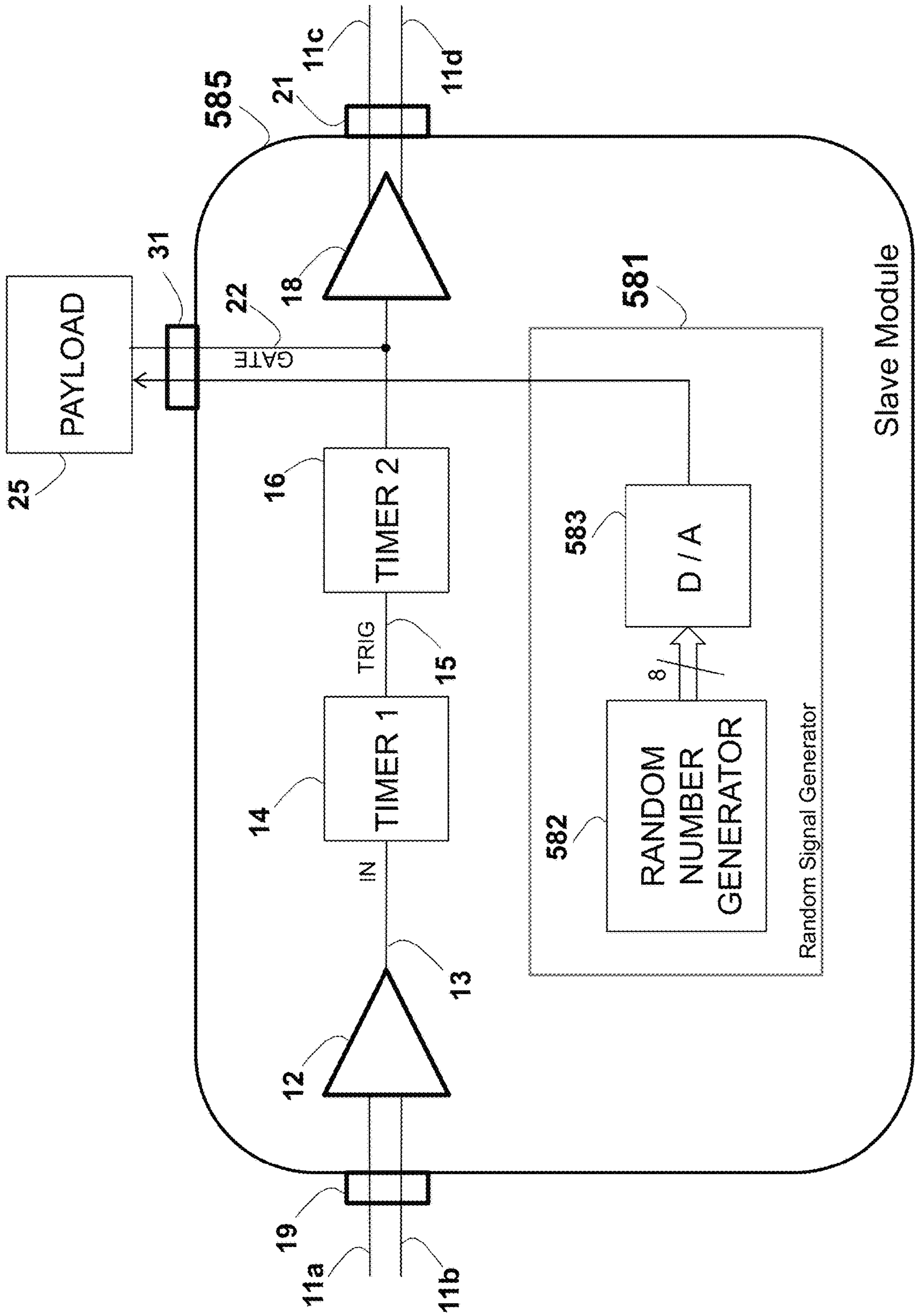
Figure 59:
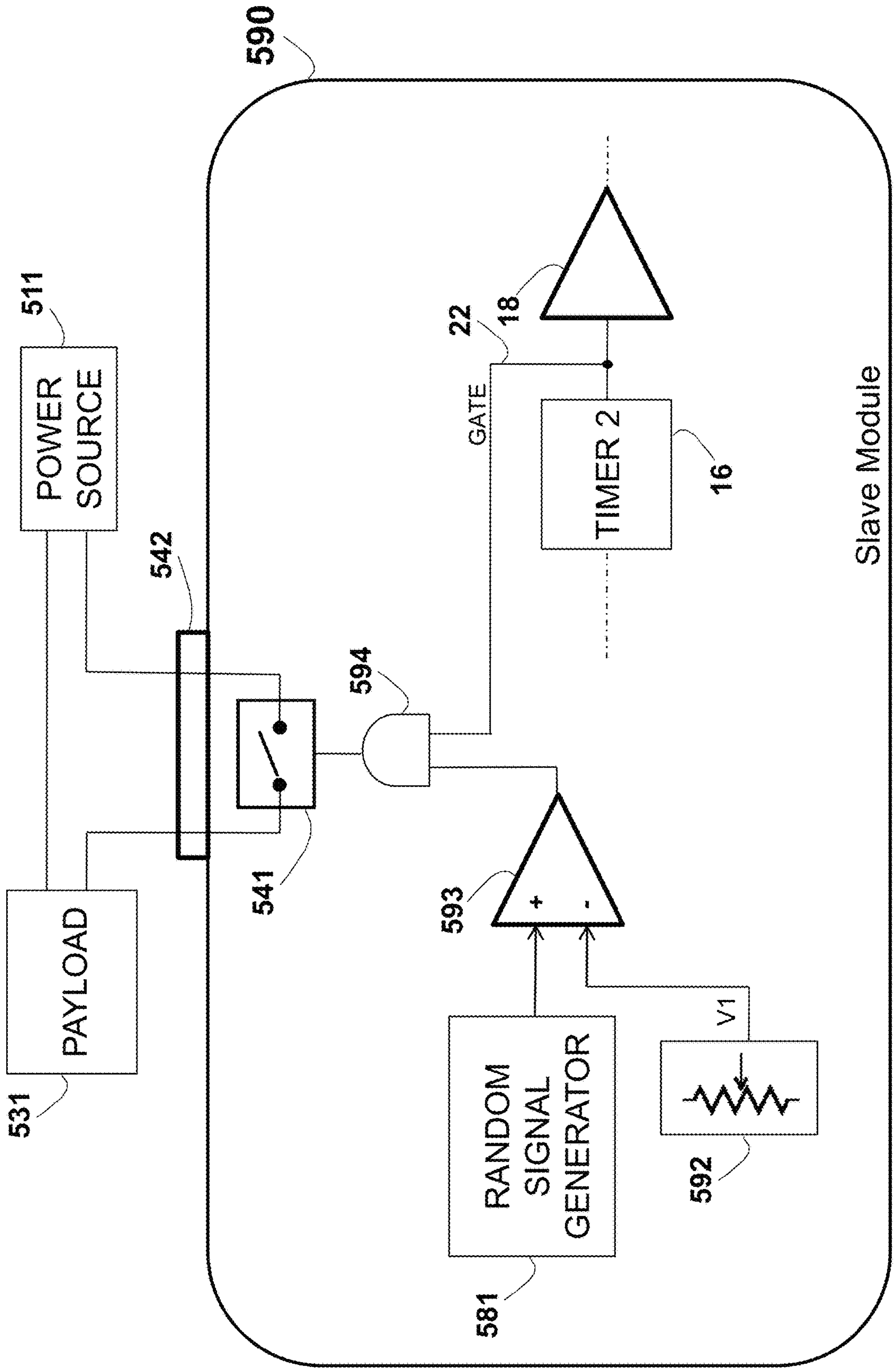
Figure 59A:
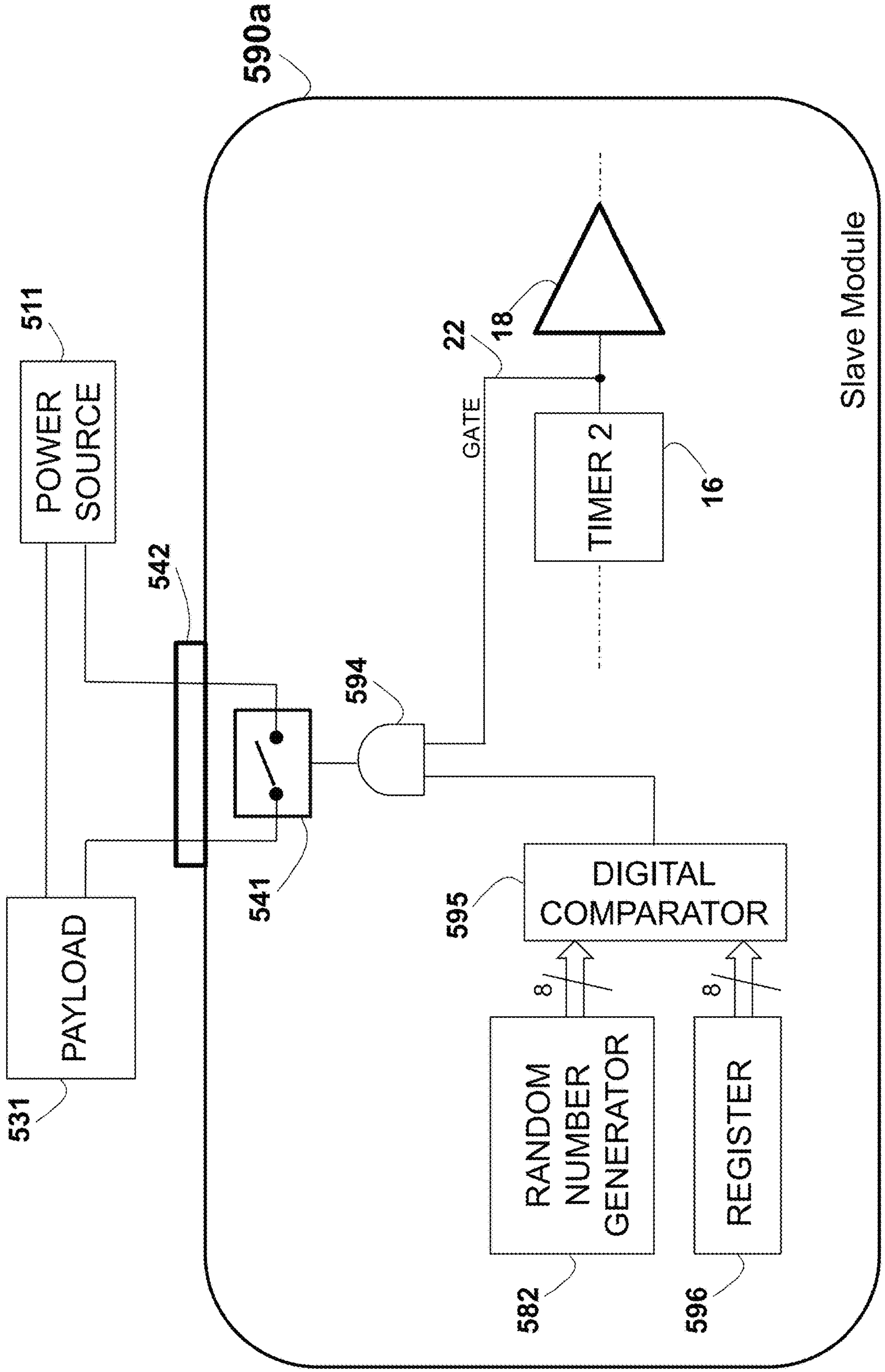
Figure 59B:
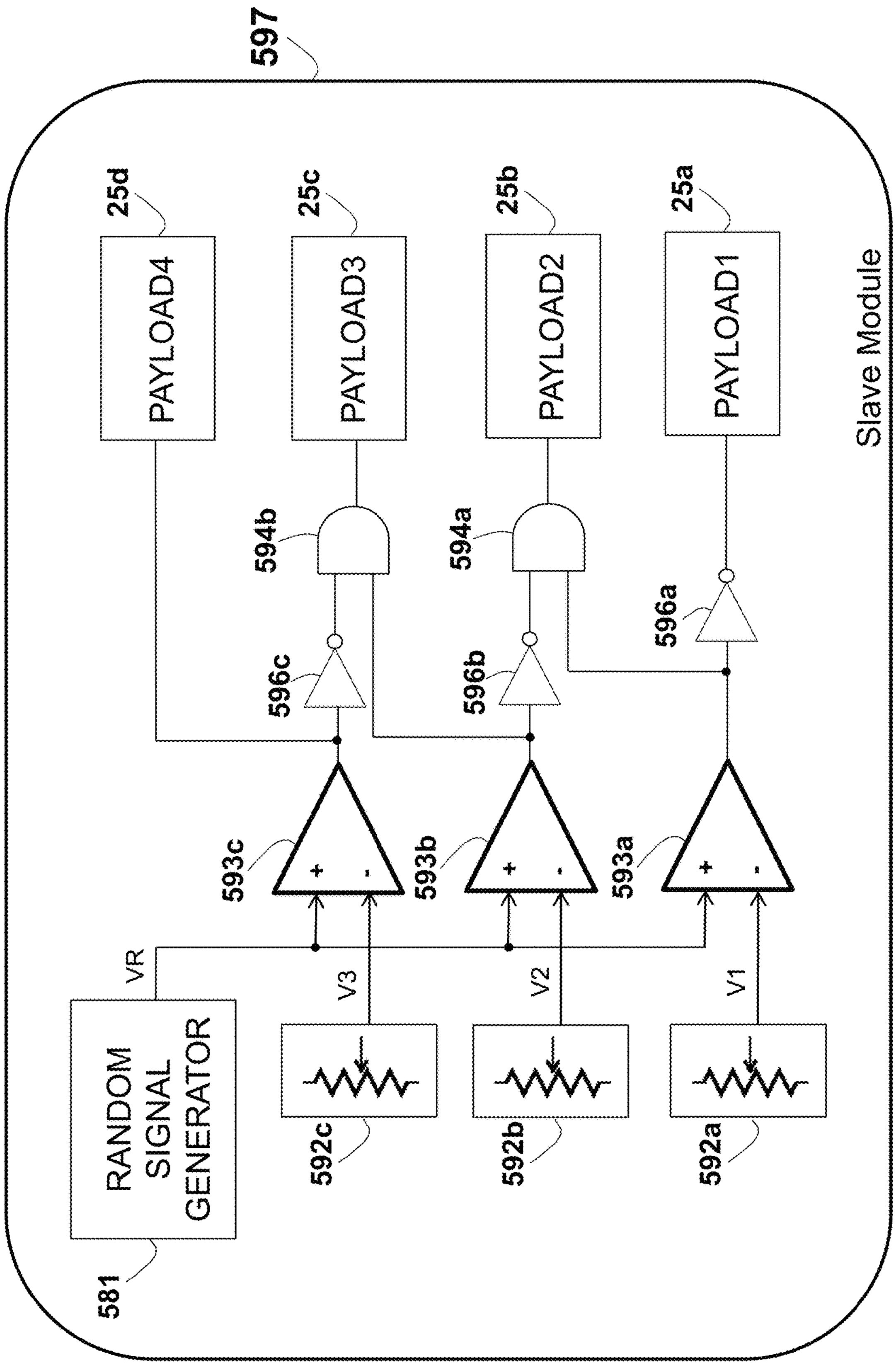
Figure 60:
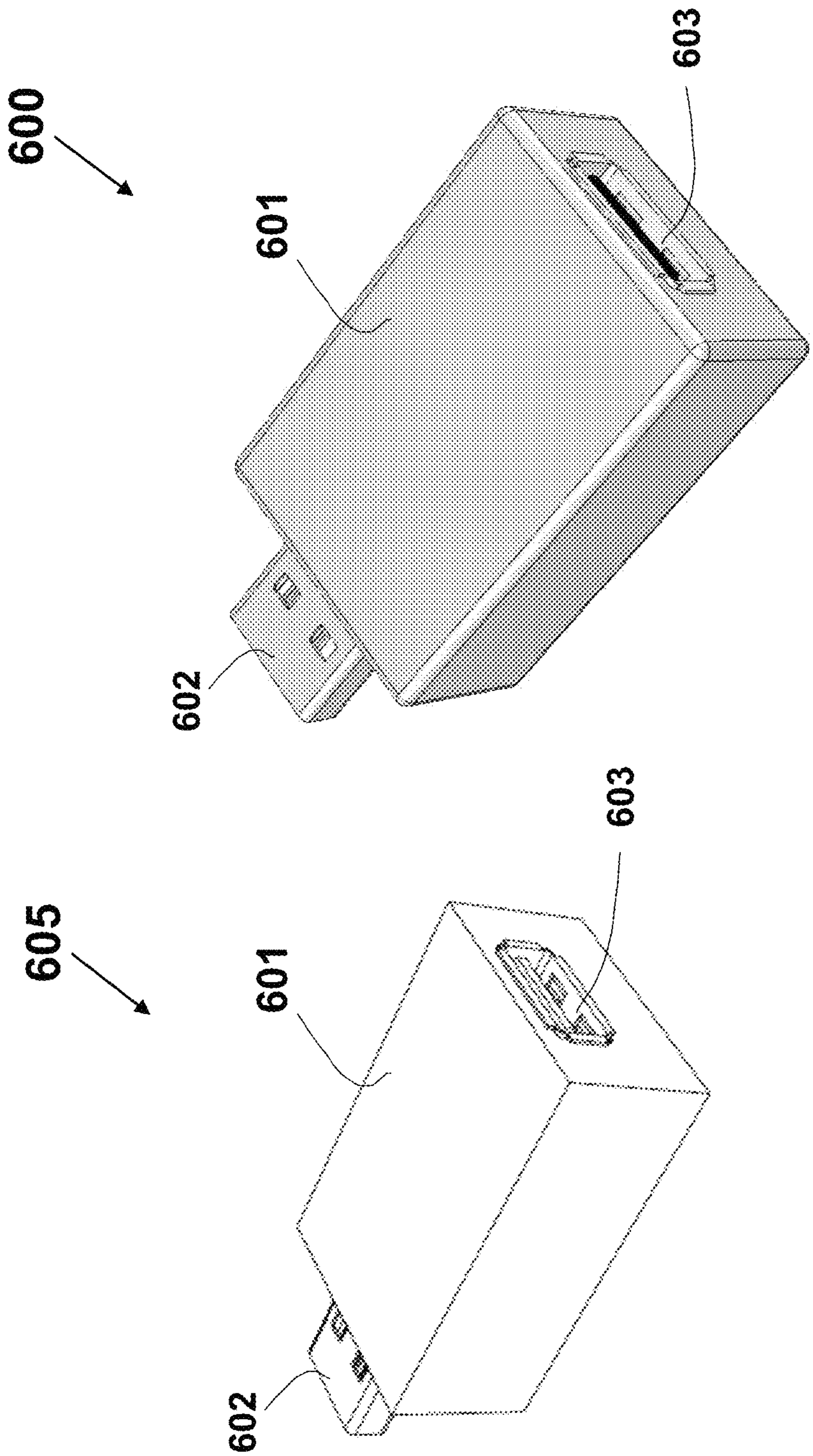
Figure 61:
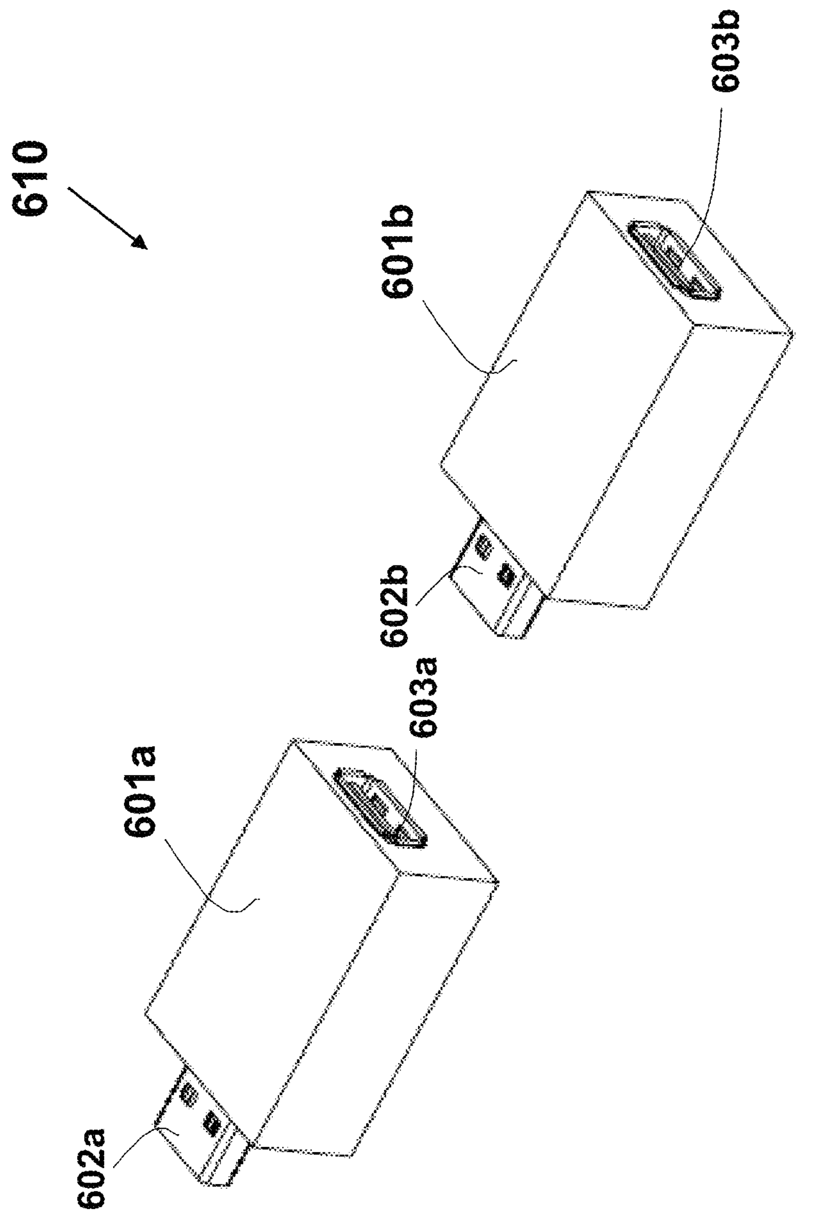
Figure 61A:
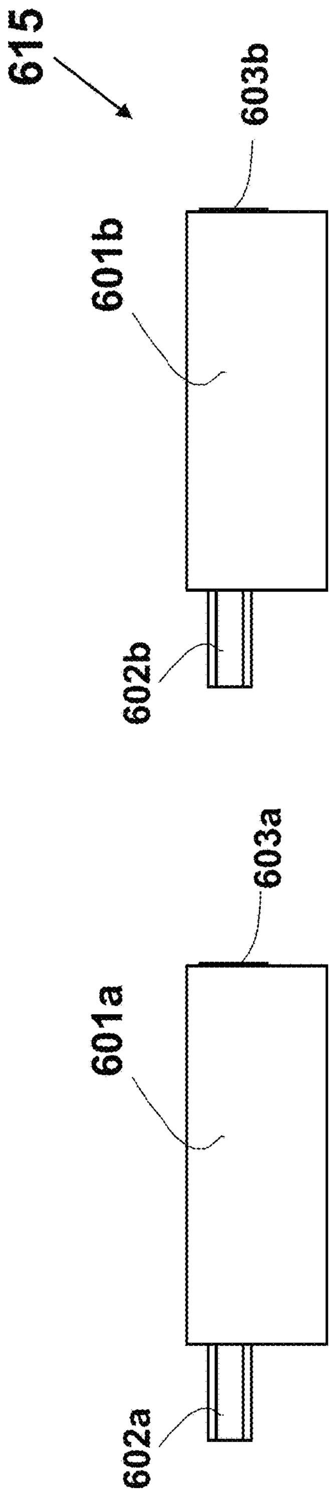
Figure 62:
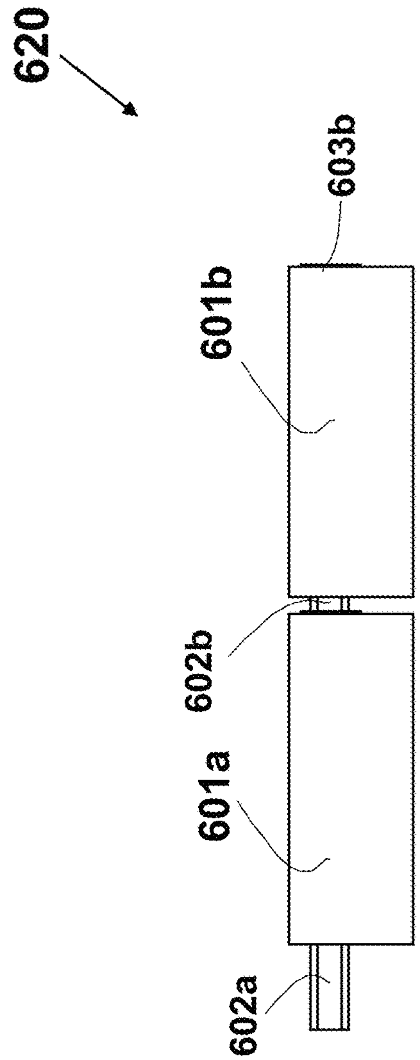
Figure 62A:
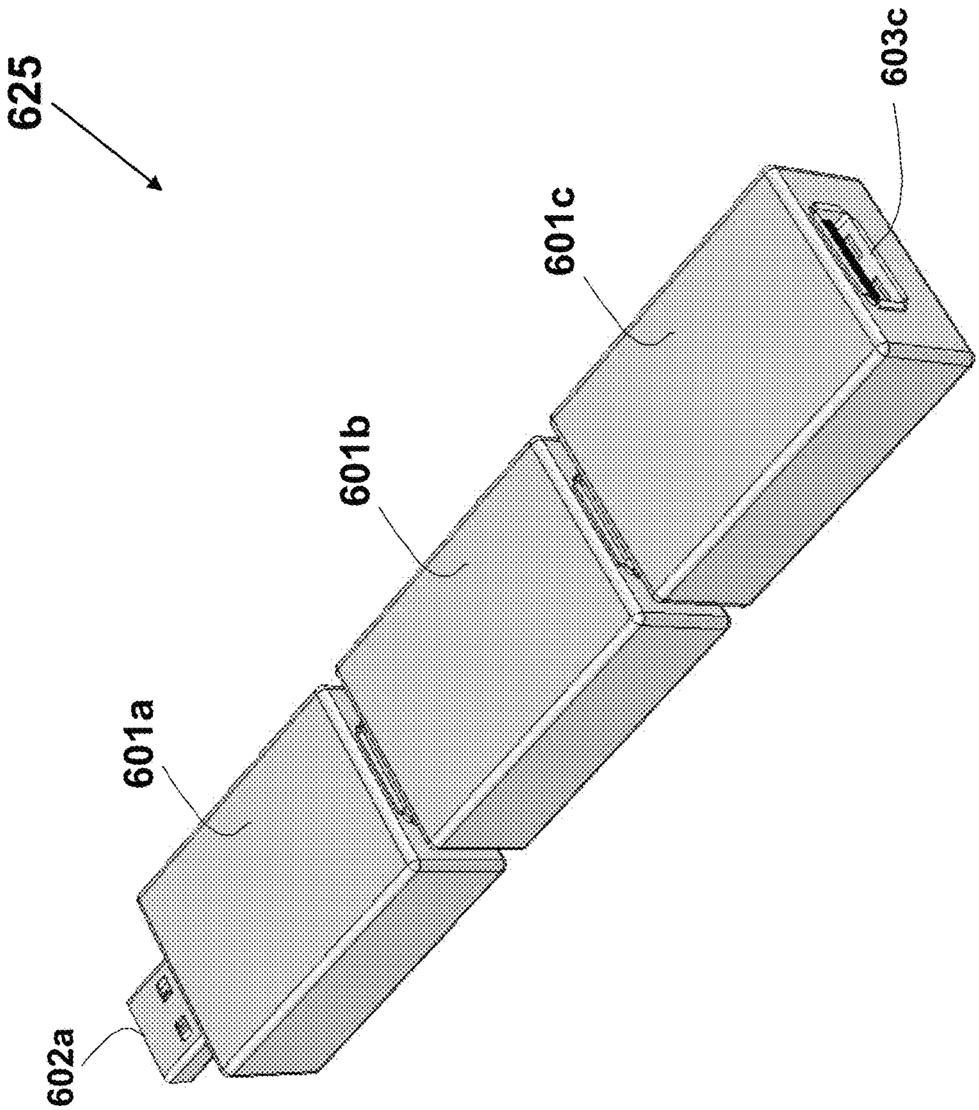
Figure 63:
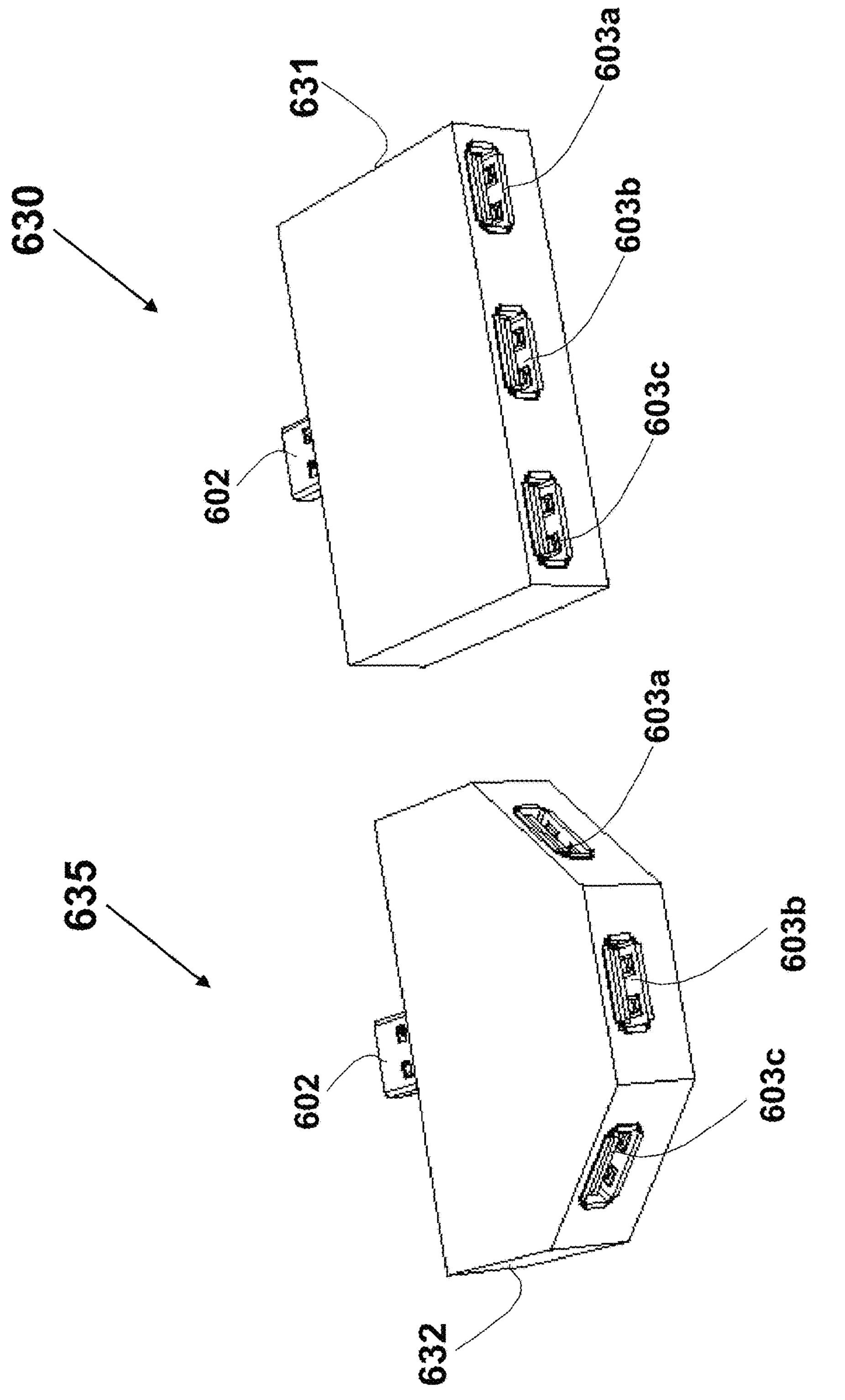
Figure 63A:
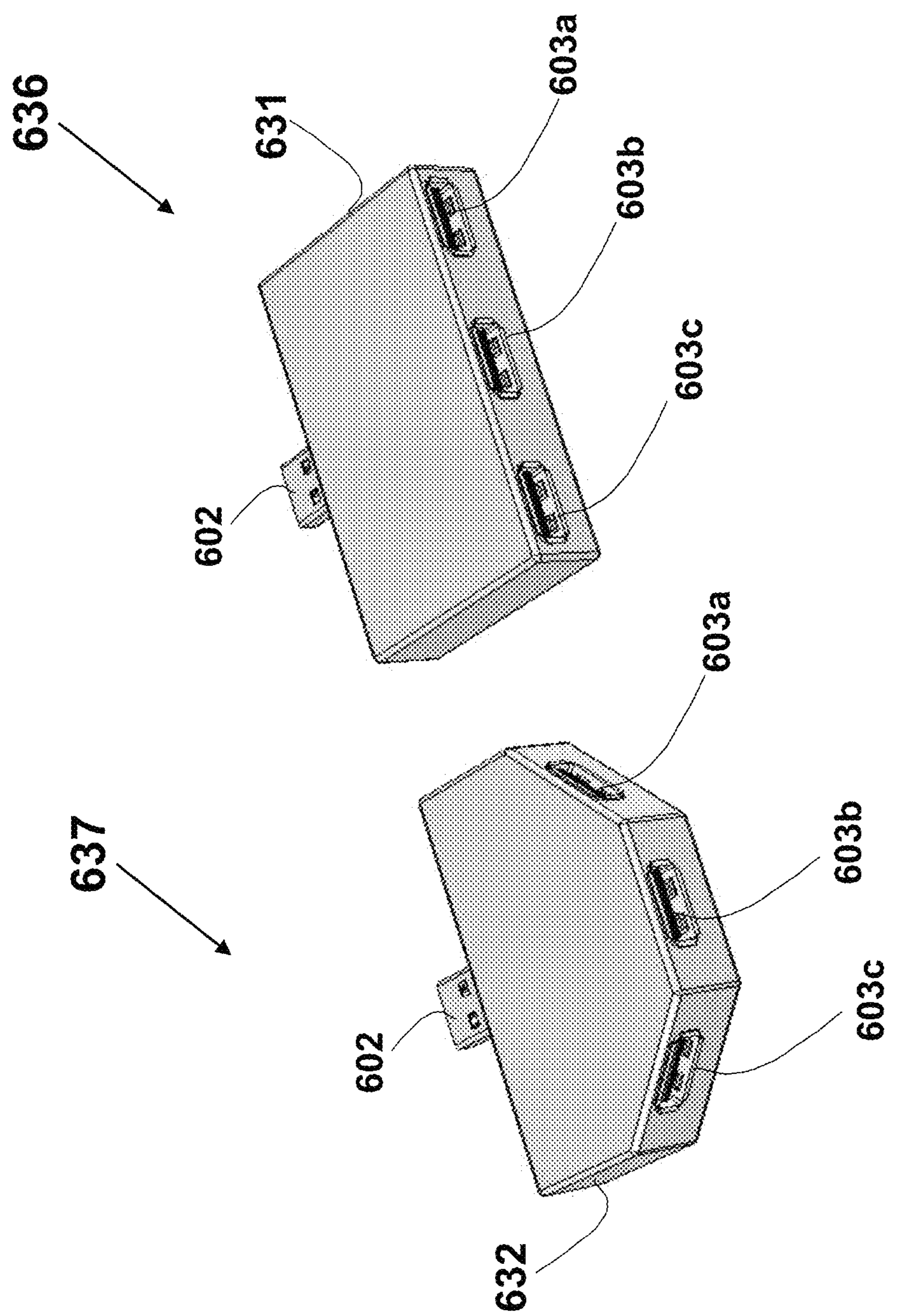
Figure 64:
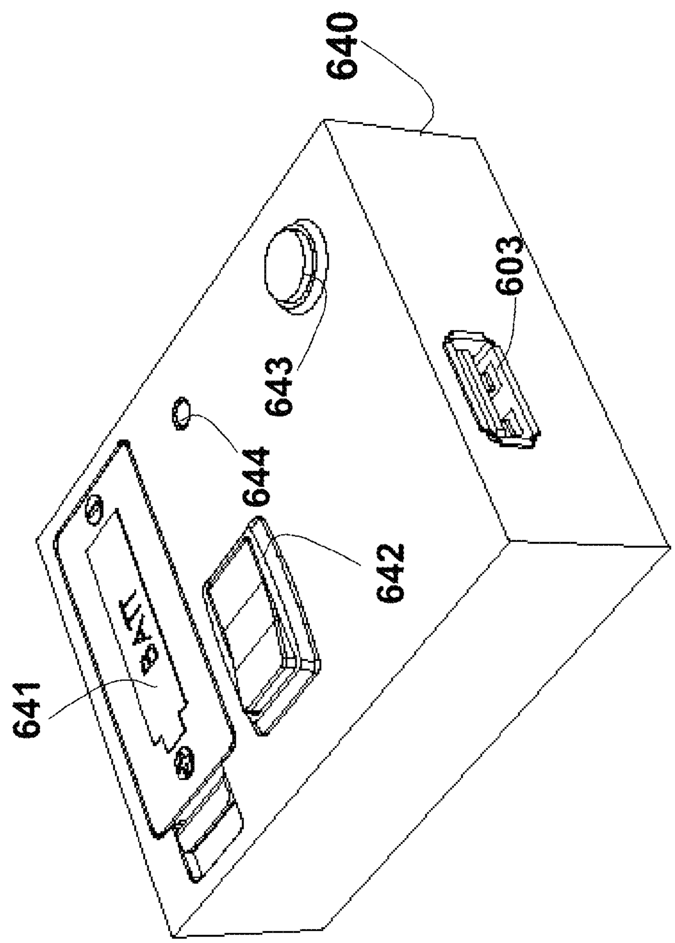
Figure 64A:
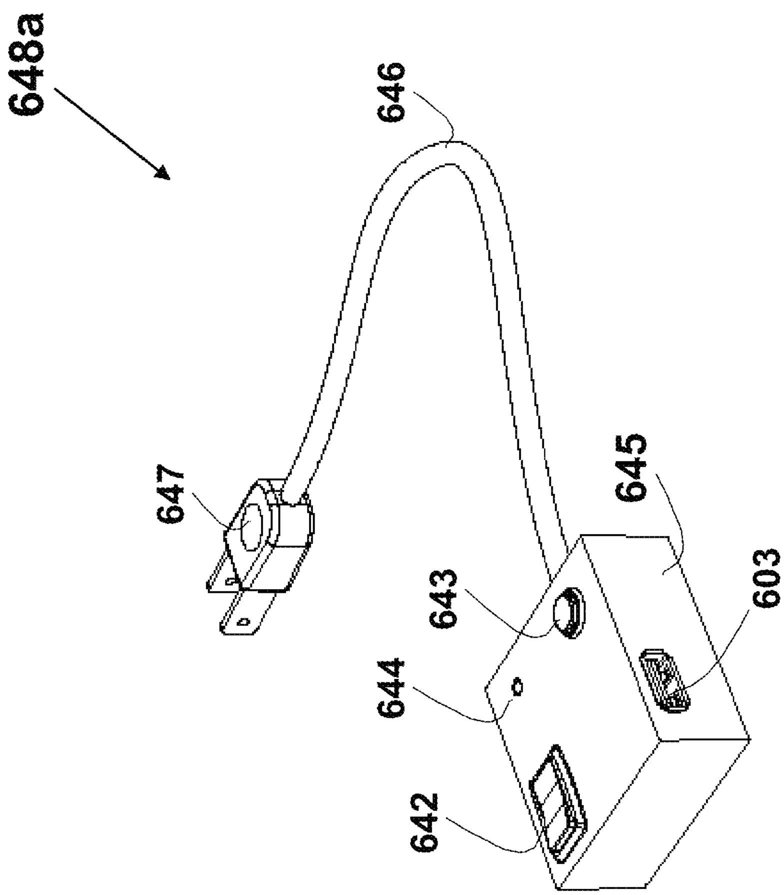
Figure 64B:
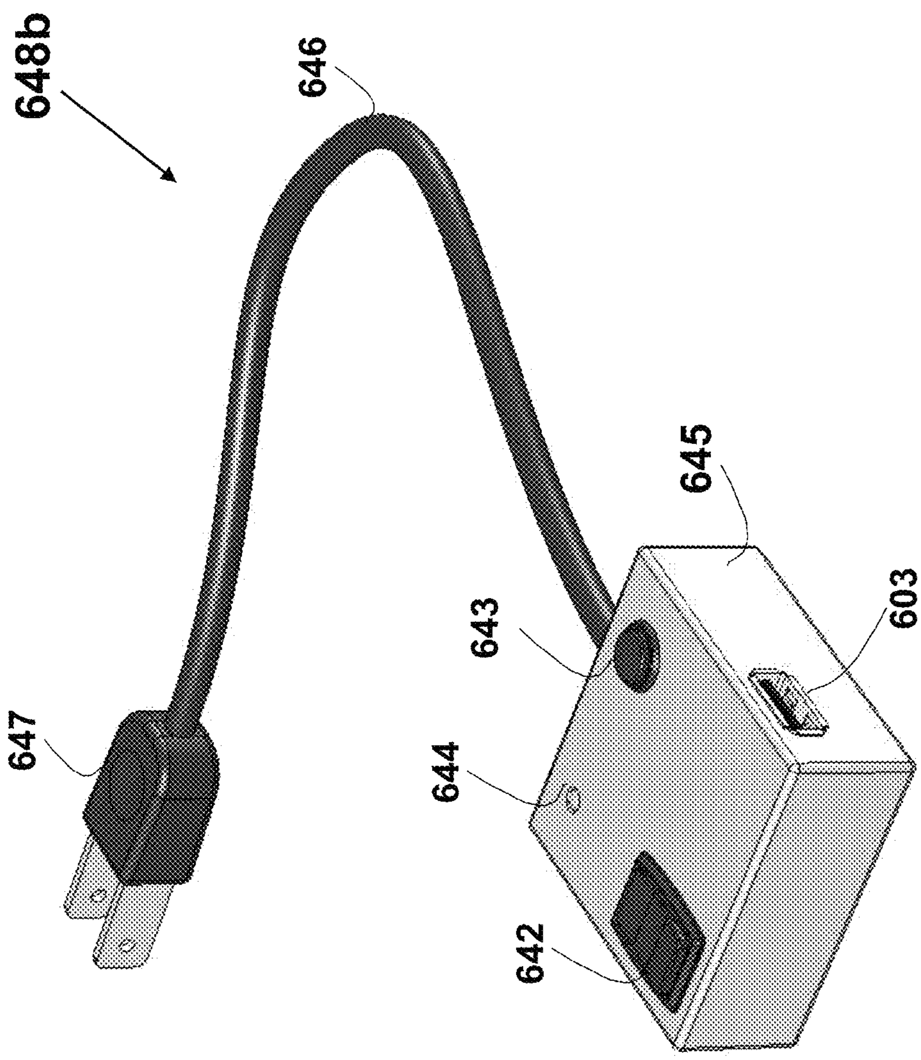
Figure 65:
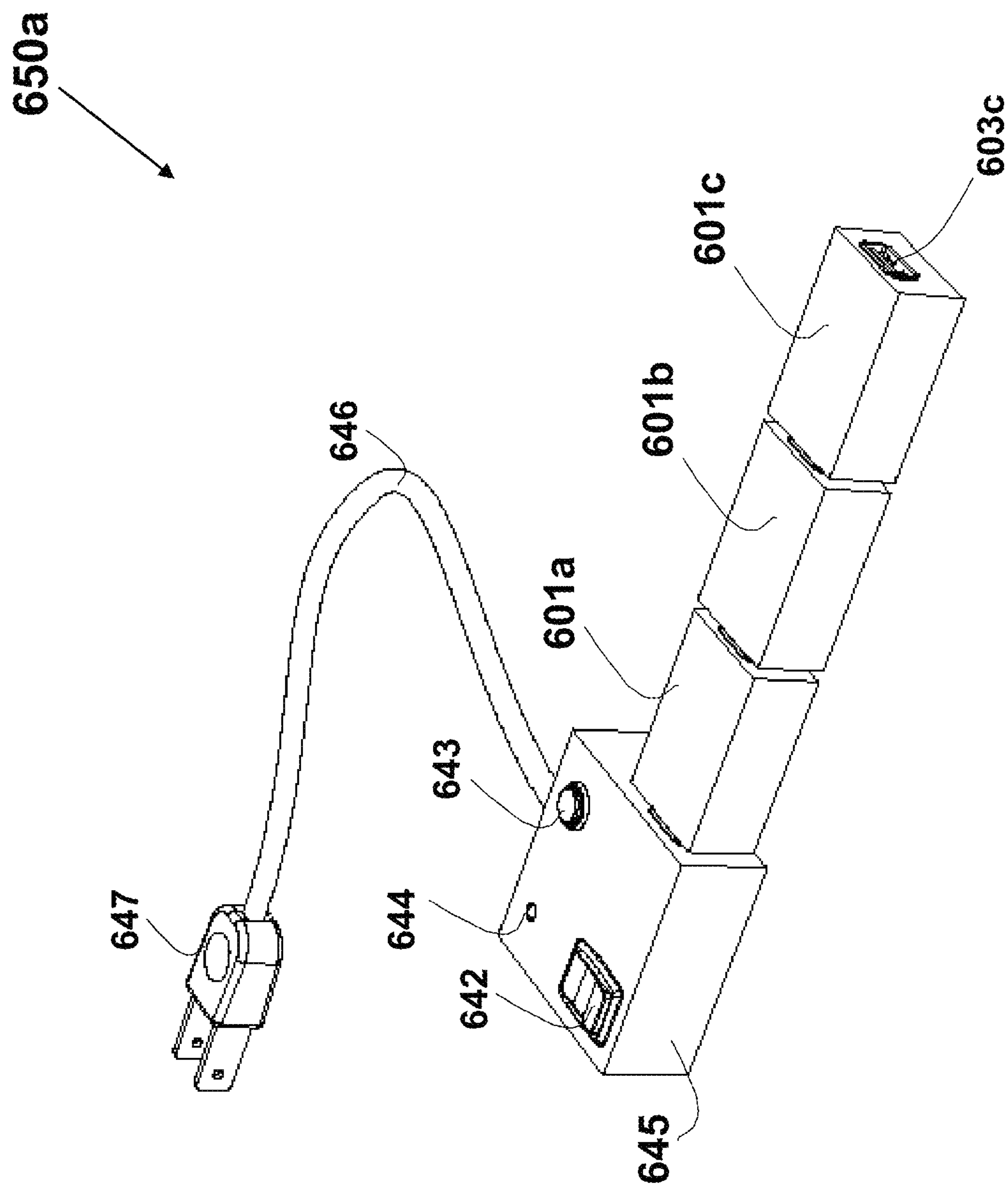
Figure 65A:
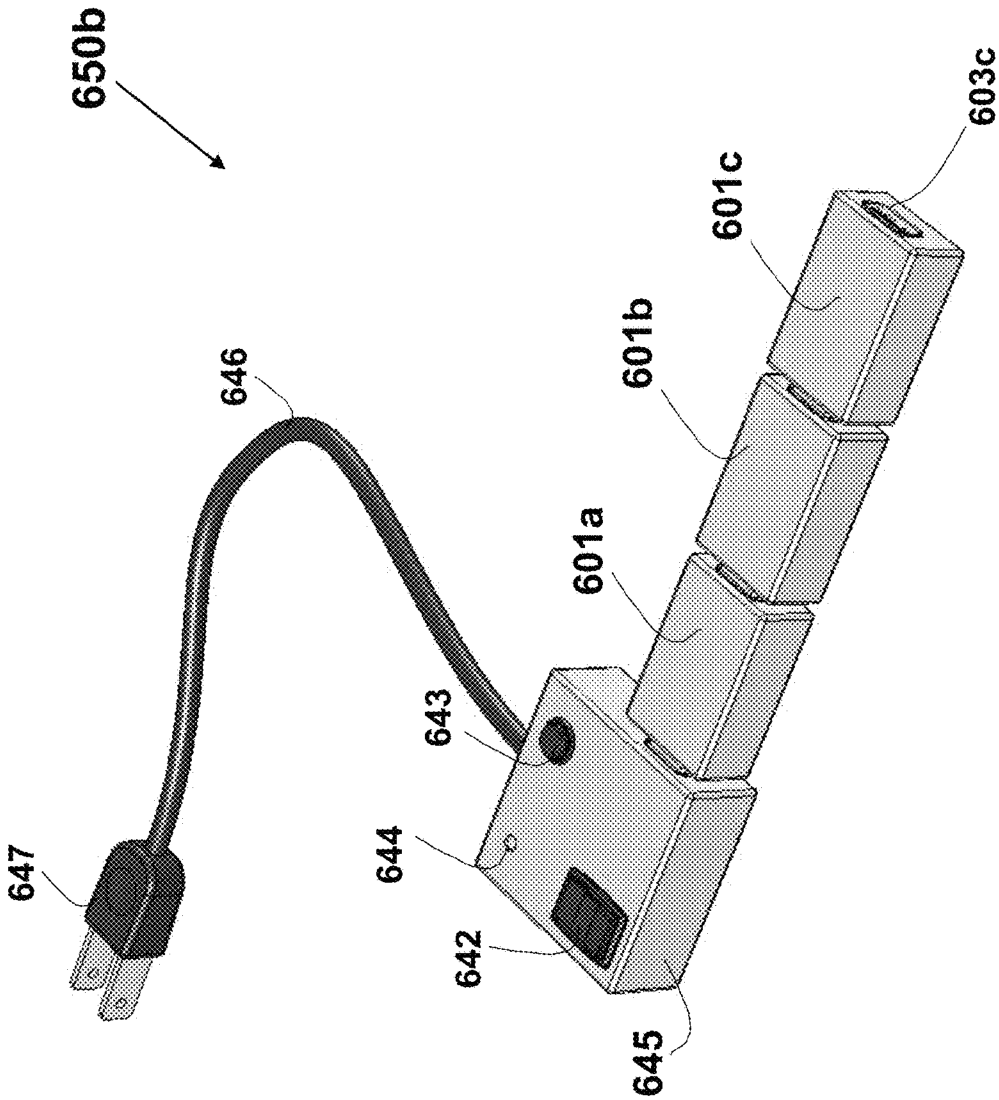
Figure 66:
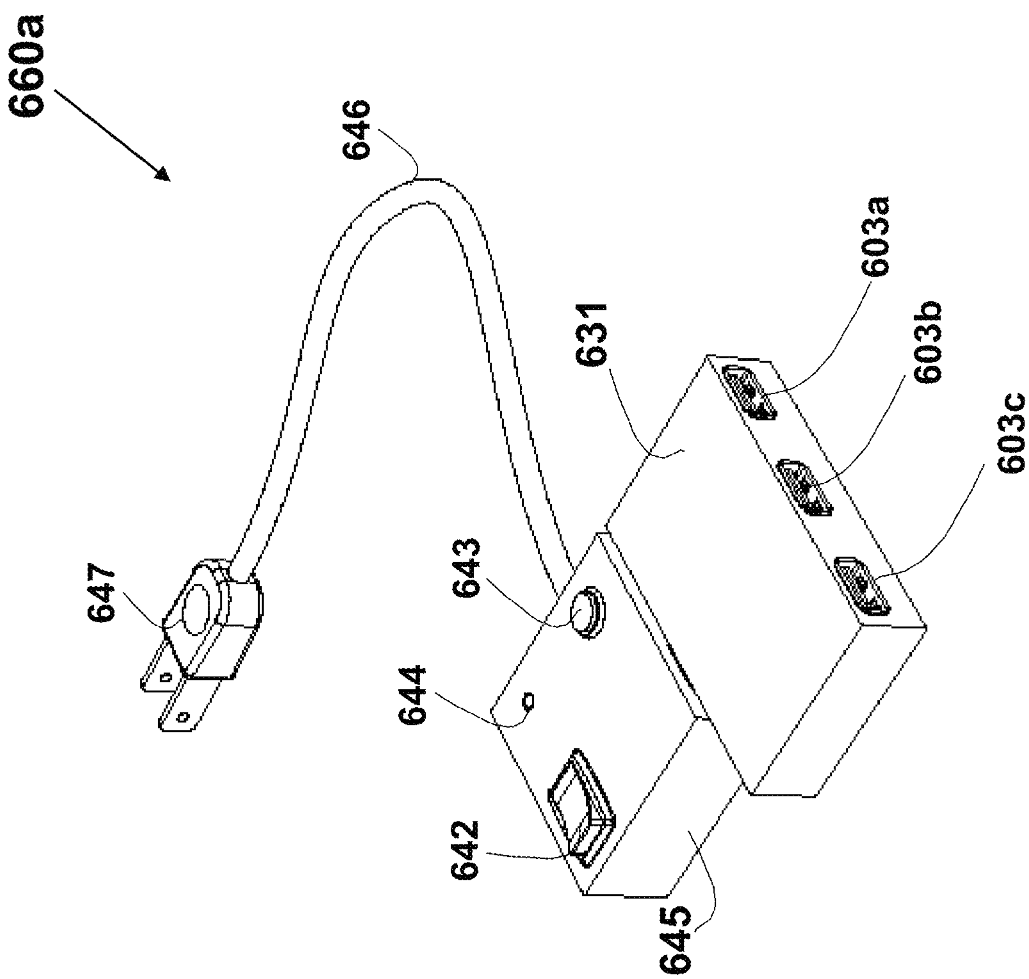
Figure 66A:
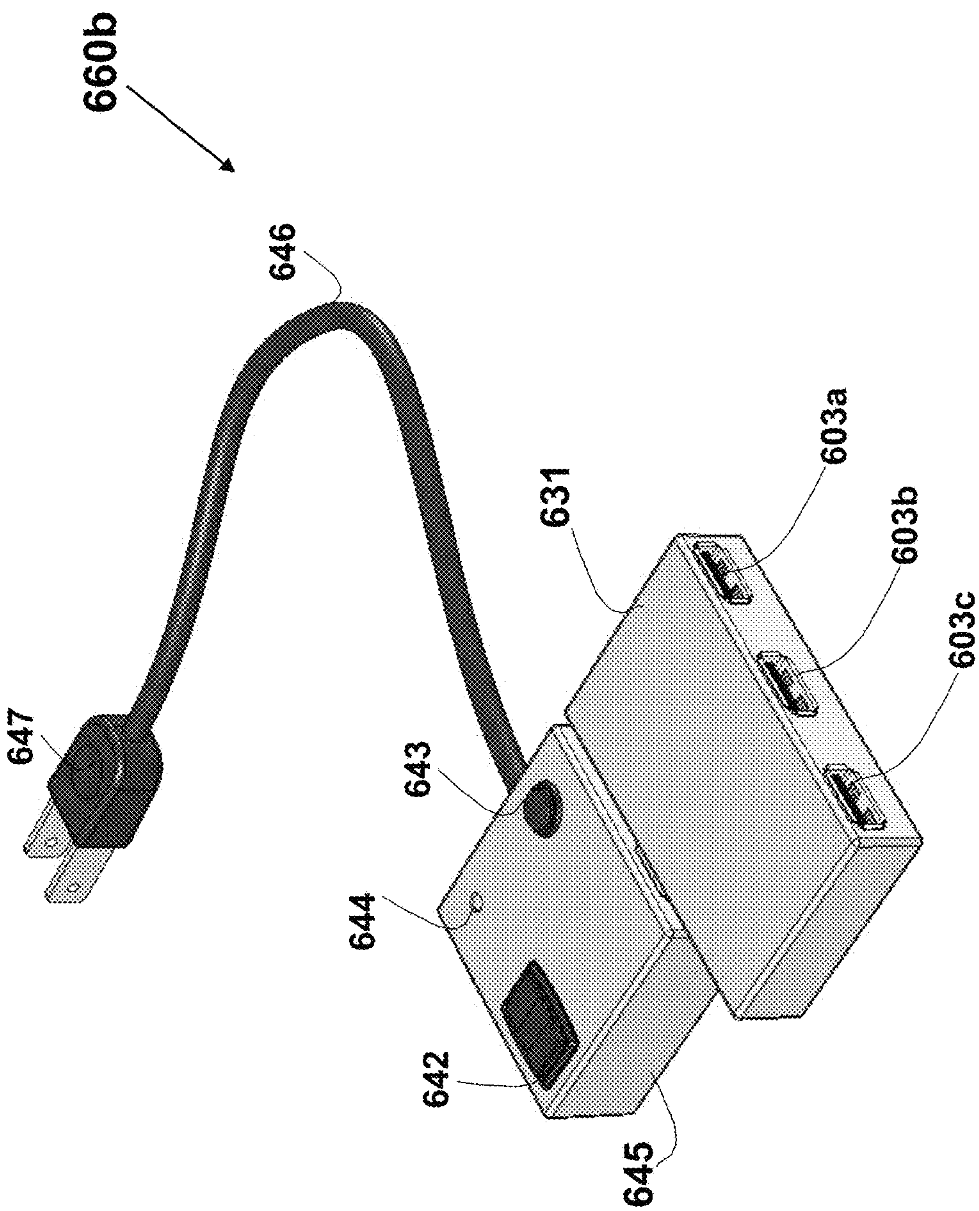
Figure 67:
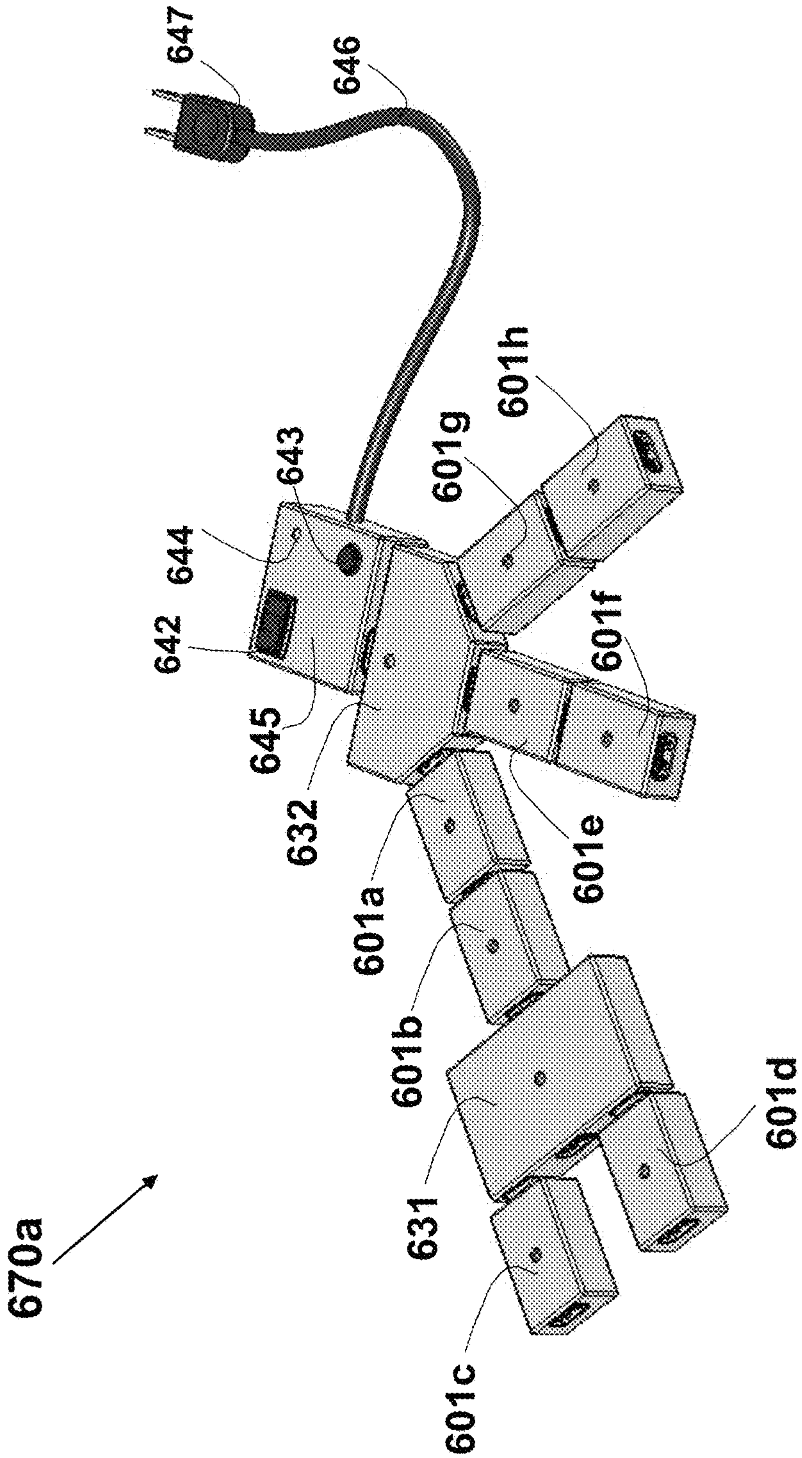
Figure 67A:
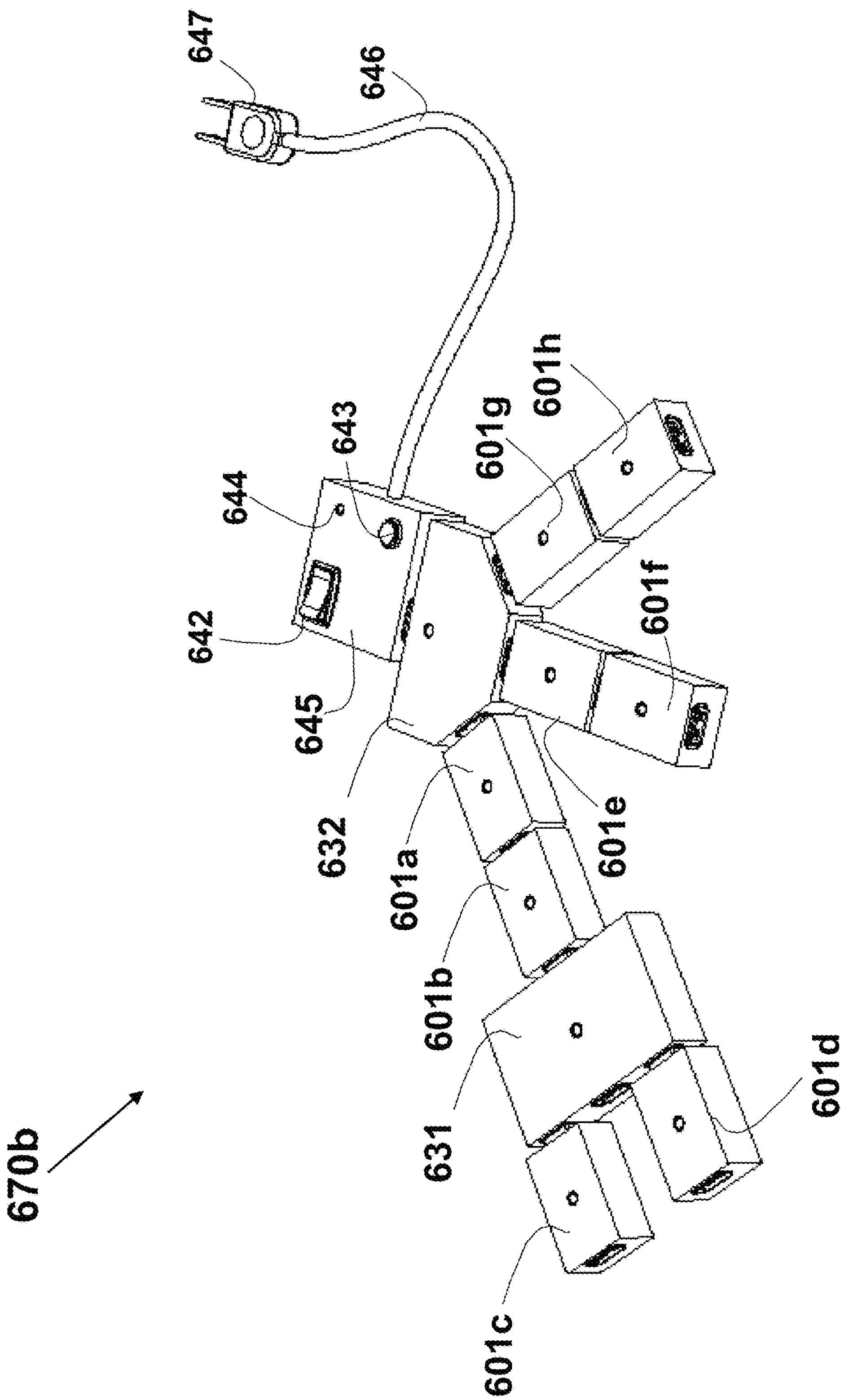
Figure 68:
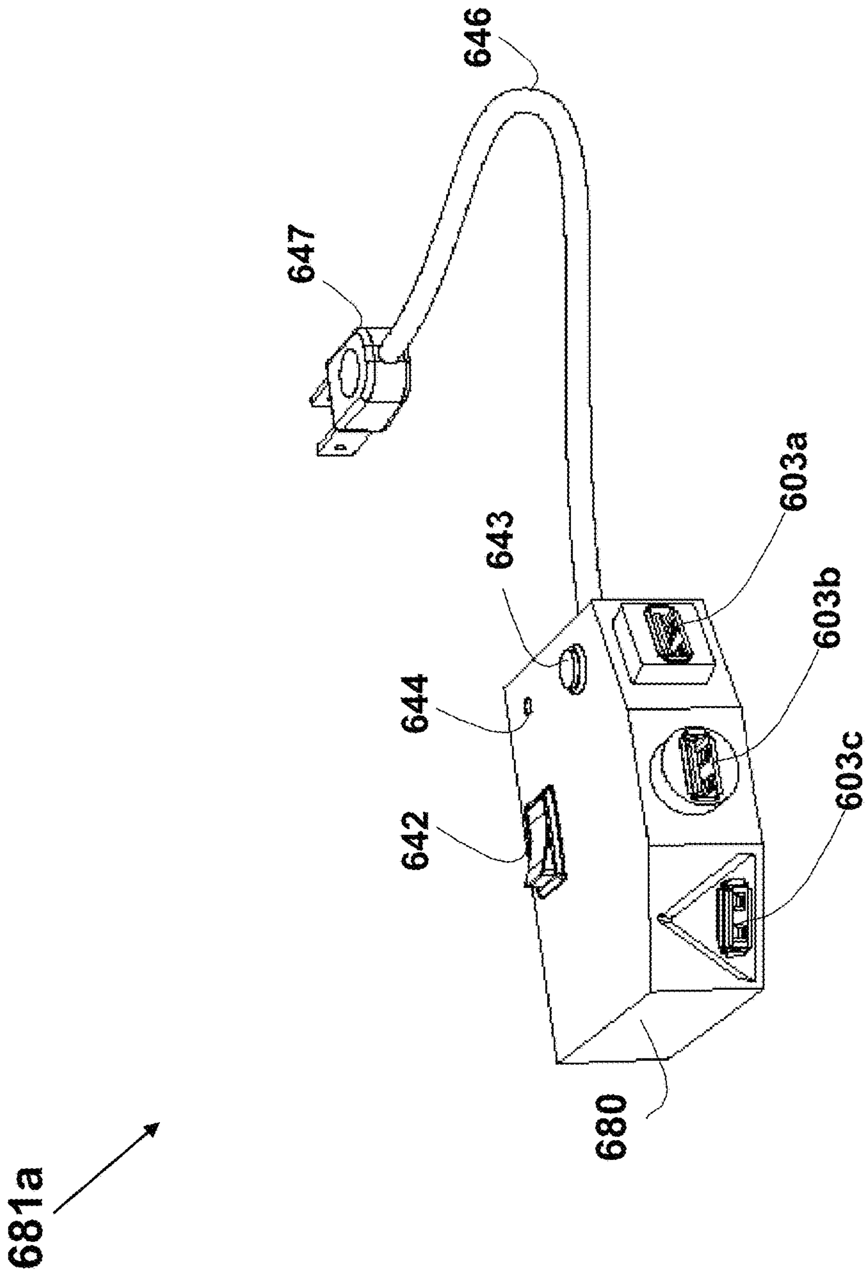
Figure 68A:
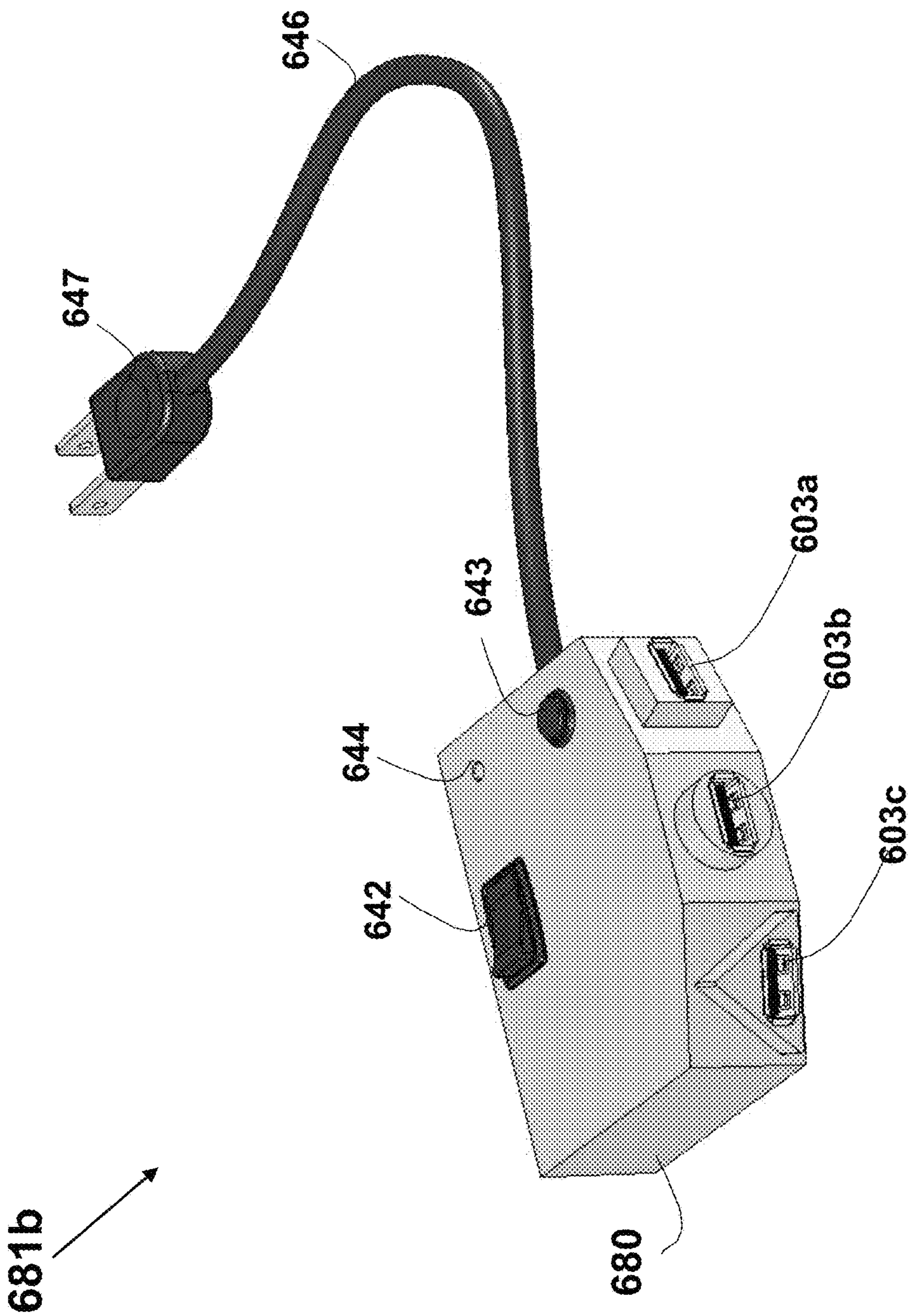
Figure 69:
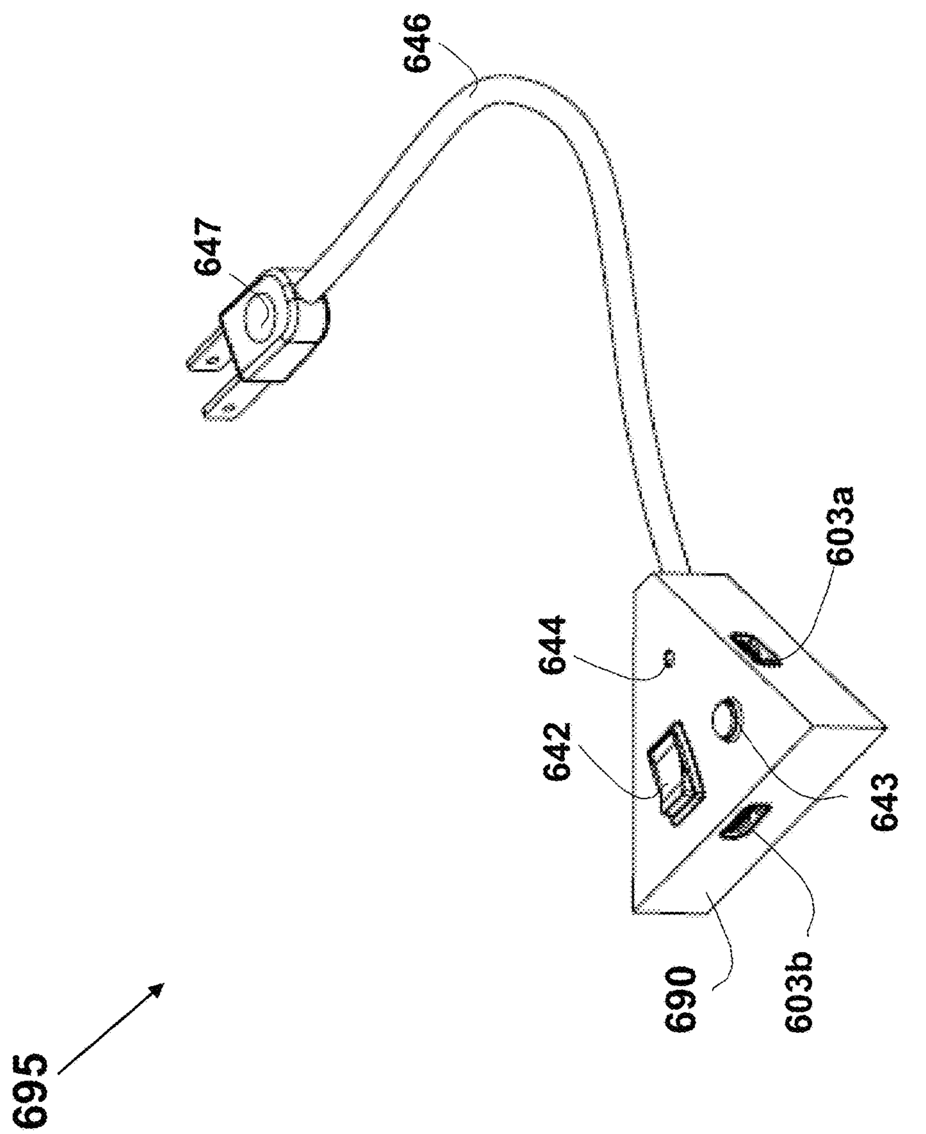
Figure 70:
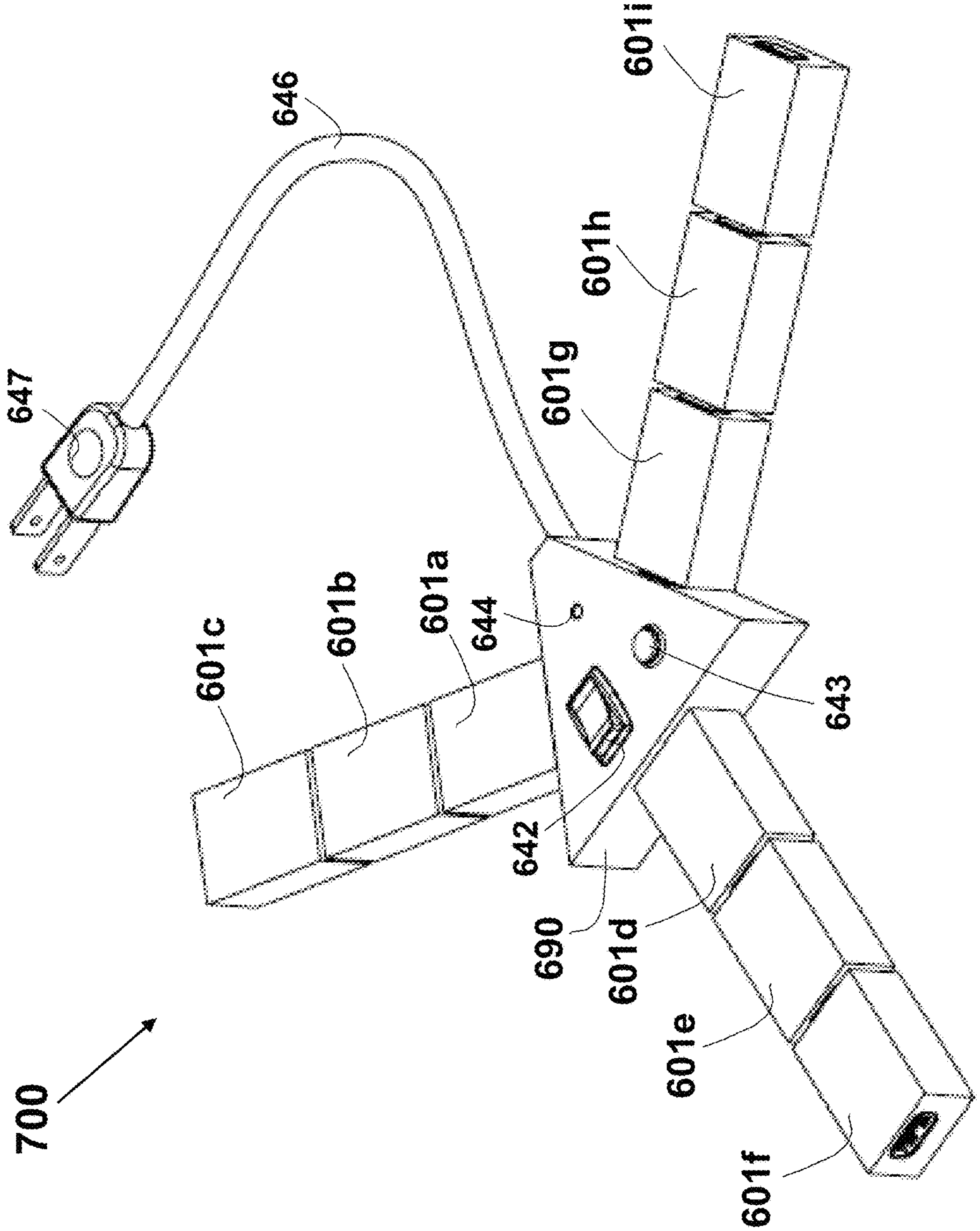
Figure 71:
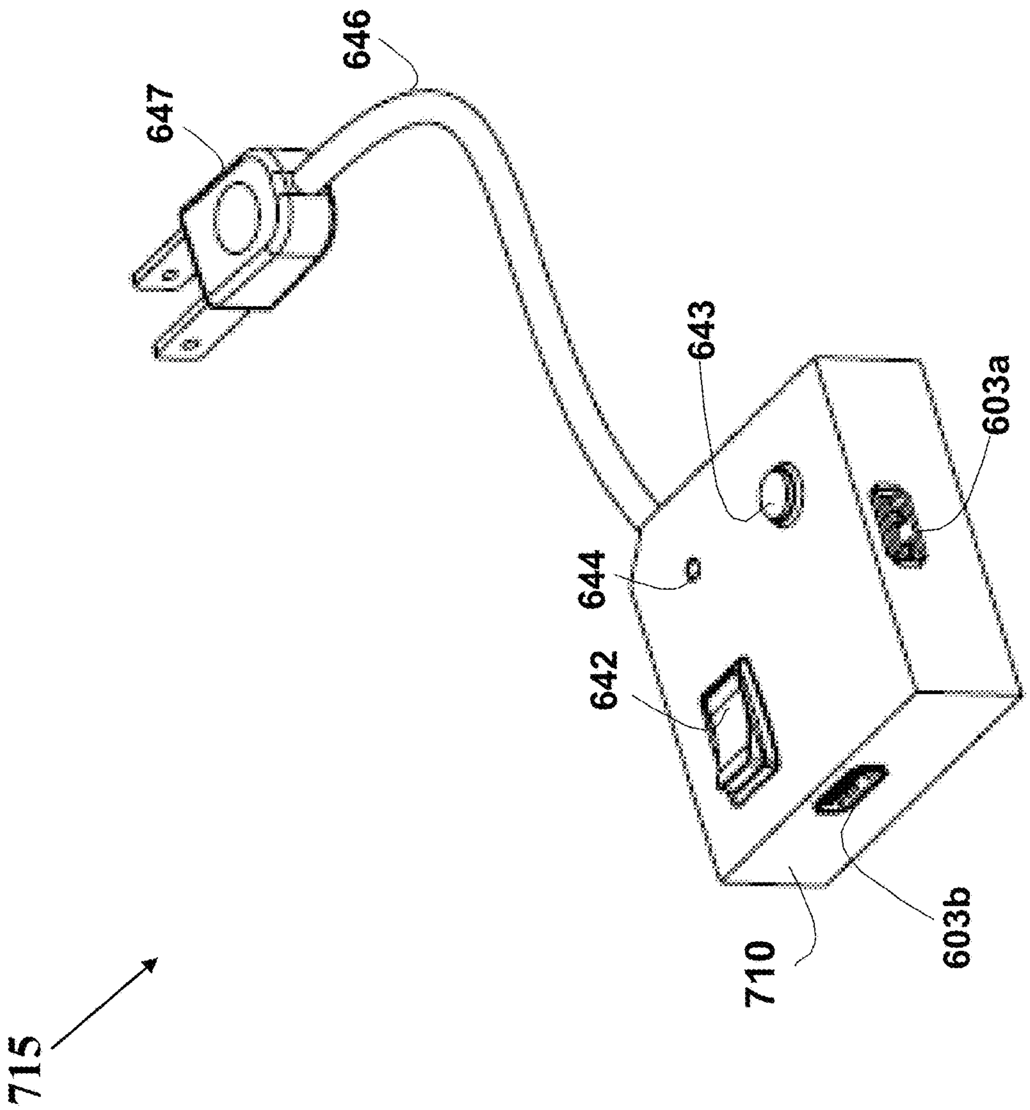
Figure 72:
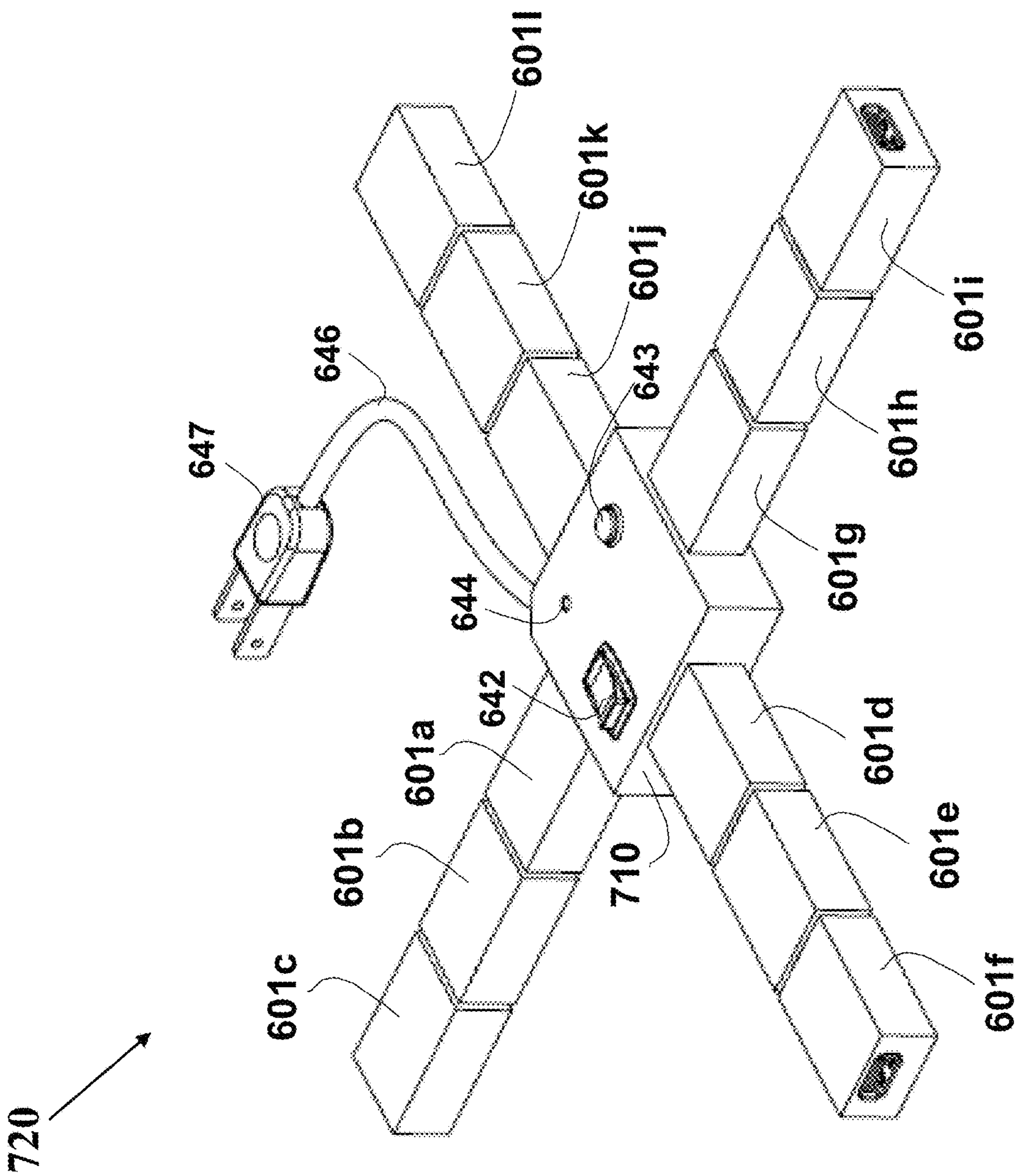
Figure 73:
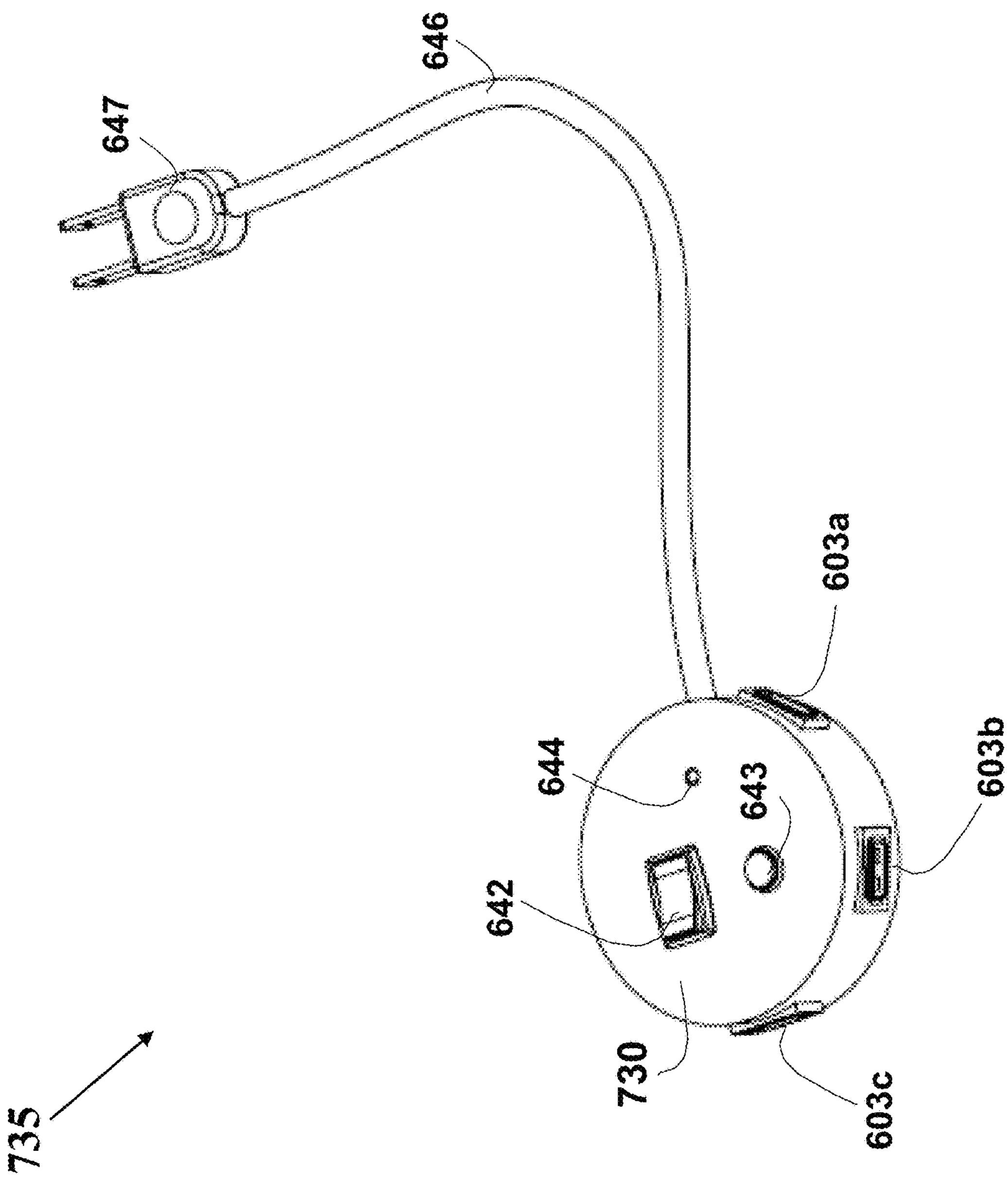
Figure 74:
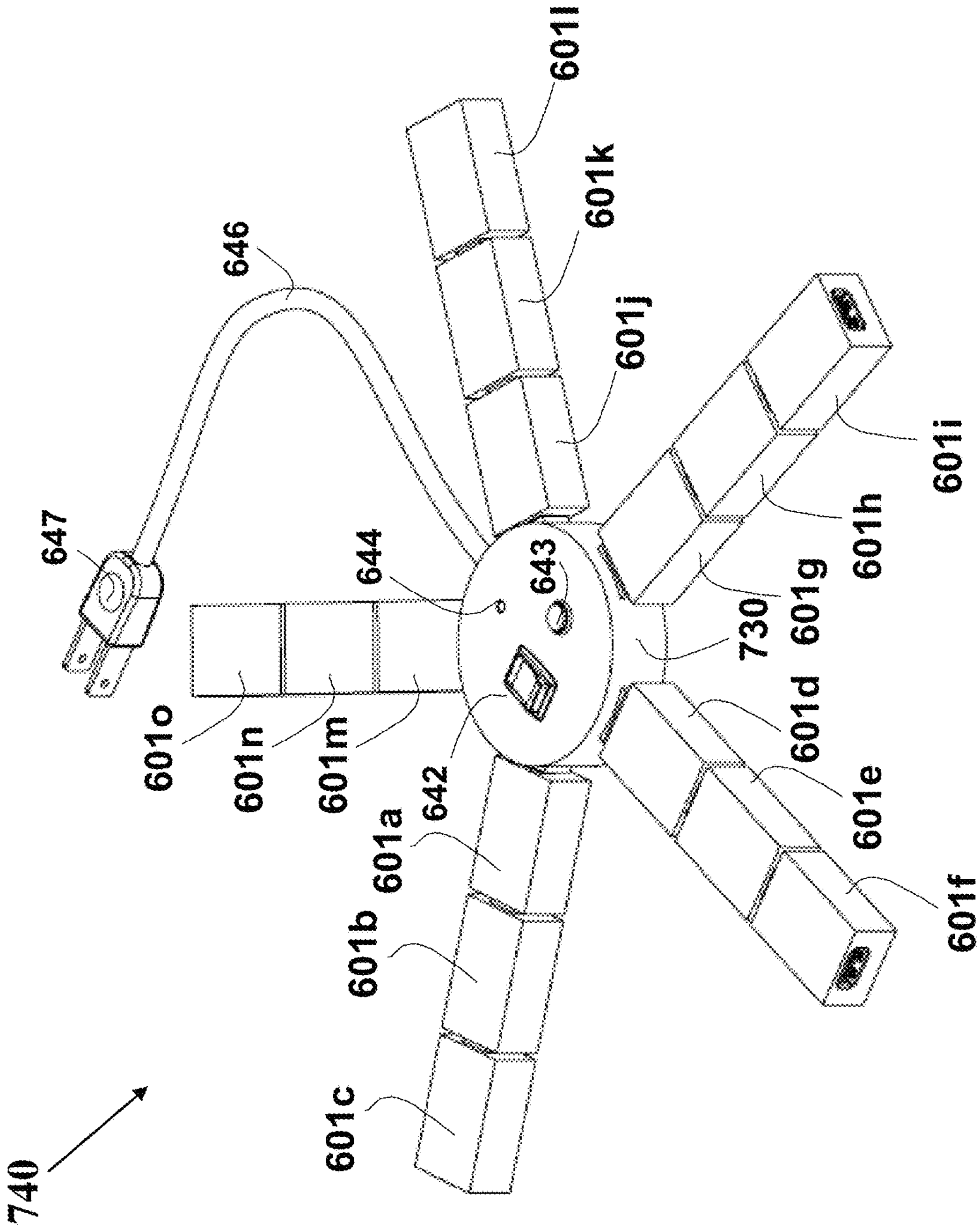
Figure 75:
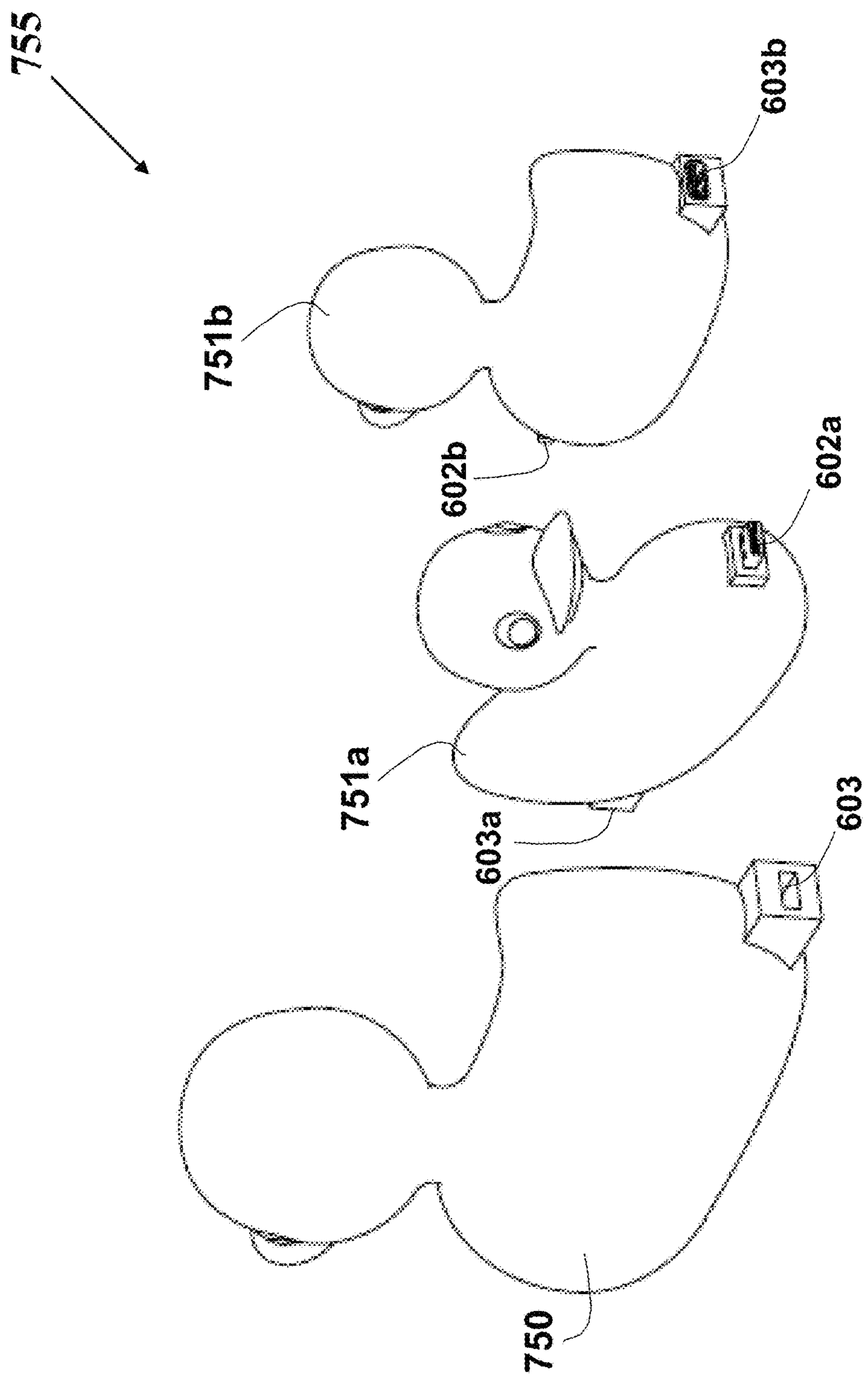
Figure 75A:
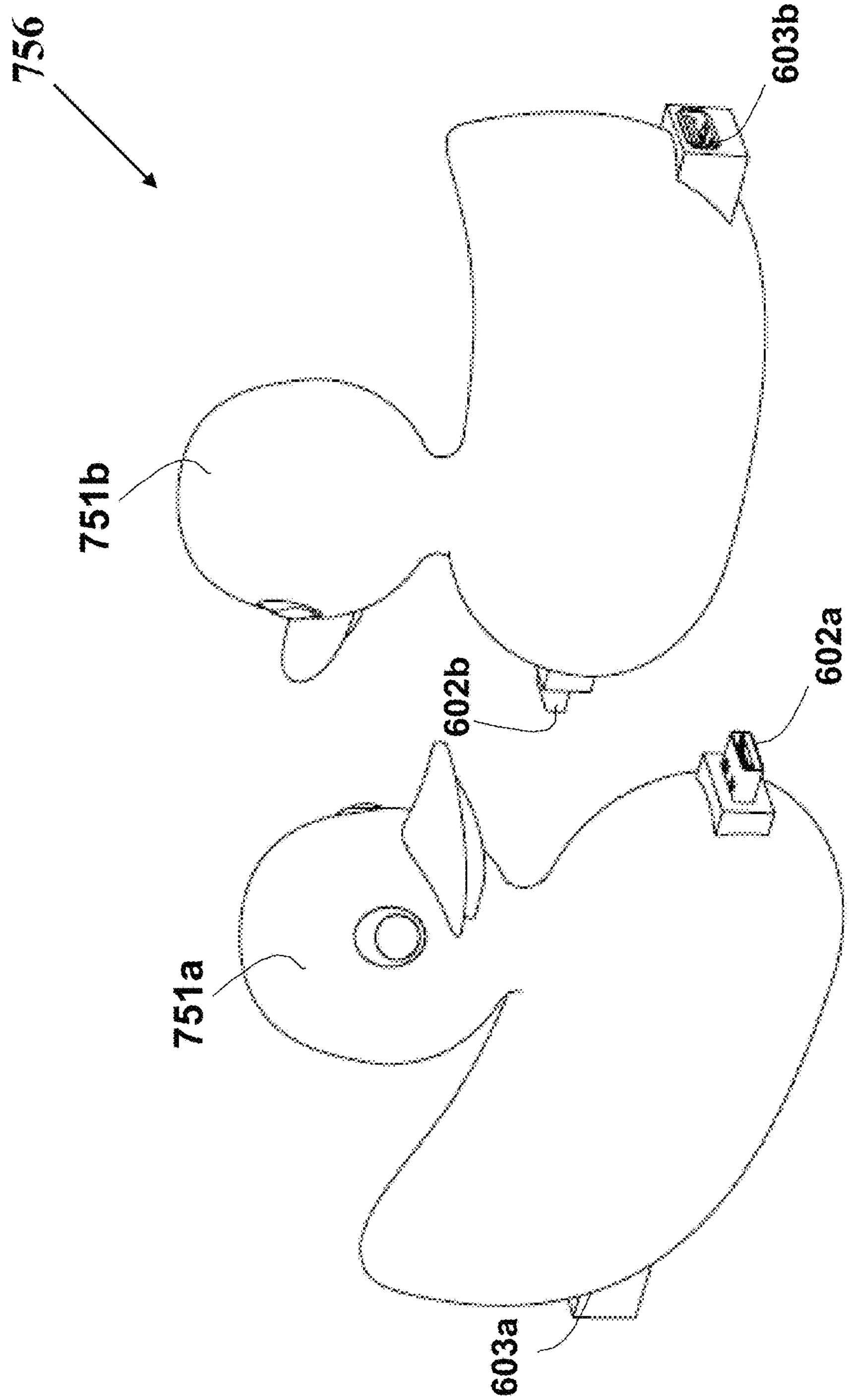
Figure 76:
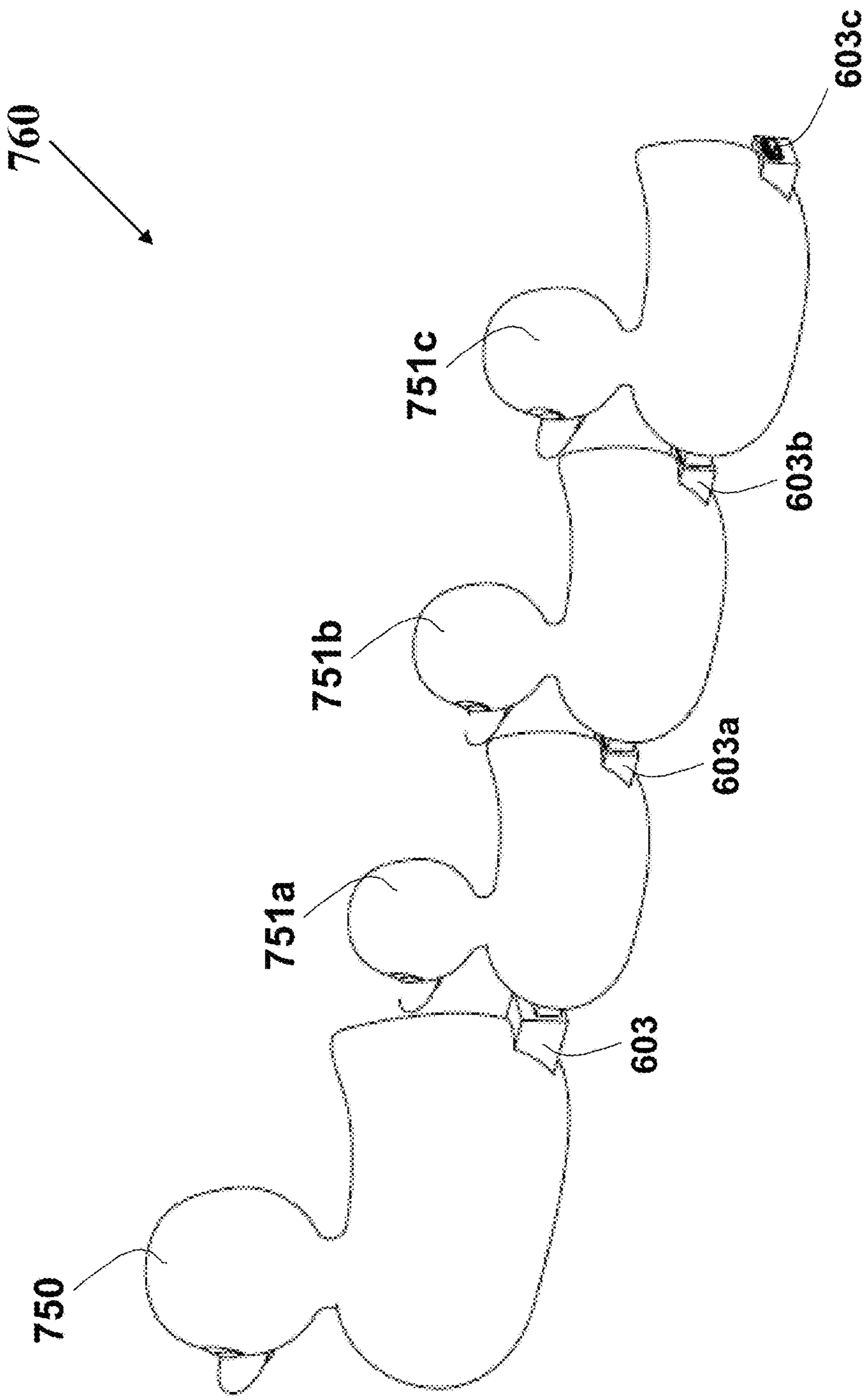
Figure 77:
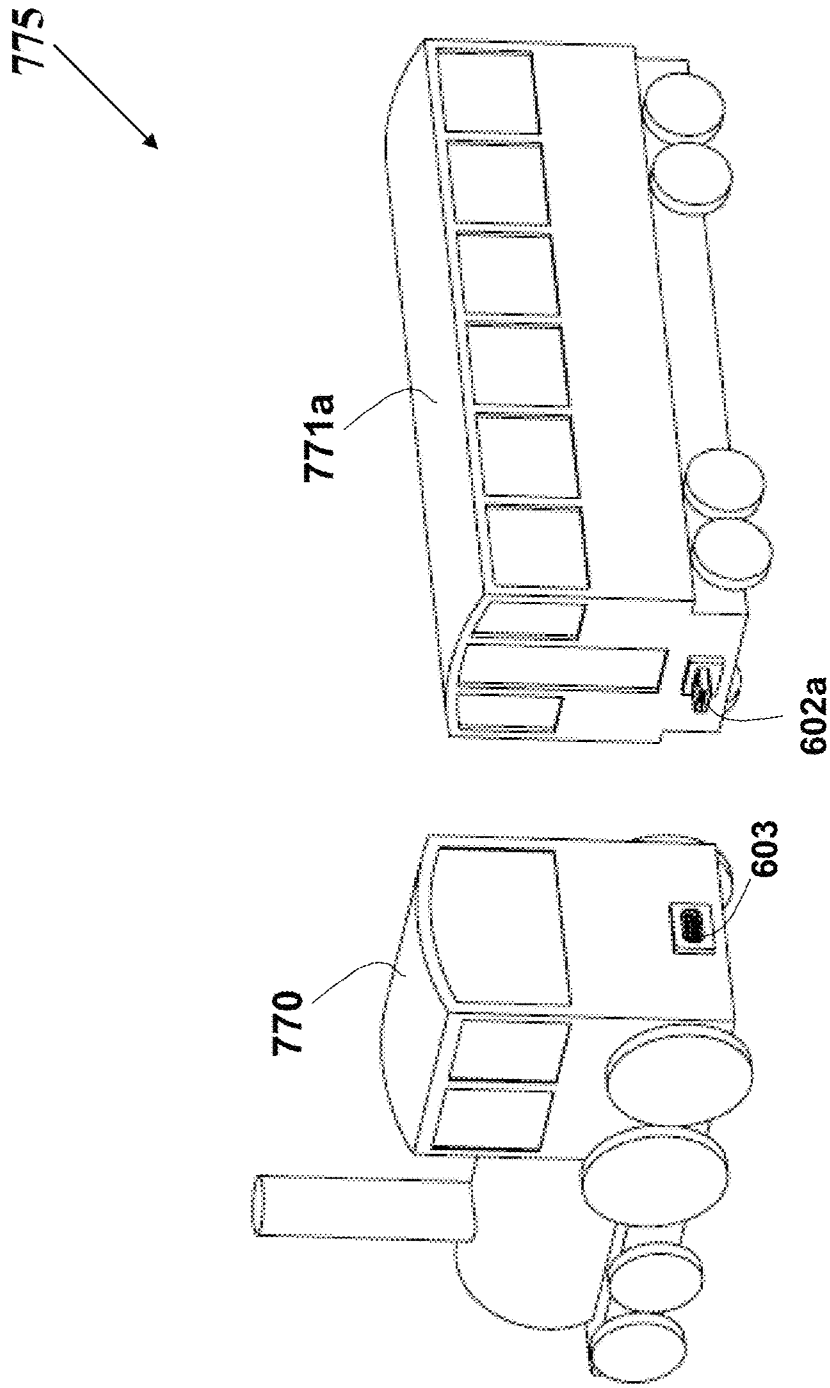
Figure 77A:
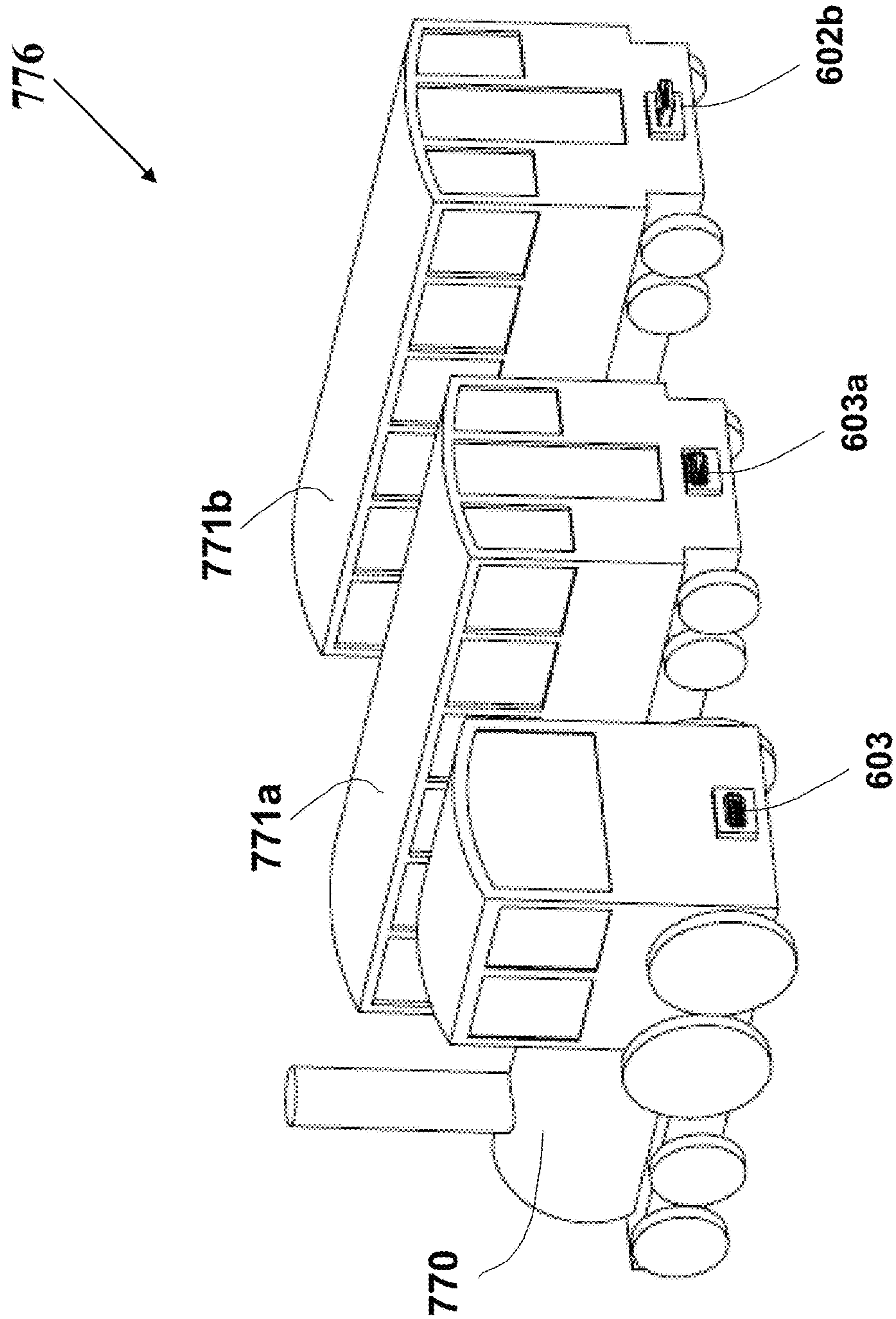
Figure 78:
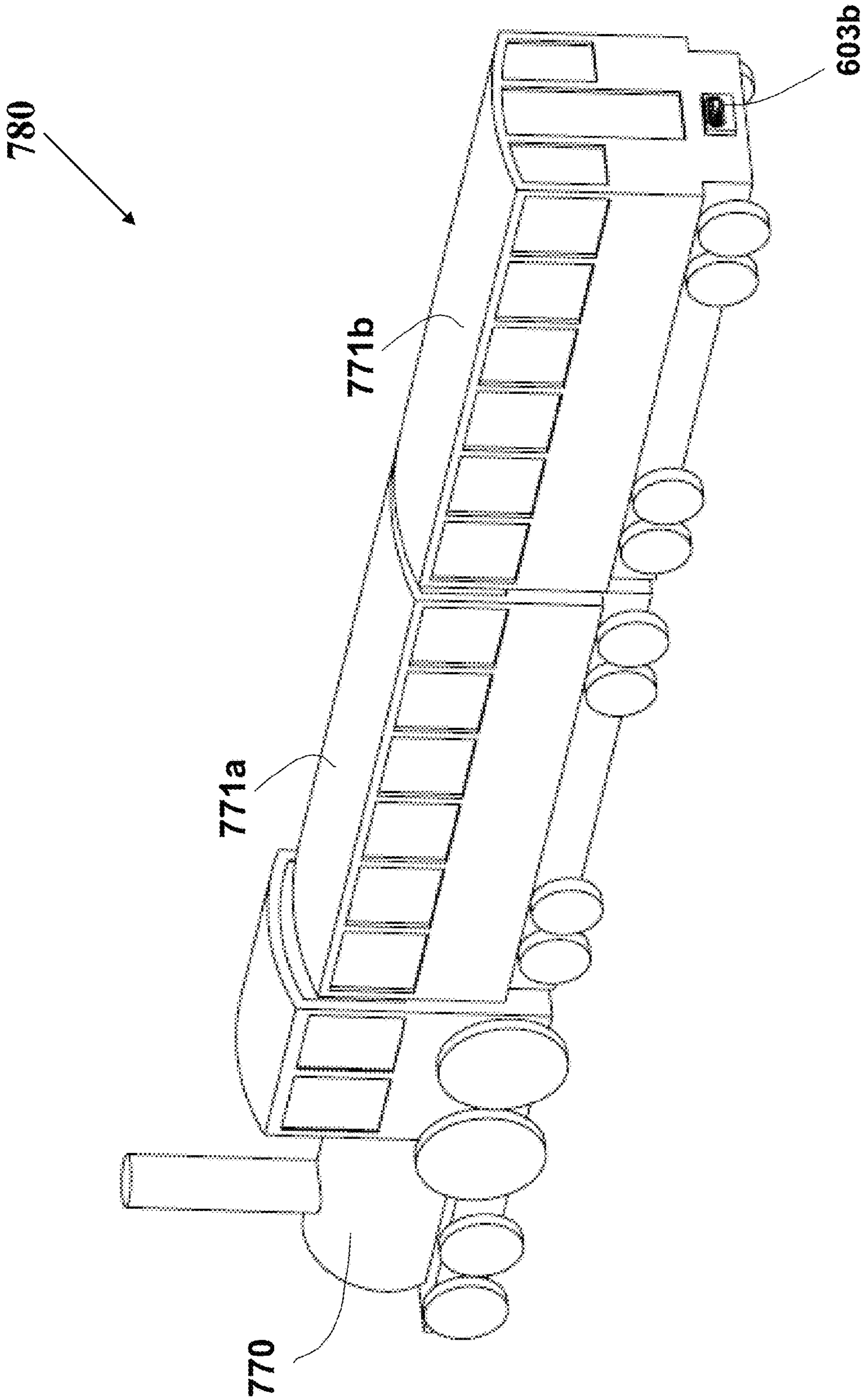
Figure 78A:
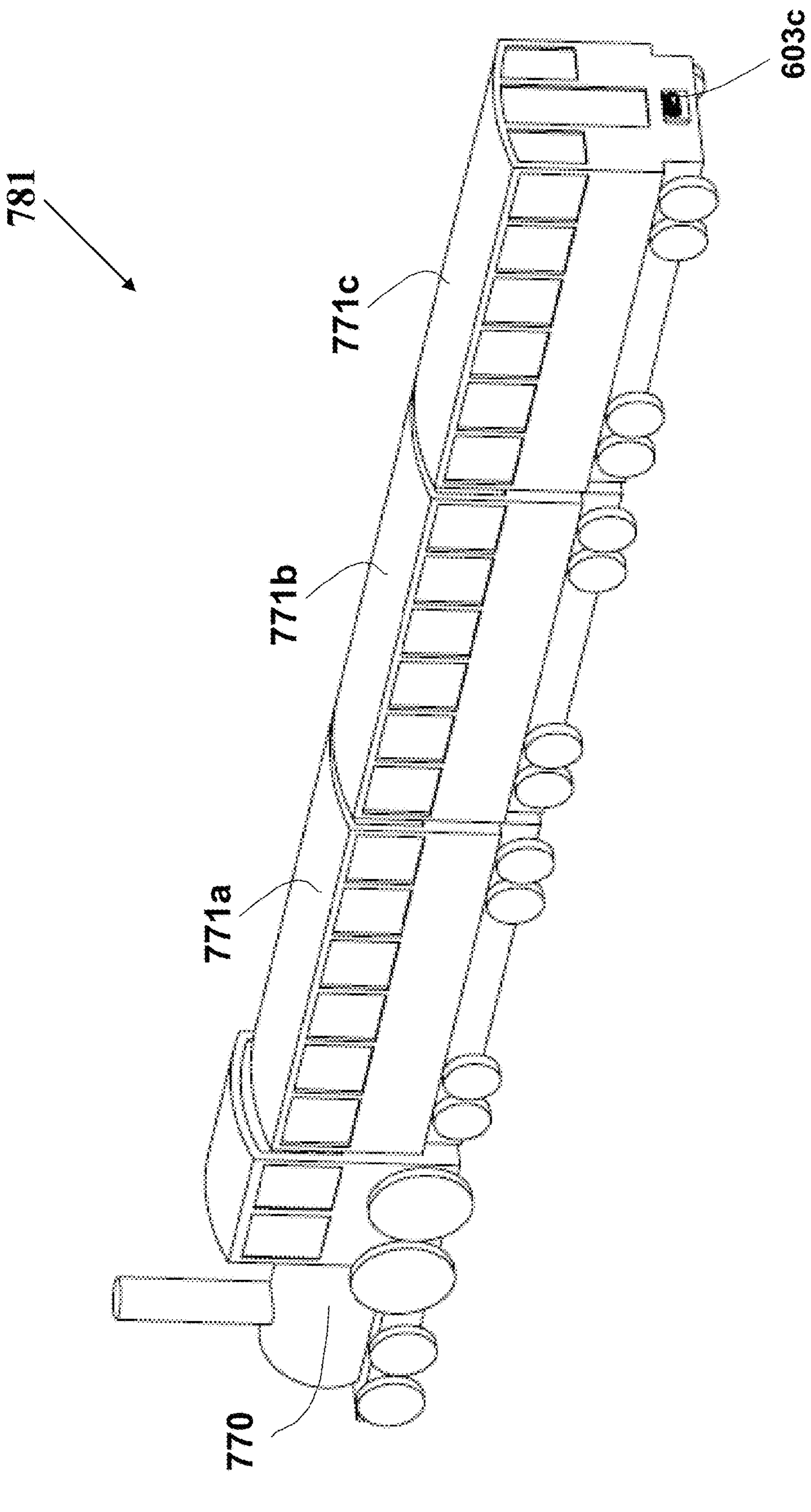
Figure 79:
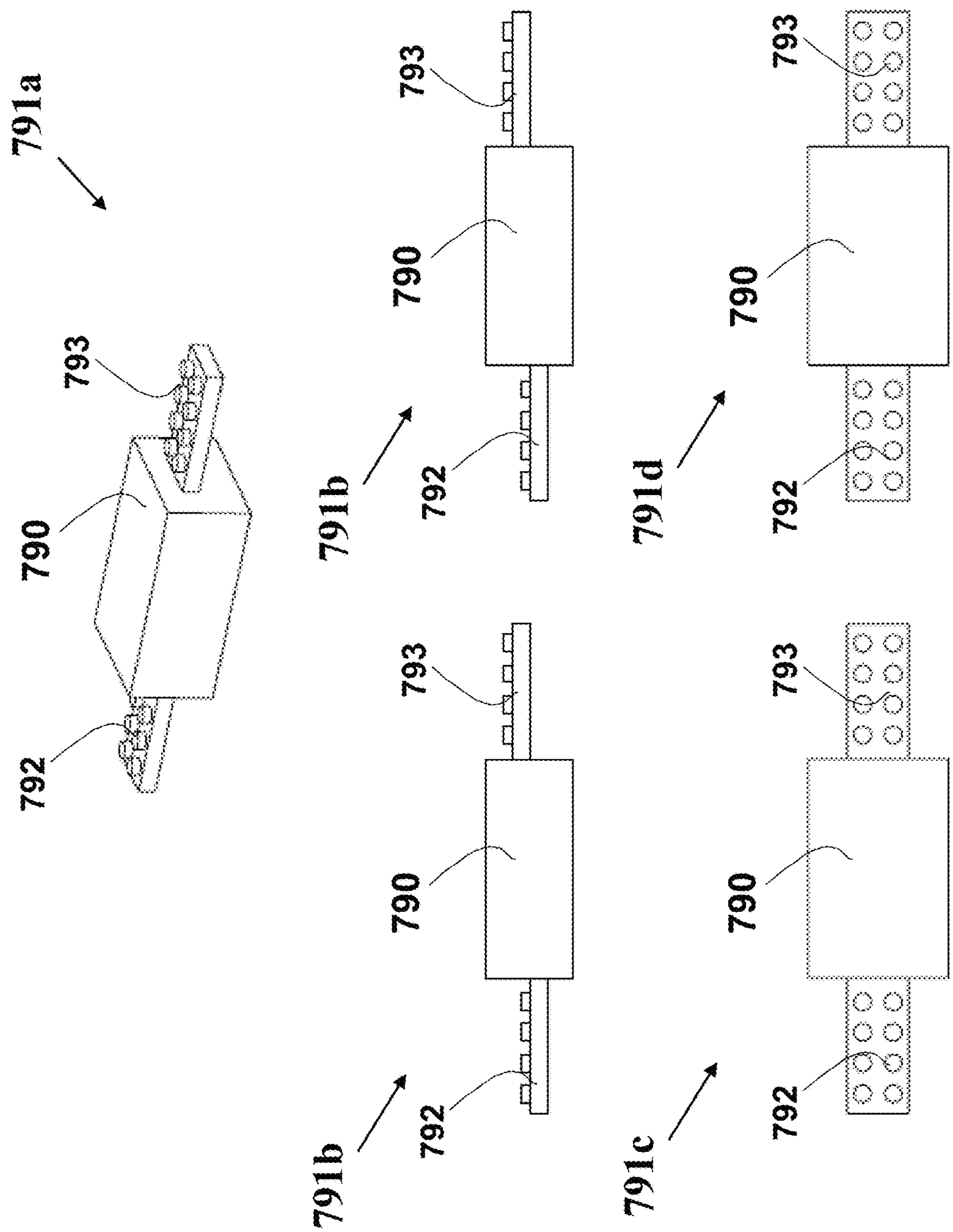
Figure 80:
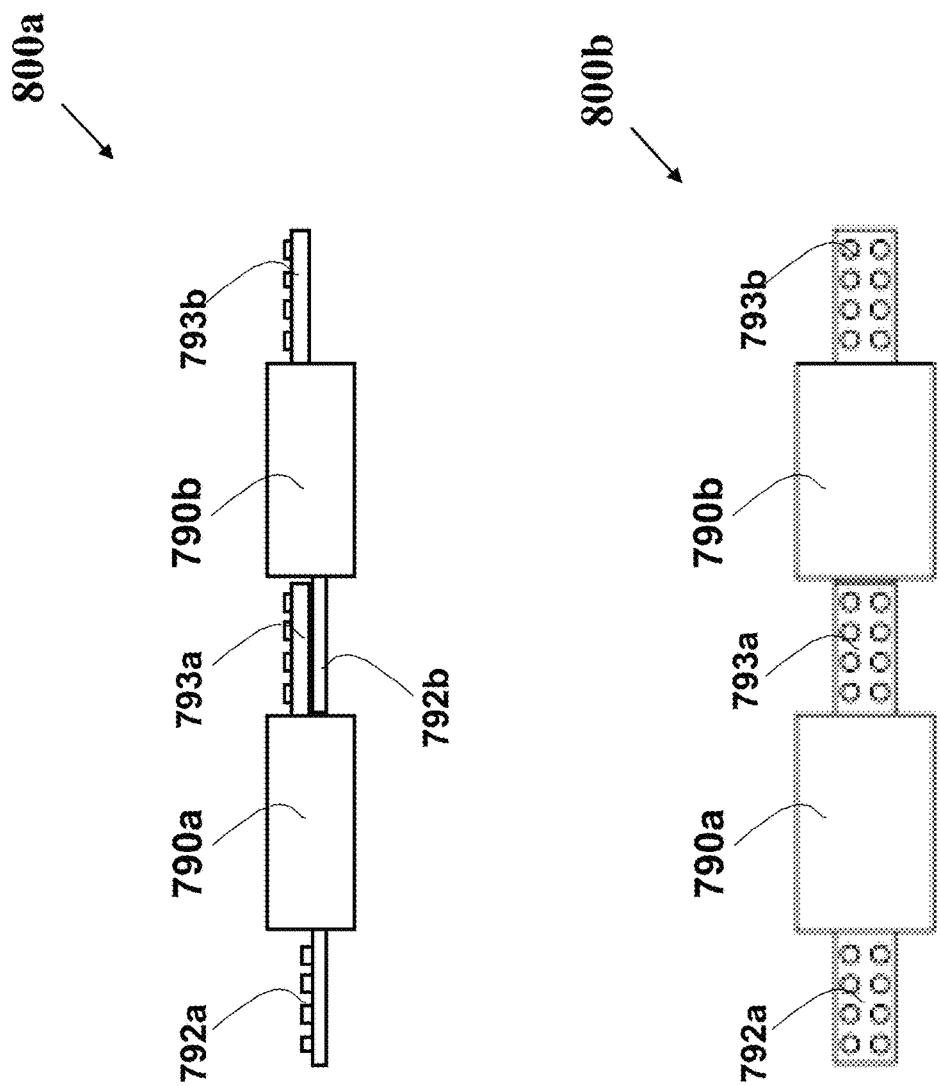
Figure 80A:
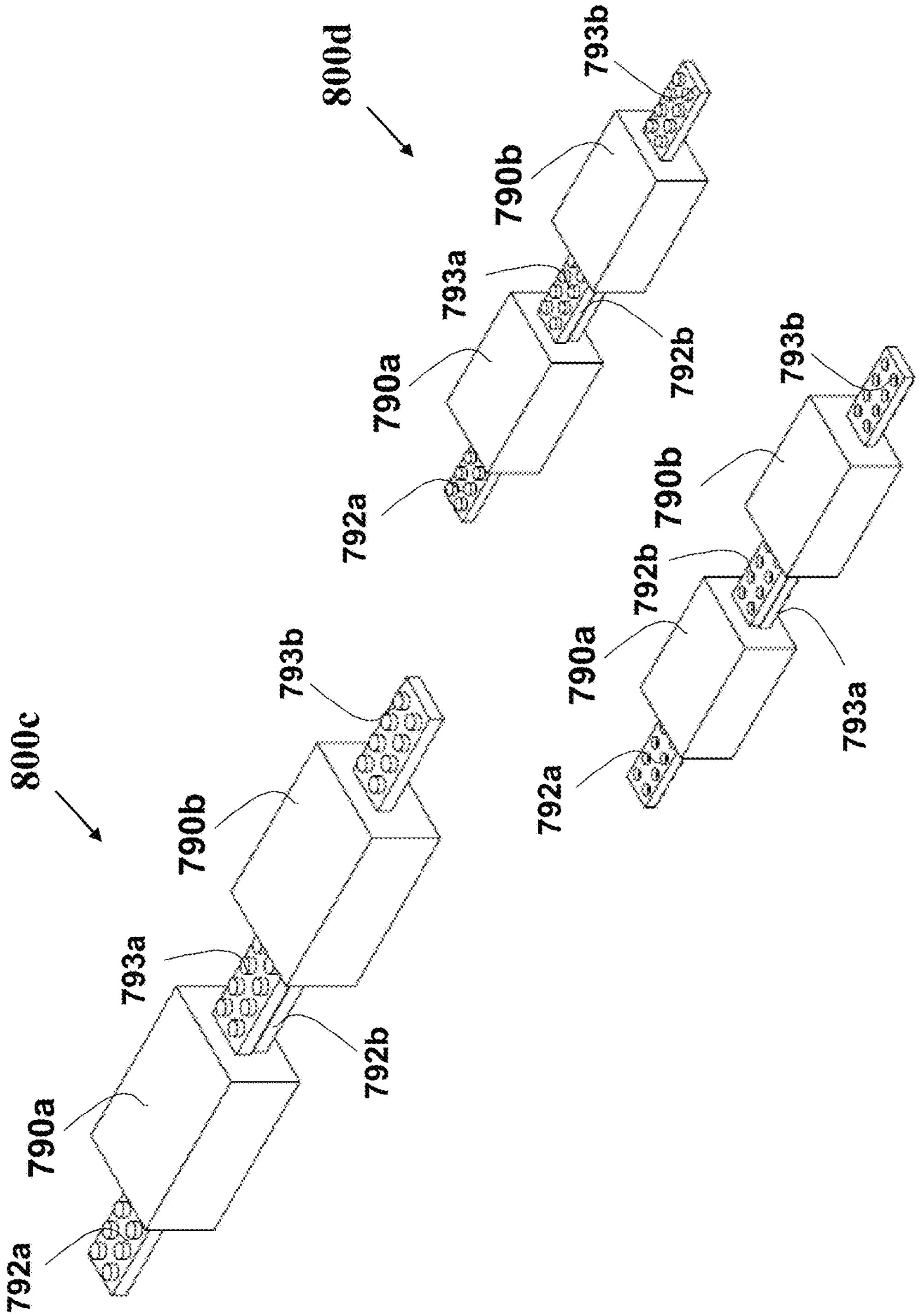
Figure 80B:
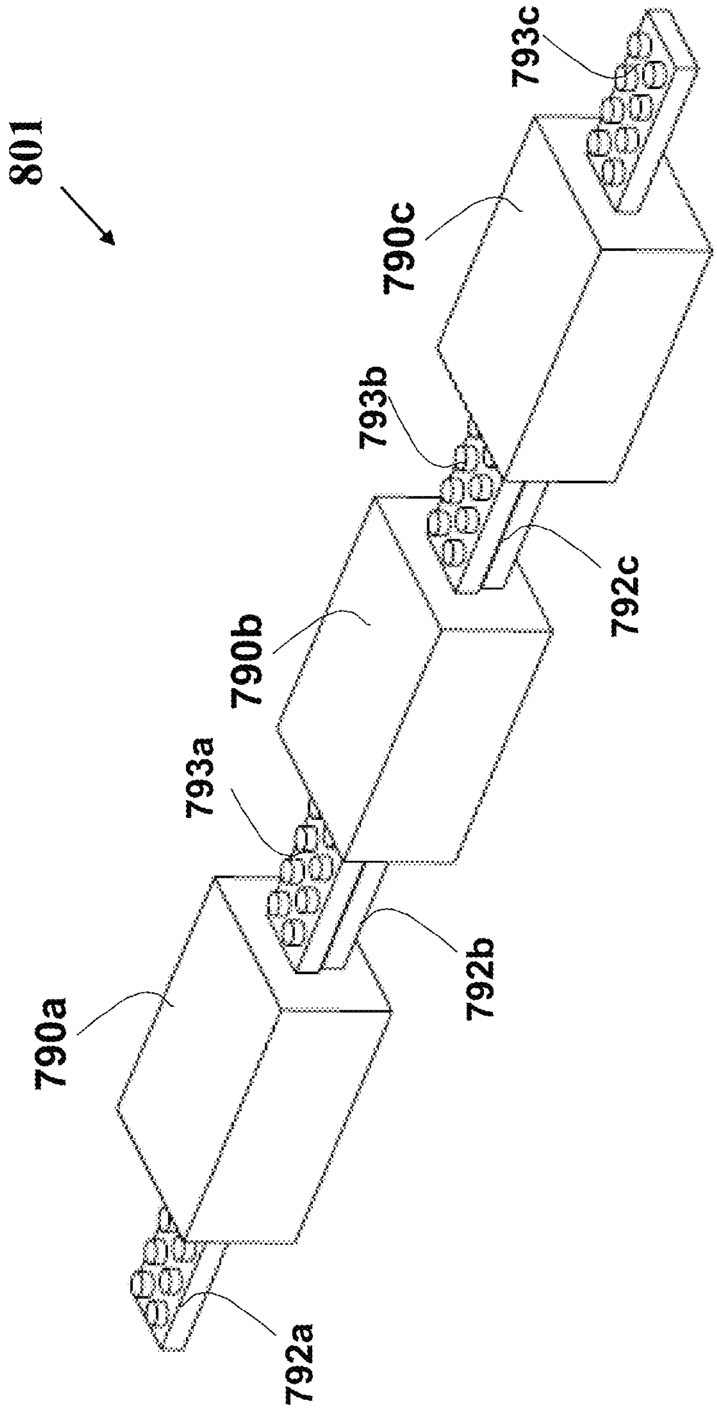
Figure 81:
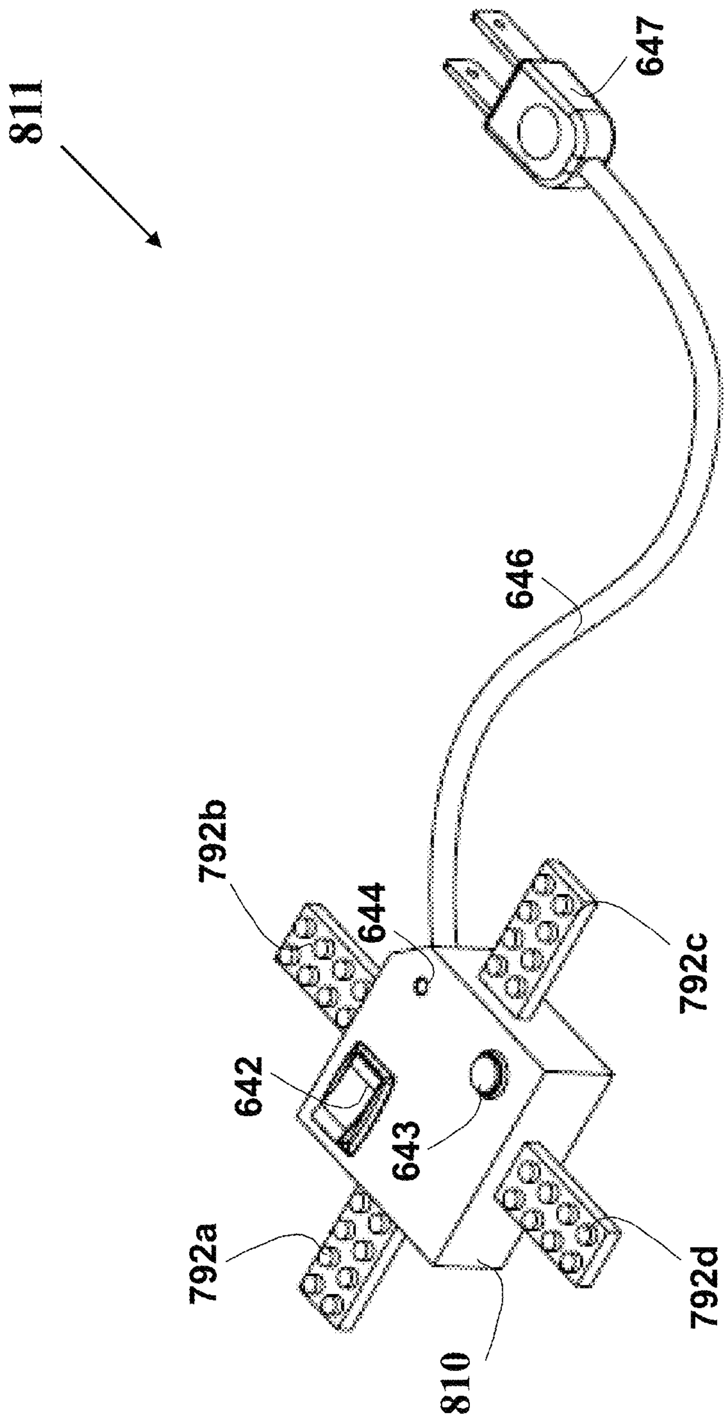
Figure 82:
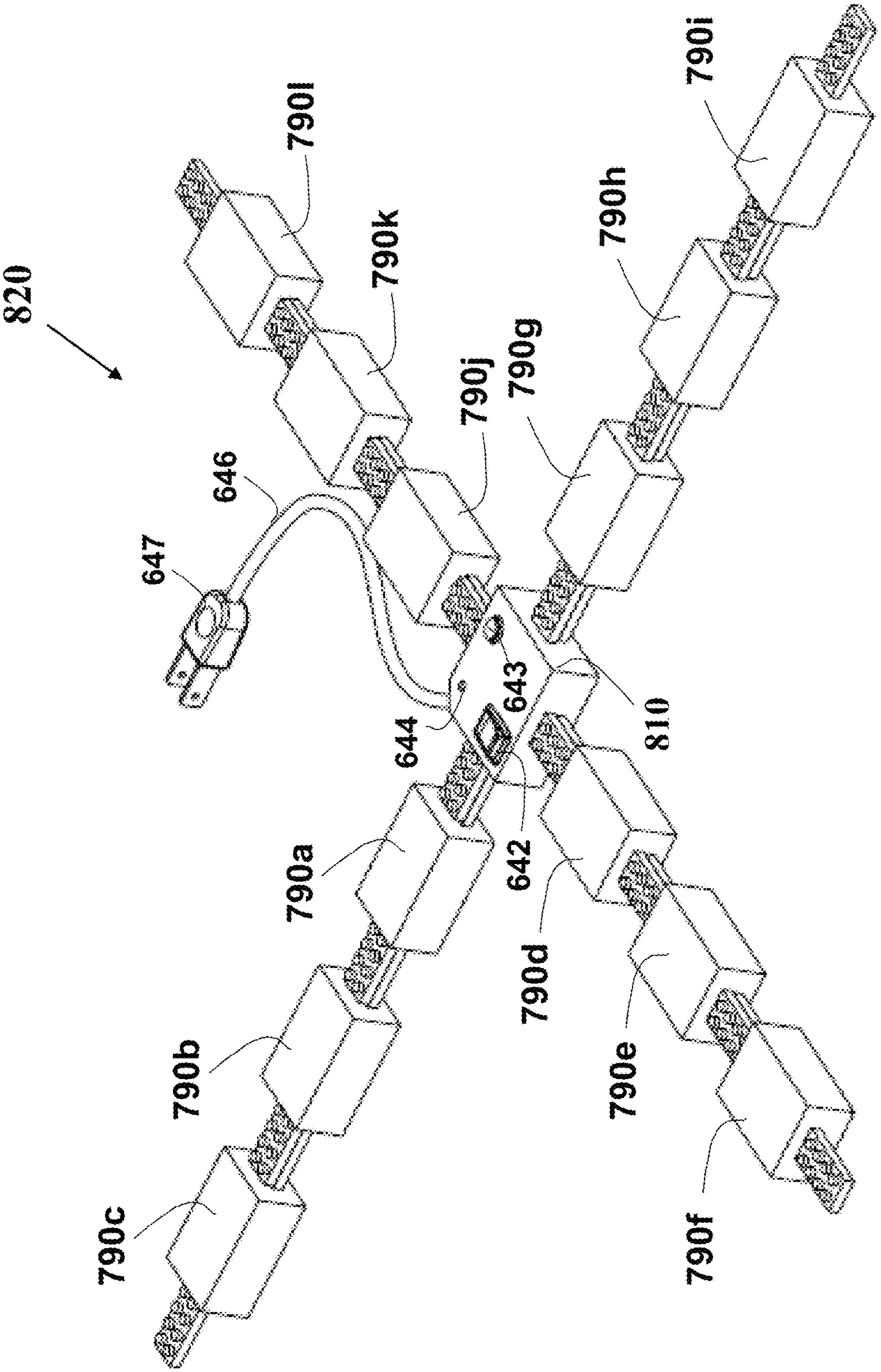
Figure 83:
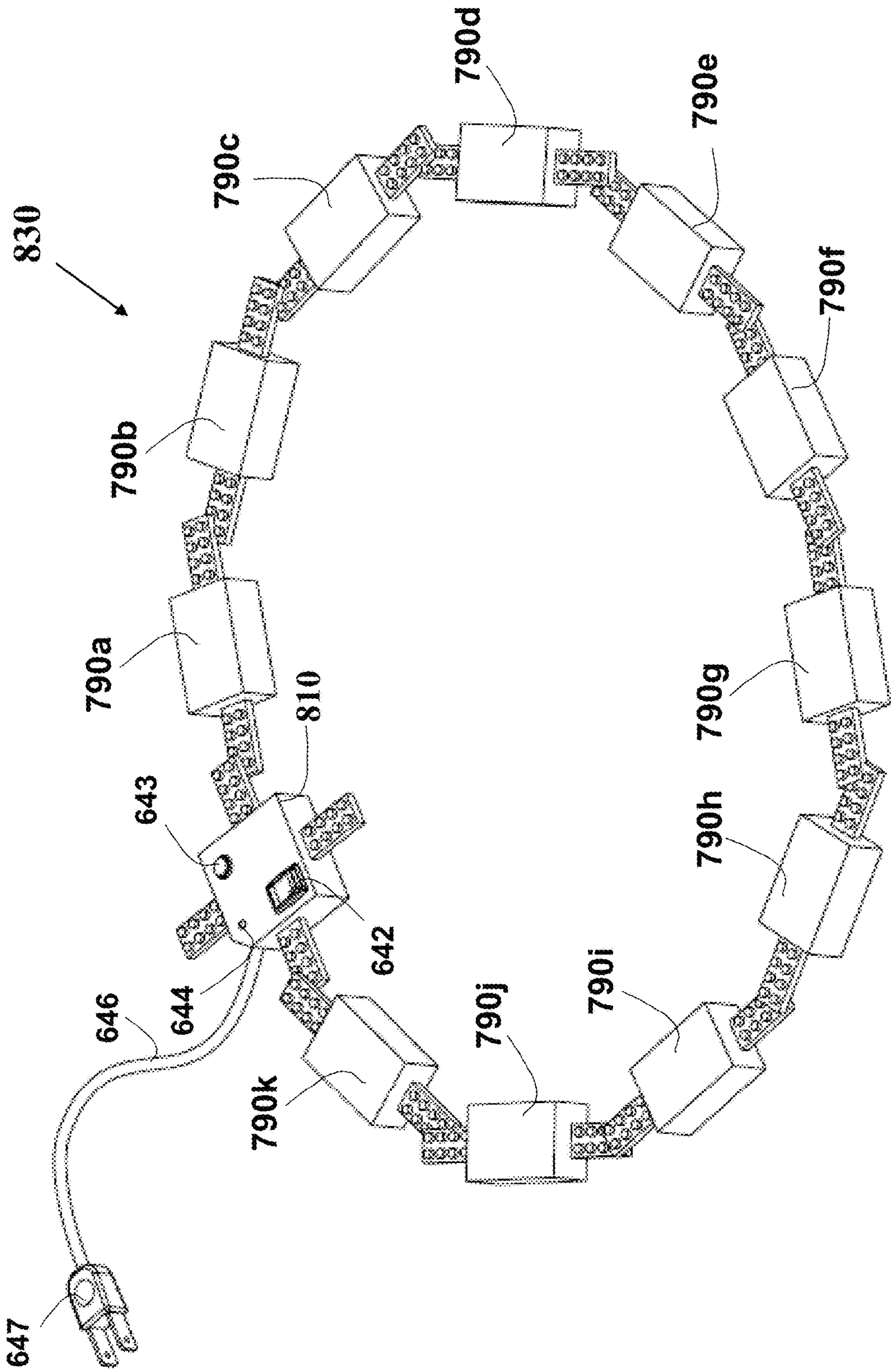
Figure 84:
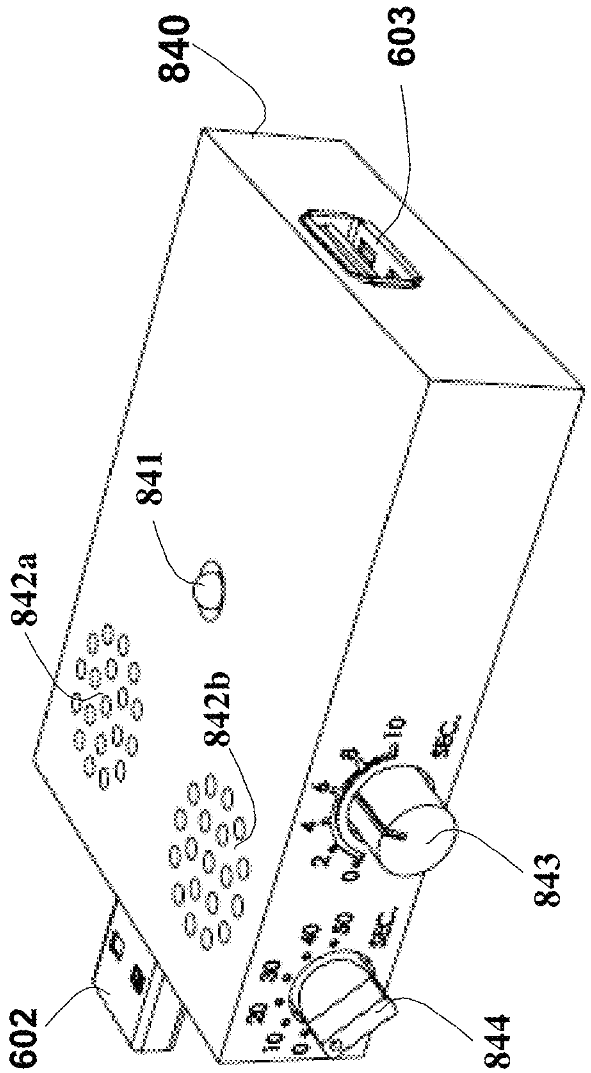
Figure 85:
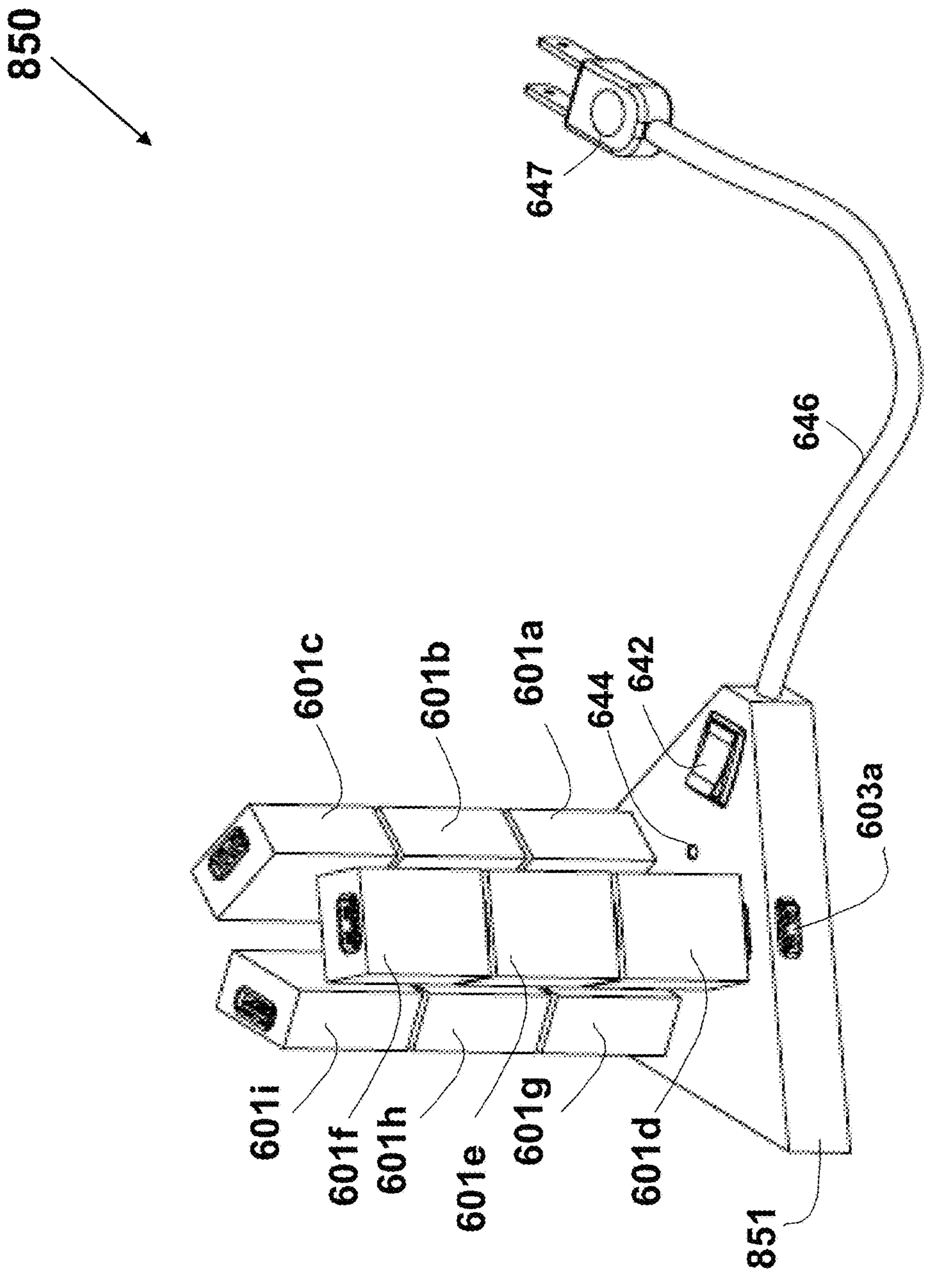
Figure 86:
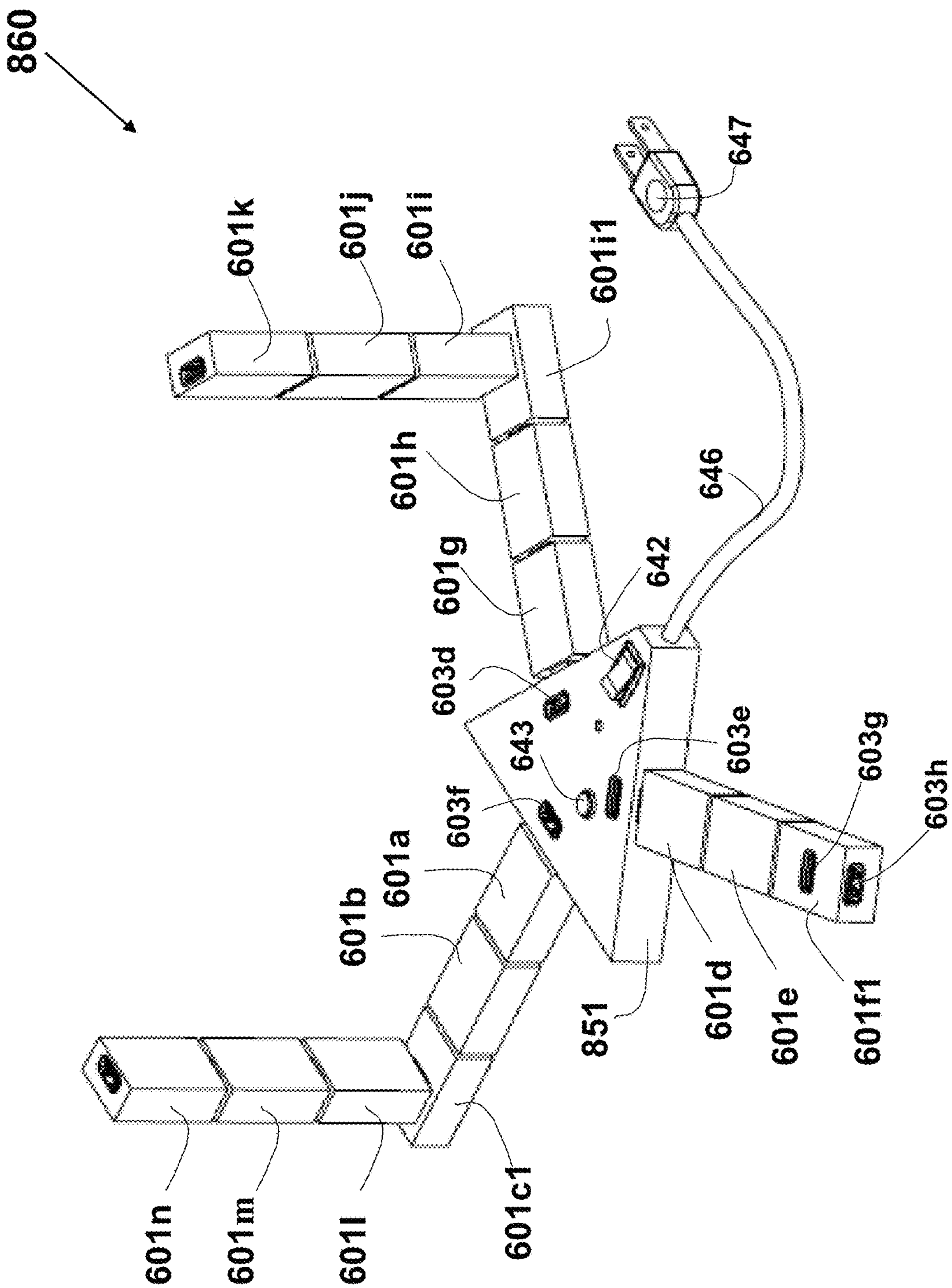
Figure 87:
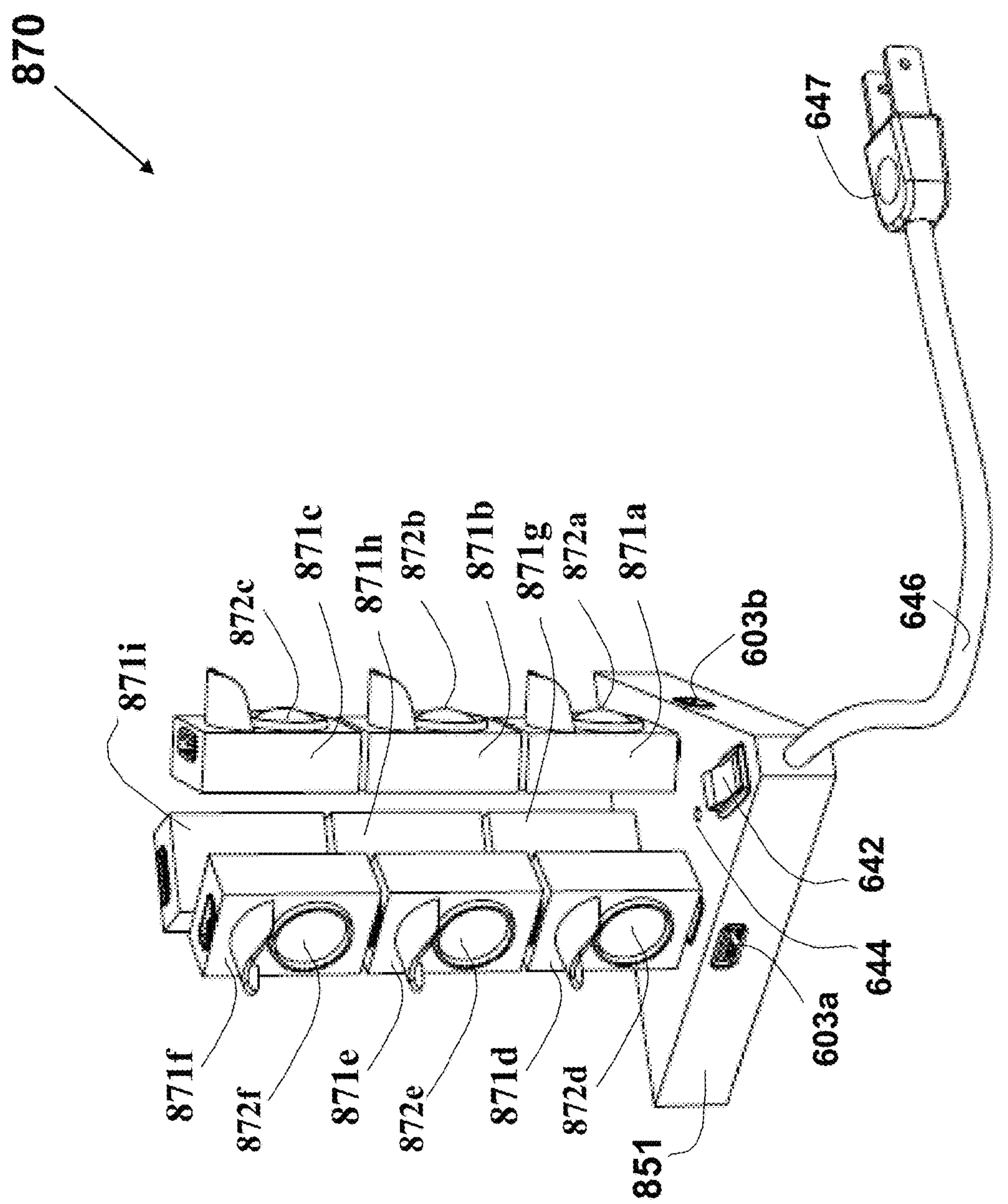
Figure 88:
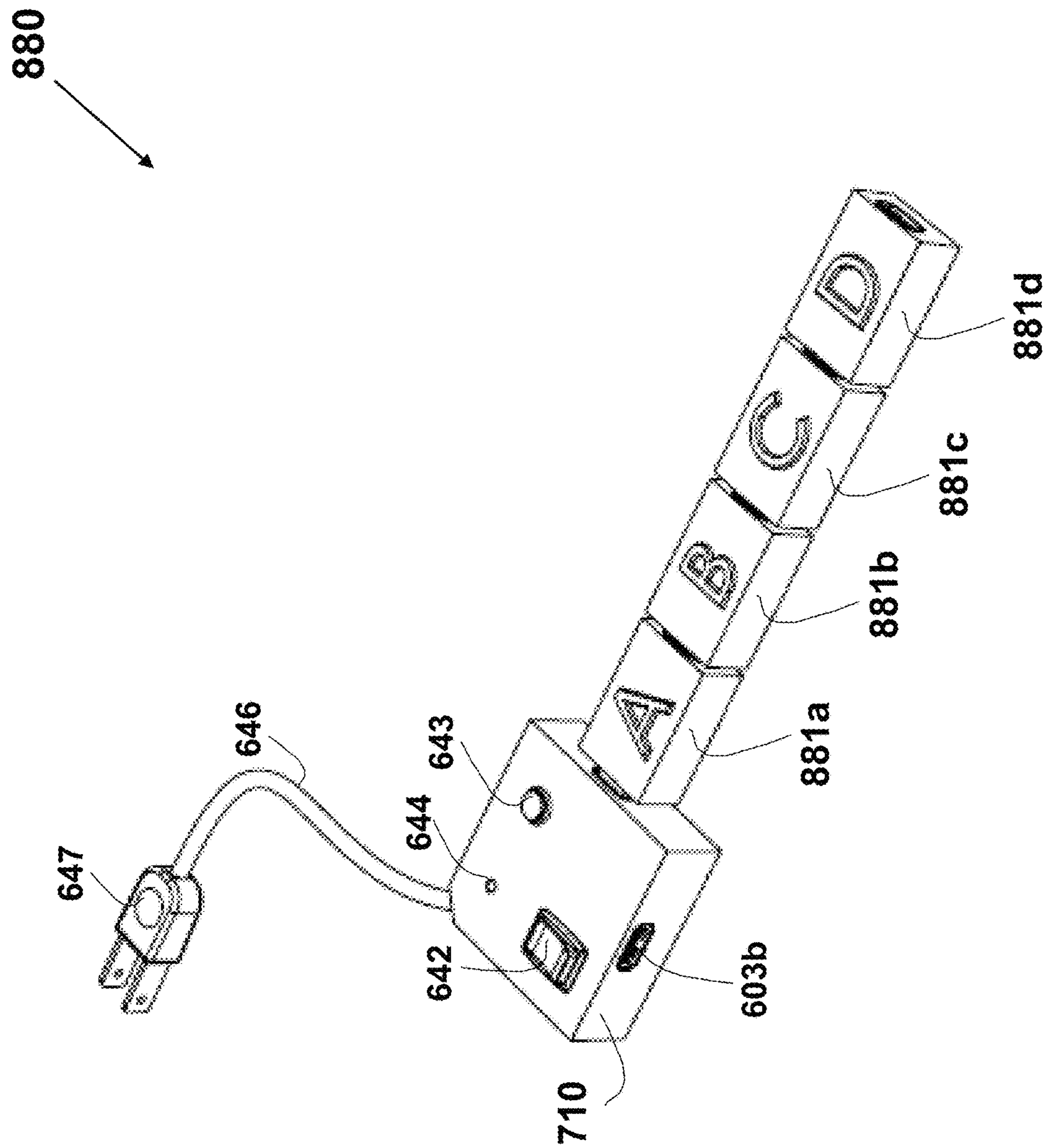
Figure 89:
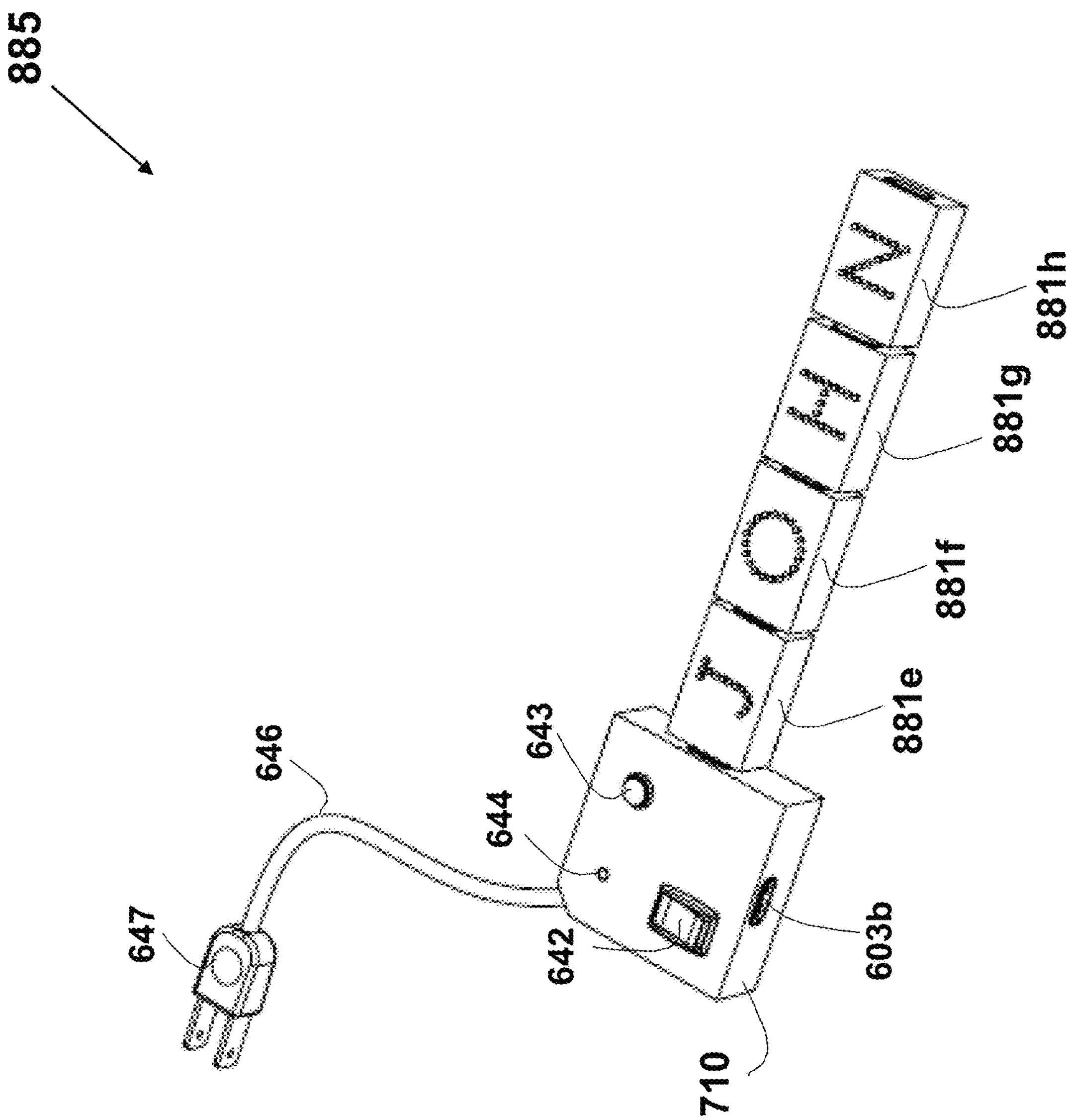
Figure 90:
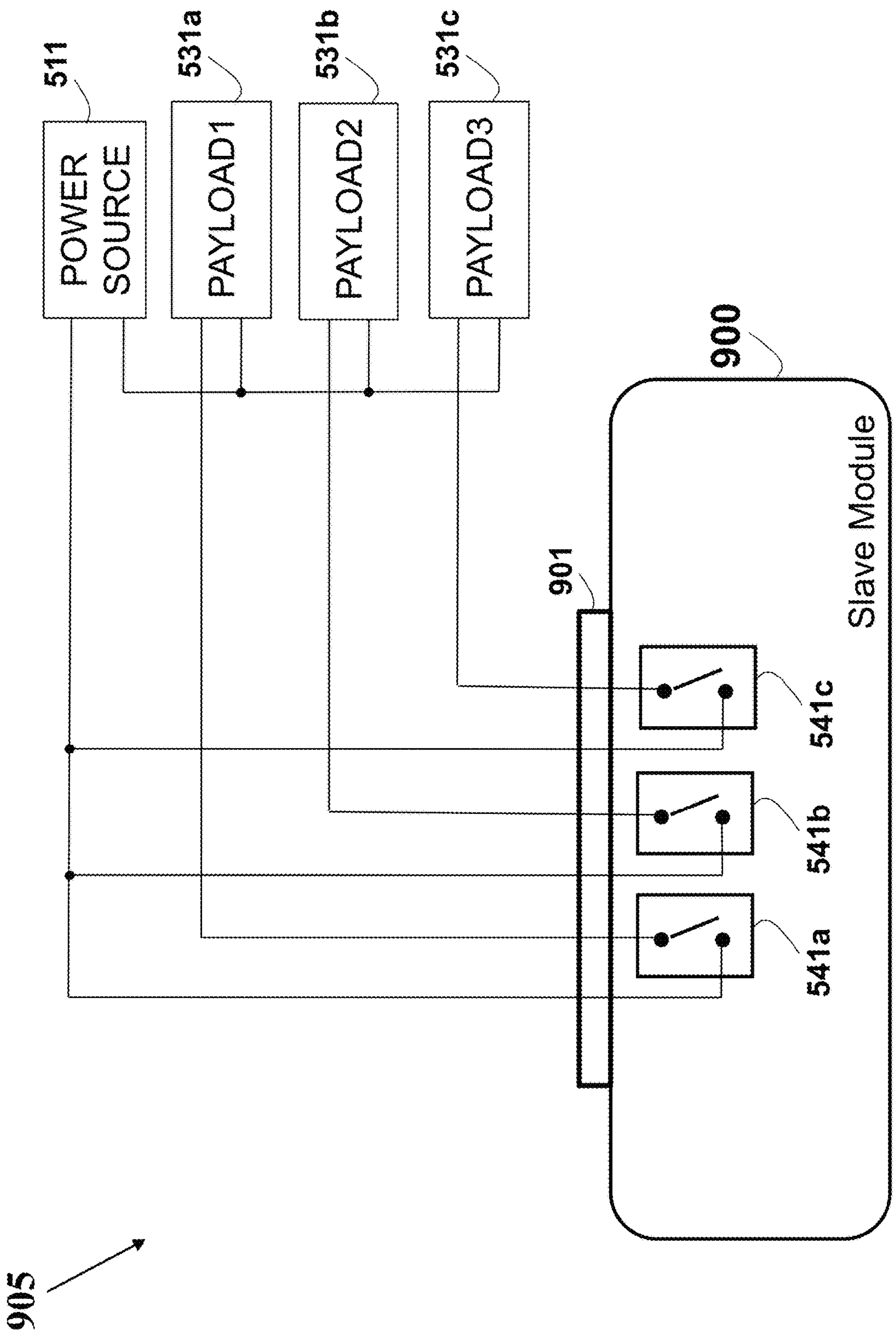
Figure 91:
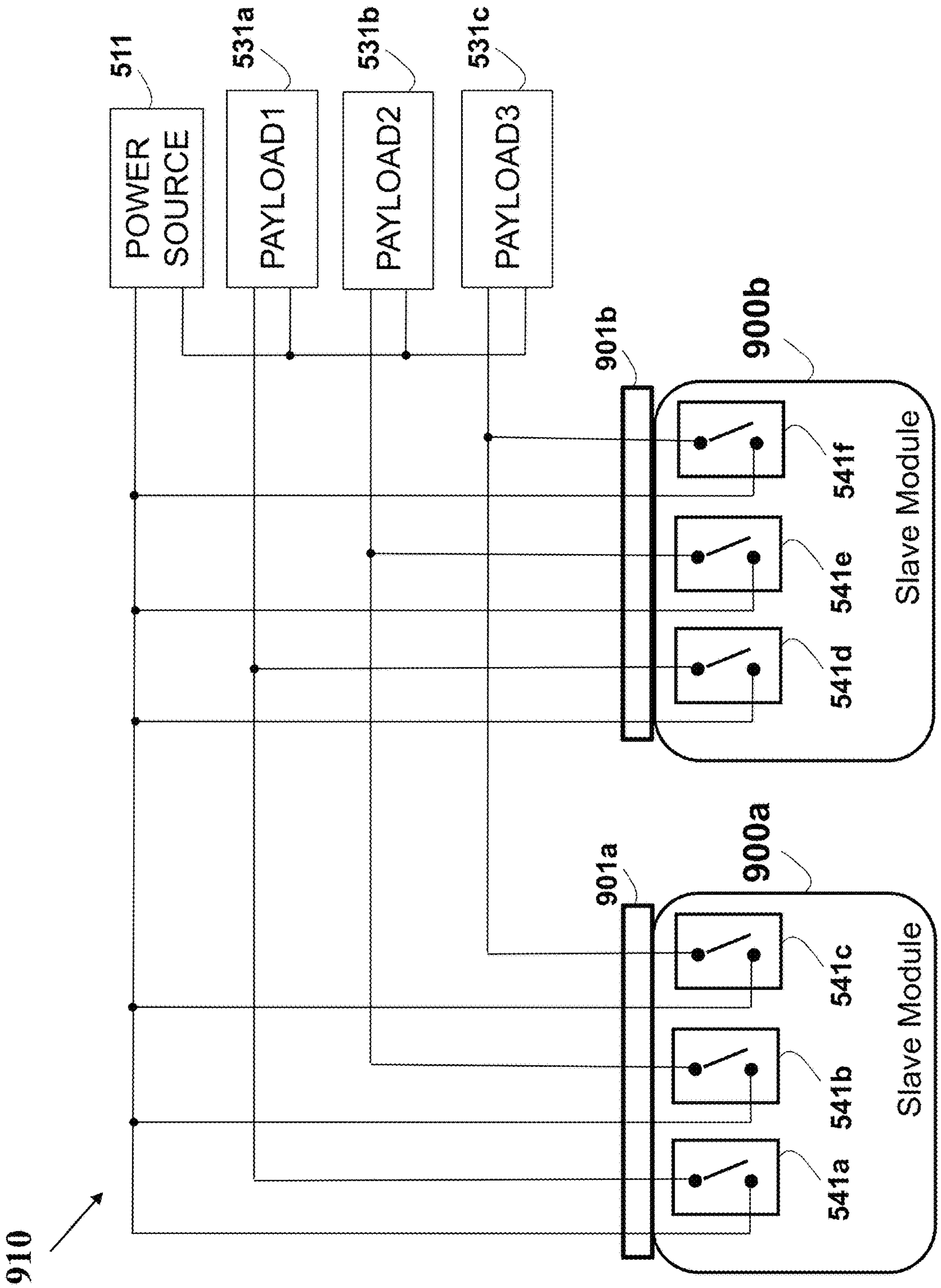
Figure 92:
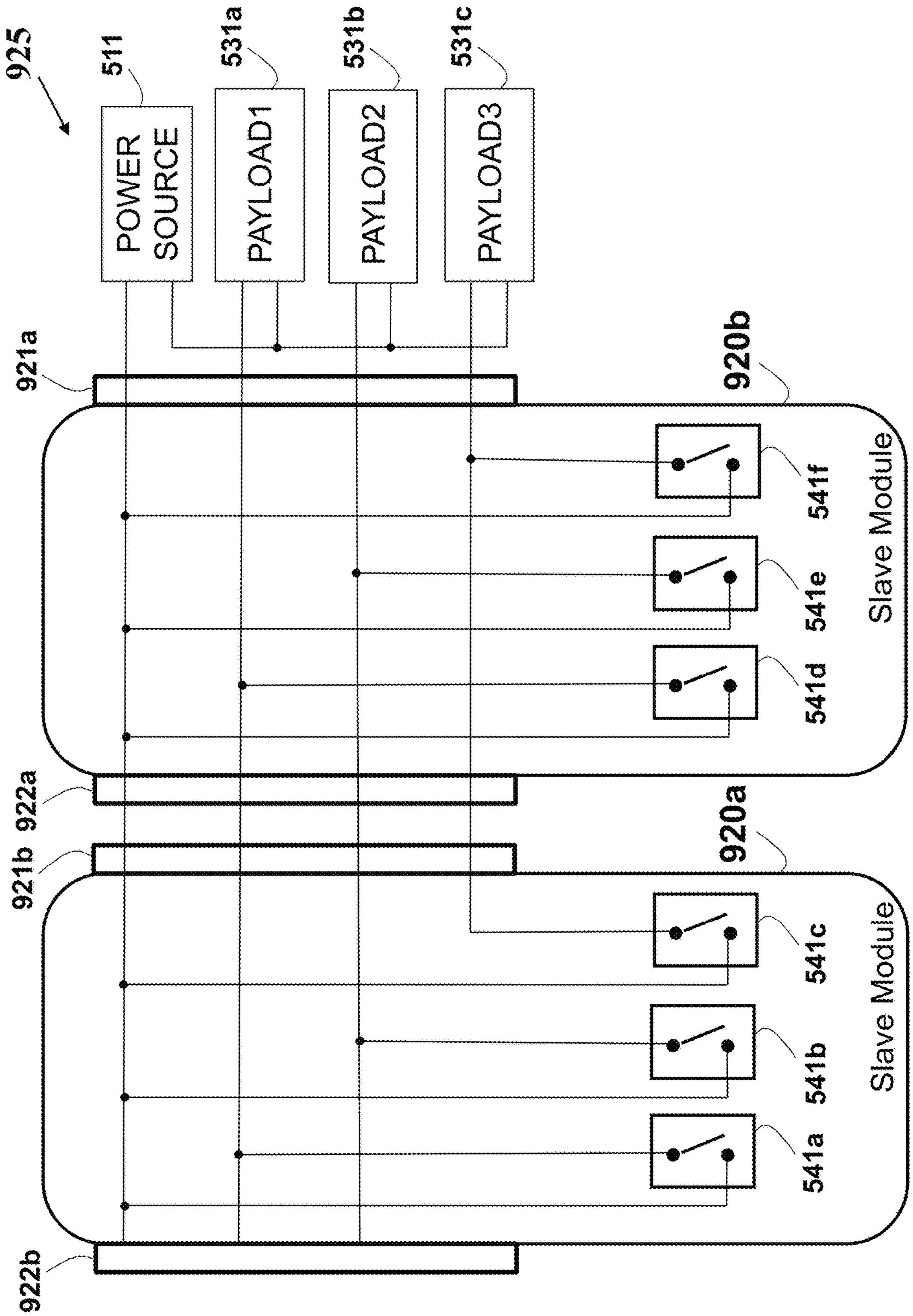
Figure 93:
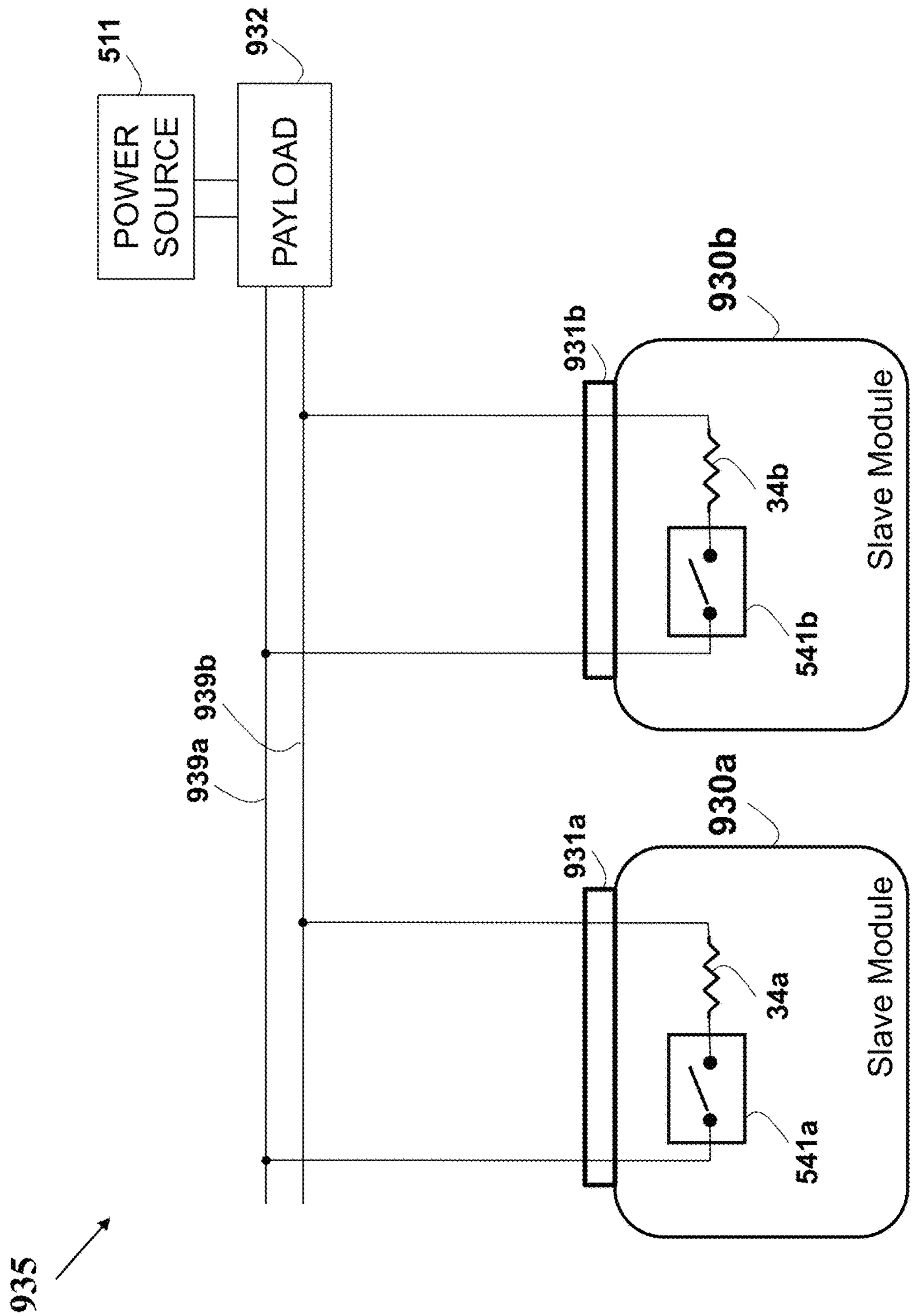
Figure 93A:
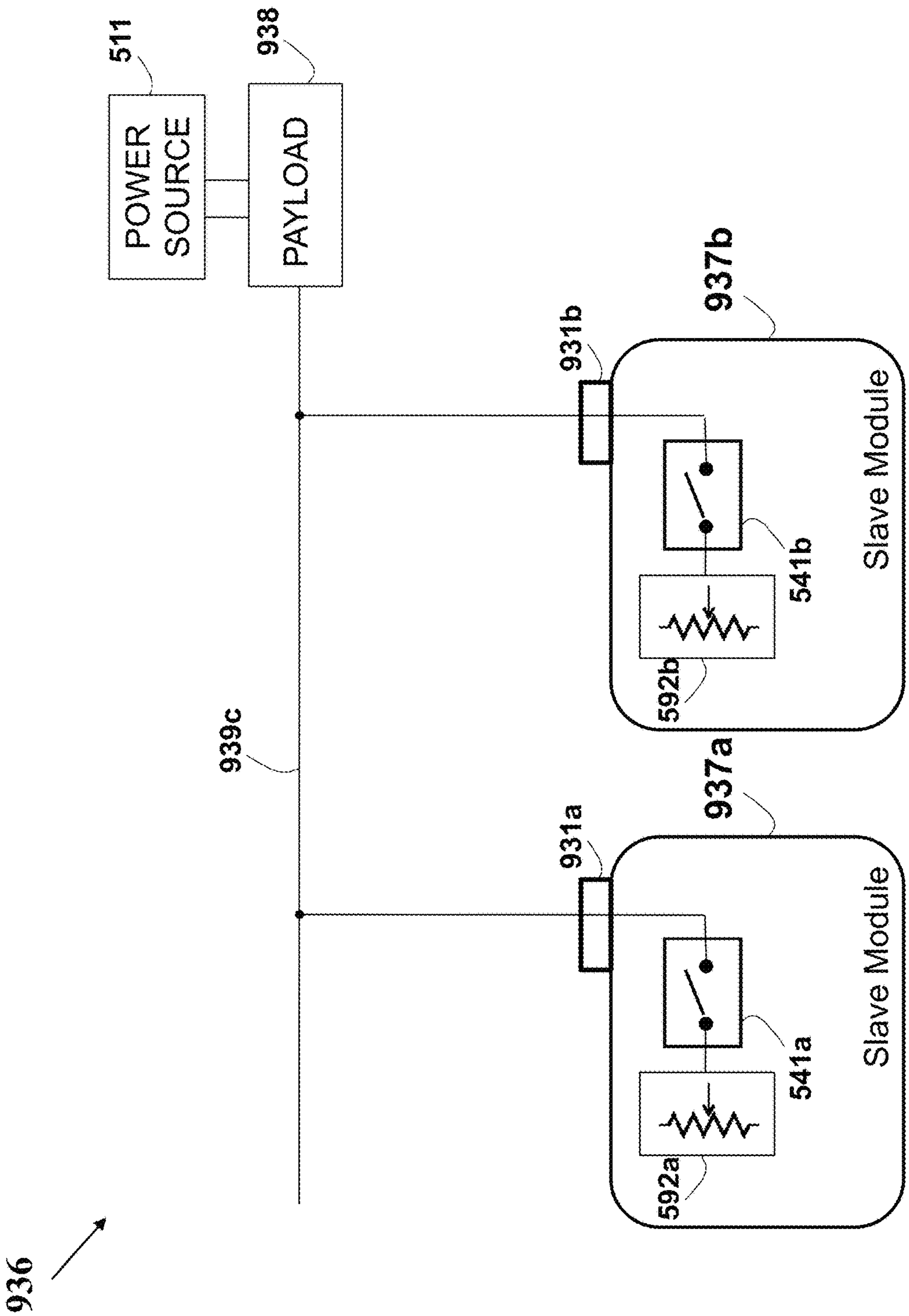
Figure 94:
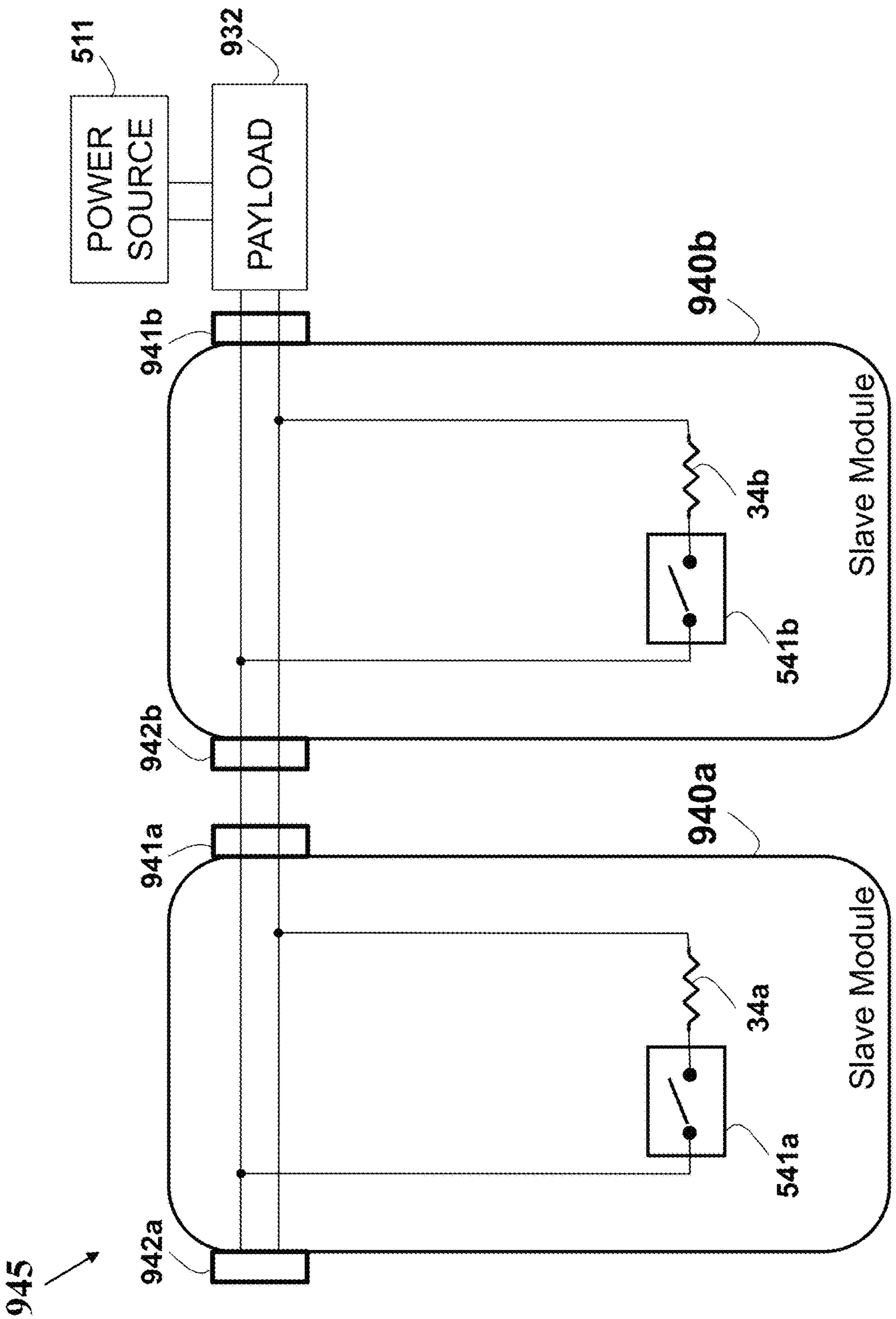
Figure 95:
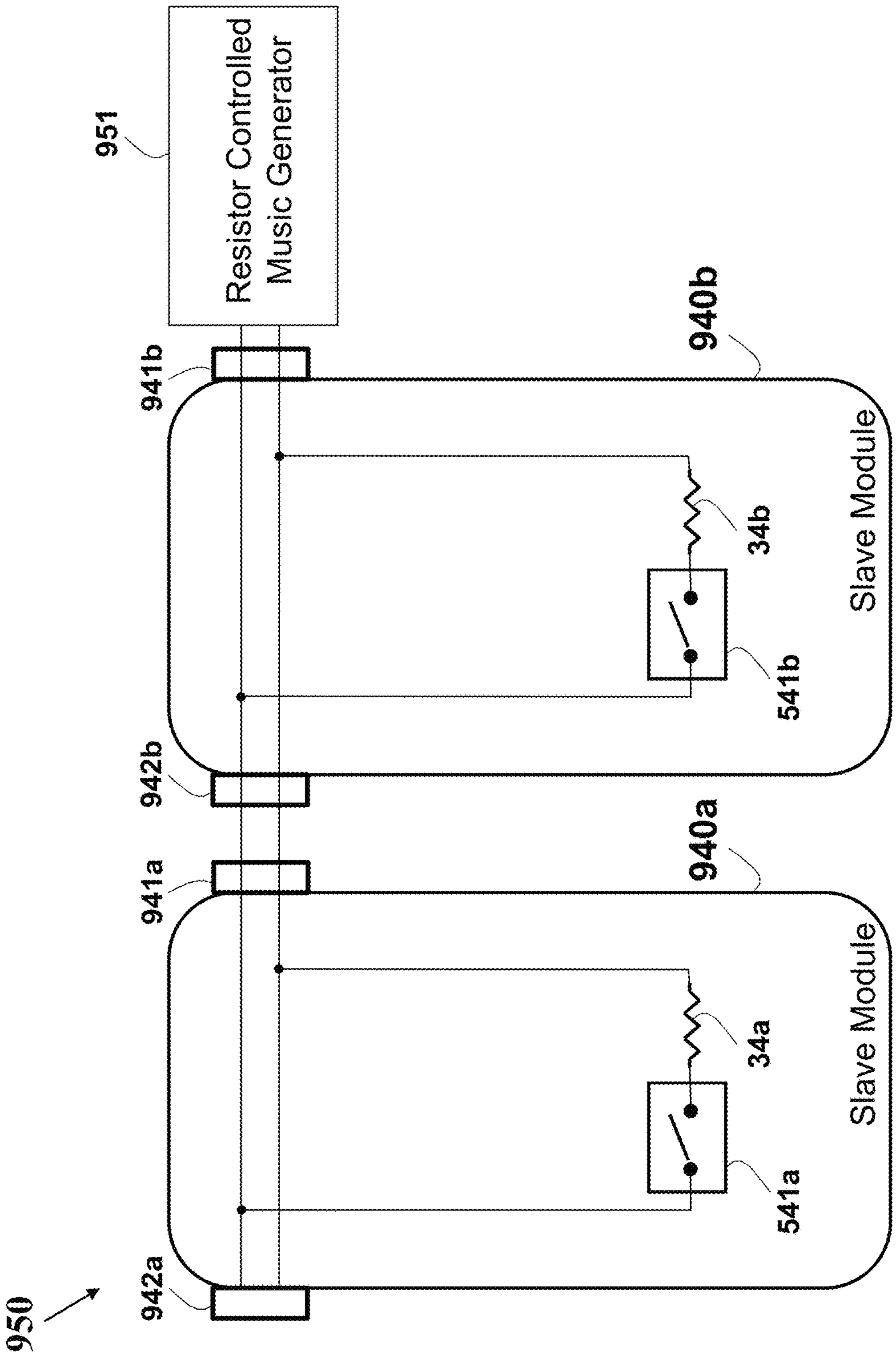
Figure 96:
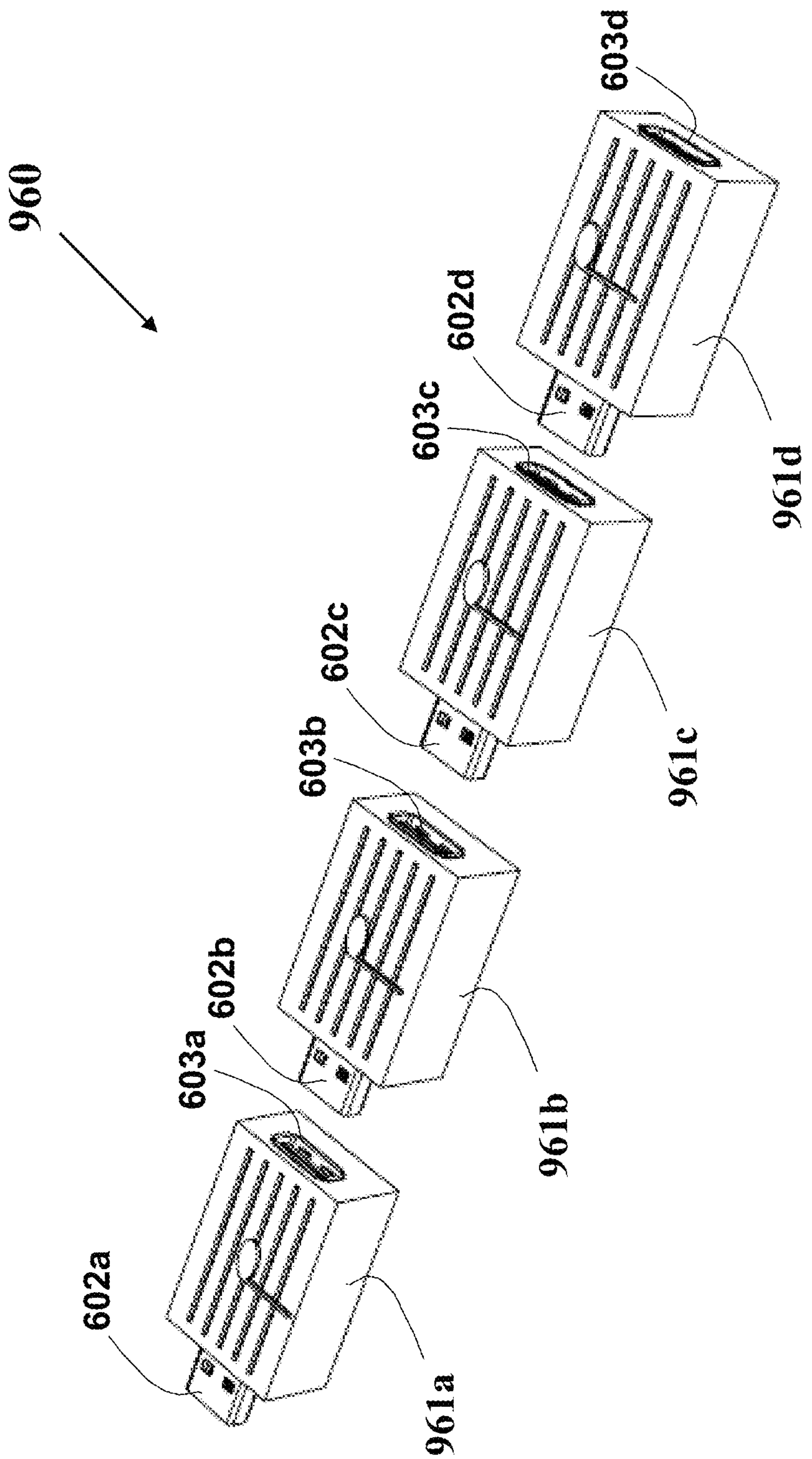
Figure 96A:
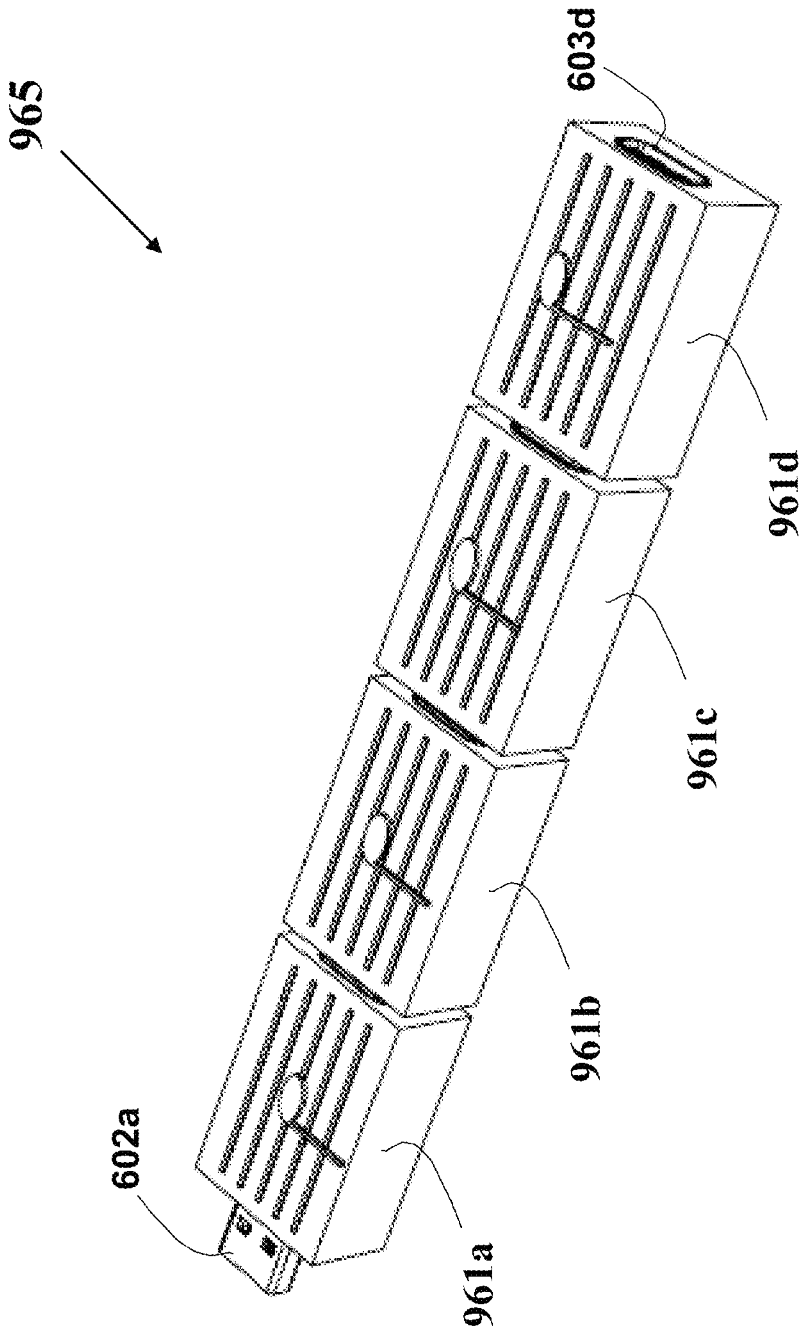
Figure 97:
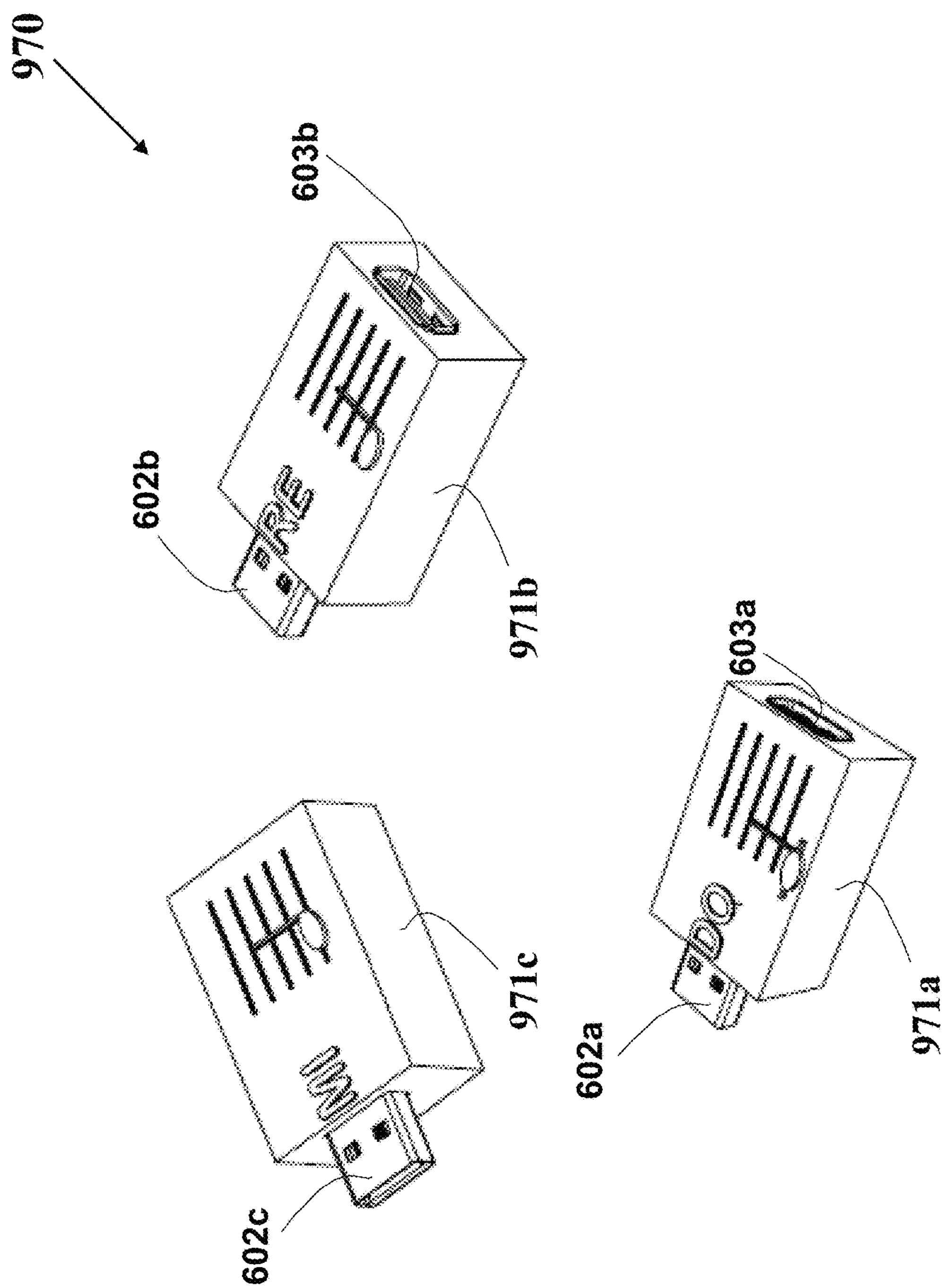
Figure 97A:
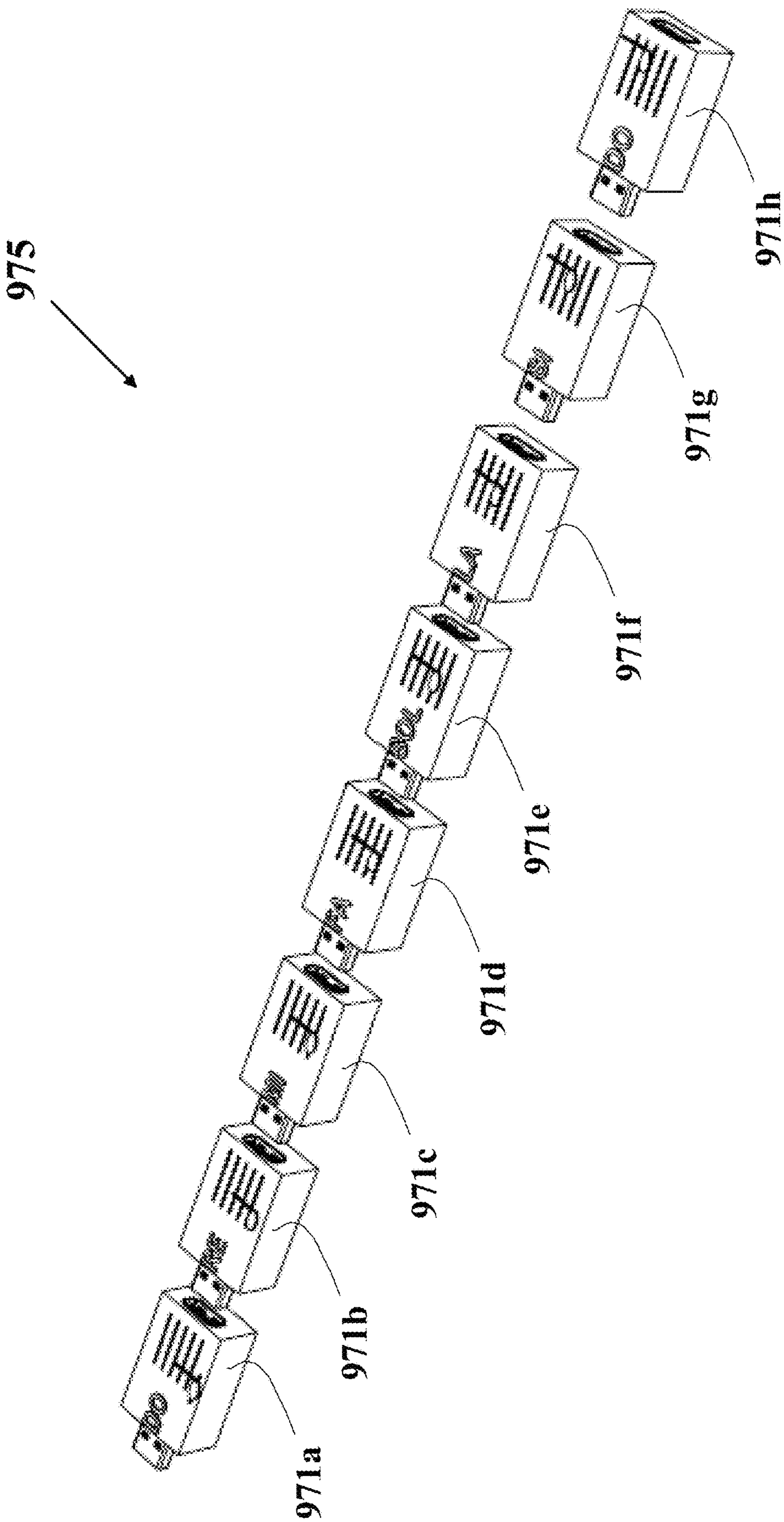
Figure 97B:
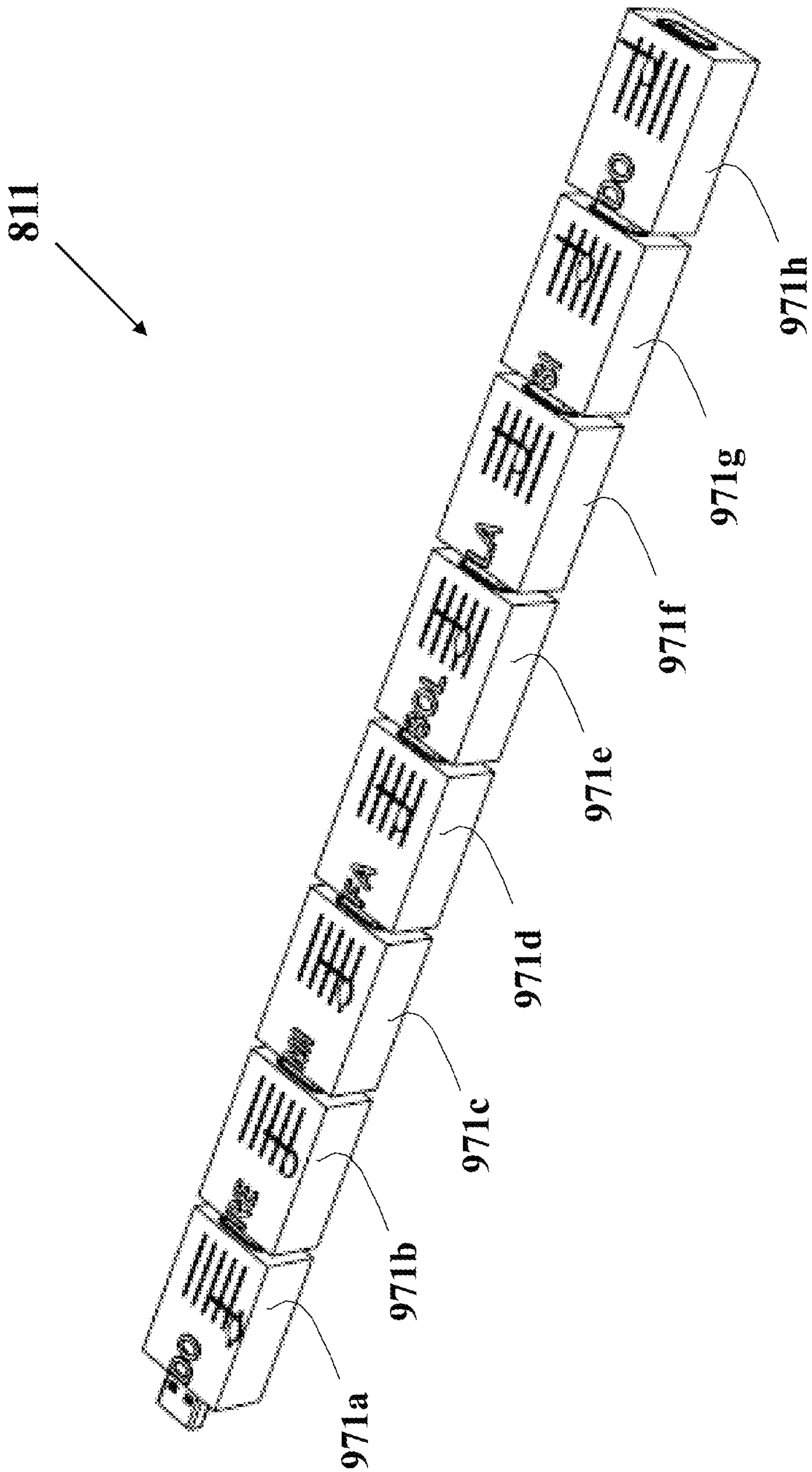
Figure 98:
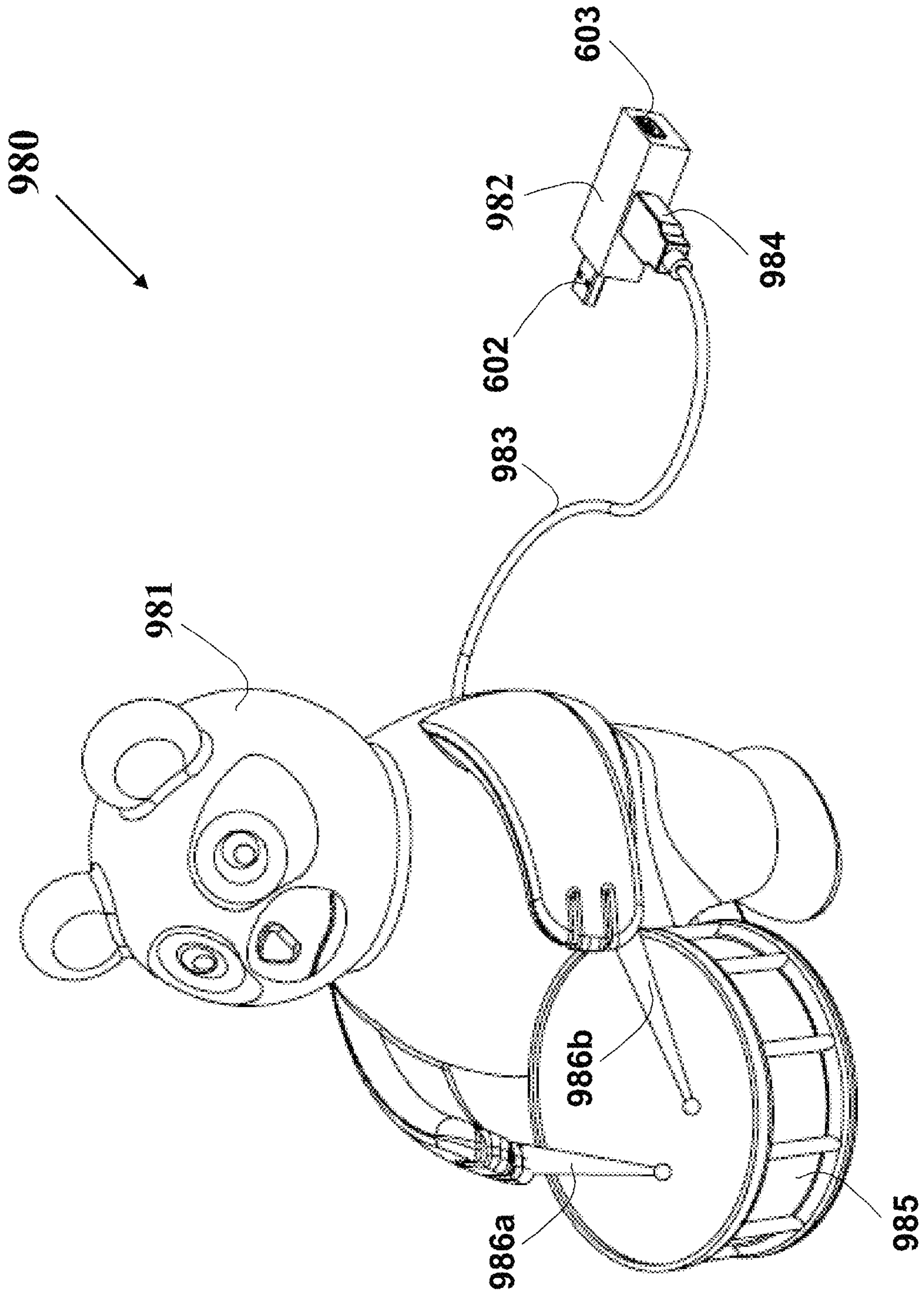
Figure 98A:
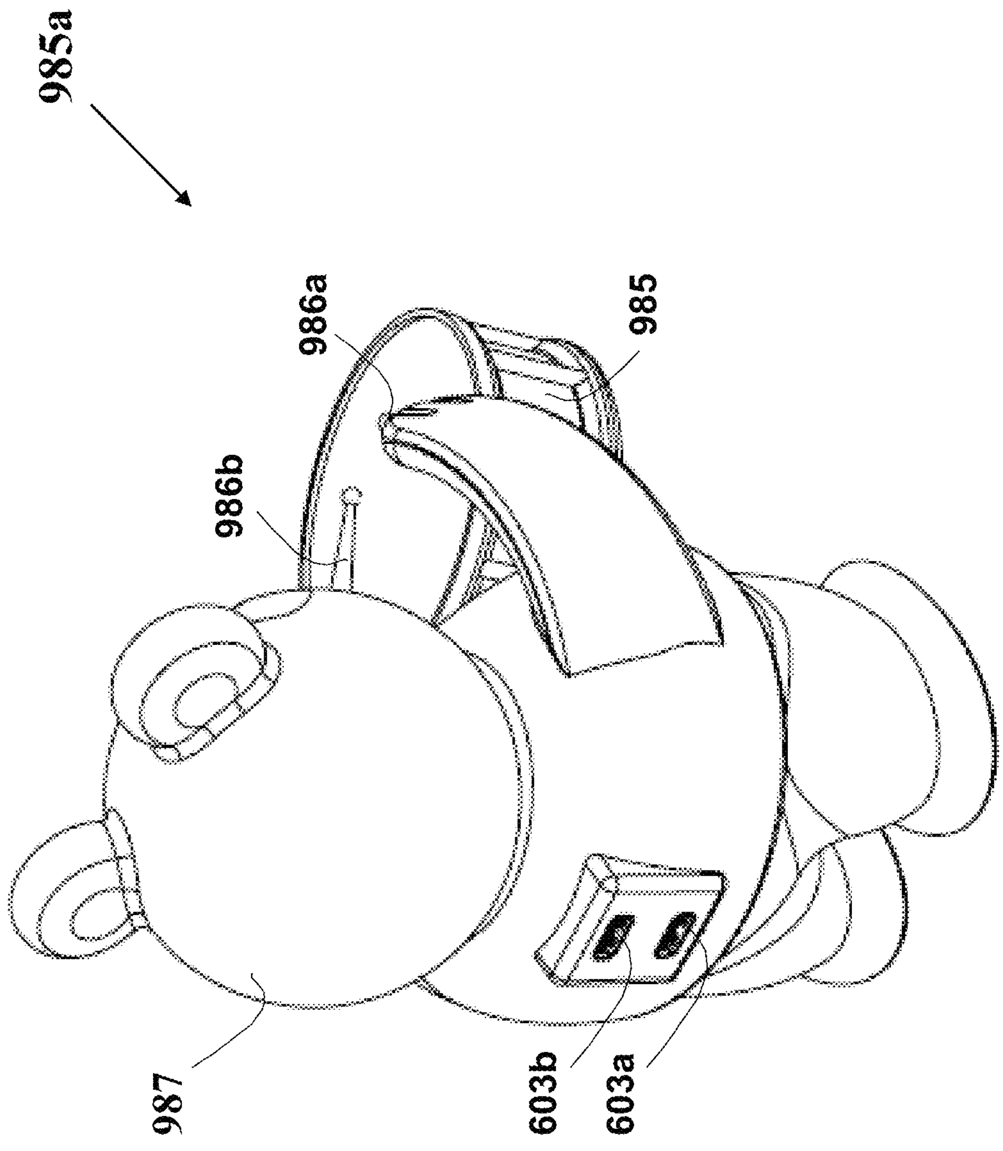
Figure 98B:
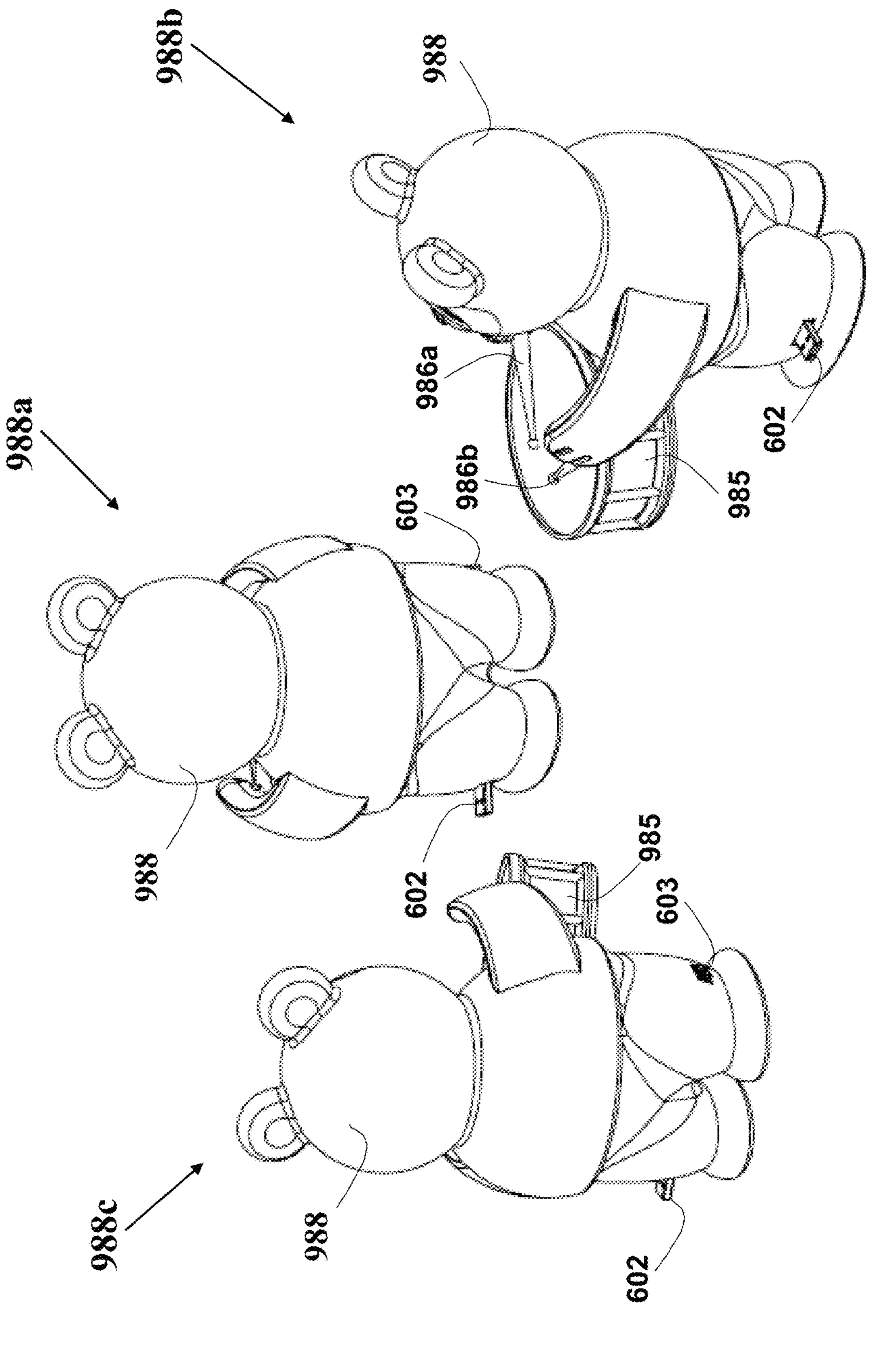
Figure 98C:
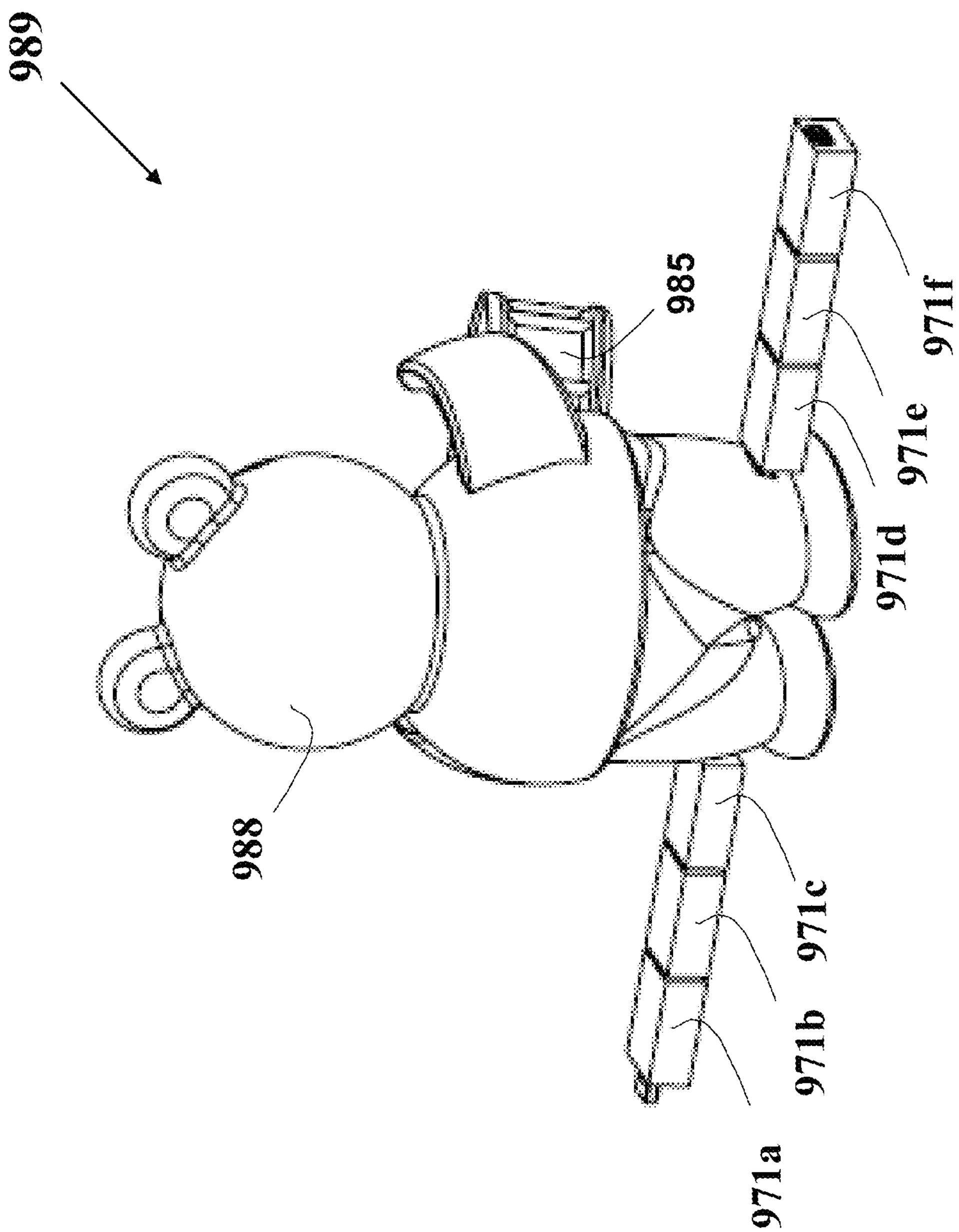
Figure 99:
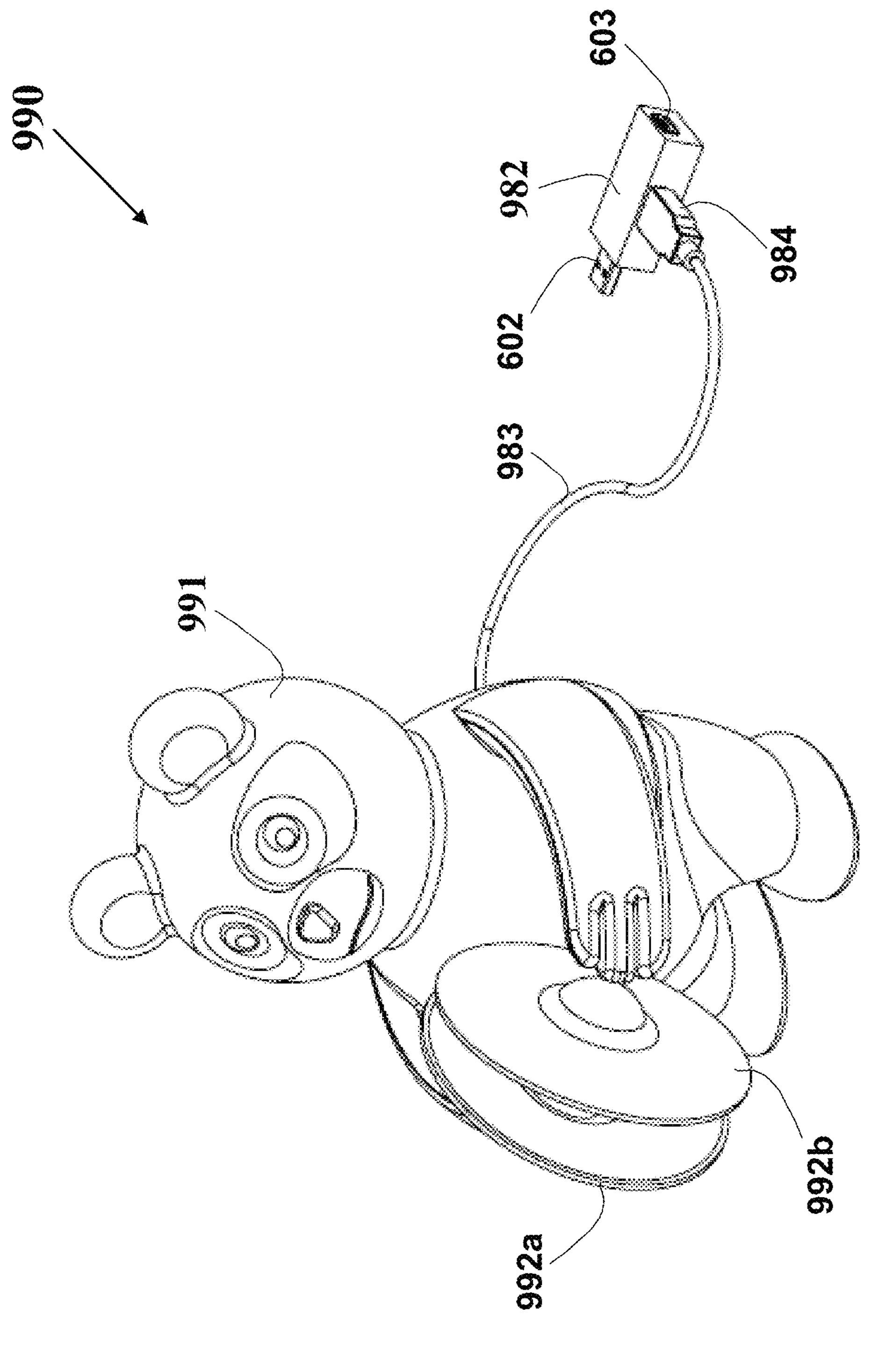
Figure 99A:
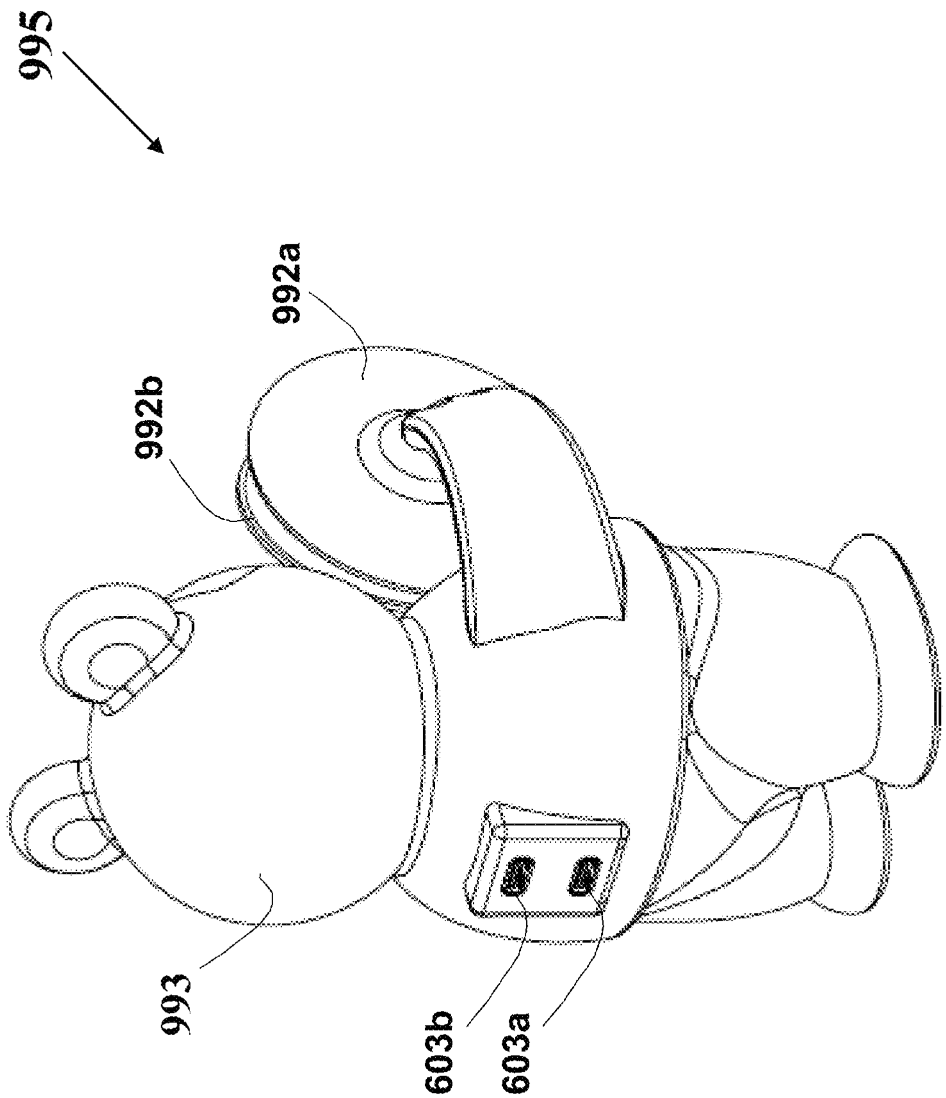

FIG. **5*a*** illustrates a schematic timing diagram relating to a system according to an aspect of the invention;

FIGS. **5*b*, 5*c*, 5*d* and 5*e*** illustrate a schematic timing table relating to a system according to various aspects of the invention;

FIG. 6 illustrates a schematic electrical diagram of part of a splitter module according to an aspect of the invention;

FIG. 7 illustrates a schematic electrical diagram of part of a splitter module according to an aspect of the invention;

FIG. 8 illustrates a schematic electrical diagram of part of a splitter module according to an aspect of the invention;

FIG. 9 illustrates a schematic electrical diagram of part of a splitter module according to an aspect of the invention;

FIG. 10 illustrates a schematic electrical diagram of part of a splitter module according to an aspect of the invention;

FIG. 11 illustrates a schematic electrical diagram of part of a slave/splitter module according to an aspect of the invention;

FIG. 12 illustrates a schematic electrical diagram of part of a system according to an aspect of the invention;

FIG. 13 illustrates a schematic electrical diagram of part of a system according to an aspect of the invention;

FIG. **14*a*** illustrates a schematic electrical diagram of part of a master module according to an aspect of the invention;

FIG. **14*b*** illustrates a schematic electrical diagram of part of a master module according to an aspect of the invention;

FIG. 15 illustrates a schematic electrical diagram of part of a master module according to an aspect of the invention;

FIG. 16 illustrates a schematic electrical diagram of part of a master module according to an aspect of the invention;

FIG. 17 illustrates a schematic electrical diagram of part of a system employing a master module according to an aspect of the invention;

FIG. 18 illustrates a schematic electrical diagram of part of a system employing a master module according to an aspect of the invention;

FIG. 18*a* illustrates a schematic electrical diagram of part of a system employing a master module according to an aspect of the invention;

FIGS. 19, 19*a* and 19*b* illustrate a schematic electrical diagram of part of a master module according to an aspect of the invention;

FIGS. 20, 20*a*, 20*b* and 20*c* illustrate a schematic electrical diagram of part of a 2-way slave module according to an aspect of the invention;

FIGS. 21, 21*a* and 21*b* illustrate a schematic electrical diagram of part of a 2-way slave module having a single payload according to an aspect of the invention;

FIG. 21*c* illustrates a schematic electrical diagram of part of a 2-way slave module according to an aspect of the invention;

FIG. 21*d* illustrates a schematic electrical diagram of part of two connected 2-way slave modules according to an aspect of the invention;

FIG. 21*e* illustrates a schematic electrical diagram of part of a 2-way slave module according to an aspect of the invention;

FIG. 22 illustrates a schematic electrical diagram of part of a system using 2-way slave modules according to an aspect of the invention;

FIGS. 22*a*, 22*b* and 22*c* illustrate a schematic timing table relating to a system according to various aspects of the invention;

FIG. 23 illustrates a schematic electrical diagram of part of a loopback module according to an aspect of the invention;

FIG. 24 illustrates a schematic electrical diagram of part of a system using 2-way slave modules, a master module and a loopback module according to an aspect of the invention;

FIGS. 24*a*, 24*b* and 24*c* illustrate a schematic timing table relating to a 2-way system according to various aspects of the invention;

FIG. 25 illustrates a schematic electrical diagram of part of a 2-way splitter module according to an aspect of the invention;

FIG. 25*a* illustrates a schematic electrical diagram of part of a 2-way slave/splitter module according to an aspect of the invention;

FIG. 25*b* illustrates a schematic electrical diagram of part of a 2-way slave/splitter module according to an aspect of the invention;

FIG. 26 illustrates a schematic electrical diagram of part of a system using 2-way slave modules, a master module, a 2-way slave/splitter module and a loopback module according to an aspect of the invention;

FIG. 26*a* illustrates a schematic timing table relating to a 2-way system according to various aspects of the invention;

FIG. 27 illustrates a schematic electrical diagram of part of a system using 2-way slave modules, a master module, a 2-way slave/splitter module and a loopback module according to an aspect of the invention;

FIG. 27*a* illustrates a schematic timing table relating to a 2-way system according to various aspects of the invention;

FIG. 28 illustrates a schematic electrical diagram of part of a 2-way master module according to an aspect of the invention;

FIG. 29 illustrates a schematic electrical diagram of part of a system using 2-way slave modules, a 2-way master module and a loopback module according to an aspect of the invention;

FIG. 29*a* illustrates a schematic timing table relating to a 2-way system according to various aspects of the invention;

FIG. 29*b* illustrates a schematic timing table relating to a 2-way system according to various aspects of the invention;

FIG. 30 illustrates a schematic electrical diagram of part of a 2-way master module according to an aspect of the invention;

FIG. 31 illustrates a schematic electrical diagram of part of a system using 2-way slave modules, a 2-way splitter module, a 2-way master module and a loopback module according to an aspect of the invention;

FIG. 31*a* illustrates a schematic electrical diagram of part of a system using 2-way slave modules, a 2-way splitter module and two 2-way master modules according to an aspect of the invention;

FIG. 32 illustrates schematic timing diagrams relating to a payload control according to various aspects of the invention;

FIG. 32*a* illustrates a schematic electrical diagram of part of a module according to an aspect of the invention;

FIG. 32*b* illustrates a schematic electrical diagram of part of a module according to an aspect of the invention;

FIG. 33 illustrates a schematic electrical diagram of part of a battery-powered slave module according to an aspect of the invention;

FIG. 33*a* illustrates a schematic electrical diagram of part of an externally-powered slave module according to an aspect of the invention;

FIG. 34 illustrates a schematic electrical diagram of part of a remotely-powered slave module according to an aspect of the invention;

FIG. 35 illustrates a schematic electrical diagram of part of a battery-powered powering module according to an aspect of the invention;

FIG. 36 illustrates a schematic electrical diagram of part of an externally powered powering module according to an aspect of the invention;

FIG. 37 illustrates a schematic electrical diagram of part of an AC-powered powering module according to an aspect of the invention;

FIG. 38 illustrates a schematic electrical diagram of part of the power related circuits of a splitter module according to an aspect of the invention;

FIG. 39 illustrates a schematic electrical diagram of part of the power related circuits of a master module according to an aspect of the invention;

FIG. 40 illustrates a schematic electrical diagram of part of a remote powered system using 2-way slave modules, a master module, a powering module, a 2-way slave/splitter module and a loopback module according to an aspect of the invention;

FIG. 41 illustrates a schematic electrical diagram of part of the power related circuits of an AC powered powering/master module according to an aspect of the invention;

FIG. 42 illustrates a schematic electrical diagram of part of the power related circuits of a battery powered powering/master module according to an aspect of the invention;

FIG. 43 illustrates a schematic electrical diagram of part of a remotely powered slave module according to an aspect of the invention;

FIG. 44 illustrates a schematic electrical diagram of part of a powering module for a remote powered system according to an aspect of the invention;

FIG. 45 illustrates a schematic electrical diagram of part of a powering/master module for a remote powered system according to an aspect of the invention;

FIG. 46 illustrates a schematic electrical diagram of part of a loopback module for a remote powered system according to an aspect of the invention;

FIG. 47 illustrates a schematic electrical diagram of part of a power/data splitter/combiner for a remote powered system according to an aspect of the invention;

FIG. 48 illustrates a schematic electrical diagram of part of a power/data splitter/combiner for a remote powered system according to an aspect of the invention;

FIG. 49 illustrates a schematic electrical diagram of part of a power/data splitter/combiner for a remote powered system according to an aspect of the invention;

FIG. 50 illustrates a schematic electrical diagram of part of a slave module for a remote powered system according to an aspect of the invention;

FIG. 51 illustrates a schematic electrical diagram of part of a slave module for a remote powered system according to an aspect of the invention;

FIG. 52 illustrates a schematic electrical diagram of part of a slave module for a remote powered system powering external payload according to an aspect of the invention;

FIG. 53 illustrates a schematic electrical diagram of part of a slave module for a remote powered system controlling external payload according to an aspect of the invention;

FIG. 54 illustrates a schematic electrical diagram of part of a slave module for a remote powered system controlling external payload according to an aspect of the invention;

FIG. 55 illustrates a schematic electrical diagram of part of a slave module for a remote powered system controlling and powering external payload according to an aspect of the invention;

FIG. 56 illustrates a schematic electrical diagram of part of a slave module using random delay according to an aspect of the invention;

FIG. 57 illustrates a schematic electrical diagram of part of a slave module using random delay according to an aspect of the invention;

FIGS. 58 and 58*a* illustrate a schematic electrical diagram of part of a slave module using random delay according to an aspect of the invention;

FIGS. 59 and 59*a* illustrate a schematic electrical diagram of part of a slave module using random payload control according to an aspect of the invention;

FIG. 59*b* illustrates a schematic electrical diagram of part of a slave module using random payload selection according to an aspect of the invention;

FIG. 60 depicts a perspective pictorial top view of a module enclosure according to an aspect of the invention;

FIG. 61 depicts a perspective pictorial top view of two slave modules according to an aspect of the invention;

FIG. 61*a* depicts a perspective pictorial side view of two slave modules according to an aspect of the invention;

FIG. 62 depicts a perspective pictorial side view of two connected slave modules according to an aspect of the invention;

FIG. 62*a* depicts a perspective pictorial top view of three connected slave modules according to an aspect of the invention;

FIGS. 63 and 63*a* depict a perspective pictorial top view of two splitter modules according to an aspect of the invention;

FIG. 64 depicts a perspective pictorial top view of a battery-powered slave module according to an aspect of the invention;

FIGS. 64*a* and 64*b* depict a perspective pictorial top view an AC-powered master module according to an aspect of the invention;

FIGS. 65 and 65*a* depict a perspective pictorial top view of a system including a master module and three slave modules according to an aspect of the invention;

FIGS. 66 and 66*a* depict a perspective pictorial top view of a system including a master module and a splitter module according to an aspect of the invention;

FIGS. 67 and 67*a* depict a perspective pictorial top view of a system including a master module, two splitter modules and slave modules according to an aspect of the invention;

FIGS. 68 and 68*a* depict a perspective pictorial top view an AC-powered master/splitter module according to an aspect of the invention;

FIG. 69 depicts a perspective pictorial top view of a triangle-shaped AC-powered master/splitter module according to an aspect of the invention;

FIG. 70 depicts a perspective pictorial top view of a system including a master/splitter module connected to three branches according to an aspect of the invention;

FIG. 71 depicts a perspective pictorial top view of a square-shaped AC-powered master/splitter module according to an aspect of the invention;

FIG. 72 depicts a perspective pictorial top view of a system including a master/splitter module connected to four branches according to an aspect of the invention;

FIG. 73 depicts a perspective pictorial top view of a round-shaped AC-powered master/splitter module according to an aspect of the invention;

FIG. 74 depicts a perspective pictorial top view of a system including a master/splitter module connected to five branches according to an aspect of the invention;

FIGS. 75 and 75*a* depict a perspective pictorial view of a duck shaped modules according to an aspect of the invention;

FIG. 76 depicts a perspective pictorial view of a system including duck shaped modules according to an aspect of the invention;

FIGS. 77 and 77*a* depict perspective pictorial views of a locomotive and train-car shaped modules according to an aspect of the invention;

FIGS. 78 and 78*a* depict perspective pictorial views of a train shaped system according to an aspect of the invention;

FIG. 79 depicts pictorial views of a slave module using LEGO® strips according to an aspect of the invention;

FIGS. 80, 80*a* and 80*b* depict pictorial views of connected slave module using LEGO® strips according to an aspect of the invention;

FIG. 81 depicts a perspective pictorial view of a master module with LEGO® strips according to an aspect of the invention;

FIG. 82 depicts a perspective pictorial view of a system using a master module with LEGO® strips according to an aspect of the invention;

FIG. 83 depicts a perspective pictorial view of a system using a master module with LEGO® strips according to an aspect of the invention;

FIG. 84 depicts a perspective pictorial view of a slave module with multiple payloads and user controls according to an aspect of the invention;

FIG. 85 depicts a perspective pictorial view of a 3-D system according to an aspect of the invention;

FIG. 86 depicts a perspective pictorial view of a 3-D system according to an aspect of the invention;

FIG. 87 depicts a perspective pictorial view of a traffic-lights shaped 3-D system according to an aspect of the invention;

FIG. 88 depicts a perspective pictorial view of a signage system example according to an aspect of the invention;

FIG. 89 depicts a perspective pictorial view of a signage system example according to an aspect of the invention;

FIG. 90 illustrates a schematic electrical diagram of part of a slave module connected to control multiple payloads according to an aspect of the invention;

FIG. 91 illustrates a schematic electrical diagram of part of slave modules connected to control multiple payloads according to an aspect of the invention;

FIG. 92 illustrates a schematic electrical diagram of part of slave modules connected to control multiple payloads according to an aspect of the invention;

FIG. 93 illustrates a schematic electrical diagram of part of slave modules connected to control a payload according to an aspect of the invention;

FIG. 93*a* illustrates a schematic electrical diagram of part of slave modules connected to a control a payload according to an aspect of the invention;

FIG. 94 illustrates a schematic electrical diagram of part of slave modules connected to control a payload according to an aspect of the invention;

FIG. 95 illustrates a schematic electrical diagram of part of slave modules connected to control a sound generator according to an aspect of the invention;

FIG. 96 depicts a perspective pictorial view of music slave modules according to an aspect of the invention;

FIG. 96*a* depicts a perspective pictorial view of connected music slave modules according to an aspect of the invention;

FIGS. 97 and 97*a* depict a perspective pictorial view of music slave modules according to an aspect of the invention;

FIG. 97*b* depicts a perspective pictorial view of connected music slave modules according to an aspect of the invention;

FIG. 98 depicts a perspective front pictorial view of a drum-beating toy connected to a slave module according to an aspect of the invention;

FIG. 98*a* depicts a perspective rear pictorial view of a drum-beating toy according to an aspect of the invention;

FIG. 98*b* depicts a perspective rear pictorial view of drum-beating toy slave modules according to an aspect of the invention;

FIG. 98*c* depicts a perspective rear pictorial view of drum-beating toy slave module connected to slave modules according to an aspect of the invention;

FIG. 99 depicts a perspective front pictorial view of a cymbals-beating toy connected to a slave module according to an aspect of the invention; and FIG. 99*a* depicts a perspective rear pictorial view of a cymbals-beating toy according to an aspect of the invention.

DETAILED DESCRIPTION

The principles and operation of a system according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and circuits. In the figures and descriptions, identical reference numerals indicate those components that are common to different embodiments or configurations. Identical numerical references (even in the case of using different suffix, such as 5, 5*a*, 5*b* and 5*c*) refer to functions or actual devices that are either identical, substantially similar or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

All directional references used herein (e.g., upper, lower, upwards, downwards, left, right, leftward, rightward, top, bottom, above, below, vertical, horizontal, clockwise, and counterclockwise, etc.) are only used for identification purposes to aid the reader's understanding of the present invention, and do not create limitations, particularly as to the position, orientation, or use of the invention. The terms 'left', 'former', 'upwards' and 'upstream' herein refer to a direction (such as a signal flow or signal direction) towards a master module. Similarly, the terms 'right', 'downwards', 'downstream' and 'next' refer to a direction or flow (such as signal flow or signal direction) away from the master module.

While the modules herein are described as connected using wires or conductors, any type of conductive transmission line can be equally used. The terms 'wire', 'conductor', 'line', 'transmission line', 'cable', 'wiring', 'wire pair' as used herein should be interpreted to include any type of conductive transmission-line, and specifically a metallic transmission line comprising two or more conductors used to carry electrical signals. Non-limiting examples are coaxial cable, PCB (Printed Circuit Board) connections and twisted pair, the latter including both UTP (Unshielded Twisted-Pair) and STP (shielded twisted-pair), as well as connections within Application Specific Integrated Circuits (ASICs). Similarly, any PAN (Personal Area Network), LAN (Local Area Network), MAN (Metropolitan Area Network) or WAN (Wide Area Network) wiring may be used as the wired medium. Further, the modules may be connected directly by plugging mating connectors, with any cable or wiring connected between the connectors.

Figure 1:
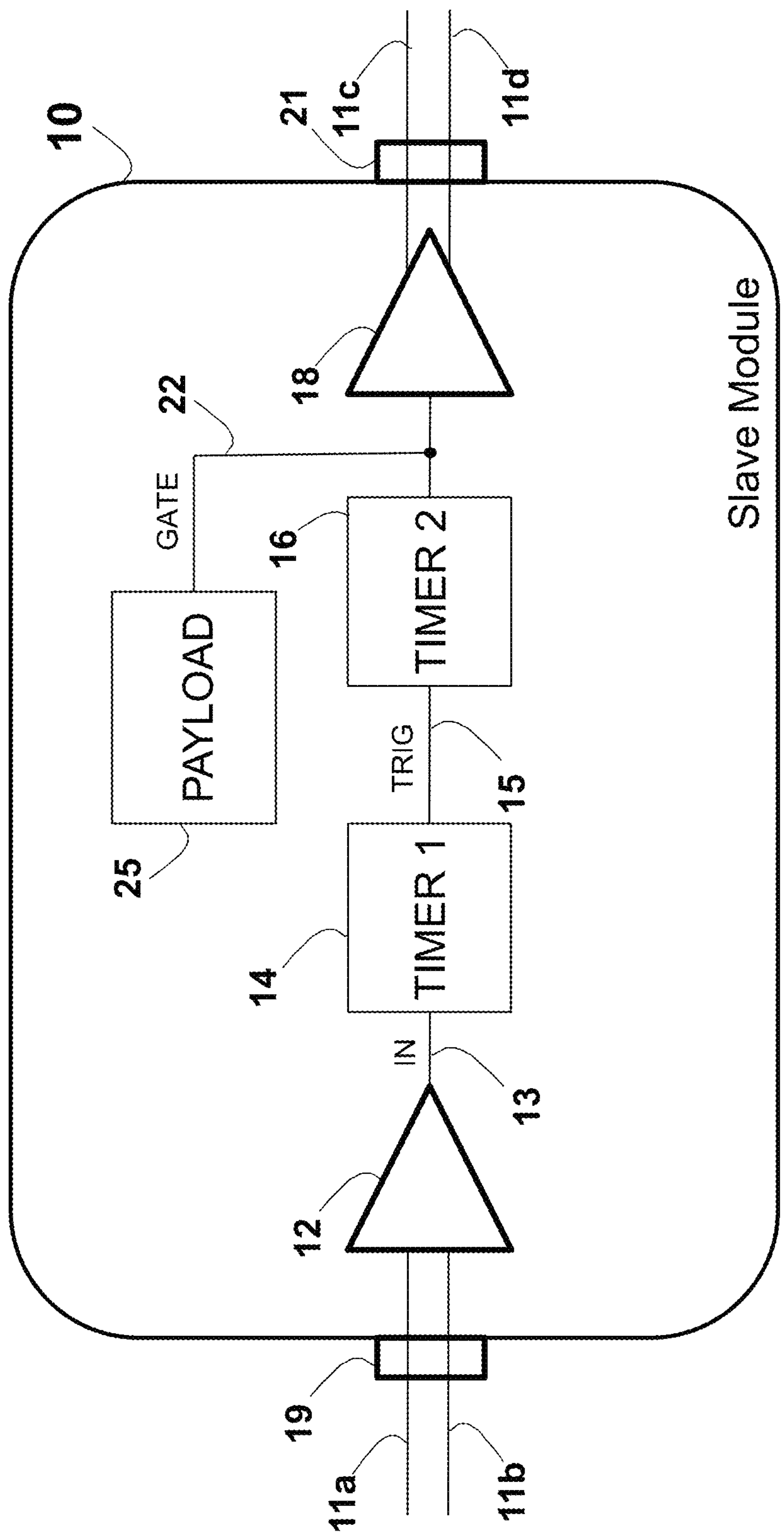
FIG. 1 illustrates a schematic electrical diagram of part of a slave module according to an aspect of the invention.

FIG. 1 shows a schematic electrical diagram of a slave module 10 according to one embodiment of the invention. An activation signal is received from a former module over conductors 11*a* and 11*b* via connector 19, and received by line receiver 12. The line receiver 12 typically converts the received signal to the logic levels used by the module internal digital logic circuits (e.g., CMOS, TTL, LSTTL and HCMOS). The conductors 11*a* and 11*b* may be individual wires or bundled in a cable connecting slave module 10 with the former module. In the example shown, slave module 10 is connected to the former module using a point-to-point connection and employing a balanced interface circuit. For example, industry standard TIA/EIA-422 (a.k.a. RS-422) can be used for the connection, and the line receiver 12 may be an RS-422 compliant line receiver, such as RS-422 receiver MAX3095, available from Maxim Integrated Products, Inc. of Sunnyvale, Calif., U.S.A., described in the data sheet "±15 kV ESD-Protected, 10 Mbps, 3V/5V, Quad RS-422/RS-485 Receivers" publication number 19-0498 Rev.1 10/00, which is incorporated in its entirety for all purposes as if fully set forth herein.

American national standard ANSI/TIA/EIA-422-B (formerly RS-422) and its international equivalent ITU-T Recommendation V.11 (also known as X.27), are technical standards that specify the "electrical characteristics of the balanced voltage digital interface circuit". These technical standards provide for data transmission, using balanced or differential signaling, with unidirectional/non-reversible, terminated or non-terminated transmission lines, point to point. Overview of the RS-422 standard can be found in National Semiconductor Application Note 1031 publication AN012598 dated January 2000 and titled:"TIA/EIA-422-B Overview" and in B&B Electronics publication "RS-422 and RS-485 Application Note" dated June 2006, which are incorporated in their entirety for all purposes as if fully set forth herein. While shown in FIG. 1 as un-terminated, a termination may be connected to the line receiver 12 inputs (typically a resistor with resistance matching the wiring characteristic impedance), in order to avoid reflections for supporting high data rate and long distances.

Alternatively, in order to improve the common-mode noise rejection capability and to allow higher data rates, a balanced and differential interface is preferably used, as described above regarding using RS-422 in module 10 shown in FIG. 1. For simplicity sake, the specification describes only a balanced interface (with the exception of module 40 shown in FIG. 4). However, unbalanced interface may be equally used.

The line receiver 12 outputs a digital signal 'IN' to TIMER1 14 over connection 13. TIMER1 14 delays the incoming signal 'IN' for a pre-determined period 't1', and produces a delayed signal 'TRIG' over connection 15. This delay allows for internal activities within the slave module 10 and the activation of payload 25 to start only after a pre-determined interval of time 't1' has lapsed from the activity related to the former module. In an embodiment where such delay may not be required, the TIMER1 14 may be omitted and the line receiver 12 may be connected directly to TIMER2 16, or alternately the TIMER1 is set to minimum or zero time delay (t1=0). The signal 'TRIG' is received by TIMER2 16, which in turn produces a signal 'GATE' over connection 22 for a pre-determined period 't2'. The signal 'GATE' is connected as a control to activate payload 25. The signal 'GATE' is also connected to a line driver 18, which is preferably a mating driver to the line receiver 12. For example, the balanced interface line driver 18 may be an RS-422 driver such as RS-422 transmitter MAX3030E, available from Maxim Integrated Products, Inc. of Sunnyvale, Calif., U.S.A., described in the data sheet "±15 kV ESD-Protected, 3.3V Quad RS-422 Transmitters" publication number 19-2671 Rev.0 10/02, which is incorporated in its entirety for all purposes as if fully set forth herein. The line driver 18 is feeding conductors 11*c* and 11*d* via connector 21, connecting the slave module 10 to the next module. The line driver 18 typically converts the logic levels used by the module internal digital logic circuits (e.g., CMOS, TTL, LSTTL and HCMOS) to a signal to be transmitted. The next module can start its operation upon activation of the 'GATE' signal (hence immediately after the delay period of 't1'), or alternately after the 'GATE' signal is deactivated (hence after a period of t1+t2).

The slave module 10 operation thus involves activating the payload 25 (via signal 'GATE') for a period of t2, after a delay of a period of t1 starting at reception of a signal from the former module, and signaling the next module concurrently with or after the end of the activation of the payload 25.

The transfer of information such as the activation signal between two modules commonly makes use of a line driver for transmitting the signal to the conductors serving as the transmission medium connecting the two modules, and a line receiver for receiving the transmitted signal from the transmission medium. The communication may use a proprietary interface or preferably an industry standard, which typically defines the electrical signal characteristics such as voltage level, signaling rate, timing and slew rate of signals, voltage withstanding levels, short-circuit behavior, and maximum load capacitance. Further, the industry standard may define the interface mechanical characteristics such as the pluggable connectors and pin identification and pin-out. In one example, the module circuit can use an industry or other standard used for interfacing serial binary data signals. Preferably the line drivers and line receivers and their associated circuitry will be protected against electrostatic discharge (ESD), electromagnetic interference (EMI/EMC) and against faults (fault-protected), and employs proper termination, failsafe scheme and supports live insertion. Preferably, a point-to-point connection scheme is used, wherein a single line driver is communicating with a single line receiver. However, multi-drop or multi-point configurations may as well be used. Further, the line driver and the line receiver may be integrated into a single IC (Integrated Circuit), commonly known as transceiver IC.

Figure 4:
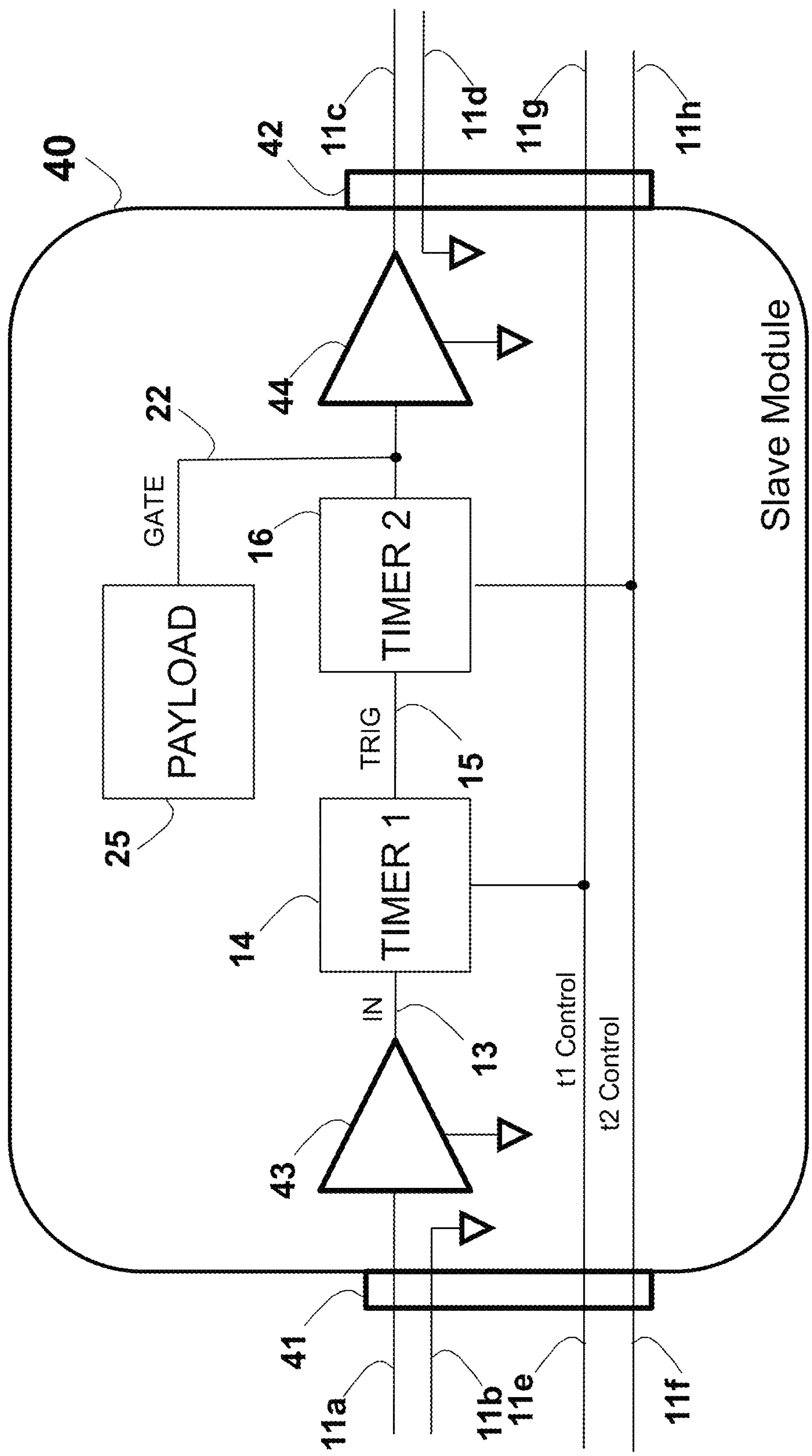
FIG. 4 illustrates a schematic electrical diagram of part of a slave module according to an aspect of the invention.

In one example, the transmission is unbalanced (single-sided), as shown for slave module 40 shown in FIG. 4, and employing a single-sided line receiver 43 receiving the activation signal carried over wire 11*a* with respect to ground 11*b* via connector 41, as well as a single-sided line driver 44 transmitting the activation signal to wire 11*c* with respect to ground wire 11*d* via connector 42. Such transmission scheme may be based on the serial binary digital data standard Electronic Industries Association (ETA) and Telecommunications Industry Association (TIA) EIA/TIA-232, also known as Recommended Standard RS-232 and ITU-T (The Telecommunication Standardization Sector (ITU-T) of the International Telecommunication Union (ITU)) V.24 (formerly known as CCITT Standard V.24). Similarly, RS-423 based serial signaling standard may be used. For example, RS-232 transceiver MAX202E may be used, available from Maxim Integrated Products, Inc. of Sunnyvale, Calif., U.S.A., described in the data sheet "±12 kV ESD-Protected, +5V RS-232 Transceivers" publication number 19-0175 Rev.6 3/05, which is incorporated in its entirety for all purposes as if fully set forth herein.

Each of the timers may be implemented as a monostable circuit, producing a pulse of set length when triggered. In one example, the timers are based on RC based popular timers such as 555 and 556, such as ICM7555 available from Maxim Integrated Products, Inc. of Sunnyvale, Calif., U.S.A., described in the data sheet "General Purpose Timers" publication number 19-0481 Rev.2 11/92, which is incorporated in its entirety for all purposes as if fully set forth herein. Examples of general timing diagrams as well as monostable circuits are described in Application Note AN170 "NE555 and NE556 Applications" from Philips semiconductors dated Dec., 1988. Alternatively, a passive or active delay line may be used. Further, a processor based delay line can be used, wherein the delay is set by its firmware.

Figure 2:
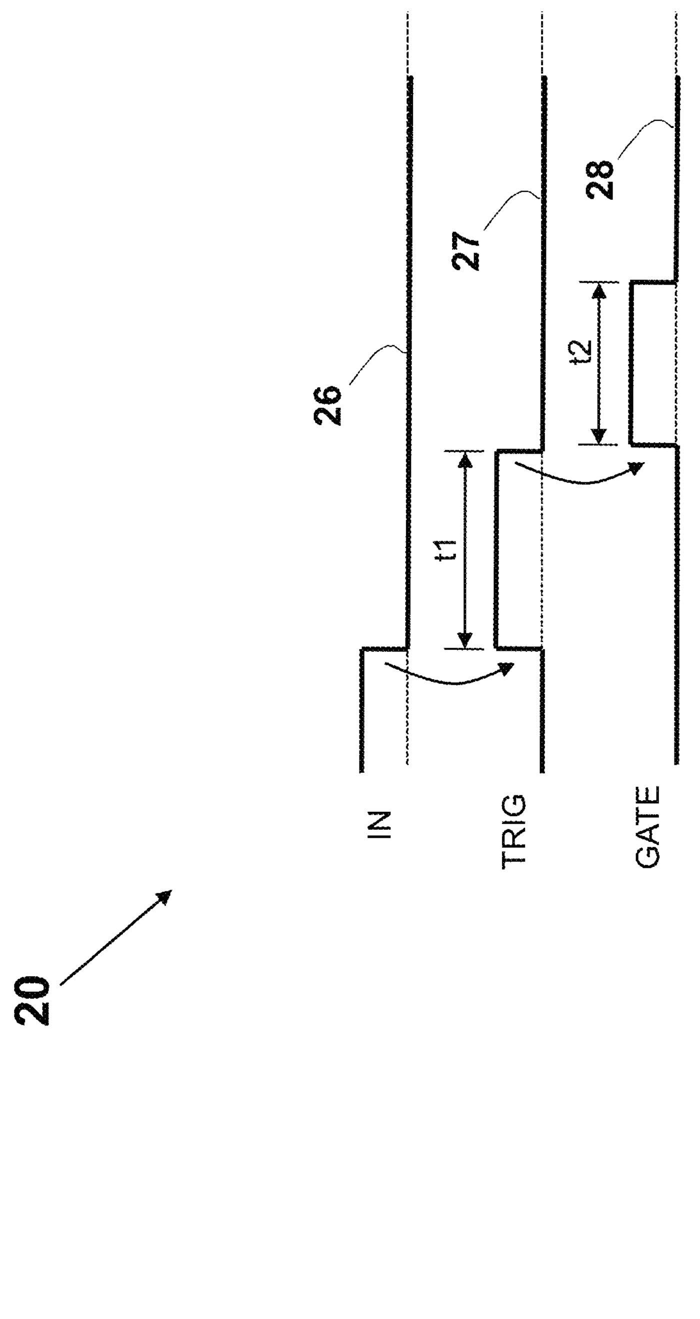
FIG. 2 illustrates a schematic timing diagram relating to a slave module according to an aspect of the invention.

A schematic timing diagram 20 of the slave module 10 is shown in FIG. 2. Referring to FIG. 1 and FIG. 2, chart 'IN' 26 shows the signal 'IN' 13, chart 'TRIG' 27 shows the signal 'TRIG' 15, and chart 'GATE' 28 shows the signal 'GATE' 22. The trailing edge of the signal 'IN' 13 (active-low) triggers TIMER1 14 (active-high) to produce the signal 'TRIG' 15 for a period of t1. After the lapsing of the t1 period, the trailing edge of the signal 'TRIG' 15 triggers TIMER 2 16 to produce the signal 'GATE' 22 (active-high) for a period of t2. It is apparent to anyone skilled in the art that all signals described herein may be either 'active low' (wherein activation or logical-true is represented by a low electrical signal) or 'active high'(wherein activation or logical-true is represented by an high electrical signal), and that signaling can be based on trailing or rising transitions of signals.

Figure 3:
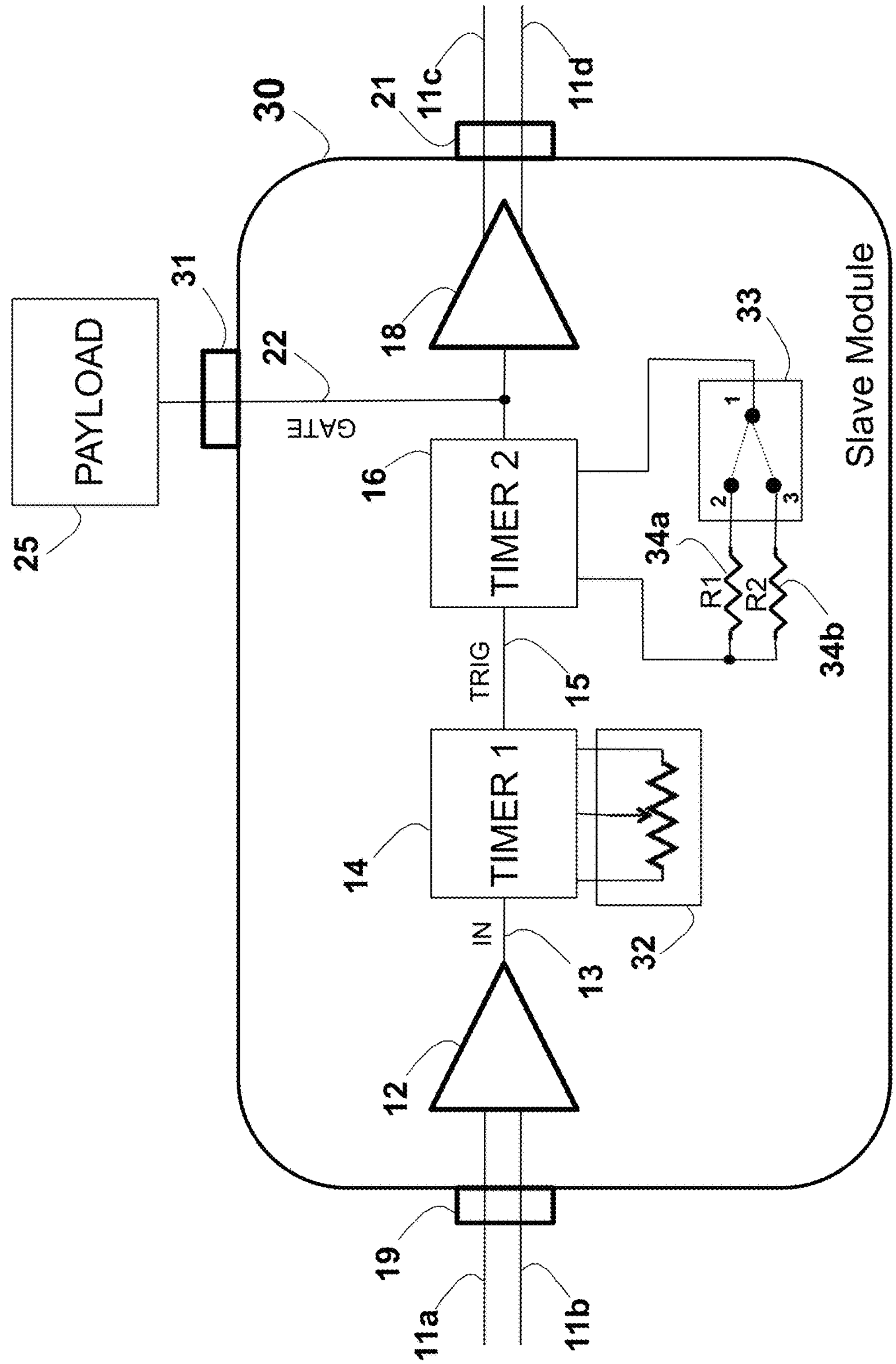
FIG. 3 illustrates a schematic electrical diagram of part of a slave module according to an aspect of the invention.

The slave module 10 has been exampled in FIG. 1 to include the payload 25 as an integral part of the slave module 10. In one embodiment, the payload 25 can be external to the housing of a module. FIG. 3 shows a slave module 30 wherein the payload 25 is external to the slave module 30, and connected thereto via connector 31 connecting the signal 'GATE' 22 to the payload 25. In such configuration, the flexibility of connecting various types of payload 25 is provided.

In one embodiment, the pre-set time periods t1 and t2 are identical to all modules in the systems, allowing for similar (or identical) timing schemes uniformly executed in the system, and for a system built from identical or interchangeable modules. In an alternative embodiment, one, few or all of the modules in the system have individually set time periods, allowing the flexibility of different settling time periods effecting the operation of modules or adapting the periods for activating individual payloads. Further, each timer with a module may be individually set. In the latter case, the time period produced by an individual timer in an individual module can be continuously adjusted, for example to obtain any time period selected within the 0 to 20 seconds range. In one example, the adjusting mechanism is based on a potentiometer, which resistance value impacts the set time period, as shown for slave module 30 shown in FIG. 3, illustrating potentiometer 32 connected to control the time period t1 associated with TIMER1 14. The potentiometer 32 may be a linear potentiometer or a logarithmic potentiometer. In an alternative embodiment, the time period of a timer is selected from few discrete values. For example, the time period may be selected from 0, 5, 10, 15 and 20 seconds. Such configuration is exampled relating to TIMER2 16 in slave module 30 shown in FIG. 3. Two resistors R1 34*a* and R2 34*b* are shown, connected via switch 33, which selects only one of the resistors, to affect the time period t2 produced by TIMER2 16. The different resistance value of each of the resistors that is selected by the switch 33 results in a different time period set. It is apparent that any timer in any module may use either continuous or discretely selected time periods.

The slave module 30 shown in FIG. 3 is shown to have an integrated potentiometer 32 and an integrated switch 33 for locally setting the time period of the timers 14 and 16. Alternatively, the time setting may be remotely controlled, by a device external to the module being set. In one alternative embodiment, the slave module 30 is set via a device connected thereto. In one example, a module may be controlled by another module connected to it directly or via the system, such as setting from a central module (e.g., a master module). Further, one timer in a slave module may be locally set while the other timer is remotely set.

In the example of slave module 40 shown in FIG. 4, two control signals 't1 Control' and 't2 Control' are used for remotely setting the time period of the timers. The slave module 40 connects via connector 41 to the former module to receive the 't1 Control' control signal over wire 11*e*, which is connected to TIMER1 14 for setting its time period. Similarly, the slave module 40 connects via connector 41 to the former module to receive the 't2 Control' control signal over wire 11*f*, which is connected to TIMER2 16 for setting its time period. The two signals 't1 Control' and 't2 Control' are further being passed to the respective wires 11*g* and 11*h* via connector 42 for passing these control signal to the next module. This mechanism allows setting and changing the time periods of few or all modules from a central module (e.g., a master module) by propagating the control signals from module to module over the system. The time period setting information carried over the control signals may use analog amplitude (e.g., proportional or logarithmic voltage/current representing the desired value), Pulse Wide Modulation (PWM), digital data representing the value or any other encoding or modulation scheme. Further, each signal line may use a distinct representation scheme.

Figure 5:
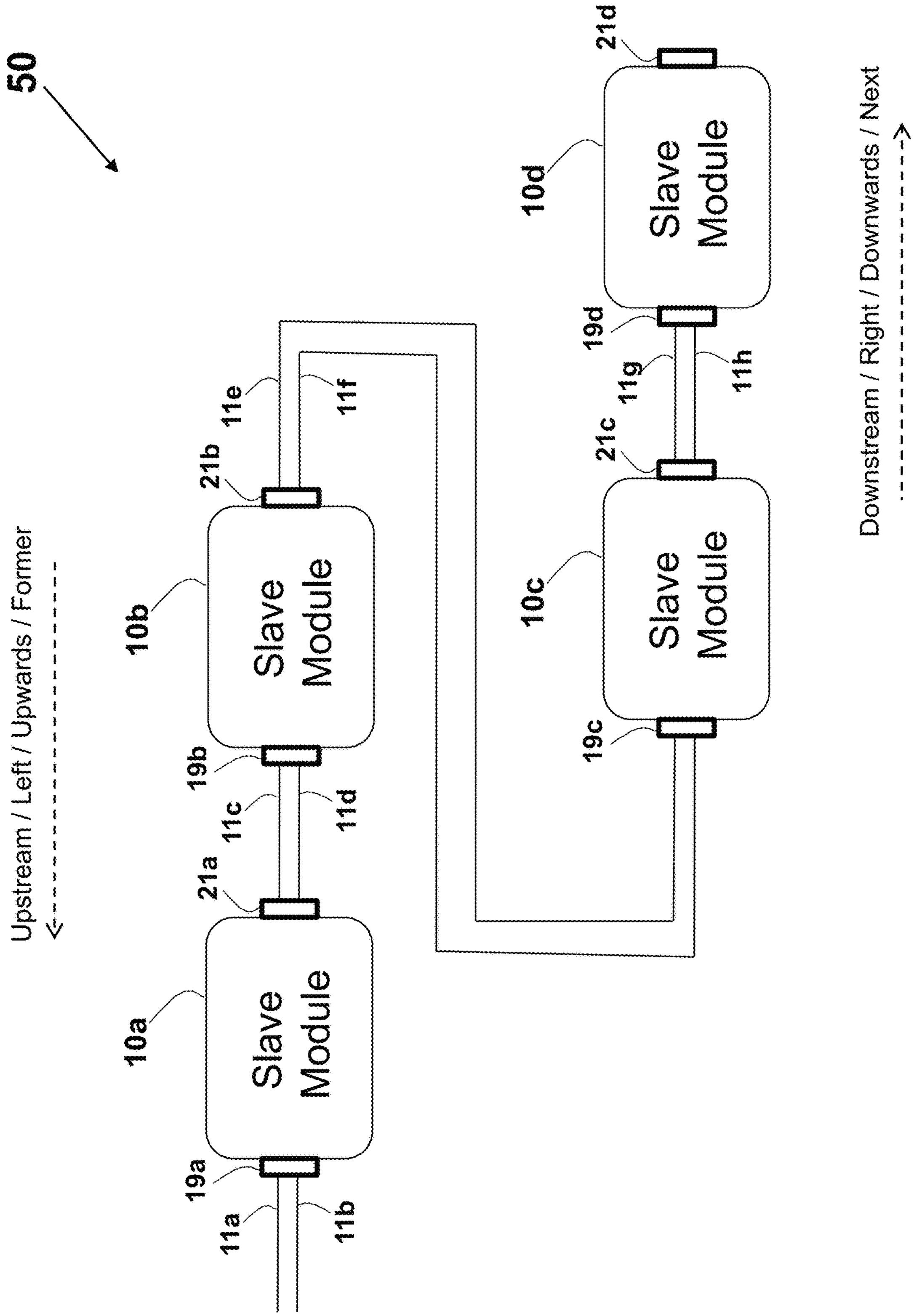
FIG. 5 illustrates a schematic electrical diagram of part of a system according to an aspect of the invention.

A system (or a sub-system) 50 is shown in FIG. 5, including four connected slave modules 10*a*, 10*b*, 10*c* and 10*d*. Each slave module is based on slave module 10 shown in FIG. 1, or based on slave module 30 shown in FIG. 3, or alternatively based on slave module 40 shown in FIG. 4. The slave modules are connected using point-to-point topology, wherein each connection connects two, and only two slave modules. Slave module 10*a* contains connector 19*a* for connecting to a former module via wires 11*a* and 11*b*, and connects to the next slave module 10*b* via wires 11*c* and 11*d* connected to the connector 21*a*. Slave module 10*b* contains connector 19*b* for connecting to the former slave module 10*a* via wires 11*c* and 1*d*, and connects to the next slave module 10*c* via wires 11*e* and 11*f* connected to connector 21*b*. Slave module 10*c* contains connector 19*c* for connecting to the former slave module 10*b* via wires 11*e* and 11*f*, and connects to the next slave module 10*d* via wires 11*g* and 11*h* connected to connector 21*c*. Slave module 10*d* contains connector 19*d* for connecting to the former slave module 10*c* via wires 11*g* and 11*h*, and can connect to the next slave module via connector 21*d*. During operation, activation signals received by slave module 10*a* over wires 11*a* and 11*b* activate the payload (after a delay, if implemented) in the slave module 10*a* (or connected to slave module 10*a*). At later stage, the activation signal is propagated to activate the payload associated with slave module 10*b*, and sequentially to slave modules 10*c* and 10*d*.

Figure 5A:
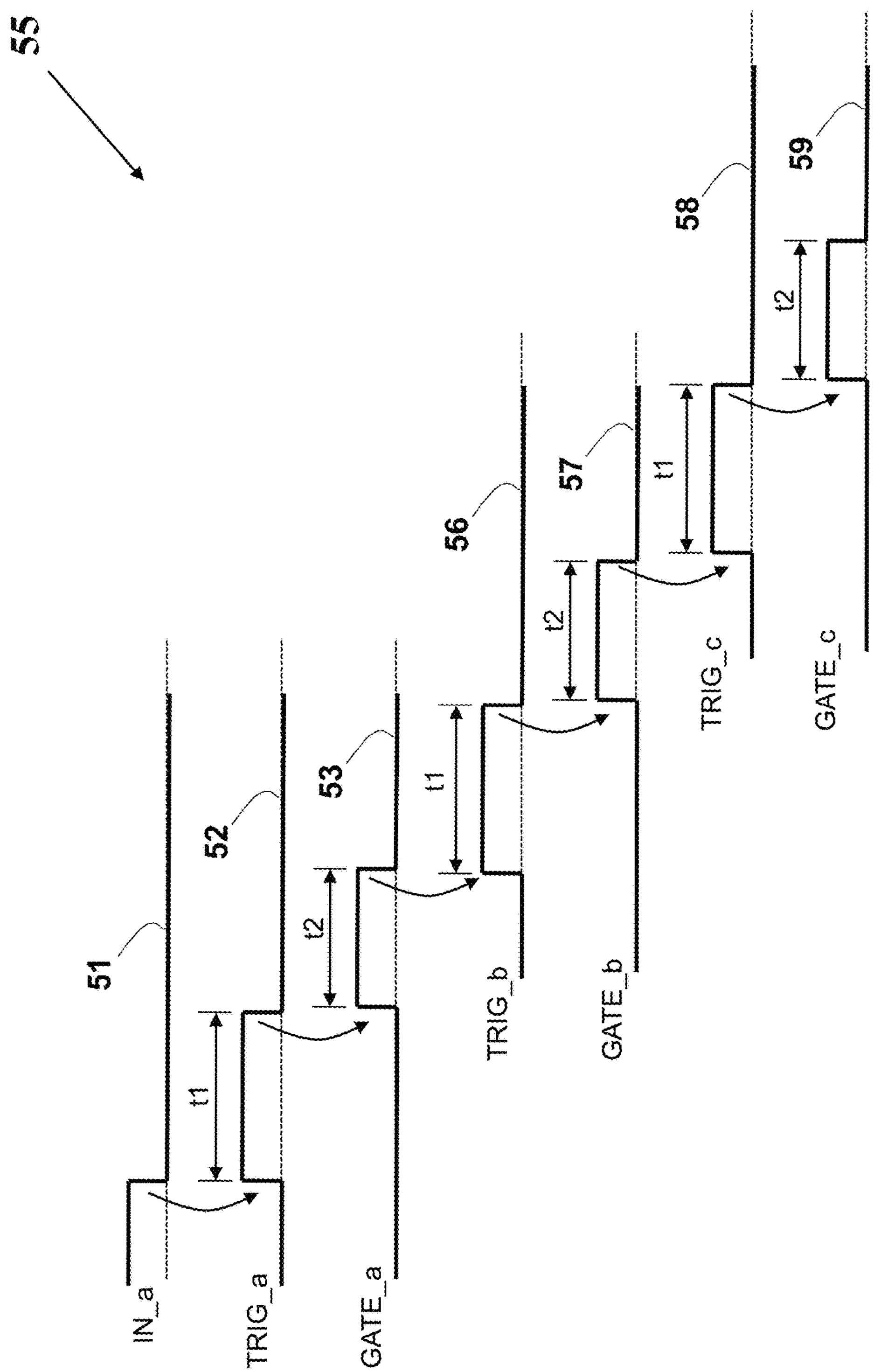

A timing diagram 55 of the system 50 of FIG. 5 is shown in FIG. 5*a*. The signal IN_a 51 is received by slave module 10*a* via wires 11*a* and 11*b*, and its trailing edge triggers a timer for producing signal TRIG_a 52 in slave module 10*a*, resulting in a signal for a period of t1. The trailing edge of the signal TRIG_a 52 triggers the signal GATE_a 53 in slave module 10*a*, which is used to activate the payload associated with slave module 10*a* for a period t2. The signal GATE_a 53 is transmitted to the next slave module 10*b* over wires 11*c* and 11*d*, and the trailing edge of signal GATE_a 53 triggers a timer in slave module 10*b* to produce signal TRIG_b 56 for a period of t1. The trailing edge of the signal TRIG_b 56 triggers the signal GATE_b 57 in slave module 10*b*, which is used to activate the payload associated with slave module 10*b* for a period t2. The signal GATE_b 57 is transmitted to the next slave module 10*c* over wires 11*e* and 11*f*, and the trailing edge of signal GATE_b 57 triggers a timer in slave module 10*c* to produce signal TRIG_c 58 for a period of t1. The trailing edge of the signal TRIG_c 58 triggers the signal GATE_c 59 in slave module 10*c*, which is used to activate the payload associated with slave module 10*c* for a period t2. Similarly, the activation signals propagate via the system sequentially activating the payloads in the slave modules according to the connection scheme, wherein each slave module activates its own payload and send the relevant activation information to the next connected slave module.

The sequential operation of the payloads associated with the connected slave modules is schematically shown as table 65 in FIG. 5*b*. Column 62*a* relates to the time lapsed in the system, wherein each row 61*a-g* is associated with a time period of operation of a specific one of the slave modules, starting with receiving an activation signal (e.g., triggering timer1, such as TRIG signal rising in FIG. 5*a*) until signaling the next module to be activated (e.g., end of timer2 period, such as trailing edge of the GATE signal in FIG. 5*a*). In the example of system 50, four slave modules are connected, wherein column #1 62*b* is associated with the payload of slave module 10*a*, column #2 62*c* is associated with the payload of slave module 10*b*, column #3 62*d* is associated with the payload of slave module 10*c*, and column #4 62*e* is associated with the payload of slave module 10*d*. TIME=0 row 61*a* relates to the time before receiving any activation signal in the slave modules, and thus all payloads are in an 'OFF' state. As a result of receiving an activation signal by slave module 10*a*, the associated payload is activated, represented as 'ON' in TIME=1 row 61*b*. Upon timer2 16 expiration in the slave module 10*a*, the payload is deactivated and reverts to 'OFF' state. Similarly, as a result of receiving an activation signal by slave module 10*b*, the payload is activated, represented as 'ON' in TIME=2 row 61*c*. Next, the payload of slave module 10*b* is deactivated and reverts to 'OFF' state. Next, as a result of receiving an activation signal by slave module 10*c*, the module payload is activated, represented as 'ON' in TIME=3 row 61*d*, followed by deactivation of the payload of slave module 10*c* (reverts to 'OFF' state). Next, as a result of receiving activation signal by slave module 10*d*, the payload is activated, represented as 'ON' in TIME=4 row 61*e*, followed by deactivation of the payload of slave module 10*d* (reverts to 'OFF' state). At stages TIME=5 61*f* and TIME=6 61*g*, no payload is activated (all in 'OFF' state), reverting to the original TIME=0 61*a* idle status.

The system 50 operation was exemplified in FIGS. 5*a* and 5*b* regarding a single activation signal propagating sequentially in the system from slave module 10*a*, to slave modules 10*b*, 10*c* and ending in 10*d*. In another example shown in table 66 in FIG. 5*c*, two activation signals are concurrently distributed over the system. Until the state in TIME=2 in row 61*c*, the table is the same as table 65. In TIME=3, an additional activation signal is received by slave module 10*a*, hence the payload associated with slave module 10*a* is re-activated, as shown in 'ON' state relating to module #1 column 62*b* in TIME=3 in row 61*d*. Next, the activation signal is propagating to the next slave module 10*b*, turning its payload again to 'ON' state shown in TIME=4 row 61*e* relating to column #2 62*c* in the table 66. Next, the activation signal is propagating to the next slave module 10*c*, turning its payload to 'ON' state shown in TIME=5 row 61*f* relating to column #3 62*d* in the table 66. The sequence stops after re-activating the next slave module 10*d*, turning its payload to 'ON' state shown in TIME=6 row 61*g* relating to column #4 62*e* in the table 66.

In the examples above, the payload 25 associated with a slave module 10 was described as being activated as long as the GATE signal 22 produced by timer2 16 is active. In an alternative embodiment of a module or of a payload, the payload 25 is triggered to start its action by the GATE 22 signal produced by the timer2 16, but then stays activated. The payload 25 may stay activated indefinitely, or as long as power is supplied thereto. Alternatively, the payload 25 activation may be terminated after a pre-set time period, either by using another timer in the module or as part of the payload. In yet another alternative, the payload 25 may be deactivated by another control, internal or external to the payload 25.

Table 67 in FIG. 5*d* is based on table 65 shown in FIG. 5*b*, however table 67 shows the payload 25 status in the case wherein the payload stays activated after being triggered by the GATE 22 signal. The table 67 shows that the payloads associated with the slave modules stays activated ('ON' state) once they have been triggered.

In one embodiment, the payload is toggle controlled, wherein each triggering event causes the payload to switch to an alternate state, for example by using a toggle switch. Table 68 in FIG. 5*e* is based on table 66 shown in FIG. 5*c*, however shows the toggle-controlled payload 25 status. For example, the status of the payload associated with slave module #3 is shown in column 62*d*. The first activation in TIME=3 in row 61*d* activates the payload into 'ON' state, and the payload stays in this state through TIME=4 in row 61*e*. In TIME=5 shown in row 61*f* another activation signal is produced as a result of a second activation signal propagated via the system, and the second activation signal shifts the payload back to the 'OFF' state. In this mechanism, the next activation signal will re-activate the payload.

The system 50 shown in FIG. 5 provides the example of slave modules connected in cascade, wherein each slave module is connected to activate a single next slave module. Alternatively, a system can be formed such that a module (such as a slave module) is connected to simultaneously activate multiple slave modules. A splitting functionality may be used in order to propagate the activation from a single module to a plurality of modules. An exemplary splitter module 60 is shown in FIG. 6. Splitter module 60 is connected to a former module (which may be any module, such as a slave module) using wires 11*a* and 11*b* via connector 19. The splitter module 60 can be connected to three next modules via three connections. The first connection to a next module uses wires 11*c* and 11*d* via connector 21*a*, the second connection to a second next module uses wires 11*e* and 11*f* via connector 21*b*, and the third connection to a third next module uses wires 11*g* and 11*h* via connector 21*c*. While the examples herein refer splitting to three next modules, it is apparent that splitter modules (such as module 60) may equally support two, four or any other number of connections, by having the appropriate number of downstream connectors and associated circuitry.

In the example of splitter module 60 shown in FIG. 6, the three outgoing connections (via connectors 21*a*, 21*b* and 21*c*) are connected directly to the incoming connector 19, so that the received signal is just split and fed unchanged simultaneously to the outgoing connections. Such configuration may be used in the case of a driver (such as the balanced line driver 18 or the unbalanced line driver 44) capable of driving multiple receivers (such as balanced line receiver 12 or unbalanced line receiver 43 respectively). For example, RS-422 standard supports such a point-to-multipoint scheme. An alternative splitter module 70 is shown in FIG. 7, containing a receiver 12 for receiving and constructing the 'IN' signal 13, and feeding the 'IN' signal 13 to three line drivers 18*a*, 18*b* and 18*c*, connected respectively to the three connectors 21*a*, 21*b* and 21*c*. In this configuration, the activation signal is received, and repeated by being retransmitted without any signal splitting. An alternative splitter module 80 is shown in FIG. 8, containing a receiver 12 for receiving and constructing the 'IN' signal 13, and feeding the 'IN' signal 13 to a single line driver 18, connected in parallel to the three outgoing connectors 21*a*, 21*b* and 21*c*. In this configuration, the activation signal is reconstructed and repeated to all the connections.

In another example, the splitter module contains the timing functionalities of a slave module. Such a splitter module 90 is shown in FIG. 9. Splitter module 90 is based on splitter module 70 shown in FIG. 7, added to the timers used in slave module 10. The signal 'IN' 13 is delayed first by TIMER1 14 producing the signal 'TRIG' 15, which in turn feeds TIMER2 16. The delayed signal is simultaneously transmitted to the three next modules via connectors 21*a*, 21*b* and 21*c*. The activation signal is thus delayed similar to the delay introduced by a slave module, before being propagated simultaneously to the next modules. While two timers TIMER1 14 and TIMER2 16 are disclosed, a single timer may also be used to introduce a delay in the activation signal propagation. In yet another example, a different delay may be introduced to each of the next connected modules. Such a splitter module 100 is shown in FIG. 10. Splitter module 100 is based on splitter module 90 shown in FIG. 9, where a set of timers is connected in the path connecting to each of the outgoing connections. TIMER1 14*a* produces a delayed activation signal 'TRIG' 15*a*, fed to TIMER2 16*a* for creating additional delay, and the delayed signal is transmitted to wires 11*c* and 11*d* via line driver 18*a*. Hence, the delay introduced from the input to the module connected to wires 11*c* and 11*d* is dependent upon the settings of timers TIMER1 14*a* and TIMER2 16*a* only. Similarly, TIMER1 14*b* produces a delayed activation signal 'TRIG' 15*b*, fed to TIMER2 16*b* for creating additional delay, and the delayed signal is transmitted to wires 11*e* and 11*f* via line driver 18*b*. Hence, the delay introduced from the input to the module connected to wires 11*e* and 11*f* is dependent upon the settings of timers TIMER1 14*b* and TIMER2 16*b* only. Further, TIMER1 14*c* produces a delayed activation signal 'TRIG' 15*c*, fed to TIMER2 16*c* for creating additional delay, and the delayed signal is transmitted to wires 11*g* and 11*h* via line driver 18*c*. Hence, the delay introduced from the input to the module connected to wires 11*g* and 11*h* is dependent upon the settings of timers TIMER1 14*c* and TIMER2 16*c* only. The time delays in each of the three paths may be identical, similar or substantially distinct from the other paths.

In one example, the slave module and the splitter functionalities are combined into a single slave/splitter module. Such a slave/splitter module 110 is shown in FIG. 11. Slave/splitter module 110 includes all the slave module 10 functionalities. Added to the line driver 18*a* (representing driver 18 shown in FIG. 1) connected to wires 11*c* and 11*d* via connector 21*a* (representing connector 21 shown in FIG. 1), two additional drivers 18*b* and 18*c* are connected to the 'GATE' signal 22, respectively connected to connectors 21*b* and 21*c* for connecting to the next modules via wire set 11*e*, 11*f* and set 11*g*, 11*h*.

An example of a system 120 including a splitter module 60 is shown in FIG. 12. An activation signal is carried over wires 11*a* and 11*b* and received by slave module 10*a* via connector 19*a*. The activation signal propagates from slave module 10*a* via connector 21*a* over wires 11*c* and 11*d* to splitter module 60 incoming connector 19*e*. The activation signal then propagates into three distinct paths. The first path includes connection from splitter module 60 connector 21*e* to slave module 10*b* connector 19*b* over wires 11*c* and 11*d*. The second path includes connection from splitter module 60 connector 21*f* to slave module 10*c* connector 19*c* over wires 11*g* and 11*h*. The third path includes connection from splitter module 60 connector 21*g* to slave module 10*d* connector 19*d* over wires 11*i* and 11*j*. Since splitter module 60 shown in FIG. 6 does not introduce any delay, the activation signal is simultaneously and without delay transmitted to the three slave modules 10*b*, 10*c* and 10*d*. Splitter module 60 in FIG. 12 may be substituted with splitter module 70 shown in FIG. 7 or with splitter module 80 shown in FIG. 8. In another example, splitter module 60 in FIG. 12 may be substituted with splitter module 90 shown in FIG. 9, thus introducing a delay in the activation signal propagation via the splitter module 90. Similarly, splitter module 60 in FIG. 12 may be substituted with splitter module 100 shown in FIG. 10, thus introducing an individual delay in each of the distribution paths. Further, splitter module 60 in FIG. 12 may be substituted with slave/splitter module 110 shown in FIG. 11, thus both introducing a delay and further activating a payload 25 associated with the slave/splitter 110. The slave modules 10*b*, 10*c* and 10*d* may be further connected downstream to additional slave or splitter modules. The modules connected in system 120 are connected in point-to-point topology, wherein each wiring connects two and only two modules, each connected to one end of the wiring, allowing easy installation and superior communication performance.

An example of a system 130 including two splitter modules 60*a* and 60*b* is shown in FIG. 13, wherein splitter module 60*b* is replacing slave module 10*d* of system 120. An activation signal is carried over wires 11*a* and 11*b* and received by slave module 10*a* via connector 19*a*. The activation signal propagates from slave module 10*a* via connector 21*a* over wires 11*c* and 11*d* to splitter module 60*a* incoming connector 19*e*. The activation signal then propagates into three distinct paths. The first path includes the connection from splitter module 60*a* connector 21*e* to slave module 10*b* connector 19*b* over wires 11*c* and 11*d*. The second path includes the connection from the splitter module 60*a* connector 21*f* to slave module 10*c* connector 19*c* over wires 11*g* and 11*h*. The third path includes connection from splitter module 60*a* connector 21*g* to splitter module 60*b* connector 19*f* over wires 11*i* and 11*j*. The splitter module 60*b* may be further connected downstream via each of its connectors 21*h*, 211 and 21*j*. In one example, both splitter modules 60*a* and 60*b* are identical, for example based on splitter module 60 shown in FIG. 6. Alternatively, each of the splitter modules 60*a* and 60*b* may be independently substituted with any of the described splitter modules or slave/splitter module. While the system 130 was shown in FIG. 13 to include two splitter (or slave/splitter) modules, any number of splitter modules may be used. Further, a system may be formed using only splitter modules, and any combination of slave, splitter, and slave/splitter modules may be formed.

Figure 14A:
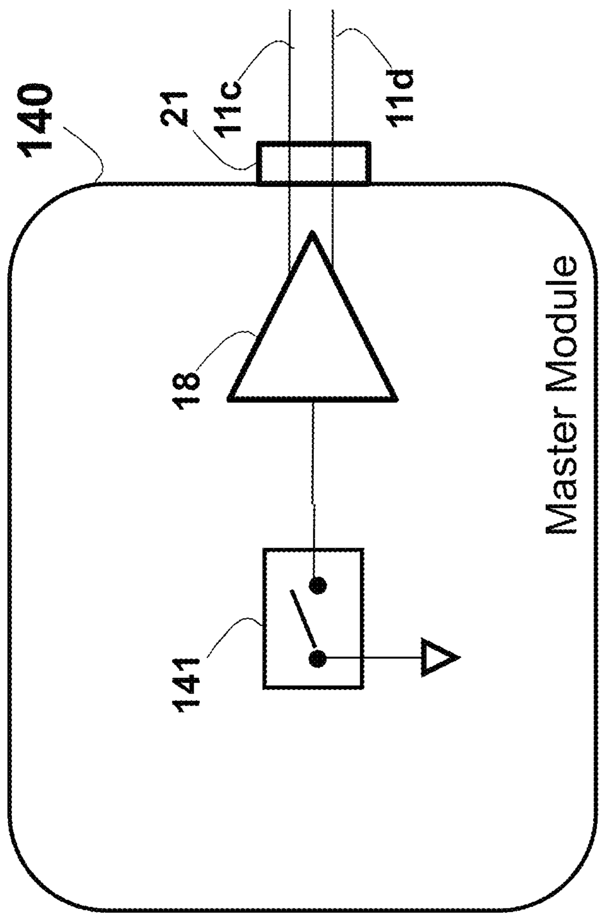
Figure 14B:
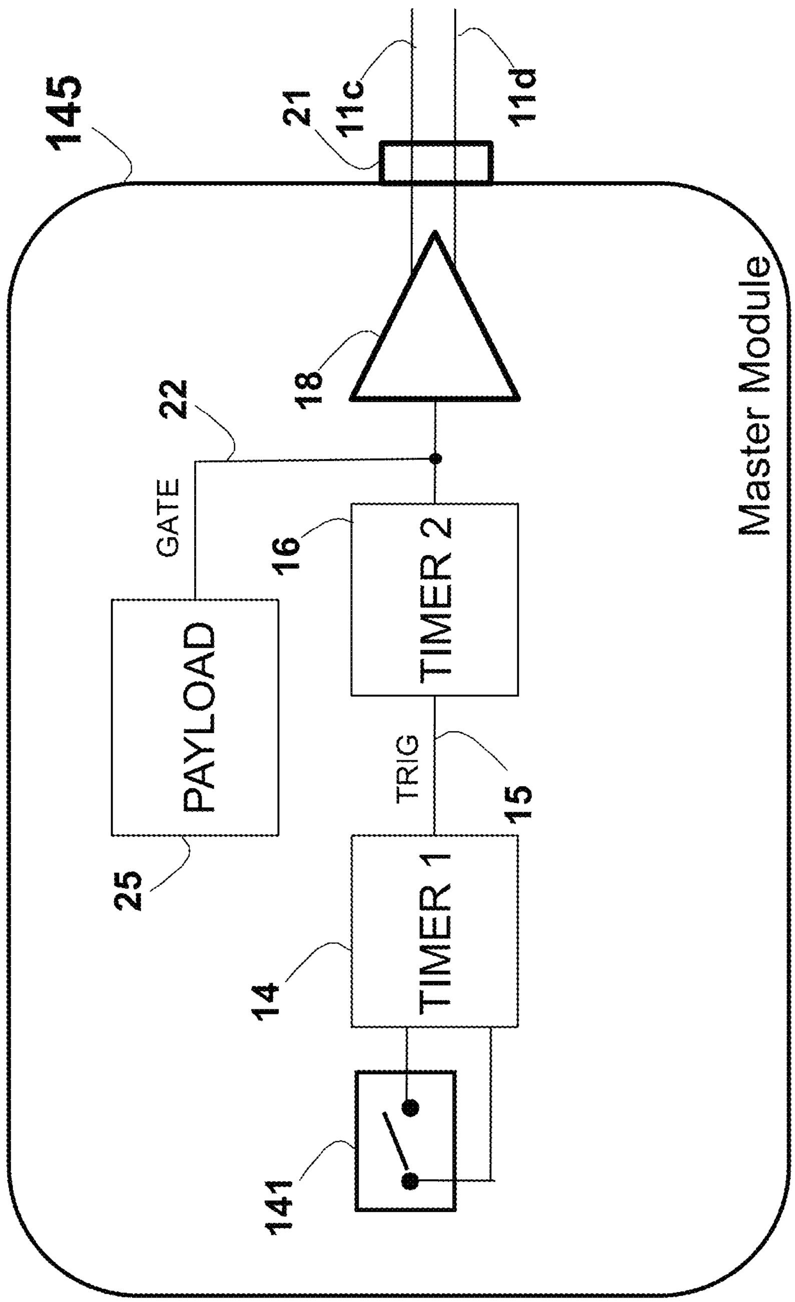

Slave and splitter modules acts as repeaters that repeat activation signals received from former modules to next modules. The activation signal in the system is generated in a master module. The core function of a master module is to transmit a trailing edge signal serving as an activation signal (such as the 'IN' signal 51 shown in FIG. 5*a*) to the connected module or modules (being slave or splitter modules). A basic master module 140 is shown in FIG. 14*a*, containing a line driver 18 transmitting to wires 11*c* and 11*d* via connector 21. A switch 141 is connected to the line driver 18 input, so that upon activation of the switch 141 (for example, by pressing a push button switch) an activation signal is transmitted over wires 11*c* and 11*d* to a module connected thereto. FIG. 14*b* shows a master module 145 including timing and payload functionalities similar to a slave module. The structure of the master module 145 is based on the structure of the slave module 10 shown in FIG. 1, wherein the activation is not triggered by a former module but rather by the switch 141 connected for triggering TIMER1 14 instead of the 'IN' signal 13. Such a master module 145 allows for payload 25 activation in the same scheme as in a slave module.

Master module 145 shown in FIG. 14*b* above provides the example of a single downstream connection connected to activate a single next slave (or splitter) module. Alternatively, a master module may include a splitting functionality so that it can be connected to simultaneously activate multiple slave (or splitter or any combination thereof) modules. An exemplary master module 150 is shown in FIG. 15 which is capable of activating three downstream connected modules. While the examples herein refer to activating three next modules, it is apparent that master modules may equally activate two, four or any other number to of connections, by having the appropriate number of downstream connectors and associated circuitry. The master module 150 is based on the master module 145 structure shown in FIG. 14*b*. Added to the driver 18*a* (representing line driver 18 of master module 145 shown in FIG. 14*b*), the 'GATE' signal 22 is fed in parallel to line driver 18*b*, which is in turn connected to connector 21*b* for transmitting to the next module via wires 11*e* and 11*f*, and to line driver 18*c*, which is in turn connected to connector 21*c* for transmitting to the next module via wires 11*g* and 11*h*. Such construction allows for simultaneous transmission of the activation signal to the three modules (such as slave or splitter modules) via connectors 21*a*, 21*b* and 21*c*.

Another example of a master module 160 is shown in FIG. 16, wherein delayed timers TIMER1 14 and TIMER2 16 are connected between the 'GATE' signal 22 (which also serves as the 'IN' signal 13) and the line drivers 18, enabling different delays in each of the three downstream paths. TIMER1 14*a* is fed from the 'GATE' signal 22 produced by the TIMER2 16, and produces the delayed signal 'TRIG' 15*a*, which in turn triggers TIMER2 16*a* connected to line driver 18*a* for transmitting to wires 11*c* and 11*d* via connector 21*a*. TIMER1 14*b* is fed from the 'GATE' signal 22 produced by the TIMER2 16, and produces the delayed signal 'TRIG' 15*b*, which in turn triggers TIMER2 16*b* connected to line driver 18*b* for transmitting to wires 11*e* and 11*f* via connector 21*b*. Similarly, TIMER1 14*c* is fed from the 'GATE' signal 22 produced by the TIMER2 16, and produces the delayed signal 'TRIG' 15*c*, which in turn triggers TIMER2 16*c* connected to line driver 18*c* for transmitting to wires 11*g* and 11*h* via connector 21*c*. Three distinct paths are thus formed, each via different set of timers, and thus can be individually set for a different delay.

A system 170 employing a master module 140 is shown in FIG. 17. System 170 is based on system 50 shown in FIG. 5, wherein slave module 10*a* is substituted with master module 140 shown in FIG. 14*a*. System 170 is a self-contained system, wherein upon activation of the switch 141 in the master module 140, the activation signal is propagating sequentially to slave module 10*b*, then to slave module 10*c*, and ending with slave module 10*d*. The payloads 25 in the slave module in the system 170 are thus activated one after the other, according to connection order of the slave modules. Similarly, a system 180 employing a master module 140 is shown in FIG. 18. System 180 is based on system 130 shown in FIG. 13, wherein slave module 10*a* is substituted with master module 140 shown in FIG. 14*a*. System 180 is a completed system wherein upon activation of the switch 141 in the master module 140, the activation signal is propagating to splitter module 60*a*, and sequentially in parallel to slave module 10*b*, slave module 10*c*, and splitter module 60*b*. The master module 145 shown in FIG. 14*b* may be equally employed in systems 170 and 180 instead of the illustrated master module 140. In this case, a delay is introduced by the timers between activating switch 141 in master module 145 and the activation signal transmission over the master module 145 outgoing connection. Further, the payload 25 in master module 145 will be the first payload to be activated in the system. In both systems, a repeated activation of the switch 141 in the master module will initiate another activation signal to be propagated through the system.

An exemplary system 185 employing a master module 160 is shown in FIG. 18*a*. When pressing the switch 141 in master module 160, the payload 25 in master module 160 is first activated (after the time delay determined by timers 14 and 16 in the master module 160). The activation signal is then split into three paths. The first path involves propagation of the activation signal to slave module 10*b* via connector 21*e* and wires 11*c* and 11*d*. The signal is received by slave module 10*b* via its incoming connector 19*b*, and consequentially transmitted to the splitter module 60*b* via connector 21*b* and wires 11*i* and 11*j*. The activation signal is received by splitter module 60*b* via its connector 19*f*, and consequentially split into three paths via connectors 21*h*, 211 and 21*j*. The second path involves propagation of the activation signal to slave module 10*c* via connector 21*f* and wires 11*g* and 11*h*. The third path involves propagation of the activation signal to slave module 10*d* via connector 21*g* and wires 11*e* and 11*f*. The activation signal is received by slave module 10*d* via its connector 19*d*, and consequentially transmitted from connector 21*d* of slave module 10*d* to slave module 10*a* via its connector 19*a* and wires 11*a* and 11*b*.

In one aspect of the invention, the master module is autonomous and free-running and is not dependent upon manual activation of a human user. In one example, the TIMER1 14 is an astable multi-vibrator that repetitively periodically generates activation pulses (as if the switch 141 is repetitively activated). The activation pulses can be provided immediately after the master module is powered on or may be dependent to start upon user activation (e.g., by the switch 141, serving as enabling switch to start the activation signals train). Further, the activation signal may be generated based on Time-Of-Day (TOD). In this configuration, a master module is set to generate an activation signal at a specific time of the day. For example, a master module can be set to communicate on a daily basis at 2:00 AM. In such a case, every day at 2:00 AM the master module will commence activation by generating an activation signal. Further, the master module can be set to activate a plurality of times during a 24-hour day, or alternatively, to commence activation less frequently than daily, such as once a week, once a month and so forth. In one example, the master module contains a real-time clock that keeps a track of the time, and stores (preferably in non-volatile memory) the parameter of the time of day wherein the activation signal should be initiated.

In one example, the activation is initiated external to the master module, rather than by a switch 141 as shown in FIGS. 14-16. Such a master module 190 is shown in FIG. 19, which is exampled based on the master module 150 shown in FIG. 15. The switch 141 is external to the master module 190 enclosure, and connected to activate the TIMER1 14 via connector 191. Such configuration allows for remote initiation of the master module 190, and thus activation of the related system.

In one example, the system is triggered in response to a physical phenomenon, as a substitute or in addition to any manual or automatic activation. Such a master module 195 is shown in FIG. 19*a*. The timer1 14 is initiated (or enabled) by an electrically controlled switch 193, replacing or supplementing the manual switch 141. The sensor 194 provides an output in response to a physical, chemical, or biological phenomenon. For example, the sensor 194 may be a thermistor or a platinum resistance temperature detector, a light sensor, a pH probe, a microphone for audio receiving, or a piezoelectric bridge. The sensor output is amplified by amplifier 192. Other signal conditioning may also be applied in order to improve the handling of the sensor output, such as attenuation, delay, filtering, amplifying, digitizing and any other signal manipulation. The comparator 593 activates the switch 193 (and thus initiates an activation signal) based on comparing between the sensor output (amplified and/or conditioned) and a reference voltage 592, providing a set reference voltage signal. For example, the sensor can be a temperature sensor, and the reference voltage 592 is set to 30° C. As such, a single activation signal (or starting or a train of activation pulses) will be triggered upon sensing of a temperature above 30° C. Similarly, digital equivalent circuitry may be used, wherein the sensor provides digital value, the comparator 593 is replaced with a digital comparator, and the reference voltage 592 is replace with a register or another memory storing a digital value.

In an alternative embodiment, the sensor 194 is external to the master module enclosure, as shown in FIG. 19*b*, wherein the sensor 194 is connected to the master module 199 via connector 196. In such scenario, the master module 199 is initiated based on a value measured at a remote location. Similarly, the amplifier 192, the comparator 593 and the voltage reference 592 can be, each or all, external to the master module casing.

Figure 20:
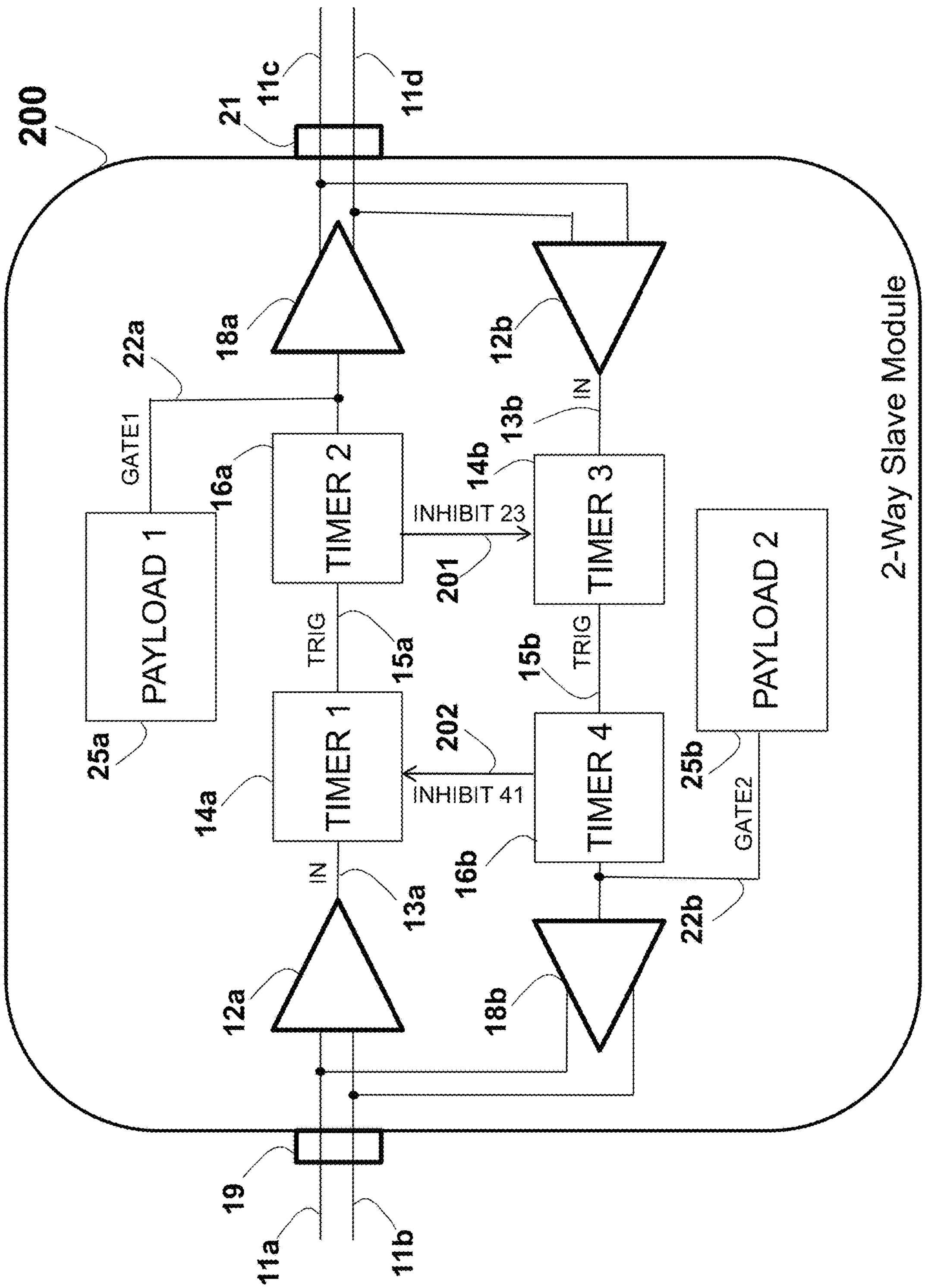
Figure 20A:
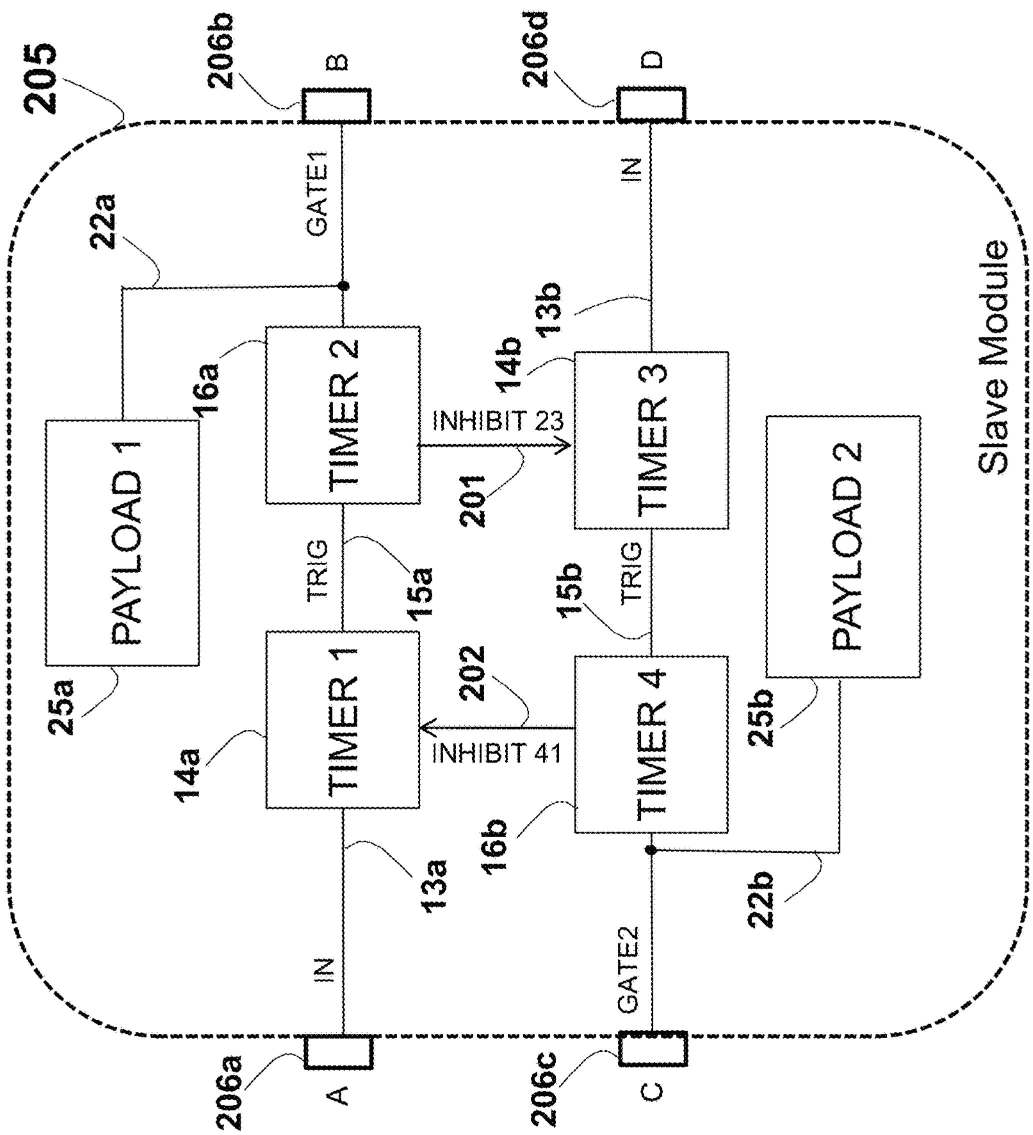
Figure 20B:
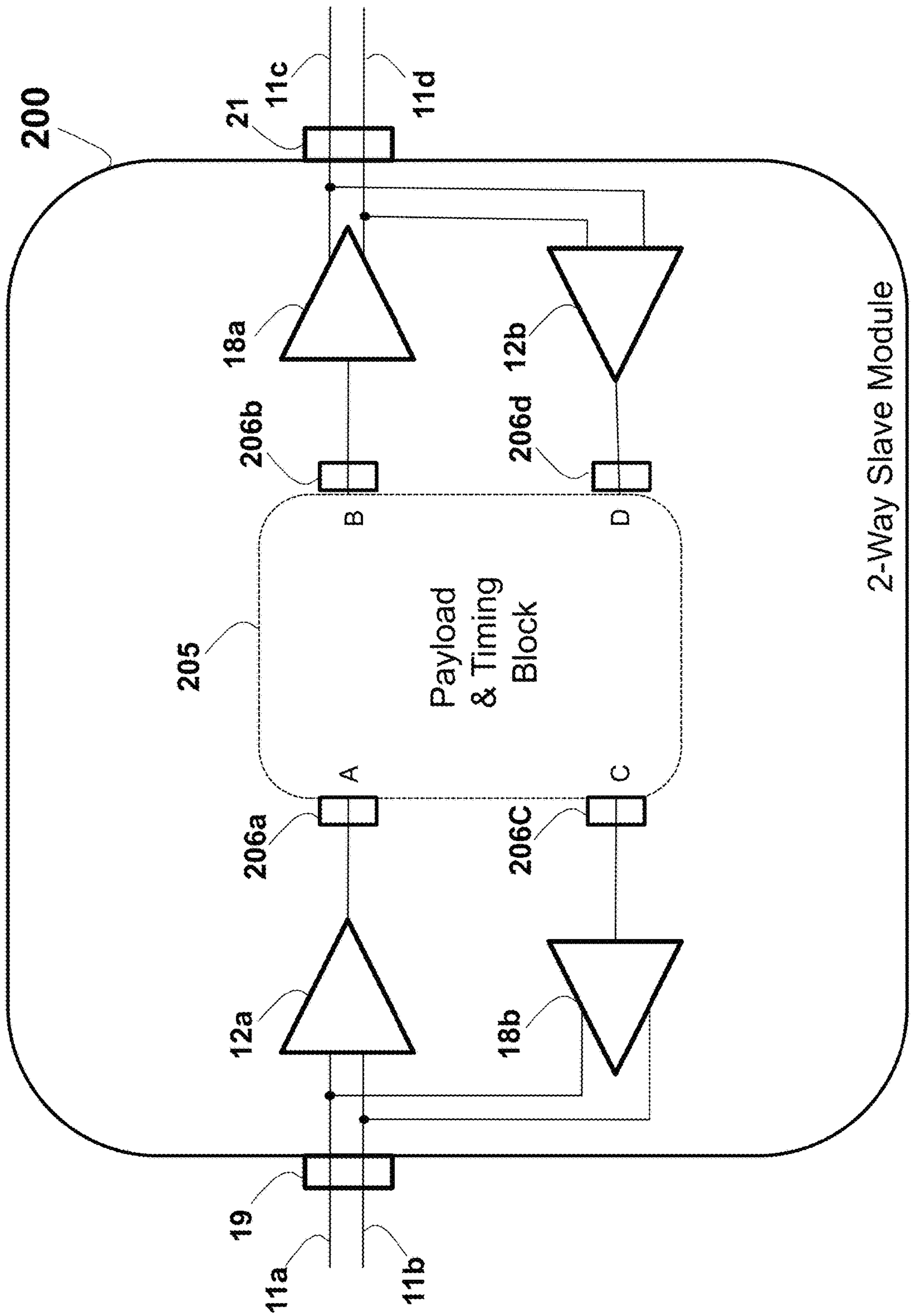

The modules and systems above exampled a unidirectional propagation of the activation signal, typically starting at the master module and distributed only downstream away from the master module. In another example, the propagation of the activation signal may be bi-directional. An example of a slave module 200 supporting two-way routing is shown in FIGS. 20, 20*a* and 20*b*. The slave module 200 basically contains two unidirectional slave modules, each connected to propagate the activation signal opposite to the other. The slave module 200 is shown to contain two functionalities of the slave module 10 shown in FIG. 1. An activation signal received in connector 19 from wires 11*a* and 11*b* is routed via a line receiver 12*a* producing 'IN' signal 13*a*, connected to TIMER1 14*a*, which produces a delayed signal 'TRIG' 15*a* fed to TIMER2 16*a*, which in turn activates payload 25*a* via 'GATE1' signal 22*a*, also connected to line driver 18*a* connected to connector 21 for supplying the activation signal over wires 11*c* and 11*d*. The line receiver 12*a*, IN' signal 13*a*, TIMER1 14*a*, signal 'TRIG' 15*a*, TIMER2 16*a*, PAYLOAD1 25*a*, 'GATE1' signal 22*a*, and line driver 18*a* respectively correspond to slave module 10 line receiver 12, 'IN' signal 13, TIMER1 14, signal 'TRIG' 15, TIMER2 16, payload 25, 'GATE' signal 22, and line driver 18. As such, any activation signal received from a former module will in time activate PAYLOAD1 25*a*, and will be output after a set delay to the next module. The slave module 200 further contains the line receiver 12*b*, 'IN' signal 13*b*, TIMER3 14*b*, signal 'TRIG' 15*b*, TIMER4 16*b*, PAYLOAD2 25*b*, 'GATE2' signal 22*b*, and line driver 18*b*, which respectively correspond to slave module 10 line receiver 12, 'IN' signal 13, TIMER1 14, signal 'TRIG' 15, TIMER2 16, payload 25, 'GATE' signal 22, and line driver 18. The latter set is connected to carry signals from the next module over the wires 11*c* and 11*d* via connector 21 to the former module over wires 11*a* and 11*b* via connector 19.

Figure 20C:
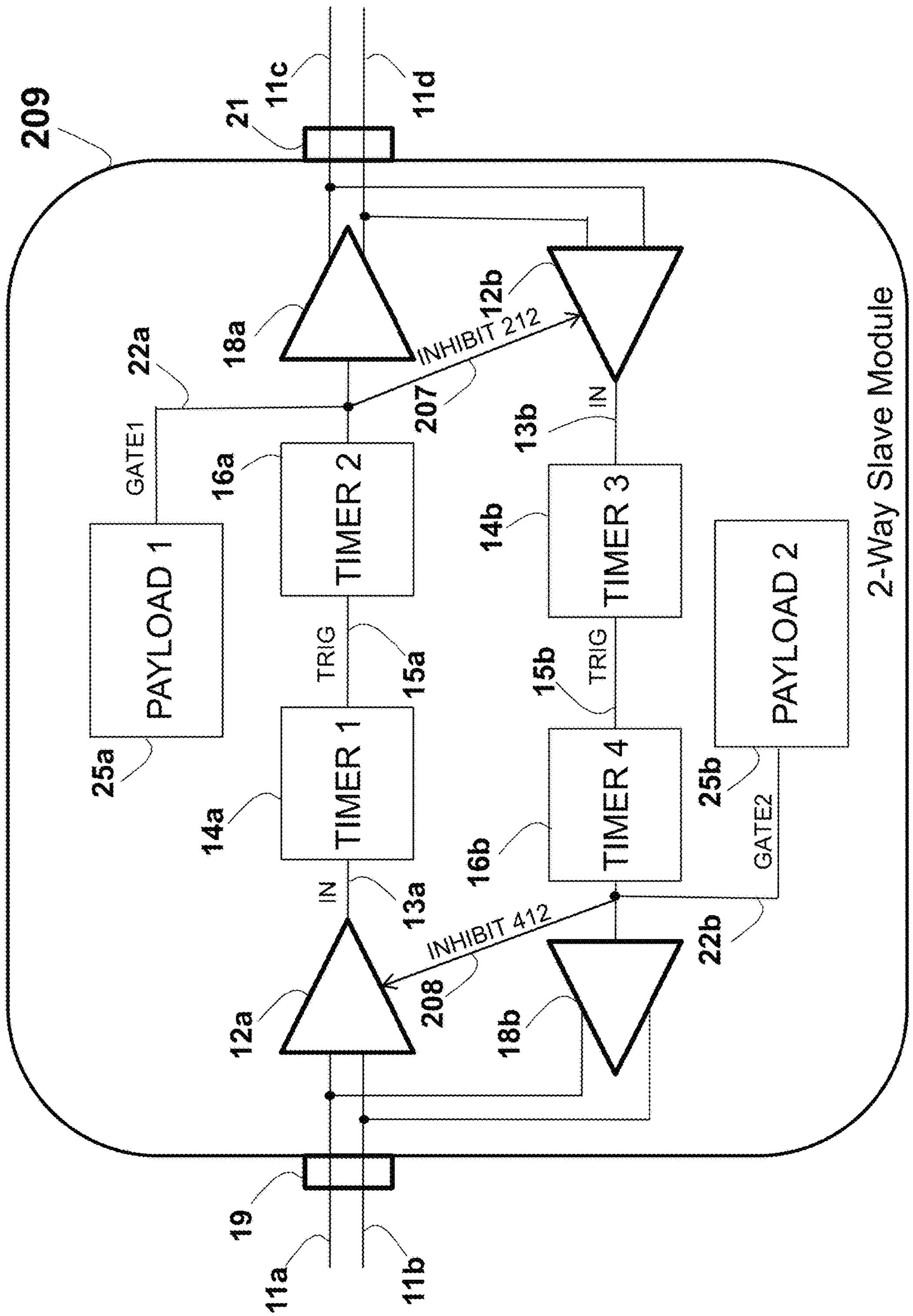

The slave module 200 acts as a two-way repeater, wherein an activation signal received from upstream activates PAYLOAD1 25*a* and is repeated downstream, while an activation signal received from downstream activates PAYLOAD2 25*b* and is repeated upwards. In order to avoid an outgoing activation signal to be received as false input, TIMER2 16*a* provides 'INHIBIT 23' signal to TIMER3 14*b* over connection 201 for inhibiting the activation as a result of the receipt of an input when GATE1 22*a* signal is transmitted to the next module. Similarly, TIMER4 16*b* provides 'INHIBIT41' signal to TIMER1 14*a* over connection 202 for inhibiting the timer operation upon receipt of an input when GATE2 22*b* signal is transmitted to the former module. Alternatively, the outgoing signal may be connected to the line receiver to inhibit its operation upon transmitting to the corresponding connection. Such a 2-way slave module 209 is shown in FIG. 20*c*. The outgoing 'GATE1' signal 22*a* serves also as 'INHIBIT 212' signal connected over connection 207 to line receiver 12*b*, for inhibiting any output by the receiver 12*b* when line driver 18*a* is transmitting. Similarly, the outgoing 'GATE2' signal 22*b* serves also as 'INHIBIT 412' signal connected over connection 208 to line receiver 12*a*, for inhibiting any output by the receiver 12*a* when line driver 18*b* is transmitting.

The timing and payload functionalities of the 2-way slave module 200 can be arranged into a sub-module 205 designated as 'payload & Timing Block' shown in FIG. 20*a*. The downstream path from port A 206*a* includes receiving the 'IN' signal 13*a*, which is transmitted as delayed signal 'GATE1' 22*a* to port B 206*b*. The downstream path includes TIMER1 14*a*, TIMER2 16*a*, PAYLOAD 25*a* and the connections therebetween. Similarly, the upstream path from port D 206*d* includes receiving the 'IN' signal 13*b*, which is transmitted as delayed signal 'GATE2' 22*b* to port C 206*c*. The upstream path includes TIMER3 14*b*, TIMER4 16*b*, PAYLOAD 25*b* and the connections therebetween. The 2-way slave module 200 is shown in FIG. 20*b* to be formed from the sub-module 205, which connected via the respective transmitters and receivers to the corresponding connectors, thus forming the functionalities of the slave module 200 shown in FIG. 20.

The 2-Way slave module 200 shown in FIG. 20 showed an example of having two payloads designated as PAYLOAD1 25*a* and PAYLOAD2 25*b*. The first payload is activated upon receiving a downstream propagated activation signal and the latter payload being activated by the upstream propagated activation signal. Alternatively, a single payload can be used, activated by either the upstream or the downstream activation signal propagated via the 2-way slave module. Such a 2-way slave module 210 is shown in FIG. 21, including a payload 25 being operated by an activation signal received in either direction. The two payload 25 activation signals 'GATE1' 22*a* and 'GATE2' 22*b* signals are being or-ed by the 'OR' gate 211, to produce a 'GATE12' signal 22*c* connected for activation of the payload 25. In this scheme the existence of either 'GATE1' 22*a* or 'GATE2' 22*b* activation signal will cause activation of the payload 25 via 'GATE12' 22*c* activation signal. Similarly, other logical functions such as 'AND', 'NOR', 'EXCLUSIVE-OR' may be implemented by using other gates as a substitute or as addition to the 'OR' gate 211.

The timing and payload functionalities of the 2-way slave module 210 can be arranged into a sub-module 215 designated as 'payload & Timing Block' shown in FIG. 21*a*. The downstream path from port A 206*a* includes receiving the 'IN' signal 13*a*, which is transmitted as delayed signal 'GATE1' 22*a* to port B 206*b*. The downstream path includes TIMER1 14*a*, TIMER2 16*a*, and the connections therebetween. Similarly, the upstream path from port D 206*d* includes receiving the 'IN' signal 13*b*, which is transmitted as delayed signal 'GATE2' 22*b* to port C 206*c*. The upstream path includes TIMER3 14*b*, TIMER4 16*b* and the connections therebetween. The two 'GATE' signals are or-ed by the 'OR' gate 211 to activate the payload 25. The 2-way slave module 210 is shown in FIG. 21*b* to be formed from the sub-module 215, which connected via the respective transmitters and receivers to the corresponding connectors, thus forming the functionalities of the 2-way slave module 210 shown in FIG. 20.

The 2-way communication interface may use the EIA/TIA-485 (formerly RS-485), which supports balanced signaling and multipoint/multi-drop wiring configurations. Overview of the RS-422 standard can be found in National Semiconductor Application Note 1057 publication AN012882 dated October 1996 and titled: "Ten ways to Bulletproof RS-485 Interfaces", which is incorporated in their entirety for all purposes as if fully set forth herein. In this case, RS-485 supporting line receivers and line driver are used, such as for example, RS-485 transceiver MAX3080 may be used, available from Maxim Integrated Products, Inc. of Sunnyvale, Calif., U.S.A., described in the data sheet "Fail-Safe, High-Speed (10 Mbps), Slew-Rate-Limited RS-485/RS-422 Transceivers" publication number 19-1138 Rev.3 12/05, which is incorporated in its entirety for all purposes as if fully set forth herein.

The activation signal or any other communication between two connected modules may use half-duplex, wherein the transmission is in both directions, but only in one direction at a time or full-duplex. Alternatively, the transmission may be full duplex, allowing simultaneous data or activation signal transmission in both directions. An example of a 2-way slave module 216 supporting full-duplex is shown in FIG. 21*c*. The connection between the modules involves four conductors grouped into two conductor pairs, wherein each pair is carrying a signal only in one direction. Line receiver 12*a* is connected to receive activation signal from an upstream module via connector 19 over wires 11*a* and 11*b*. Line driver 18*b* is connected to transmit activation signal to an upstream module via connector 19 over wires 11*a*1 and 11*b*1. Since different transmission paths are used, the independent signals may be carried in either direction. Similarly, line receiver 12*b* is connected to receive activation signal from a downstream module via connector 21 over wires 11*c*1 and 11*d*1, and line driver 18*a* is connected to transmit activation signal to a downstream module via connector 21 over wires 11*c* and 11*d*. View 217 in FIG. 21*d* shows the connection between 2-way slave modules 216*a* and 216*b*, each built according to module 216. The line driver 18*a* of module 216*b* transmits only to line receiver 12*a* of module 216*a* via wires 11*a* and 11*b*. Similarly, the line driver 18*b* of module 216*a* transmits only to line receiver 12*b* of module 216*b* via wires 11*a*1 and 11*b*1.

In another example, the 2-way simultaneous signal propagation (such as full-duplex) is provided over two conductors using hybrid circuitry, similar to the telephone hybrids that are used within the Public Switched Telephone Network (PSTN) wherever an interface between two-wire and four-wire circuits is needed. A two-wire circuit has both speech directions on the same wire pair, as exemplified by the usual POTS home or small business telephone line. Within the telephone network, switching and transmission are almost always four-wire with the two sides being separated. The fundamental principle is that of impedance matching. The send signal is applied to both the telephone line and a 'balancing network' that is designed to have the same impedance as the line. The receive signal is derived by subtracting the two, thus canceling the send audio. Early hybrids were made with transformers configured as hybrid coils that had an extra winding which could be connected out of phase. The name 'hybrid' comes from these special mixed-winding transformers. A hybrid may use passive (commonly resistors based) or active (power-consuming) circuitry. A hybrid circuit commonly has three ports: a 'T/R' port for connecting to the wire pair carrying signals in both ways; an 'R' port extracting received signal from the wire pair; and a 'T' port for receiving the signal to be transmitted to the wire pair.

A 2-way slave module 218 based on a hybrid scheme is shown in FIG. 21*e*. The hybrid 219*b* is handling the upstream connection and is connected between the line driver 18*b*, line receiver 12*a* and connector 19. The 'T/R' port is connected to the wire pair 11*a* and 11*b* connecting to a module upstream. The 'R' port extracts the signal received and is connected to line receiver 12*a*, and the 'T' port injects the signal to be transmitted and is connected to line driver 18*b*. Similarly, the hybrid 219*a* is handling the downstream connection and is connected between the line driver 18*a*, line receiver 12*b* and connector 21. The 'T/R' port is connected to the wire pair 11*c* and 11*d* connecting to a module downstream. The 'R' port extracts the signal received and is connected to line receiver 12*b*, and the 'T' port injects the signal to be transmitted and is connected to line driver 18*a*. Examples of hybrid circuits are disclosed in U.S. Pat. Nos. 3,877,028, 3,970,805, 4,041,252, 4,064,377 and 4,181,824, which are all incorporated in their entirety for all purposes as if fully set forth herein.

A system 220 formed by 2-way slave modules 200 is shown in FIG. 22. System 220 is based on system 50 shown in FIG. 5, wherein the one-way slave modules 10 are replaced with the 2-way slave modules, each based on the 2-way slave module 200 shown in FIG. 20. Alternatively, slave modules based on the 2-way slave module 210 shown in FIG. 21 may be used. The 2-way slave modules are connected using point-to-point topology, wherein each connection connects two, and only two slave modules. The 2-way slave module 200*b* contains connector 19*b* for connecting to a former 2-way slave module via wires 11*c* and 11*d*, and connects to the next 2-way slave module 200*c* via wires 11*e* and 11*f* connected to connector 21*b*. The 2-way slave module 200*c* contains connector 19*c* for connecting to the former 2-way slave module 200*b* via wires 11*e* and 11*f*, and connects to the next 2-way slave module 200*d* via wires 11*i* and 11*j* connected to connector 21*c*. The 2-way slave module 200*d* contains connector 19*d* for connecting to the former 2-way slave module 200*c* via wires 11*i* and 11*j*, and can connects to the next 2-way slave module over wires 11*k* and 11*l* via connector 21*d*.

During operation, an activation signal received by 2-way slave module 200*b* over wires 11*c* and 11*d* activates the payload (after a delay, if implemented) in the 2-way slave module 200*b* (or connected to slave module 200*b*). At a later stage, the activation signal is propagated to activate the payload associated with the 2-way slave module 200*c*, and sequentially to the 2-way slave module 200*d*. System 220 supports bi-directional signal flow, and thus an activation signal received from the next 2-way module over the wires 11*k* and 11*l* will propagate upwards. The activation signal received by 2-way slave module 200*d* over wires 11*k* and 11*l* activates the payload (after a delay, if implemented) in the 2-way slave module 200*d* (or connected to slave module 200*d*). At a later stage, the activation signal is propagated upstream to activate the payload associated with the 2-way slave module 200*c*, and sequentially to the 2-way slave module 200*b*.

The timing diagram 221 of system 220 is shown in FIG. 22*a*, corresponding to the unidirectional system timing diagram 65 shown in FIG. 5*b*. Column 62*a* relates to the time lapsed in the system, wherein each row 61*a-j* is associated with a time period of operation of a specific one of the 2-way slave modules, starting with receiving an activation signal until signaling the next module to be activated. In the example of system 220, three 2-way slave modules are connected, wherein column #1 62*c* is associated with the one of the payloads of the 2-way slave module 200*b*, column #2 62*d* is associated with the payload of slave module 200*c*, column #3 62*e* is associated with the payload of slave module 200*d*. From TIME=0 61*a* to TIME=4 61*e* is an example of a downstream propagation, similar to the one-way system 50. TIME=0 row 61*a* relates to the time before receiving any activation signal in the slave modules, and thus all payloads are in 'OFF' state. As a result of receiving activation signal by 2-way slave module 200*b*, its payload (the downstream payload 25*a* shown for 2-way slave module 200 or the payload 25 of 2-way slave module 210) is activated, represented as 'ON' in TIME=1 row 61*b*. Upon timer2 16*a* expiration in slave module 200*b*, the payload is deactivated and reverts to 'OFF' state. Similarly, as a result of receiving activation signal by slave module 200*c*, its payload (the downstream payload 25*a* shown for 2-way slave module 200 or the payload 25 of 2-way slave module 210) is activated, represented as 'ON' in TIME=2 row 61*c*. Next, the payload of slave module 200*c* is deactivated and reverts to 'OFF' state. Next, as a result of receiving activation signal by 2-way slave module 200*d*, its payload (the downstream payload 25*a* shown for 2-way slave module 200 or the payload 25 of 2-way slave module 210) is activated, represented as 'ON' in TIME=3 row 61*d*, followed by deactivation of the payload of 2-way slave module 200*d* (reverts to 'OFF' state). At stages TIME=4 61*e*, no payload is activated (all in 'OFF' state), reverting to the original TIME=0 61*a* idle status.

From TIME=5 61*f* to TIME=8 61*i* is an example of an upstream propagation. TIME=4 row 61*e* relates to the time before receiving the upstream activation signal by the 2-way slave modules, and thus all payloads are in 'OFF' state. As a result of receiving activation signal by 2-way slave module 200*d*, its payload (the downstream payload 25*b* shown for 2-way slave module 200 or the payload 25 of 2-way slave module 210) is activated, represented as 'ON' in TIME=5 row 61*f*. Upon timer2 16*b* expiration in slave module 200*d*, the payload is deactivated and reverts to 'OFF' state. Similarly, as a result of receiving activation signal by 2-way slave module 200*c*, its payload (the downstream payload 25*b* shown for 2-way slave module 200 or the payload 25 of 2-way slave module 210) is activated, represented as 'ON' in TIME=6 row 61*g*. Next, the payload of slave module 200*c* is deactivated and reverts to 'OFF' state. Next, as a result of receiving activation signal by 2-way slave module 200*b*, its payload (the downstream payload 25*b* shown for 2-way slave module 200 or the payload 25 of 2-way slave module 210) is activated, represented as 'ON' in TIME=7 row 61*h*, followed by deactivation of the payload of 2-way slave module 200*b* (reverts to 'OFF' state). At stages TIME=4 61*e* and at TIME=9 61*j*, no payload is activated (all in 'OFF' state), reverting to the original TIME=0 61*a* idle status.

Each of payload 25*a* and 25*b* shown as part of 2-way slave module 200 may be of the type that stays activated after being triggered by the corresponding GATE signal, as was exampled above in table 67 in FIG. 5*d*. Similarly, the payload 25 shown as part of 2-way slave module 210 may be of the type that stays activated after being triggered by the corresponding GATE signal. A timing diagram in table 222 shown in FIG. 22*b* corresponds to 2-way slave module 200 based system where the two payloads 25*a* and 25*b* are each of the type that stays activated after being triggered. Since payload 25*a* is activated upon receiving a downstream activation signal, the payload 25*a* in the 2-way slave module 200*b* is activated in TIME=1 row 61*b* and stays activated, and similarly the payload 25*a* in the 2-way slave modules 200*c* and 200*d* are respectively activated in TIME=2 row 61*c* and TIME=3 row 61*d* and stays activated thereafter (noted as ON1 in table 222). Since payload 25*b* is activated upon receiving an upstream activation signal, the payload 25*b* in the 2-way slave module 200*d* is activated in TIME=5 row 61*f* and stays activated, and similarly the payload 25*b* in the 2-way slave modules 200*c* and 200*b* are respectively activated in TIME=6 row 61*g* and TIME=7 row 61*h* and stays activated thereafter together with the payload 25*a* (noted as ON12 in table 222).

In one embodiment, the payload 25*a* or the payload 25*b* of slave module 200 (or both) are toggle controlled, wherein each triggering event causes the payload to switch to an alternate state, for example by using a toggle switch, similar to the one-way associated table 68 in FIG. 5*e*. A timing diagram in table 223 shown in FIG. 22*c* corresponds to the system 220 employing 2-way slave module 210 where the payload 25 is of a toggle type. In this case, any activation signal, either downstream or upstream, will switch the payload 25 of the corresponding 2-way slave module to an alternate state. The first activation in TIME=1 in row 61*b* activates the payload 25 in the 2-way slave module 210*b* (replacing module 200*b* in system 220) into 'ON' state, and the payload stays in this state through TIME=6 in row 61*g*, where the upstream activation signal will toggle the payload into an 'OFF' state. The payload 25 in the 2-way slave module 210*c* (replacing module 200*c* in system 220) is activated in TIME=2 in row 61*c* activates into 'ON' state, and the payload stays in this state through TIME=5 in row 61*f*, where the upstream activation signal will toggle the payload into an 'OFF' state. Similarly, the payload 25 in the 2-way slave module 210*d* (replacing module 200*d* in system 220) is activated in TIME=3 in row 61*d* activates into 'ON' state, and the payload stays in this state through TIME=4 in row 61*e*, where the upstream activation signal will toggle the payload into an 'OFF' state. In this mechanism, the next activation, either downstream or upstream, signal will re-activate the payload.

A loopback module may be used in order to invert the direction of the propagation of the activation signal in a system, either from downstream to upstream directions or vice versa. An example of a loopback module 230 is shown in FIG. 23. The loopback module 230 includes all the functionalities of slave module 10 shown in FIG. 1, such as incoming connector 19, line receiver 12, TIMER1 14, TIMER2 16, payload 25 and line driver 18. Similar to the slave module 10, the payload 25 will be activated as a response to receiving an activation signal, and after such activation the activation signal will be transmitted via line driver 18. However, the qloopback module 230 is distinct from a slave module by having only a single network connection via connector 19, and where the output of the line driver 18 is connected to the connector 19. Thus, after the corresponding delays, an activation signal received in connector 19 from the former module via wires 11*a* and 11*b*, will be transmitted back to the system via connector 19 to the same wires 11*a*, and 11*b*, thus inverting the direction of the activation signal propagation. In order to avoid the activation signal to be looped back to the loopback module and causing infinite triggering sequence, TIMER2 16 is connected to TIMER1 14 via connection 231 carrying 'INHIBIT21' signal, inhibiting TIMER1 14 to be triggered during the activation of TIMER2 16. Alternatively, the signal 'GATE' 22 can be connected to the line receiver 12 via connection 232 carrying the 'INHIBIT412' signal, which inhibits the receiving of any signal when line driver 18 is transmitting out the activation signal. Other similar mechanisms to avoid the internal loopback may be equally used. In other examples, the loopback module only involves the receiving and transmitting functionalities, without employing any payload or any payload activation functions.

An example of a 2-way system 240 is shown in FIG. 24, based on the 2-way system 220 shown in FIG. 22. A master module 140 is added upstream to the 2-way slave module 200*b* using connector 21*a* for connecting the master module 140 to wires 11*c* and 11*d*. The loopback module 220 is connected downstream from the 2-way slave module 200*d* using connector 19*e* for connecting to the wires 11*k* and 11*l*. The system 240 is idle until initiated by activating the switch in the master module 140. After activating the payload in the master module 140 the activating signal is propagated downstream sequentially activating the payloads in modules 200*b*, 200*c* and 200*d*, and then activating the payload in the loopback module 220. The loopback module 220 then initiates an activating signal towards the 2-way slave module 200*d*, thus starting upstream propagation. The upstream propagation involves sequential activation of the payloads in the 2-way slave modules 200*d*, 200*c* and 200*b*, until reaching the master module 140. The system 240 then remains idle until further initiating of an activating sequence by the master module 140.

A timing diagram 241 of system 240 is shown in FIG. 24*a*. The column 62*a* relates to the time lapsed in the system, wherein each row 61*a-j* is associated with a time period of operation of a specific one of the 2-way slave modules, starting with receiving an activation signal until signaling the next module to be activated. The column #1 62*g* is associated with the payload in the master module 140 in system 240. The column #2 62*c* is associated with the payload (or one of the payloads in case of multiple payloads) of the 2-way slave module 200*b*, column #3 62*d* is associated with the payload of slave module 200*c*, column #4 62*e* is associated with the payload of slave module 200*d*. The column #5 62*h* is associated with the payload in the loopback module 220 in system 240. From TIME=1 61*b* to TIME=5 61*e* is an example of a downstream propagation, similar to the one-way system 50. TIME=0 row 61*a* relates to the time before receiving any activation signal in the slave modules, and thus all payloads are in 'OFF' state. As a result of initiating by activating a switch in the master module 140, its payload is activated, represented as 'ON' in TIME=1 row 61*b*. Sequentially after the activation signal is received by the 2-way slave module 200*b*, its payload (the downstream payload 25*a* shown for 2-way slave module 200 or the payload 25 of 2-way slave module 210) is activated, represented as 'ON' in TIME=2 row 61*c*. Upon timer2 16*a* expiration in slave module 200*b*, the payload is deactivated and reverts to 'OFF' state. Similarly, as a result of receiving an activation signal by slave module 200*c*, its payload (the downstream payload 25*a* shown for 2-way slave module 200 or the payload 25 of 2-way slave module 210) is activated, represented as 'ON' in TIME=3 row 61*d*. Next, the payload of slave module 200*c* is deactivated and reverts to 'OFF' state. Next, as a result of receiving activation signal by 2-way slave module 200*d*, its payload (the downstream payload 25*a* shown for 2-way slave module 200 or the payload 25 of 2-way slave module 210) is activated, represented as 'ON' in TIME=4 row 61*e*, followed by deactivation of the payload of 2-way slave module 200*d* (reverts to 'OFF' state). At stages TIME=5 61*f*, the payload in the loopback module 220 is activated. The loopback module 220 initiates an upstream activation, sequentially activating the payload in the 2-way slave module 200*d* in stage TIME=6 61*g*, the payload in the 2-way slave module 200*c* in stage TIME=7 61*h*, and ending with activating the payload in the 2-way slave module 200*b* in stage TIME=8 61*i*, thus reverting to system idle state in TIME=9 61*j*. Similar to the above discussion, table 242 in FIG. 24*b* shows the timing diagram in case of payloads that stays 'ON' after being activated, and table 243 in FIG. 24*c* shows the timing diagram in case of payloads which are toggle-controlled.

An example of a splitter module 250 for use in 2-way systems is shown in FIG. 25. While the 2-way splitter modules are described herein as splitting into three paths, it is apparent that splitting to any number of ports may be used, such as two, four, five or any other number for creating multiple propagation paths. The downstream path in 2-way splitter module 250 is similar to the unidirectional splitter 70 in FIG. 7 described above. An activation signal from wires 11*a* and 11*b* via connector 19 is received by line receiver 12*a*, which simultaneously feeds the line drivers 18*b*, 18*c* and 18*d* respectively connected to connectors 21*a*, 21*b* and 21*c*. In the upstream path, an activation signal received from wires 11*c* and 11*d* via connector 21*a* is received by line receiver 12*b* producing 'GATE B' signal over connection 242*b*, an activation signal received from wires 11*e* and 11*f* via connector 21*b* is received by line receiver 12*c* producing 'GATE C' signal over connection 242*c*, and an activation signal received from wires 11*g* and 11*h* via connector 21*c* is received by line receiver 12*d* producing 'GATE D' signal over connection 242*d*. The three signals 'GATE B', 'GATE C', and 'GATE D' are or-ed by the 'OR' gate 241*a*, feeding line driver 18*a* connected to transmit the activation signal upstream via connector 19. In this configuration, a downstream activation signal is simultaneously distributed to all three downstream connected modules (connected via connectors 21*a*, 21*b* and 21*c*). Any upstream activation signal received in one of the downstream connections (via connectors 21*a*, 21*b* and 21*c*) will be simultaneously propagated upstream via connector 19.

An alternative 2-way splitter/slave module 251 is shown in FIG. 25*a*. A Payload & Timing Block 1 215*a* is added in the path connecting to the connector 21*a*, a Payload & Timing Block 2 215*b* is added in the path connecting to the connector 21*b*, and a Payload & Timing Block 2 215*c* is added in the path connecting to the connector 21*c*. The added blocks introduce delays in the activation signal either in the downstream propagation, or in the upstream propagation or both. The delays can be the same or different. Further, a payload 25 is added in each block 215 as shown in FIG. 25*a*, activated in either direction of the activation signal flow. Alternatively, one, part or all of the blocks 215*a*, 215*b* and 215*c* may be substituted with the Payload and Timing Block 205 shown in FIG. 20*a*, offering two distinct payloads 25*a* and 25*b*, one activated by the downstream signal and the other activated by the upstream signal. In general, the various payloads in such a 2-way splitter/slave module may be each individually operated by a corresponding activation signal relating to one of the directions (upstream or downstream) and to one of the connections. Alternatively, various dependencies may be implemented between the payloads. For example, a payload may be operated using an 'OR' gate, thus being activated by any one of the activation signals flowing through the module. In another example, a payload may be operated using an 'AND' gate, thus being activated only when plurality of the activation signals are flowing through the module. Other logic schemes may be equally applied.

A 2-way system 260 containing a 2-way slave/splitter module 251 is shown in FIG. 26 and is based on system 240 shown in FIG. 24. The 2-way slave/splitter module 251 is connected between 2-way slave modules 200*b* and 200*c*, wherein slave module 200*b* is connected to the upstream connector 19*f* and slave module 200*c* connected to the downstream connector 21*j*. The 2-way slave/splitter module 251 is further, via the downstream connector 21*h*, connecting to wires 11*m* and 11*n* to the 2-way slave module 200*e* via its connector 19*f*.

System 260 timing diagram is shown in table 261 in FIG. 26*a* which is based on table 241 shown in FIG. 24*a*. The added column #6 62*i* corresponds to the state of one of the payloads in the 2-way slave/splitter module 251, and the added column #7 62*j* corresponds to the state of one of the payloads in the 2-way slave module 200*e*. In TIME=3 61*d*, one or more of the payloads of 2-way slave/splitter module 251 is activated. Assuming the delays introduced by the 2-way slave/splitter module 251 in all paths are the same, then next in TIME=4 61*e*, both the 2-way slave module 200*e* and the 2-way slave module 200*c* are activated. The downstream propagation continues in TIME=5 61*f* and TIME=6 61*g*, respectively turning 'ON' the payloads in the 2-way slave module 200*d* and the loopback module 220. The loopback module 220 initiates the upstream propagation, sequentially activating in TIME=7 61*h* module 200*d*, in TIME=8 61*i* module 200*c*, in TIME=9 61*i* 2-way slave/splitter module 251, ending with TIME=10 61*k* module 200*b*. The system then reverts to its original idle state.

Another example of a 2-way slave/splitter module 255 is shown in FIG. 25*b*, based on the 2-way slave/splitter module 251 shown in FIG. 25*a*. An 'OR' gate 241*b* is connected between the Payload & Timing Block 1 215*a* and the line driver 18*b*. The 'OR' gate 241*b* performs the 'or' operator on the downstream activation signal output from the 'Payload & Timing Block 1' 215*a*, the 'GATE C' signal, which is the output of the upstream activation signal output from the 'Payload & Timing Block 2' 215*b*, and the 'GATE D' signal, which is the output of the upstream activation signal output from the 'Payload & Timing Block 3' 215*c*. Thus, any activation signal received from any one of the connections (other than the connector 21*a* port to which the activation signal is transmitted) of the 2-way slave/splitter module (either upstream or downstream) will be repeated (after the appropriate delay and payload activation, if implemented) to the next module connected over wires 11*c* and 11*d* via connector 21*a*. Similarly, an 'OR' gate 241*c* is connected between the 'Payload & Timing Block 2' 215*b* and the line driver 18*c*. The 'OR' gate 241*c* performs the 'or' operator on the downstream activation signal output from the 'Payload & Timing Block 2' 215*b*, the 'GATE B' signal, which is the output of the upstream activation signal output from the 'Payload & Timing Block 1' 215*a*, and the 'GATE D' signal, which is the output of the upstream activation signal output from the 'Payload & Timing Block 3' 215*c*. Thus, any activation signal received from any one of the connections (other than the connector 21*b* port to which the activation signal is transmitted) of the 2-way slave/splitter module (either upstream or downstream) will be repeated (after the appropriate delay and payload activation, if implemented) to the next module connected over wires 11*e* and 11*f* via connector 21*b*. Further, an 'OR' gate 241*d* is connected between the 'Payload & Timing Block 3' 215*c* and the line driver 18*d*. The 'OR' gate 241*d* performs the 'or' operator on the downstream activation signal output from the 'Payload & Timing Block 3' 215*c*, the 'GATE B' signal, which is the output of the upstream activation signal output from the 'Payload & Timing Block 1' 215*a*, and the 'GATE C' signal, which is the output of the upstream activation signal output from the 'Payload & Timing Block 2' 215*b*. Thus, any activation signal received from any one of the connections (other than the connector 21*c* port to which the activation signal is transmitted) of the 2-way slave/splitter module (either upstream or downstream) will be repeated (after the appropriate delay and payload activation, if implemented) to the next module connected over wires 11*g* and 11*h* via connector 21*c*. Hence, the 2-way splitter/slave module 255 is operative to repeat an activation signal received in any one of its connections (either upstream or downstream) to all other connections.

A 2-way system 270 containing a 2-way slave/splitter module 255 is shown in FIG. 27 and is based on system 260 shown in FIG. 26. The 2-way slave/splitter module 250 is substituted with the 2-way slave/splitter module 255. In such a scheme, any activation signal received by the 2-way slave/splitter module 255 in any one of its connections, will be propagated to all the other connections. System 270 timing diagram is shown in table 271 in FIG. 27*a*, which is based on table 261 shown in FIG. 26*a*. The downstream propagation is identical to the system 260 operation. However, in the upstream direction, an activation signal reaching the 2-way slave/splitter module 255 will be distributed upstream to the 2-way slave module 200*b* (as before), and also to the downstream connected 2-way slave module 200*e*, activating it as shown as 'ON' in TIME=10 61*k*.

A 2-way master module 280 is shown in FIG. 28, based on unidirectional master module 145 shown in FIG. 14*b*. An 'OR' gate 241*b* is added between the switch 141 and TIMER1 14, supporting the former functionality of the master module 145 of initiating an activation signal by activating switch 141. A line receiver 12*a* is connected to the connector 21*a*, and thus receiving any upstream activation signal received from wires 11*a* and 11*b*. The received activation signal is then fed to the OR gate 241*b*, and causing the received activation signal to initiate TIMER1 14 as if initiated by the switch 141, which will initiate a new activating sequence downwards. Hence, the 2-way master module 280 includes a loopback functionality (similar to loopback module 220), reverting an upstream to downstream propagation of the activation signal.

An example of a 2-way system 290 containing a 2-way master module 280 is shown in FIG. 29, and is based on system 240 shown in FIG. 24. The 1-way master module 140 is substituted with the 2-way master module 280, thus any upstream activation signal received by the 2-way master module 280 will activate its internal payload 25 and will be looped back downwards as if the activation switch 141 has been re-activated. In such a scheme, the activation signal is reverted from downstream to upstream by the loopback module 220, and the activation signal is reverted from upstream to downstream by the 2-way master module 280. Thus after a single activation of the system (by switch 141 in the 2-way master module 280), the activation signal will infinitely propagate downstream and upstream without any external intervention. A system 290 timing diagram is shown in table 291 in FIG. 29*a*, which is based on table 241 shown in FIG. 24*a*. The system 290 operation until TIME=8 61*i* is identical to the sequence in table 241, including activation in TIME=1 61*b*, downstream propagation until TIME=5 61*f* when the loopback module 220 is activated, following the upstream propagation until TIME=8 61*i*. The upstream activation signal reaches the 2-way master module 280 and activates its payload 25 in TIME=9 61*j*. The 2-way master module 280 also reverts the system 290 to downstream propagation by sending activation to the 2-way slave module 200*b*, activated in TIME=10 61*k*, followed by activating of the 2-way slave module 200*c* in TIME=11 61*l*. The system 290 status in TIME=9 61*j* is identical to its status in TIME=1 61*b*, the system 290 status in TIME=10 61*k* is identical to its status in TIME=2 61*c*, wherein the 2-way slave module 200*b* is activated, and similarly the system 290 status in TIME=11 61*l* is identical to its status in TIME=3 61*d* wherein the 2-way slave module 200*c* is activated. The sequence including the states TIME=1 61*b* to TIME=8 61*i* will thus be repeated infinitely. Table 292 in FIG. 29*b* shows the system 290 states in the case wherein all the payloads are toggle-controlled.

Another example of a 2-way master module 300 is shown in FIG. 30, based on unidirectional master module 160 shown in FIG. 16. Three line receivers 12*b*, 12*c* and 12*d* are added, connected to receive upstream activation signal from the respective connectors 21*a*, 21*b* and 21*c*. The three upstream activation signals received are or-ed, together with the switch 141 activation signal, by the 'OR' gate 241, which output activates TIMER1 14. In this configuration, the initiation of a downstream sequence by activating the switch 141 is retained, added to the functionality that any upstream signal received from one of the connector 21*a*, 21*b* and 21*c* will both activate the payload 25 in the 2-way master module 300 and will further initiate a downstream sequence in all the connected downstream paths. In an alternative embodiment, the reverting from upstream to downstream in the activated paths will exclude the path from which the activation signal was received, similar to the functionality of the splitter 255 shown in FIG. 25*b*.

An example of a 2-way system 310 containing a 2-way master module 300 is shown in FIG. 31, having similar topology such as the unidirectional system 185 shown in FIG. 18*a*. The one-way slave modules 10*a*, 10*b*, 10*c* and 10*d* are respectively substituted with the 2-way slave modules 200*a*, 200*b*, 200*c* and 200*d*, and the 1-way splitter module 60*b* is substituted with the 2-way splitter module 255. The 1-way master module 160 is substituted with the 2-way master module 300, thus any upstream activation signal received by the 2-way master module 300 will activate its internal payload 25 and will be looped back downwards as if the activation switch 141 has been re-activated. A loop-back module 220 is connected via connector 19*e* downstream to the 2-way slave module 200*a* over wires 11*k* and 11*l*. In such a scheme, the activation signal is reverted from downstream to upstream by the loopback module 220, and the activation signal is reverted from upstream to downstream by the 2-way master module 300. Thus after a single activation of the system (by switch 141 in the 2-way master module 300), the activation signal will infinitely propagate downstream and upstream without any external intervention.

The example system 310 shown in FIG. 31 and other 2-way systems exampled above included a single master module, hence the system operation can be initiated only by the switch 141 of the corresponding 2-way master module. In another example, two or more master modules are used, each allowing for system initiation, and thus not limiting the system activation to a single point. An example of such a 2-way system 311 containing two 2-way master modules is shown in FIG. 31*a*, having similar topology as the system 310 shown in FIG. 31. The loopback module 220 in system 310 is substituted with the 2-way master module 280. Since the 2-way master module 280 includes a loopback function, the functionalities and the operation of the system 310 are not changed. However, the system 311 can be initiated by the 2-way master module 280 (by its switch 141), in addition to the initiation by the switch 141 in the 2-way master module 300.

Payload Control.

The control of a payload, either internal or external to a module) is dependent upon the 'GATE' signal. In one aspect, the payload is activated as long as the 'GATE' signal is active. For example, in the example of a payload including a lamp, the lamp will illuminate during the time when the 'GATE' signal in active (either active-low or active-high).

FIG. 32 shows a timing diagram 315 relating to cases wherein the payload control is triggered ON and/or OFF based on the GATE signal. The GATE signal is shown in timing chart 316, and shows a first activating pulse 317*a* followed by another activating pulse 317*b*. In a 1-way system, the two activation pulses may be generated as a response to two activations of a switch in the master module. In a 2-way system, the first pulse may relate to one direction and the other pulse can be the result of an activation signal in the other direction.

In one example, the payload control is latched based on the GATE signal. Such scheme is shown in graph CONTROL1 318 in FIG. 32, and is exampled is module 325 shown in FIG. 32*a*. A set-reset latch flip-flop 327 is coupled between the 'GATE' signal carried over connection 22 and generates the CONTROL1 signal carried over connection 326 to payload 25 via connector 31. As shown in graph 318, the rising edge of the first GATE activation pulse 317*a* triggers the CONTROL1 signal to be latched into a steady high ("1") state. This state does not change regardless of changes in the 'GATE' signal 316. In the example of a payload 25 including a lamp, the lamp stays powered and illuminating after its single activation. The system may or may not reset upon power removal to the module (or to the payload) and repowering it. Further, the system can reset to its initial state by an external event or by a logic that is internal to and part of the payload 25.

Another alternative is shown in graph CONTROL2 319 in FIG. 32, the payload 25 is activated by the rising edge of the GATE pulse 317*a*, and stays activated for a set time. A third timer is added (added to TIMER1 14 and TIMER2 16), controlled by the GATE signal and producing the CONTROL2 319 signal. The time period of the operation can be determined similar to setting of the other timers.

In another alternative, the GATE signal is used to toggle the payload 25 state. The payload state is changed (e.g., from 'active' to 'non active' and vice versa) each time a GATE pulse is present. Such scheme is shown in graph CONTROL3 314 in FIG. 32, and is exampled is module 328 shown in FIG. 32*b*. A toggle flip-flop 329 is coupled between the 'GATE' signal carried over connection 22 and generates the CONTROL3 signal carried over connection 326 to payload 25 via connector 31. The payload is activated upon the rising edge of the first GATE pulse 317*a*, until the rising edge of the second GATE pulse 317*b*.

Powering.

The electric circuit in one, few or all of the modules in a system may be energized by a local power source. In this scheme, a module is individually powered, for example by a power source integrated within the module enclosure. An example of a locally powered 1-way slave module 320 is shown in FIG. 33. The slave module contains the slave module functionality of the slave module 10 shown in FIG. 1. The electrical circuits in the slave module 320 are powered from the battery 321 serving as the DC (Direct Current) power source and integrated in the slave module 320 enclosure. The battery 321 may be a primary or a rechargeable (secondary) type, may include a single or few batteries, and may use various chemicals for the electro-chemical cells, such as lithium, alkaline and nickel-cadmium. Common batteries are manufactured in defined output voltages (1.5, 3, 4.5, 9 Volts, for example), as well as defined standard mechanical enclosures (usually defined by letters "A", "AA", "B", "C" sizes etc. and 'coin' type). Commonly, the battery (or batteries) is enclosed in a battery compartment or a battery holder, allowing for easy replacement, such as battery compartment 641 shown for master module 640 in FIG. 64. A DC/DC converter 322 may be added between the battery and one or all of the electrical circuits in the module 320 adapting between the battery 321 voltage (e.g., 9 VDC or 1.5 VDC) and the voltage required by the internal electrical circuits (e.g., 5 VDC or 3.3 VDC).

As an alternative or as addition to using internal battery as a power source, a module can be power fed from an external power source, such as the AC power supply or an external battery. External powering is exampled in FIG. 33*a*, showing a slave module 330 (exampled as based on the slave module 10 in FIG. 1), connected to an external power source 323 via a connector 324 (preferably a power connector). In the case wherein an external power source 323 is used, the DC/DC converter 322 is replaced (or supplemented) with an AC/DC converter, for converting the AC power (commonly 115 VAC/60 Hz in North America and 220 VAC/50 Hz in Europe) into the required DC voltage or voltages. AC powering is exampled in a module 370 in FIG. 37 showing an AC plug 373 connected to the module 370 AC connector 372 via cord 374, feeding AC/DC converter 371, pictorially shown as AC plug 647 and cable 646 in view 648*a* in FIG. 64*a*. The AC/DC adapter may further be external and plugged to an AC outlet. Such small outlet plug-in step-down transformer shape can be used (also known as "wall-wart", "power brick", "plug pack", "plug-in adapter", "adapter block", "domestic mains adapter", "power adapter", or AC adapter) as known in the art and typically involves converting 120 or 240 volt AC supplied by a power utility company to a well-regulated lower voltage DC for electronic devices. A module may include a chargeable battery and AC power connection, the latter used for charging the internal battery as known in the art.

In an alternative powering scheme, a module (or few or all modules in a system) is remotely powered via the connection (or connections) to another module (or modules). For example, such scheme may allow a system to be powered by a single power source, wherein the power supplied is carried to power all the modules in the system via the modules connections. An example of a remotely powered 1-way slave module 340 is shown in FIG. 34 (exampled as based on the slave module 10 in FIG. 1). The upstream connector 19 is shown to contain four contacts for connecting to the activation signal carrying conductors 11*a* and 11*b* and to the power carrying conductors 341*a* and 341*b*. In one example, the power can be carried over the conductors 341*a* and 341*b* as a DC power signal, and the module 340 further contains a DC/DC converter 322 for adapting the DC voltage supplied to the DC voltage levels required by the module 340 internal electrical circuits. Alternatively, the power signal carried over the conductors 341*a* and 341*b* is an AC power signal, and in such a case the DC/DC converter is replaced with a corresponding AC/DC converter. The downstream connector 21 of slave module 340 also contains four contacts for connecting to both the activation signal carrying conductors 11*c* and 11*d* and to the power carrying conductors 341*c* and 341*d*. The power conductors 341*c* and 341*d* are respectively connected to the incoming power conductors 341*a* and 341*b* for supplying the power to the next module connected via the downstream connector 21, hence the power signal is carried and propagated downstream similar to the activation signal in a 1-way system. In an alternative embodiment, the power signal flow is directed upstream, wherein power is received from the power conductors 341*c* and 341*d*, and fed upstream to the conductors 341*a* and 341*b*.

In the case of remote powering wherein the power is fed to a module via the connection to another module, a powering module is used to inject the power to the system. An example of a powering module 350 is shown in FIG. 35. A battery 321 serves the power source to part or all of the system, connected to the power conductors 341*a* and 341*b* via connector 19 for powering the upstream connected modules, and further connected to the power conductors 341*c* and 341*d* via connector 21 for powering the downstream connected modules. A powering module such as the powering module 350 shown in FIG. 35 and any other module, and in particular modules having external connections (e.g., to a payload) and/or handling power, may use protection unit 351 (shown in FIG. 35 connected between the battery 321 as the power source and the system wiring) for protecting the system from harmful effects, such as overheating, fire, explosion or damages (e.g., a short circuit due to a fault, damaged or a wrong connection), or for improved safety, for example for meeting the required safety and ESD/EMC requirements imposed by the UL/FCC in the U.S.A. and CE/CENELEC in Europe. The protection block 351 is typically handing surges, over-voltage, lightning, and ensuring a safe and undamaged operation. Commonly, the protection involves current limiting using a fuse, active current limiter circuit or a circuit breaker. For example, the protection may be based on, for example, P3100SC '275V SIDACTOR® Device' from Littlefuse of Des Plaines, Ill., U.S.A.

An alternative powering module 360 is shown in FIG. 36, showing an external power source 363 connected via a power connector 362 to a power supply 361, which feeds the power to the system wires 341*a*, 341*b* and wires 341*c* and 341*d* via the protection circuit 351. The power supply 361 is used to adapt between the external power source 363 supplied voltages to the system internal voltage, by converting the input voltage (e.g., normal 120 or 240 volts AC power) to AC and/or DC at the various voltages and frequencies. Powering module 370 shown in FIG. 37 examples the case wherein the power source is the AC domestic mains 120 or 240 volt AC supplied by a power utility company and provided via the AC power plug 373 connected via the AC power cable 374, which is connected via the AC power connector 372 to the AC/DC converter 371 for providing the regulated and stabilized DC voltage (or voltages) to be carried over the system wires.

The powering related circuit of a splitter module 380 is shown in FIG. 38. The powering functionality may be added to any of the 1-way splitter modules described above in FIGS. 6-11 such as splitter module 70 shown in FIG. 7, splitter module 90 shown in FIG. 9 or slave/splitter module 110 shown in FIG. 11. Further, the powering functionality may be added to any of the 2-way splitter modules described above in FIGS. 25-25*b* such as splitter module 250 shown in FIG. 25 or splitter module 255 shown in FIG. 25*b*. The splitter module 380 connects to the upstream power conductor pair 341*a* and 341*b* via connector 19, to the downstream power conductors 341*c* and 341*d* via connector 21*a*, to the downstream power conductor pair 341*e* and 341*f* via connector 21*b* and to the downstream power conductor pair

341*g* and 341*h* via connector 21*d*. A power signal received from any of the power conductor pair will feed the DC/DC converter 322, which in turn will power the splitter module electrical circuits. Since all power conductors pairs are connected together, any power signal received in any one of the pairs will be distributed to all the other connections via the corresponding connectors.

The powering related circuit of a master module 390 is shown in FIG. 39. The powering functionality may be added to any of the 1-way master modules described above in FIGS. 14-16 such as master module 140 shown in FIG. 14, master module 150 shown in FIG. 15 or master module 160 shown in FIG. 16. Further, the powering functionality may be added to any of the 2-way master modules described above in FIGS. 25-30, such as master module 280 shown in FIG. 28 or master module 300 shown in FIG. 30. The powering/master module 410 connects to the downstream power conductors 341*c* and 341*d* via connector 21*a*, to the downstream power conductor pair 341*e* and 341*f* via connector 21*b* and to the downstream power conductor pair 341*g* and 341*h* via connector 21*d*. A power signal received from any of the power conductor pair will feed the DC/DC converter 322, which in turn will power the master module electrical circuits. Since all power conductor pairs are connected together, any power signal received in any one of the pairs will be distributed to all the other connections via the corresponding connectors. Similarly, a loopback module can be powered by its connection to the power conductors via its connector to the system.

An example of a remote-powered system 400 is shown in FIG. 40, based on the system 260 shown in FIG. 26. The slave modules 200*b*, 200*e* and 200*d* include a powering functionality similar or identical to the powering functionality shown for slave module 340 shown in FIG. 34. Similarly, the master module 140 (and the loopback module 220) includes a powering functionality similar or identical to the powering functionality shown for master module 390 shown in FIG. 39. Further, the splitter module 251 includes a powering functionality similar or identical to the powering functionality shown for splitter module 380 shown in FIG. 38. The power conductor pair 341*c* and 341*d* connects the master module 140 and the slave module 200*b*, the power conductor pair 341*f* and 341*e* connects the slave module 200*b* and the splitter module 251 upstream connection, the power conductor pair 341*h* and 341*g* connects the slave module 200*e* and the splitter module 251 downstream connection, and the power conductor pair 341*l* and 341*k* connects the slave module 200*d* and the loopback module 220. A powering module 370 substitutes for the slave module 200*c* in system 260, and connects to splitter module 251 via power conductor pair 341*m* and 341*n* and to the slave module 200*d* via power conductor pair 341*i* and 341*j*. Similarly, powering modules 350 or 360 may be equally used. The AC power is sourced from AC power source via AC plug 373 to the powering module 370. After conditioning (e.g., voltage and AC/DC conversion) the power is supplied downstream over the power conductors 341*i* and 341*j* to the slave module 200*d*, and further to the loopback module 220 via power conductors 341*k* and 341*l*. The power is also supplied upstream to the splitter 251 over power conductors 341*m* and 341*n*, and via the splitter module 251 to the slave module 200*e* over power conductors 341*g* and 341*h*. The splitter module 251 further transfer the power upstream to the slave module 200*b* over power conductors 341*e* and 341*f*, and from the slave module 200*b* to the master module 140 via power conductors 341*c* and 341*d*. Hence, the whole system if fed from a single power source via a single AC power plug 373.

A module may double as both a powering module and either a slave, a master or a splitter module. The powering related circuit of a powering/master module 410 is shown in FIG. 41. The powering functionality may be equally added to any of the master modules described above in FIGS. 14-16 such as master module 140 shown in FIG. 14, master module 150 shown in FIG. 15 or master module 160 shown in FIG. 16. Further, the powering functionality may be added to any of the 2-way master modules described above in FIGS. 25-30, such as master module 280 shown in FIG. 28 or master module 300 shown in FIG. 30. The powering/master module 390 connects to the downstream power conductors 341*c* and 341*d* via connector 21*a*, to the downstream power conductor pair 341*e* and 341*f* via connector 21*b* and to the downstream power conductor pair 341*g* and 341*h* via connector 21*d*. An AC power signal is received from AC power source by the AC plug 373 and the AC power cable 374, connected to the module via the AC power connector 372. The AC power is converted to appropriate DC voltage (or voltages) by the AC/DC converter 371, and the resulting DC power is fed to the downstream connectors 21*a*, 21*b* and 21*d* via the protection circuitry 351. Similarly, a loopback module can include a powering functionality to feed the system power conductors via its connector (or connectors). An alternative battery powered functionality of a powering/master module 420 is shown in FIG. 42, wherein the internal battery 321 replaces the external AC power as a powering source.

FIGS. 34-42 described above exampled the case wherein the power is carried over dedicated and distinct wires, thus the power signal is carried separated from any other signals carried between the modules such as the activation signal. Such configuration further requires the use of connectors (such as connectors 19 and 21) having at least four contacts, two for the power and two for the activation signal (or any other signal propagating in the system). In an alternative remote powering scheme, the power signal and the data signal (e.g., activation signal) are concurrently carried together over the same wire pair. This scheme makes use of a power/data splitter/combiner (P/D S/C) circuit, which either combines the power and data signals to a combined signal, or splits a combined signal into its power and data signals components. Such P/D S/C circuit 431 (e.g., P/D S/C 431*a* and 431*b* in FIG. 43) commonly employs three ports designated as ‘PD’ 433 (stands for Power+Data), ‘D’ 432 (stands for Data only) and ‘P’ 434 (stands for Power only). A data signal received from, or transmitted to, the port D 432 is combined with the power signal fed from, or supplied to, port P 434, and the combined signal is fed to, or being fed from, the port PD 433. Thus, power signal is transparently passed between ports PD 433 and P 434, while data signal (e.g. activation signal) is transparently passed between ports PD 433 and D 432. For example, a combined power and data signal received in port 433 is separated by the P/D S/C 431 to a power signal routed to port P 434 and to a data signal routed to port D 432. Similarly, a power signal received in port P 434 and a data signal received in port D 432*a* are combined by the P/D S/C 431 to a power/data signal in port 433. The power signal may be AC or DC, and the P/D S/C 431 may contain only passive components or alternatively may contain both active and passive electronic circuits.

An example of a remotely powered 1-way slave module 430 using P/D S/Cs is shown in FIG. 43 (exampled as based on the slave module 10 in FIG. 1). The upstream connector 19 is shown to contain two contacts for connecting to the conductors 11*a* and 11*b* carrying combined power and activation signals. The received signal is connected to port PD 433*a* of the P/D S/C 431*a*. The P/D S/C 431*a* separates the activation signal and provides the separated activation signal via port D 432*a* to the line receiver 12. The P/D S/C 431*a* separates the power signal and provides the separated activation signal via port P 434*a* to the DC/DC converter 322, which in turn feeds the module 430 circuits. The activation signal to be transmitted to the next module via the downstream connection 21 is connected to D port 432*b* of the P/D S/C 431*b*. The separated power signal from the P/D S/C 431*a* is connected to port P 434*b* of the P/D S/C 431*b*. The P/D S/C 431*b* combines the activation and power signal, and the combined signal is fed to the next module via connector 21 and wires 11*c* and 11*d*. Thus, the power feeding is propagated through and feeding the slave module 430, while the activation signal is propagated as described above, yet using only two wires for connecting the modules.

Supplying the power to the system may for example use a powering module 440 shown in FIG. 44, which examples the case wherein the power source is the AC mains 120 or 240 volt AC supplied by a power utility company is used as a power source provided by the AC power plug 373 connected via the AC power cable 374, connected via the AC power connector 372 to the AC/DC converter 371 providing the regulated and stabilized DC voltage (or voltages) to be carried over the system wires, similar to powering module 370 shown in FIG. 37 above. The P/D S/C 431*a* is used to couple the power signal onto the system wires (which also carry the activation signal). The DC power signal from the protection block 351 is connected to port P 434*a* of the P/D S/C 431*a*, and the data isolated power signal is fed to the wires 11*a* and 11*b* and wires 11*c* and 11*d* from the port PD 433*a*.

A 2-way master module 450 doubles to also include powering functionality as shown in FIG. 45, based on the powering/master module 410 shown in FIG. 41, adapted to support power and data carried over the same wires. A P/D S/C circuit 431*a* is connected to pass power from the protection block 351 to the wires 11*c* and 11*d* via connector 21*a*, and to further pass data between the wires 11*c* and 11*d* via connector 21*a* and the line driver 18*b* and line receiver 12*b*. Similarly, a P/D S/C circuit 431*b* is connected to pass power from the protection block 351 to the wires 11*e* and 11*f* via connector 21*b*, and to further pass data between the wires 11*e* and 11*f* via connector 21*b* and the line driver 18*c* and line receiver 12*c*. Similarly, a P/D S/C circuit 431*c* is connected to pass power from the protection block 351 to the wires 11*g* and 11*h* via connector 21*c*, and to further pass data between the wires 11*g* and 11*h* via connector 21*c* and the line driver 18*d* and line receiver 12*d*.

An example of a remotely fed loopback module 460 is shown in FIG. 46. The P/D S/C circuit 431*a* is connected to receive power and data signals from the wires 11*a* and 11*b* via connector 19, and to pass only the power to the DC/DC converter 322, and to further pass data between the wires 11*a* and 11*b* via connector 19 and the line driver 18 and line receiver 12*a*.

In one example, the data and power signals are carried over the same wires using Frequency Division Multiplexing (FDM), where each signal is using different frequency band, and wherein the frequency bands are spaced in frequency. For example, the power signal can be a DC signal (0 Hz), while the data signal will be carried over a band excluding the DC frequency. Similarly, the power signal can be an AC power signal, using a frequency above the frequency band used by the data signal. Separation or combining the power and data signals makes use of filters, passing or stopping the respective bands. An example of a P/D S/C circuit 431 using FDM is shown as circuit 470 in FIG. 47, corresponding to the case wherein the power signal is a DC signal (0 Hz), while the data signal is an AC signal carried over a band excluding the DC frequency. A capacitor 472*a*, which may be supplemented with another capacitor 472*b* is connected between the PD port 433 and the D port 432, implementing a High Pass Filter (HPF) 471. The HPF 471 substantially stops the DC power signal and substantially passes the data signal between the connected corresponding ports. An inductor 474*a*, which may be supplemented with another inductor 474*b* is connected between the PD port 433 and the P port 434, implementing a Low Pass Filter (LPF) 473. The LPF 473 substantially stops the data signal and substantially passes the DC power signal between the connected corresponding ports. Other passive or active implementations of the HPF 471 and LPF 473 can be equally used.

Alternatively, the data and power signals are carried over the same wires using a split-tap transformer, as commonly known for powering an analog telephone set known as POTS (Plain Old Telephone Service). An example of a P/D S/C circuit 431 using a split-tap transformer scheme is shown as circuit 480 in FIG. 48, corresponding for example to the case wherein the power signal is a DC signal (0 Hz), while the data signal is an AC signal carried over a band excluding the DC frequency. A transformer 481 is connected between the PD port 433 and the D port 432, where the primary side windings 482*a* and 482*b* connected to the PD port 433, and the secondary winding 482*c* is connected to the D port 432. The primary side is split to be formed of two windings 482*a* and 482*b*, connected together with capacitor 483. The transformer substantially passes the data signal between PD port 433 and the D port 432, while the DC power signal is blocked by the capacitor 483. Any DC signal such as the DC power signal is substantially passed between the PD port 433 and the P port 434.

In another alternative, the power signal is carried over a phantom channel between two pairs carrying the data signal or signals. An example of a P/D S/C circuit 431 using phantom scheme is shown as circuit 490 in FIG. 49, corresponding for example to the case wherein the power signal is a DC signal (0 Hz), while the data signal is an AC signal carried over a band excluding the DC frequency. The transformers 491*a* and 491*b* are connected between the PD port 433 and the D port 432, substantially passing data signals therebetween. The split tap 492*b* (of the winding 492*a* of transformer 491*a*) and the split tap 492*e* (of the winding 492*d* of transformer 491*b*) are connected to the P port 434, allowing for DC power flow between the PD port 433 and the P port 434. Further, the power may be carried over the wires substantially according to IEEE802.3af or IEEE802.3at standards. Using the phantom channel for carrying power is preferably used in the case wherein four conductors are used as connection medium between modules, such as the configuration shown in module 216 in FIGS. 21*c* and 21*d*.

Typically, the payload 25 is a power consuming apparatus, and thus required to be connected to a power source for proper operation. In one example, the payload 25 is fed from the same power source energizing the module corresponding to the payload 25, and controlling it via the GATE activation or control signal. Such scheme is exampled in slave module 500 shown in FIG. 50, based on slave module 340 shown in FIG. 34. The payload 25 is integrated within the module 500 enclosure and is powered from the DC/DC converter 322 via the power connection 501, and thus shares the powering circuitry of the slave module 500. The payload 25 may use a dedicated voltage and thus requires a separated output of the DC/DC converter 322, or alternatively share the same output and voltage used by other circuits in the module 500.

Alternatively, the payload 25 is powered from a power source external to the module and separated from the internal power circuitry energizing the module circuits (other than the payload 25). Such scheme is exampled in slave module 510 shown in FIG. 51, based on slave module 340 shown in FIG. 34. The payload 25 is integrated within the module 510 enclosure, but is powered only from the external power source 511, connected to the payload 25 via connector 513 and power conductors 512*a* and 512*b*.

Alternatively, the payload may be external to the module enclosure, yet being powered from and controlled by the module. Such scheme is exampled in slave module 520 shown in FIG. 52, based on slave module 340 shown in FIG. 34. The payload 521 is external to the slave module 520 enclosure and connected to the slave module 520 via connector 513, but is powered from the module 520 DC/DC converter 322 via the power connection 522, and controlled by the GATE signal over connection 22. In another alternative scheme, the payload is external to the module enclosure and being powered from an external power source 511, yet controlled by the related module. Such scheme is exampled in slave module 530 shown in FIG. 53, based on slave module 340 shown in FIG. 34. The payload 531 is external to the module 530 enclosure and controlled by the GATE signal over connection 22 via connector 513, but is powered from the power source 511 which is separated from the module 530 (or system) powering scheme.

In one example, the payload control involves supplying power to the payload when activated. In such scheme, a switch is controlled by the GATE signal, switching power from a power source to a payload for its activation. The power source may be internal or external to the module enclosure. Similarly the payload may be internal or external to the module enclosure. Such scheme is exampled in slave module 540 shown in FIG. 54, based on slave module 340 shown in FIG. 34, showing an external power source 511 and external payload 531. Upon activating of the GATE signal over connection 22, the switch 541 is closed and enables the power flowing from the power source 511 to the payload 531 via the switch 541 connected via connector 542. The case of an internal power source and external payload is exampled in module 550 shown in FIG. 55. The payload 531 is connected to connector 552, and is powered from the DC/DC converter 322 via the switch 551, activated by the GATE signal.

Randomness.

The term 'random' in this specifications and claims is intended to cover not only pure random, non-deterministically generated signals, but also pseudo-random, deterministic signals such as the output of a shift-register arrangement provided with a feedback circuit as used to generate pseudo-random binary signals or as scramblers, and chaotic signals.

In one aspect of the invention, a randomness factor is included in one or more modules. The stochastic operation may add amusement and recreation to the system or module operation since the operation will be surprising, non-repetitive and cannot be predicted. In one example, the time delay associated with TIMER1 14 or with TIMER2 16 (or both) is randomly set, as shown in slave module 560 shown in FIG. 56, based on slave module 30 shown in FIG. 3. A random signal generator 561*a* is connected to TIMER1 14 for controlling its associated time delay, and random signal generator 561*b* is connected to TIMER2 16 for controlling its associated time delay. In one example, the random generators 561*a* or 561*b* provide analog output voltage, where the voltage level affects the setting of the time delay. For example, the analog random signal generator 561*a* outputs random voltage level in the range of 0-10 VDC and the time delay control range of TIMER1 14 is in 0 to 50 seconds range. Assuming linear control, 0 VDC output of the analog random signal generator 561*a* will result in 0 seconds delay, 10 VDC output of the analog random signal generator 561*a* will result in 50 seconds delay, and 5 VDC output of the analog random signal generator 561*a* will result in 25 seconds delay. Alternatively, non-linear control may be used, such as exponential, logarithmic, parabolic or any other mathematical function.

An example of an analog random signal generator 571 is shown in FIG. 57, as part of a slave module 570. The analog random signal generator 571 contains the signal generator 572 and a Sample & Hold (S/H) 573. Preferably, the signal generator 572 produces a simple repetitive waveform, such as sinewave, sawtooth, square and triangular waveforms. Similarly an arbitrary waveform generator can be used, allowing the user to generate arbitrary waveforms. In the example shown in FIG. 57, the signal generator 572 produces a linear sawtooth waveform 574 having linear and monotonous slope, ranging between 0 to 10 VDC. Preferably, the repetition rate is substantially higher than the delays in a module or in a system. The signal generator 572 sawtooth wave form is output to the sample & Hold (S/H) 573. Upon being triggered, the S/H 573 will hold the sampled analog voltage steady. This sampled voltage is connected to control the delay of TIMER2 16. The S/H 573 may be based on a capacitor to store the analog voltage, or alternatively use digital storage with associated analog to digital conversion. The S/H 573 is triggered by the 'IN' signal 13, and thus will provide a different analog voltage to control the delay of TIMER2 16 each time an activation signal is propagated through the slave module 570. Since there is substantially no correlation between the received activation signal and the signal generator 572 output, the sampled voltage level is substantially random. In an alternative embodiment, the analog random signal generator 571 is activated only once, either upon powering up or upon receiving the first activation signal, and the sampled voltage is retained thereafter (e.g., until next powering up).

An alternative embodiment of the analog random signal generator 581 is shown in FIG. 58 as part of a slave module 580. The analog random signal generator 581 contains a digital random number generator 582 (e.g., with an 8 bit digital output), connected to a digital to analog (D/A) converter 583 for converting to an analog voltage signal. The output of the analog random signal generator 581 is connected to control the delay of TIMER2 16, and can have 256 equally spaced different analog voltages. Similar to the above, the random analog voltage may be generated once (e.g., upon power up) or repetitively each time an activation signal is received. Examples of an analog random signal generator 581 are disclosed in U.S. Pat. No. 3,659,219 to Rueff entitled: "Discrete Random Voltage Generator", in U.S. Pat. No. 4,578,649 to Shuppe entitled: "Random Voltage Source with Substantially uniform Distribution", and in U.S. Pat. No. 6,147,552 to Sauer entitled: "Chopper-Stabilized Operational Amplifier including Integrated Circuit with True Random Voltage Output", which are incorporated in its entirety for all purposes as if fully set forth herein.

In another example, the randomness is associated with the payload operation. In the example shown in FIG. 58*a*, a slave module 585 contains the analog random signal generator 581 connected via connector 31 to control the payload 25. For example, the payload 25 may receive a random control voltage from the analog random signal generator 581 each time it is activated via 'GATE signal 22. The random voltage may be used to direct or regulate the behavior of the payload 25, such as setting any parameter thereof.

In one aspect of the invention, the randomness factor is affecting the actual activation of a payload, as shown in slave module 590 shown in FIG. 59, based on slave module 540 shown in FIG. 54. The analog random voltage level output of the analog random signal generator 581 is compared with a reference voltage V1 output of a voltage reference 592. Typically, the voltage reference 592 sources a constant output voltage V1 irrespective of external changes such as temperature, loading and power supply variations. Such voltage reference may be based on a zener diode or a bandgap voltage reference, such as the industry standard LM317. The voltage comparison is made at a voltage comparator 593, which may be based on an operation amplifier such as the industry standard LM339. In the example shown in FIG. 59, the voltage comparator 593 will output logic '1' when the voltage from the analog random signal generator 581 is larger than the voltage reference 592 output. This output is AND-ed by the 'AND' gate 594 with the 'GATE' signal 22, and the 'AND' gate 594 output is connected to control switch 541, which is connected to power the payload 531 from the power source 511. In this scheme, the payload 531 will be powered only if both the 'GATE' activation signal is active and the analog random signal is greater than V1. In the example wherein the analog random signal generator can uniformly provide any voltage in the 0 to 10 VDC range, the probability of activating the payload 531 upon active 'GATE' signal is calculated to be (10−V1)/V1. For example, a V1 of 2 VDC will result in 0.8=80% probability to activate the payload 531, while 7 VDC will result in only 0.3=30% probability to activate the payload 531. The voltage reference 592 output can be fixed, or can be changed by a user, thus allowing different probabilities to be chosen by the user.

While exampled above with regard to using analog random signal generator, a digital random signal generator (known as random number generator) may be equally used, wherein numbers in binary form replaces the analog voltage value output. One approach to random number generation is based on using linear feedback shift registers. An example of random number generators is disclosed in U.S. Pat. No. 7,124,157 to Ikake entitled: "Random Number Generator", in U.S. Pat. No. 4,905,176 to Schulz entitled: "Random Number Generator Circuit", in U.S. Pat. No. 4,853,884 to Brown et al. entitled: "Random Number Generator with Digital Feedback" and in U.S. Pat. No. 7,145,933 to Szajnowski entitled: "Method and Apparatus for generating Random signals", which are incorporated in its entirety for all purposes as if fully set forth herein.

A digital equivalent of slave module 590 is shown as slave module 590*a* shown in FIG. 59*a*, wherein the digital random generator 582 (e.g., with an 8 bit output for producing a random digital value in the 0-255 range) is replacing the analog random signal generator 581, a register 596 stores a reference digital value, and the digital values are compared by a digital comparator 595 (e.g., CMOS 4063 or 4585).

In one aspect of the invention, multiple payloads are available to be randomly selected, as shown in slave module 597 described in part in FIG. 59*b*. An analog random signal generator 581 outputs a random voltage level VR (for example in the 0-10 VDC range), compared with voltage reference 592*a* outputting voltage V1, with voltage reference 592*b* outputting voltage V2, and with voltage reference 592*c* outputting voltage V3, by the respective voltage comparators 593*a*, 593*b* and 593*c*. In this example, it is assumed that V3>V2>V1. In the case the random analog voltage VR is below V1 voltage level output by reference 592*a* (VR<V1), none of the comparators will be active, and thus will all output '0' logic level. The 'NOT' gate 596*a* will be thus active and will activate PAYLOAD1 25*a*. In the case of V2>VR>V1, only the output of comparator 593*a* will be active. The 'AND' gate 594*a* will receive '1' from the comparator 593*a* and '1' as the output of the 'NOT' gate 596*b*, and thus will activate PAYLOAD2 25*b*, which will be the only payload to be activated. Similarly, the 'NOT' gate 596*c* and the 'AND' gate 594*b* will activate PAYLOAD3 25*c* in the case wherein V3>VR>V2, and only PAYLOAD4 25*d* is activated in the case of VR>V3. Assuming uniform distribution of the analog random signal generator, the probabilities of activating a specific payload can be determined to be V1/10, (V2−V1)/10, (V3−V2)/10, (10−V3)/10 respectively for PAYLOAD1 25*a*, PAYLOAD2 25*b*, PAYLOAD3 25*c* and PAYLOAD4 25*d*. In the case of V1=2.5 VDC, V2=5.0 VDC, V3=7.5 VDC each of the payloads have the same probability of 25% to be activated. In the example of V1=1.0 VDC, V2=3.0 VDC, V3=6.0 VDC, the activation probabilities are 10% for PAYLOAD1 25*a*, 20% for PAYLOAD2 25*b*, 30% for PAYLOAD3 25*c* and 40% for PAYLOAD4 25*d*.

The digital random signal generator 582 can be based on 'True Random Number Generation IC RPG100/RPG100B' available from FDK Corporation and described in the data sheet 'Physical Random number generator RPG100.RPG100B' REV. 08 publication number HM-RAE106-0812, which is incorporated in its entirety for all purposes as if fully set forth herein. The digital random signal generator 582 can be hardware based, generating random numbers from a natural physical process or phenomenon, such as the thermal noise of semiconductor which has no periodicity. Typically, such hardware random number generators are based on microscopic phenomena such as thermal noise, shot noise, nuclear decaying radiation, photoelectric effect or other quantum phenomena, and typically contain a transducer to convert some aspect of the physical phenomenon to an electrical signal, an amplifier and other electronic to bring the output into a signal that can be converted into a digital representation by an analog to digital converter. In the case where digitized serial random number signals are generated, the output is converted to parallel, such as 8 bits data, with 256 values of random numbers (values from 0 to 255). Alternatively, the digital random signal generator 582 can be software (or firmware) based, such as pseudo-random number generators. Such generators include a processor for executing software that includes an algorithm for generating numbers, which approximates the properties of random numbers.

The random signal generator (either analog or digital) may output a signal having uniform distribution, in which there is a substantially or pure equal probability of a signal falling between two defined limits, having no appearance outside these limits. However, Gaussian and other distribution may be equally used.

Mechanical Aspects.

Pictorial perspective views 600 and 605 of a module 601 are shown in FIG. 60, depicting an enclosure housing the hardware of a module. While a slave module is shown in the example, the same principles can be applied to other types of modules such as master, splitter and loopback modules. A rectangular cross-section box with all sides flat (or substantially flat) is shown. Similarly, the box used may have (or be based on) a cross section (horizontal or vertical) that is square, elongated, round or oval; sloped or domed top surfaces, or non-vertical sides. Similarly, the shape of a cube or right rectangular prism can be used, or can be based upon. A horizontal or vertical circular cross section can be used (or be based upon) such as simple geometric shapes such as a, cylinder, sphere, cone, pyramid and torus. Further, the modules in a system may all have (or based upon) the same enclosure shape, or alternatively each module (or a group of module) may use individual shape different from other modules in the system. The module shape and the shape of the pre-defined structure resulting after proper connection and assembly of the modules may be amorphous, abstract, organic, conceptual, virtual, irregular, regular, figurative, biomorphic, geometric, partially geometric, conventional, unconventional, symmetric and asymmetric. Similarly, in the case that the modules are assembled to form a picture or image, the design can be abstract, symbolic, conceptual, virtual, realistic, relating to fantasy or dreams, and representational. Further, the modules and the connecting and attaching scheme can be designed and fabricated to fit any age and ability. Furthermore, each of the modules can be fabricated of natural, man-made, composite and recycled material, such as paper, fabric, metal, wood, stone, rubber, foam, reciprocal and plastic. Further, a module may have any suitably rigid, flexible, bendable, multi-sided, electronic, digital, magnetic, stationary, moving, mechanical, reciprocal, sensory-related section, including a mechanism such as activation point, button and switch.

In one example, the module 610 shown in FIG. 60 may correspond to any slave module (either 1-way or 2-way), such as the slave module 10 shown in FIG. 1, thus including two connectors. The connector 602 corresponds to the upstream connector 19 of the slave module 10, and the connector 603 corresponds to the downstream connector 21 of the slave module 10. Connectors 602 and 603 are standard USB (universal Serial Bus) connectors, wherein connector 602 is a type 'A' plug and connector 603 is a mating type 'A' receptacle, as described in 'Universal serial Bus specification' revision 1.0 dated Jan. 15, 1996, which is incorporated in its entirety for all purposes as if fully set forth herein. The USB type 'A' connectors are shaped as flattened rectangle, and includes four terminals. Using different types of connectors (e.g., plugs and receptacles) for each direction prevents the user from accidentally creating a faulty connection, allowing for the retaining of a proper activation signal direction. Other connector shapes such as square and round can be equally used. Preferably, keyed connectors are used, such that they have some component which prevents mating except with specific connectors or in a specific orientation. Other types of standard connectors may be used. Preferably, standard data connectors (e.g., digital data connectors) or standard power connectors can be used.

The USB type 'A' connectors 602 and 603 includes four pins, two for power and two for data. Thus, these connectors may correspond to connectors 19 and 21 of the slave module 340, shown to connect to the two power carrying conductors (341*a* and 341*b* upstream and 341*c* and 341*d* downstream) added to the two signal carrying conductors (11*a* and 11*b* upstream and 11*c* and 11*d* downstream). Other standard connectors designed for systems wherein the wiring is carrying both power and data signal may be equally used, such as IEEE1394 standard connectors. In one example, an edge card connector is used. An edge card connector is commonly a portion of a printed circuit consisting of traces leading to edge of the board, that are intended to plug into a matching socket, commonly referred to as slot. In another example proprietary connectors are used, thus preventing the potential user fault of connecting between non-mating systems, which may result in system damage or even a safety hazard.

Pictorial perspective top view 610 is shown in FIG. 61, depicting two slave modules 601*a* and 601*b* respectively having an upstream connectors 602*a* and 602*b* and downstream connectors 603*a* and 603*b*. The slave modules 601*a* and 601*b* are oriented such that the upstream plug 602*b* of slave module 601*b* is directed towards its mating slave module 601*a* downstream receptacle 603*b*, as also shown in the pictorial side view 615 shown in FIG. 61*a*.

Pictorial side view 620 shown in FIG. 62 depicts slave modules 601*a* and 601*b* inter-engaged by plugging the connector 602*b* into the mating receptacle 601*a*. The plugging provides both the electrical connection as well as the mechanical attachment of the two modules to each other. The mechanical coupling may be interlocking or releasable. Similarly, the pictorial perspective top view 625 shown in FIG. 62*a* depicts three connected slave modules 601*a*, 601*b* and 601*c*.

Pictorial perspective top views 630 and 635 of exemplary respective splitter modules 631 and 632 are shown in FIGS. 63 and 63*a*. In one example, the splitter module 630 (or splitter module 635) shown may correspond to any splitter module, such as the splitter module 110 shown in FIG. 11 or the splitter module 60 shown in FIG. 6. Similarly, the splitter module 636 (or splitter module 637) shown in FIG. 63*a* may correspond to any splitter module, such as the splitter module 110 shown in FIG. 11 or the splitter module 60 shown in FIG. 6. The connector 602 corresponds to the upstream connector 19 of the splitter module, and the connectors 603*a*, 603*b* and 603*b* correspond to the respective downstream connectors 21*a*, 21*b* and 21*c* of the splitter module.

A pictorial perspective top view of an exemplary master module 640 is shown in FIG. 64. A downstream connector 603 is shown, corresponding to the connector 21 shown, for example, for the master module 140 in FIG. 14*a* or master module 145 shown in FIG. 14*b*, and the push-button switch 643 shown on the module 640 enclosure top corresponds to the switch 141 shown above as an inherent part of any master module. The master module 640 is powered by a battery 321, housed in the battery compartment 641. The battery may power feed only module 640 or part or all of the system as described above. Power switch 642 is an ON/OFF switch for powering the module or the system, and LED 644 serves as a visual indicator to indicate that the module (and/or the system) is powered.

Pictorial perspective top views 648*a* and 648*b* of exemplary respective AC-powered master modules 645 are shown in FIGS. 64*a* and 64*b*. The AC power plug 647 corresponds to the AC plug 373 and the power cable 646 corresponds to the cable 374, described above for any AC-powered module.

Pictorial perspective top views 650*a* and 650*b* of an exemplary system are shown in FIGS. 65 and 65*a*. The system shown is using AC-powered master modules 645 connected to three connected slave modules 601*a*, 601*b* and 601*c* shown connected in view 625 in FIG. 62*a*. Pictorial perspective top views 660*a* and 660*b* of an exemplary system are shown in FIGS. 66 and 66*a*. The system shown is using AC-powered master modules 645 connected to a splitter module 631 shown in view 636 in FIG. 63*a*.

Pictorial perspective top views 670*a* and 670*b* of an exemplary system are shown in FIGS. 67 and 67*a*. The system shown is using AC-powered master modules 645 connected to a splitter module 632 having three downstream ports. Two slave modules 601*g* and 601*h* are connected in series to one of the ports. Two slave modules 601*e* and 601*f* are connected in series to another one of the ports. The third port connects to the slave modules 601*a* and 601*b*, and then to a splitter module 631. The splitter module 631 has three ports, one connected to a slave module 601*c* and another connected to the slave module 601*d*.

A pictorial perspective top views 681*a* and 681*b* of an exemplary master/splitter module 680 are respectively shown in FIGS. 68 and 68*a*, corresponding for example to the master/splitter module 450 shown in FIG. 45. The master module 680 includes the elements described for the master module 645 above, added to the splitter functionality providing for three downstream connectors 603*a*, 603*b* and 603*c*.

A pictorial perspective top view 695 of an exemplary master/splitter module 690 is shown in FIG. 69, corresponding for example to the master/splitter module 450 shown in FIG. 45. The master/splitter module 690 enclosure is a triangle shaped box, having a downstream connection in each of its side planes, such as downstream connectors 603*a*, 603*b* and 603*c* (not shown in the figure). A pictorial perspective top view of an exemplary system 700 is shown in FIG. 70, showing slave modules 601*a*, 601*b* and 601*c* connected to one downstream connection, slave modules 601*d*, 601*e* and 601*f* connected to a second downstream connection, and slave modules 601*g*, 601*h* and 601*i* connected to the third downstream connection.

Similarly, a pictorial perspective top view 715 of an exemplary master/splitter module 710 is shown in FIG. 71, corresponding for example to the master/splitter module 450 shown in FIG. 45. The master/splitter module 710 enclosure is a square shaped box, having a downstream connection in each of its side planes, such as downstream connectors 603*a*, 603*b*, 603*c* and 603*d* (last two not shown in the figure). A pictorial perspective top view of an exemplary system 720 is shown in FIG. 72, showing slave modules 601*a*, 601*b* and 601*c* connected to one downstream connection, slave modules 601*d*, 601*e* and 601*f* connected to a second downstream connection, slave modules 601*g*, 601*h* and 601*i* connected to the third downstream connection, and slave modules 601*j*, 601*k* and 601*l* connected to the fourth downstream connection.

In another similarly example, a pictorial perspective top view 735 of an exemplary master/splitter module 730 is shown in FIG. 73, corresponding for example to the master/splitter module 450 shown in FIG. 45. The master/splitter module 730 enclosure is a circle shaped box, having five downstream connections evenly spread around in perimeter, such as downstream connectors 603*a*, 603*b*, 603*c*, 603*d* and 603*e* (last two not shown in the figure). A pictorial perspective top view of an exemplary system 740 is shown in FIG. 74, showing slave modules 601*a*, 601*b* and 601*c* connected to one downstream connection, slave modules 601*d*, 601*e* and 601*f* connected to a second downstream connection, slave modules 601*g*, 601*h* and 601*i* connected to the third downstream connection, slave modules 601*j*, 601*k* and 601*l* connected to the fourth downstream connection, and slave modules 601*m*, 601*n* and 601*o* connected to the fifth downstream connection.

The shape of a single module, few modules or of a system formed by connected modules may be according to a theme. The theme may provide for amusement, education, entertainment and a better user experience. In one example, the theme relates to animals, such as ducks. Slave modules 751*a* and 751*b*, shaped as ducklings, are shown in views 755 and 756 in the respective FIGS. 75 and 75*a*. The 'duckling'-shaped slave modules 751*a* and 751*b* contain respectively upstream connectors 602*a* and 602*b* and downstream connectors 603*a* and 603*b*. FIG. 76 shows a master module 750 that is shaped as a bigger ducks thus mimicking the 'mother-duck', having a downstream connector 603. System 760 shown in FIG. 76 contains the master module ('mother-duck') 750 and three connected slave modules ('ducklings') 751*a*, 751*b* and 751*c*. In one example, the theme relates to man-made objects, such as transportation. A master module 770 shaped as a locomotive and slave modules 771*a* and 771*b* shaped as train cars are shown in views 775 and 776 in the FIGS. 77 and 77*a*. The train car shaped slave modules 771*a* and 771*b* contain respectively upstream connectors 602*a* and 602*b* and downstream connectors 603*a* and 603*b*. The master module 770 has a mating downstream connector 603. A train shaped system 780 shown in FIG. 78 contains the master module ('locomotive') 770 and two connected slave modules ('train cars') 771*a* and 771*b*. Similarly, train shaped system 781 shown in FIG. 78*a* contains the master module (locomotive) 770 and three connected slave modules ('train cars') 771*a*, 771*b* and 771*c*.

In one example, the LEGO® strips are used for connecting the modules to each other, providing both electrical connection and mechanical affixing. A slave module 790 using LEGO® strips is shown in FIG. 79. View 791*a* is a perspective view, view 791*b* is a side view, view 791*c* is a top view and view 791*d* is a bottom view of the slave module 790. The upstream connection uses the LEGO® strip 792, which is lower than the downstream LEGO® strip 793. In FIG. 80, view 800*a* is a side view and view 800*b* is a top view of the two connected modules 790*a* and 790*b*. A perspective top view 800*c* and a perspective top view 800*d* of the two connected modules 790*a* and 790*b* are shown in FIG. 80*a*. Similarly, three connected slave modules 790*a*, 790*b* and 790*c* are shown in view 801 in FIG. 80*b*.

An AC-powered master/splitter module 810 is shown in view 811 in FIG. 81. The master/splitter module 810 is based on the master/splitter module 710 shown in FIG. 71, where the USB connectors are replaced with the LEGO® strips 792*a*, 792*b*, 792*c* and 792*d*. The master/splitter module 810 can be connected to a plurality of slave modules 790*a*-1 as shown in view 820 in FIG. 82, and can be connected in a circle as shown in view 830 in FIG. 83.

A module may include multiple payloads, as exampled in slave module 840 shown in FIG. 84. The slave module 840 includes integrated lamp 841 (which can be an LED), and two sounders (or any other sound emitting devices such as speakers) having their sounds passing through holes screens 842*a* and 842*b*. The lamp 841 can be used as a payload (and thus controlled or activated in response to the activation signal) or can be used only for notifying power availability in the module, and thus illuminated as long as power is available in the module. The module 840 further includes a rotary dial 843 allowing the user to manually select a value in the range of 0 to 10 seconds. This knob may be corresponding to control the potentiometer 32 shown in slave module 30 shown in FIG. 3, introducing a time delay selectable in the 0-10 seconds range. A similar knob may be used to continuously control any other parameter in a module, such as the manual setting of potentiometer 592 used in the module 195 shown in FIG. 19*a*. The module 840 further includes a knob 844 allowing the user to select between multiple discrete values. The user can manually set the switch to select from 0, 10, 20, 30, 40 and 50 seconds. This knob may control the multiple throws switch 33 shown in slave module 30 shown in FIG. 3, introducing a time delay selectable in the 0-50 seconds range with 10 seconds steps. Similar knob and related means may be used to control any other parameter in a module by selecting from multiple discrete values.

While the invention has been exampled above with regard to two-dimensional (2-D) structure, wherein the modules are all connected to form a substantially planar structure, it will be appreciated that the invention equally applies to three-dimensional structure (3-D) wherein the system formed by the modules connections is a three-dimensional shape. For example, the system 700 shown in FIG. 70 involves a master module 690 connected to three branches, all connected and attached as a single layer over a horizontal plane. Similar 3-D systems 850 and 860 are respectively shown in FIGS. 85 and 86. In system 850 the master module 690 is substituted with a master module 851, having a set of downstream connectors 603*a*, 603*b* and 603*c* allowing for horizontal connections similar to the system 700. Further, the master module 851 includes three downstream connectors 603*d*, 603*e* and 603*f*, allowing for connecting slave modules vertically to the master module 851 plane. The three branches (each including three slave modules) are shown connected in parallel to each other, and vertically to the horizontal plane used in system 700. In system 860 the three branches are connected horizontally as in system 700 shown in FIG. 70. Further, the slave module 601*f* connected in the end of the branch including the slave modules 601*d* and 601*e* is replaced with the slave module 601*f*1, having two downstream connections 603*h* and 603*g*. The latter downstream connection 603*g* is vertical to the downstream connection 603*h*, allowing for connecting modules vertical to the slave module 601*f*1 plane. Similarly, the slave modules 601*c* and 601*i* are respectively substituted with slave modules 601*c*1 and 601*i*1, having a vertical downstream port. The vertical downstream connector in slave module 601*c*1 connects to a branch including slave modules 601*l*, 601*m* and 601*n*, which are vertical to the horizontal plane. Similarly, the vertical downstream connector in slave module 601*i*1 connects to a branch including slave modules 601*i*, 601*j* and 601*k*, which are vertical to the horizontal plane. Connection allowing connection angles other than 90 degrees can equally be used, allowing for firming various 3-D structures.

Examples of engaging parts to form a 3-D structure are disclosed in U.S. Patent Application 2009/0127785 to Kishon entitled: "Puzzle", U.S. Pat. No. 6,692,001 to Romano entitled: "Multi-Layered Decorative Puzzle Apparatus", U.S. Pat. No. 6,237,914 to Saltanov et al. entitled: "Multi dimensional Puzzle", U.S. Pat. No. 2,493,697 to Raczkowski entitled: "Profile Building Puzzle", U.S. Patent Application 2009/0127785 to Kishon entitled: "Puzzle" and U.S. Pat. No. 4,874,176 to Auerbach entitled: "Three-Dimensional Puzzle", which are all incorporated in their entirety for all purposes as if fully set forth herein.

In one embodiment, a semiconductor light source such as a Light-Emitting-Diode (LED) is used as the payload, having small form factor and high efficiency. However, any type of visible electric light emitter such as a flashlight, a liquid crystal display, an incandescent lamp and compact fluorescent lamps can be used.

Referring to FIG. 87, a system 870 is shown, based on system 850 shown in FIG. 85. System 870 is shown as a toy modeling a traffic light, such as is commonly used for signaling to control traffic flow, such as positioned at road intersections or pedestrian crossings. System 870 includes three branches, each modeling three traffic lights. One traffic light includes slave modules 871*d*, 871*e* and 871*f*, respectively including lamps 872*d*, 872*e* and 872*f* (serving as payloads). For example, the lamps 872*f*, 872*e* and 872*d*, respectively, which can illuminate in red, amber and green colors, are illuminated sequentially, simulating a real-life traffic light. Similarly, the other traffic light includes slave modules 871*a*, 871*b* and 871*c*, respectively including lamps 872*a*, 872*b* and 872*c*. Another traffic light includes slave modules 871*g*, 871*h* and 871*i*. Similarly, system 870 can be used to actually control a real-life traffic light, or any other system wherein sequential lighting of lamps is required.

In one aspect of the invention, the light source in a module is used to illuminate a symbol, such as a number, a letter or a word. Such systems may be used as part of signage systems, providing visual graphics for displaying information. A user may select from a variety of modules each having a different symbol, to form a custom-made signage based on the selected modules and the way they are interconnected. An example of a signage system 880 is shown in FIG. 88, based on system 650*a* shown in FIG. 65. The master module 710 is connected to four slave modules 881*a*, 881*b*, 881*c* and 881*d*, respectively displaying the letters 'A', 'B', 'C', and 'D' when the internal light source (serving as a payload) is illuminating. Hence, the word ABCD is shown, wherein one, few or all the letters are illuminated based on the payload activation logic within the modules. In the example of system 885 shown in FIG. 89, the name 'JOHN' is formed by the four slave modules 881*e*, 881*f*, 881*g* and 881*h*, respectively associated with the letters T, '0', 'H' and 'N'. The invention can be similarly used to display word messages in a variety of fashions and formats, such as scrolling, static, bold and flashing. The modules can further display visual display material beyond words and characters, such as arrows, symbols, ASCII and non-ASCII characters, still images such as pictures and video. The payload may include an image or video display which may be alphanumeric only or analog video display, and may use technologies such as LCD (Liquid Crystal Display), FED (Field Emission Display, or CRT (Cathode Ray Tube).

Multiple Payloads.

While some of the examples above described a single payload associated with a module, in one aspect of the invention a plurality of payloads may be controlled or activated by a single module. An example of such a slave module 900 is shown as part of a system 905 shown in FIG. 90, based on slave module 540 shown in FIG. 54. Three payloads, designated as PAYLOAD1 531*a*, PAYLOAD2 531*b* and PAYLOAD3 531*c* are shown, powered from the same power source 511. The payloads may be independent or separated, or alternatively part of the same payload system. For example, each switch may power or activate a distinct function within the payload system. Further, each payload may be powered from a separate power source. While three payloads are described, any number of payloads may be equally used. The PAYLOAD1 531*a* is activated by switch 541*a*, PAYLOAD2 531*b* is activated by switch 541*b* and PAYLOAD3 531*c* is activated by switch 541*c*. The switches connect to the respective payloads and the power source (or power sources) via connector 901. Similarly, the payloads (and/or the power source) may be enclosed within the module, and thus obviating the need for the connector 901. One, few or all the payloads may be activated by the TRIG signal as described above. In one aspect, each payload is associated with a dedicated timer in the slave module 900, and thus activated in different delays after the activation signal is received. In another aspect, only one payload out of the three is activated in response to receiving of an activation signal, based on a preset logic. In one example, the payload to be activated is randomly selected as described with regard to module 595 shown in FIG. 59*b*. In another example, a different payload is sequentially and cyclically selected each time in response to receiving of an activation signal. For example, the first activation signal received will activate PAYLOAD1 531*a*, the next will activate PAYLOAD2 531*b*, the next will activate PAYLOAD3 531*c*, to be followed again by PAYLOAD1 531*a*. Further, a different payload may be selected based on the direction of the activation signal propagation, as described with regard to slave module 200 shown in FIG. 20. Further, any logic combining few of the above mechanisms may be used.

While some of the examples above described a dedicated payload (or payloads) associated with each module, in one aspect of the invention a payload (or a plurality of payloads) may be controlled or activated by two or more modules. An example of such a system 910 is shown in FIG. 91, exampled by using two slave modules 900*a* and 900*b*, each as shown in FIG. 90. The three payloads, designated as PAYLOAD1 531*a*, PAYLOAD2 531*b* and PAYLOAD3 531*c* are shown, powered from the same power source 511. The payloads may be independent or separated, or alternatively part of the same system. Further, each payload may be powered from a separate power source. While three payloads are described, any number of payloads may be equally used. The PAYLOAD1 531*a* can be activated by switch 541*a* in slave module 900*a* or by switch 541*d* in slave module 900*b*. Similarly, PAYLOAD2 531*b* can be activated by switch 541*b* in slave module 900*a* or by switch 541*e* in slave module 900*b*, and PAYLOAD3 531*c* can be activated by switch 541*c* in slave module 900*a* or by switch 541*f* in slave module 900*b*. The slave module 900*a* connects to the payloads via connector 901*a* and the slave module 900*b* connects to the payloads via connector 901*b*. The logic for activating the payloads may be identical in two or all the modules connected in the system. The power source 511 and the payloads 531*a*, 531*b* and 531*c* may be integrated and housed in one of the modules. In one embodiment, the payloads 531 and/or the power source 511 are housed within the master module housing.

The wiring infrastructure relating to connecting to the payloads (and to the power source) is shown in FIG. 91 to be distinct from the wiring used for connecting the modules to form the network. Alternatively, the connection to the payload (or payloads) may use the modules as the part of the connections infrastructure, exampled in system 925 shown in FIG. 92. While the power source 511 and the payloads 531 are either located externally to the system or part of one or more modules in the system (e.g., in a master module), each module further contains two connectors for passing the payloads activation wiring in the system. The slave module 920*a* is shown to have a connector 922*b* for connecting the payloads control wires to a former module and a connector 921*b* for connecting the payloads control wires to a next module. Similarly, the slave module 920*b* is shown to have a connector 922*a* for connecting the payloads control wires to a former module and a connector 921*a* for connecting the payloads control wires to a next module. The system 925 is formed by connecting the payloads control wires between connected modules, such as connecting connector 921*b* of module 920*a* to connector 922*a* of module 920*b*. The payloads 531 and the power source 511 are connected to the payloads control wires via connector 921*a* of module 920*b*, and thus each module connected in the system has access to the payload control wires for activating the various payloads. Preferably, the connectors used to connect the activation signal in the system such as connector 19 for upstream connection and connector 21 for downstream connection are respectively combined with connector 922 and connector 921, allowing for easy system forming by using a single pair of connectors for connecting between a pair of modules.

While the example in FIG. 91 above described controls a payload by powering it 'on' or 'off' or activating a function within the payload (or payloads), in one aspect of the invention a payload (or a plurality of payloads) may use analog control by a continuously variable signal by two or more modules. An example of such a system 935 is shown in FIG. 93, exampled by using two slave modules 930*a* and 930*b*. The system 935 includes a payload 932 powered by a power source 511. The payload 932 is continuously controlled by a resistance connected to wires 939*a* and 939*b*. In response to an activation signal, the slave module 930*a* connects the resistor 34*a* connected to switch 541*a* to the control wires 939*a* and 939*b* via connector 931*a*. Similarly, the slave module 930*b* connects the resistor 34*b* connected to switch 541*b* to the control wires 939*a* and 939*b* via connector 931*b*. The resistance values of resistors 34*a* and 34*b* may be different, hence the payload 932 responds differently to each activation cycle (of each connected module) based on the connected resistor value. The control wires 939*a* and 939*b* may be connected as part of the system wiring as exampled in system 945 shown in FIG. 94, wherein slave modules 940*a* and 940*b* respectively use upstream connectors 942*a* and 942*b* and respective downstream connectors 941*a* and 941*b* to carry the control wires throughout the system. Further, while the example in FIG. 93 above described control of a payload by means of resistance, any other analog signal may be used. For example, system 936 shown in FIG. 93*a* discloses an analog voltage controlled payload 938 controlled by the analog voltage in wire 939*c*. The slave modules 937*a* and 937*b* respectively contain a voltage reference 592*a* and 592*b*, connected via the respective switch 541*a* and 541*b* and via the respective connectors 931*a* and 931*b* to the analog voltage control wire 939*c*. Hence, upon activation of one of the slave modules, the reference voltage is switched to the control line 939*c* to control the payload 938.

The payload 25 may include an annunciator, defined as any visual or audible signaling device, or any other device that indicates a status to the person. In one embodiment according to the invention, the annunciator is a visual signaling device. In one example, the device illuminates a visible light, such as a Light-Emitting-Diode (LED) 841 shown as part of module 840 shown in FIG. 84. However, any type of visible electric light emitter such as a flashlight, an incandescent lamp and compact fluorescent lamps can be used. Multiple light emitters may be used, and the illumination may be steady, blinking or flashing. Further, the illumination can be directed for lighting a surface, such as a surface including an image or a picture. Further, a single single-state visual indicator may be used to provide multiple indications, for example by using different colors (of the same visual indicator), different intensity levels, variable duty-cycle and so forth. In one example, the invention is used for electrically illuminated a Christmas tree or other decorative or festive lighting. Such Christmas lights (also called twinkle lights, holiday lights, and mini lights in the US and fairy lights in the UK) are commonly based on strands of electric lights used to decorate homes, public/commercial buildings and Christmas trees, and come in a dazzling array of configurations and colors. Further, the visual signaling may be associated with the module or system theme or shape. Such conceptual relationship may include, for example, the light emitters' brightness, appearance, location, type, color and steadiness that are influenced by the module or system theme, providing a surprising and illustrative result.

In one example, the system is used for sound or music generation. For example, the modules may serve as a construction toy block as part of a music toy instrument. An example of a music generation system is shown in FIG. 95, showing a system 950. The system 950 is based on system 945 shown in FIG. 94, wherein the payload 932 is exampled by a resistor controlled music generator 951. The generator 951 includes sounding means controlled by the resistance connected. For example, the resistance may control the tone to be heard by the generator 951.

A pictorial view 960 of music-associated slave modules 961*a*, 961*b*, 961*c* and 961*d* is shown in FIG. 96. The music-associated slave modules 961*a*, 961*b*, 961*c* and 961*d* respectively include upstream connectors 602*a*, 602*b*, 602*c* and 602*d* and downstream connectors 603*a*, 603*b*, 603*c* and 603*d*. Each of the slave modules 961*a*, 961*b*, 961*c* and 961*d* is associated with a musical tune (or a tone) or any other single sound, which is played upon activation of the music-associated slave module. A timbre sound element may also be used to select the timbre or other tonal characteristics of the output sounds. The sounding generation means may be included in the slave module, or alternatively the music generator is external to the modules, and is only controlled by the modules, as exampled in any of the systems above such as in system 950 shown in FIG. 95. The sign of the musical tune to be played by each module is printed, engraved or labeled on the module external surface. Upon connecting the music-associated slave-modules, the system plays the musical tunes in the sequence of connecting the modules, thus sounding a melody or song. An example of such a system 965 is shown in FIG. 96*a*, pictorially illustrating the music-associated slave modules 961*a*, 961*b*, 961*c* and 961*d* shown in FIG. 96 connected to form a system. Upon receiving an activating signal in connector 602*a* of the slave module 961*a*, the music tone associated with the slave module 961*a* will be sounded, sequentially followed by the musical notes associated with the slave modules 961*b*, 961*c* and 961*d*. Assuming two-way activation signal propagation is supported, in the case of receiving an activating signal in connector 603*d* of the slave module 961*d*, the music tune associated with the slave module 961*d* will be sounded, sequentially followed by the musical notes associated with the slave modules 961*c*, 961*b* and 961*a*, thus playing the musical tunes in reverse order, adding amusement and surprise to the user. Further, the sound produced by a module can emulate the sounds of a conventional acoustical music instruments, such as a piano, tuba, harp, violin, flute, guitar and so forth. In one example, a module can be shaped as a miniature of the music instrument associated with its sound.

In order to ease the association of the music-associated slave modules with the musical tune, the modules may be identified by the signage or marking on the modules, which may be the actual musical notation (identified as a note in a musical staff), tune name, a number, a symbol, a letter, a color or any other simpler association. For example, if the modules are numbered such as 'DO'=1, 'RE'=2. 'MI'=3 etc., the user can be instructed to build the module according to a specific order such as 1-4-4-5-2-3-7, where upon activation the notes are played in the connection sequence, corresponding to the notes in a set song, a melody or any other audible theme. View 970 in FIG. 97 shows three music-associated slave modules 971*a*, 971*b* and 971*c*, respectively including upstream connectors 602*a*, 602*b* and 602*c* and downstream connectors 603*a*, 603*b* and 603*c* (not shown). View 975 in FIG. 97*a* shows eight such music-associated slave modules 971*a*, 971*b*, 971*c*, 971*d*, 971*e*, 971*f*, 971*g* and 971*h* (slave module 971*h* may be identical to slave module 971*a* associated with the musical note 'DO') oriented before their connection to form system 811 shown in FIG. 97*b*. Upon activation, a full octave will be played from 'DO' to the next 'DO'.

In another example, the music associated payload includes sound or music generation by mechanical means. System 980 in FIG. 98 shows a pictorial view of a slave module 982 including upstream connector 602 and downstream connector 603, connected to a payload which is a bear-shaped toy 981 with drum sticks 986*a* and 986*b* for beating the drum 985. The bear toy 981 is connected via cable 983 and connector 984 to the slave module 982. Upon activating of the payload, the drum beating is activated for providing amusement. The toy bear 981 may be powered from the slave module 982 over the cable 983 or alternatively to be independently powered by a battery or external power source. The modules may be alternatively shaped as music instruments or music tunes, or in general according to any music theme.

While FIG. 98 shows the toy bear 981 as a payload external to the slave module 982, the functionalities of the payload and the slave module 982 can be integrated into a single device, such as the bear-shaped toy unit 987 shown in view 985*a* in FIG. 98*a*. The unit 987 includes the slave module functionality, and thus has two connectors 603*a* and 603*b* located on the bear-shape back for connecting to other modules. Alternatively, the connectors may be located in other places on the unit. FIG. 98*b* shows a rear view 988*a* and perspective rear views 988*b* and 988*c* of a toy bear-shaped module 988. The left leg of the module includes the upstream connector 602 allowing for upstream connecting to other modules, such as to the music-associated slave modules 971*c*, 971*b* and 971*a* shown in system 989 in FIG. 98*c*. The right leg of the module includes the downstream connector 603 (not shown) allowing for downstream connecting to other modules, such as to music-associated slave modules 971*d*, 971*e* and 971*f* shown in system 989 in FIG. 98*c*. Such a system includes both synthetic music generation in slave modules 971*a-f* played together with mechanical sound generation in module 988. In another example, the payload includes sounding by means of actual cymbals 992*a* and 992*b*, being part of a toy bear 991 as shown in system 990 in FIG. 99. Similar to view 985*a*, the toy bear-shaped housing 993 may include the slave module functionality as shown in view 995 in FIG. 99*a*.

In one embodiment according to the invention, the annunciator is an audible signaling device, emitting audible sounds that can be heard (having frequency components in the 20-20,000 Hz band). In one example, the device is a buzzer (or beeper), a chime, a whistler or a ringer. Buzzers are known in the art and are either electromechanical or ceramic-based piezoelectric sounders which make a high-pitch noise. The sounder may emit a single or multiple tones, and can be in continuous or intermittent operation. In another example, the sounder simulates the voice of a human being or generates music, typically by using an electronic circuit having a memory for storing the sounds (e.g., music, song, voice message, etc.), a digital to analog converter to reconstruct the electrical representation of the sound and driver for driving a loudspeaker, which is an electro-acoustical transducer that converts an electrical signal to sound. An example of a greeting card providing music and mechanical movement is disclosed in U.S. Patent Application 2007/0256337 to Segan entitled: "User Interactive Greeting Card", which is incorporated in its entirety for all purposes as if fully set forth herein.

The audible signaling may be associated with the module or the system theme or shape. For example, the sounder appearance, as well as the sound volume, type and steadiness may be influenced by the theme, providing a surprising and illustrative result. For example, the shape may include household appliance associated with a specific sound such as the ringing of a telephone set, the buzzer of the entrance bell or the bell sound or a microwave oven. Other examples are a horn of an automobile, the rattling 'chik-chuk' sound of a train and a siren of an emergency vehicle such as a police car, an ambulance or a fire-engine truck. In such a case, the sounder will preferably generate a sound which simulates or is similar to the real sound associated with the theme, e.g., a telephone ringing for a telephone set and a siren sound for a police car. In another example, the puzzle picture (or shape) include an animal, and the sounder produces the characteristic sound of the animal, such as barking for a dog, yowling for a cat and twittering of a bird. Such system can be used for audio-visual learning for teaching small children by association of an object such as a musical instruments or an animal which produces a distinctive sound with the viewable indicia associated therewith.

In one example the sound generated is music or song. The elements of the music such as pitch (which governs melody and harmony), rhythm (and its associated concepts tempo, meter, and articulation), dynamics, and the sonic qualities of timbre and texture, may be associated with the shape theme. For example, if a musical instrument shown in the picture, the music generated by that instrument will be played, e.g., drumming sound of drums and playing of a flute or guitar.

In one example according to the invention, a song or a melody of a song are played by the annunciator. Preferably, the song (or its melody) is associated with a module or system shape or theme. For example, the theme can be related to the calendar such as season or a holiday. For example, a theme of winter season showing rain or snow will be associated with a song about rain (such as "rain, rain") or about snowing, while a spring related theme may play the 'Spring Song'. Similarly, a theme of Christmas may be associated with Christmas related songs such as 'Santa Claus is coming to town' or 'Jingle Bells'. In another example, the theme includes an animal, and the song played is corresponding to the specific animal, such as the song 'Mary had a Little Lamb' for a theme showing a lamb, the song 'swan Lake' for a swan or 'B-I-N-G-O' for a dog theme. In the case that the theme relates to a specific location or a specific geography location or region (such as a continent, island, river, region, famous places, country, city etc.), a corresponding song may be played. For example, if the theme includes a map of a country (e.g., United-States) or the puzzle is shaped as the map of a country or a continent, a popular song related to the country or its national anthem (e.g., "The Star-Spangled Banner" for the US) may be played, thus helping in improving children learning about the world and geography. Some examples of geography related puzzles are disclosed in U.S. Pat. No. 6,425,581 to Barrett entitled: "Map Puzzle Game" and U.S. Patent Application 2008/0224396 to Cocis et al. entitled: "Jigsaw Educational Game", which are all incorporated in their entirety for all purposes as if fully set forth herein.

Other famous places may include the song 'London Bridge' for a theme of London or a bridge. In the case the theme relates to a specific activity (e.g., birthday party), the song or melody may correspond to the occasion (e.g., 'Happy Birthday' song). Similarly, a theme relating to household appliance (e.g. telephone) will be associated with a relevant related song (e.g. 'Mr. Telephone Man'). In the case the image (or shape) relates to a television or cinema character (e.g., 'Bob Sponge' and 'Spiderman'), the song may be associated with the respective movie or television show opening melody or song. The same goes for transportation, space and other common children or adult themes.

In one example according to the invention, a human voice talking is played by the annunciator. The sound may be a syllable, a word, a phrase, a sentence, a short story or a long story, and can be based on speech synthesis or pre-recorded. Male or female voice can be used, being young or old. The text sounded is preferably associated with the shape or theme. For example, a name of the theme of the system can be heard, such as 'dog', 'truck' and 'mountain'. Further, the story heard may be related to the theme, or can describe the items shown in the image. In another example, general encouraging, thanking or praising phrases can be made such as 'good work', 'excellent' and 'congratulations'. Further, a greeting such as 'Merry Christmas' can be played for a Christmas related theme. In another example, each module plays part of an audio chapter such as a song, melody, story or text. Each module plays part of the audio chapter such as a work, tune, syllable or word, such that when properly connected, the whole audio chapter is played. Such 'audio puzzle' provides amusement and can be played by children, trying to find the correct order of modules assembly to be rewarded by the complete and properly played audio part.

A tone, voice, melody or song sounder typically contains a memory storing a digital representation of the pre-recorder or synthesized voice or music, a digital to analog (D/A) converter for creating an analog signal, a speaker and a driver for feeding the speaker. An annunciator, which includes a sounder, may be based on Holtek HT3834 CMOS VLSI Integrated Circuit (IC) named '36 Melody Music Generator' available from Holtek Semiconductor Inc., headquartered in Hsinchu, Taiwan, and described with application circuits in a data sheet Rev. 1.00 dated Nov. 2, 2006, which is incorporated in their entirety for all purposes as if fully set forth herein. Similarly, the sounder may be based on EPSON 7910 series 'Multi-Melody IC' available from Seiko-Epson Corporation, Electronic Devices Marketing Division located in Tokyo, Japan, and described with application circuits in a data sheet PF226-04 dated 1998, which is incorporated in its entirety for all purposes as if fully set forth herein. A human voice synthesizer may be based on Magnevation SpeakJet chip available from Magnevation LLC and described in 'Natural Speech & Complex Sound Synthesizer' described in User's Manual Revision 1.0 Jul. 27, 2004, which is incorporated in its entirety for all purposes as if fully set forth herein. A general audio controller may be based on OPTi 82C931 'Plug and Play Integrated Audio Controller' described in Data Book 912-3000-035 Revision: 2.1 published on Aug. 1, 1997, which is incorporated in its entirety for all purposes as if fully set forth herein. Similarly, a music synthesizer may be based on YMF721 OPL4-ML2 FM+Wavetable Synthesizer LSI available from Yamaha Corporation described in YMF721 Catalog No. LSI-4MF721A20, which is incorporated in its entirety for all purposes as if fully set forth herein.

Some examples of prior-art toys that include generation of an audio signal such as music are disclosed in U.S. Pat. No.

4,496,149 to Schwartzberg entitled: "Game Apparatus Utilizing Controllable Audio Signals", in U.S. Pat. No. 4,516,260 to Breedlove et al. entitled: "Electronic Learning Aid or Game having Synthesized Speech", in U.S. Pat. No. 7,414,186 to Scarpa et al. entitled: "System and Method for Teaching Musical Notes", in U.S. Pat. No. 4,968,255 to Lee et al. entitled: "Electronic Instructional Apparatus", in U.S. Pat. No. 4,248,123 to Bunger et al. entitled: "Electronic Piano" and in U.S. Pat. No. 4,796,891 to Milner entitled: "Musical Puzzle Using Sliding Tiles", and toys with means for synthesizing human voice are disclosed in U.S. Pat. No. 6,527,611 to Cummings entitled: "Place and Find Toy", and in U.S. Pat. No. 4,840,602 to Rose entitled: "Talking Doll Responsive to External Signal", which are all incorporated in their entirety for all purposes as if fully set forth herein. A music toy kit combining music toy instrument with a set of construction toy blocks is disclosed in U.S. Pat. No. 6,132,281 to Klitsner et al. entitled: "Music Toy Kit" and in U.S. Pat. No. 5,349,129 to Wisniewski et al. entitled: "Electronic Sound Generating Toy", which are incorporated in their entirety for all purposes as if fully set forth herein.

In one example according to the invention, the annunciator is a smoke generation unit, mimicking the generation of a real life smoking such as a smoke of a real train. Preferably, such implementation may relate to a theme of a train having a smoking locomotive or a fire. Some examples of smoke generation units are disclosed in U.S. Pat. No. 6,280,278 to Wells entitled: "Smoke Generation System for Model Top Applications" and U.S. Pat. No. 7,297,045 to Pierson et al. entitled: "Smart Smoke Unit", which are all incorporated in their entirety for all purposes as if fully set forth herein.

Wireless.

The payload 25 may be external to the module, such as module 30 shown in FIG. 3 above. The module 30 includes a connector 31 and a cable or wiring for connecting the control 'GATE' 22 signal to the payload 25. Alternatively, the payload 25 may be controlled via the air without using any conductive connection. For example, wireless communication over the air may be used to convey the control information from the module to the payload 25. In this embodiment, the module further includes a wireless transceiver (or transmitter) coupled to the control or activation signal, for transmitting this information over the air to the payload, to be received by a mating wireless transceiver associated with the payload 25. The communication may be based on Wireless Personal Area Network (WPAN). In one example, ZWave or ZigBee standard based on IEEE 802.15.4-2003 may be used for the wireless communication and the wireless transceiver.

Non-limiting other examples of WPAN systems include Bluetooth, which according to IEEE 802.15.1 standard, for example, operates over license-free ISM band at 2.45 GHz and Ultra-Wide-band (UWB), which according to the IEEE 802.15.3 standard, for example, uses a wavelet. Other wireless technologies may be used, using either licensed frequency bands or unlicensed frequency band, such as the frequency bands utilized in the Industrial, scientific and Medical (ISM) frequency spectrum. In the US, three of the bands within the ISM spectrum are the A band, 902-928 MHz; the B band, 2.4-2.484 GHz (referred to as 2.4 GHz); and the C band, 5.725-5.875 GHz (referred to as 5 GHz).

The invention equally applies to any other wireless based technology, using either single or multi carrier signals for implementing either spread spectrum or narrowband, using either unlicensed bands (such as ISM) or licensed spectrum. Such technology may be part of the IEEE 802.11 (such as IEEE 802.11a/b, IEEE 802.11g or IEEE 802.11n), ETSI HiperLAN/2 or any technology used for WLAN, home networking or PAN (Personal Area Network). One non-limiting example is using IEEE 802.11b based on CCK (Complementary Code Keying). Other non-limiting examples are BlueTooth™, UWB and HomeRF™. Furthermore, WAN (Wide Area Network) and other wireless technologies may be used, such as cellular technologies (e.g., GSM, GPRS, 2.5G, 3G, UMTS, DCS, PCS and CDMA) and Local Loop oriented technologies (WLL—Wireless Local Loop) such as WiMax, WCDMA and other Fixed Wireless technologies, including microwave based technologies. Similarly, satellite based technologies and components may be equally used. While the technologies mentioned above are all standards-based, proprietary and non-standards technologies may be equally used according to present invention. Furthermore, the invention may equally apply to using technologies and components used in non-radio based through-the-air wireless systems such as light (e.g., infrared) or audio (e.g., ultrasonic) based communication systems.

It will be appreciated to those skilled in the art that the modules may be made of paper (card-board), wood (stain sheets), synthetic resins (soft and hard material), synthetic material, stone materials, woven or non-woven fabrics, cork, metals, leather, glass, plastic, cast metal, cast plaster, case stone, papier-mache or other materials and may have a design imprinted on its exposed surface or surfaces or may have a surface sheet of imprinted design applied to its exposed surface or surfaces. The modules may be individually molded pieces, assembled of separate pieces fitted and adhered together, or cut from a precast larger piece. Further, the modules may be solid or hollow.

The module electronic circuits (e.g., integrated circuit (IC) and related devices) may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. For example, a timer can be implemented by a counted loop executed in software. In the case of a programmable device as well as in other implementations, a memory is required. The memory may include a static RAM (random Access Memory), dynamic RAM, flash memory, ROM (Read Only Memory), or any other data storage medium. The memory may include data, algorithms, programs, and/or instructions and any other software or firmware executable by the processor. The control logic can be implemented in hardware or in software, such as a firmware stored in the memory. The term "processor" herein is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor. In accordance with various embodiments of the present disclosure, the methods described herein may be implemented by software programs executable by a processor or a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium or a distribution medium and other equivalents and successor media, in which data or instructions may be stored.

While the invention has been exampled above with regard to two-dimensional (2-D) structure, wherein the module are all connected to form a substantially planar structure, it will be appreciated that the invention equally applies to three-dimensional structure (3-D) wherein the system formed by the modules connections is a three-dimensional shape. Examples of engaging parts to form a 3-D structure are disclosed in U.S. Patent Application 2009/0127785 to Kishon entitled: "Puzzle", U.S. Pat. No. 6,692,001 to Romano entitled: "Multi-Layered Decorative Puzzle Apparatus", U.S. Pat. No. 6,237,914 to Saltanov et al. entitled: "Multi dimensional Puzzle", U.S. Pat. No. 2,493,697 to Raczkowski entitled: "Profile Building Puzzle", U.S. Patent Application 2009/0127785 to Kishon entitled: "Puzzle" and U.S. Pat. No. 4,874,176 to Auerbach entitled: "Three-Dimensional Puzzle", which are all incorporated in their entirety for all purposes as if fully set forth herein.

In one example application of the invention, a module or a system formed by connected modules is used as a toy or a game, and thus can be contrived as a form of amusement, education or entertainment. For example, it can be played as aiming to reconstruct a system by connecting or attaching interlocking modules serving as construction toy blocks, for example in a predetermined manner. The modules may take toy-like shapes such as having a look like a toy character, or according to a theme, to give additional interest in the game. The intellectual challenge involves connecting or attaching of numerous interlocking and tessellating modules. The system formed from the connected modules may be used to operate electrical devices such as visual or sound-based indicators, such as a music toy kit, as exampled in system 960 above. The operation of the annunciator attracts the player attention and thus provides reward for completing the system. In addition to recreational purposes, the invention may provide educational and therapeutic benefits as motor skills, art, music and creative thinking skills are employed. In addition to music and notes applications described above, the modules and system may be used in training involving spelling, counting and object and color identification, which may be used by an operator who is in preliterate stage of development, such as a preschool age child. Further, it will be appreciated that the invention equally applies to any game set involving assembling (and disassembling) of modules into an array (which may be enclosed in a frame structure), wherein the modules are sized and configured to fit one with other by interlocking, friction fit or using shaped lugs and cut-outs (e.g. by connectors) for solving by means of connecting, wherein the modules are each having an electrical property, such as allowing for electrically announcing the proper solving of the game. Particularly, the invention may apply to any building block toy set or similar construction systems that employ modules that can be assembled together to form larger toys or systems, and wherein the game primary purpose is the recreation or amusement by assembling or disassembling the game. As an example, the game set may comprise a plurality of inter-engaged game modules, each game module having one or more indentations and one or more protrusions, wherein the game is solved by the game modules can be assembled together in a single way using mating indentations and protrusions into a one pre-defined structure, and wherein each of said game module comprises two or more connectors, such that when properly assembled or connected together form an electrical system.

Further, the manner of play may be for diversified ages; diversified abilities; diversified approaches; specified age; specified ability; specified approach; creative; artistic; music-oriented; puzzle; recreational; educational; therapeutic; stage-oriented; level-oriented; family-oriented; age-appropriate; selective; thematic; turn indicated; timing indicated; scoring indicated; hierarchical; sequential; matching; choice; according to players, direction, playing order, number of players, teams; procedure indicated; having emission; introductory; junior; standard; intermediate; advanced; professional; numerical; alphabetical; identifying; positioning; pre-determined; improvisational; exchangeable; sharing; rotating; variable; same, different, switch, story, and customize-able.

While the invention has been exampled above with regard to a payload including an annunciator providing visual or audible signaling, it will be appreciated that the invention equally applies to a payload adapted to perform other functions, such as physical movement or other motive functions (e.g. pop-up figure). For example, the payload may include motors, winches, fans, reciprocating elements, extending or retracting, and energy conversion elements. In addition, heaters or coolers may be used. Each of the actuator or movement appearance, location, color, type, shape and functionality may be conceptually related to the module or system theme (such as image or shape). Further, the payload may include an indicator for indicating free-form, shape, form, amorphous, abstract, conceptual, representational, organic, biomorphic, partially geometric, conventional, unconventional, multi-sided, natural, figurative, recognizable concept, geometric, amorphous, abstract, organic, virtual, irregular, regular, biomorphic, conventional, unconventional, symmetric, asymmetric, man-made, composite, geometric, letter, number, code, and symbol. Furthermore, the payload may be indicating associated information such as indicia, indicator, theme indicator, turn indicator, timing indicator, game piece indicator, emission indicator, emission device, playing area indicator, scoring indicator, and procedure indicator. Further, the module or system may include sensors that will be part of the formed electrical circuit, such as photocells, voltage or current detectors, pressure detectors or motion detector and manually or automatically operated switches. Each of the sensor appearance, location, color, type, shape and functionality may be conceptually related to the module or system theme (such as image or shape).

In one particular example, the invention can be applied to control and automation, such as industrial control, robotics, factory automation and other similar applications, wherein the control is based on a sequence of events such as a finite state machine. For example, the system can be used as a substitute or a supplement to a PLC (Programmable Control Logic). Most control system involves programming language stored in software (or firmware) and executed by a processor in order to set (or program) or to execute the required set of controlling steps. One example is ladder logic or C language. Updating or changing such software requires skill and expertise, added to various programming tools, and thus expensive and complex to a lay person. Further, since the software is not directly visible, the programmed control steps are hidden to the user. The system according to the invention can be used to 'program' a process by connecting or attaching various modules, each associated with a different functionality of control step. Such system forming (as well as its modifications) is easy and intuitive, and does not require any expertise, skill or special tools. Further, the control steps involved are apparent by the type of modules used and their location in the system and in respect to each other. The formed control system may be used for home entertainment and control applications such as smart lighting, temperature control, safety and security, for home awareness applications such as water sensing and control, power sensors, energy monitoring, smoke and fire detectors, smart appliances and access sensors, for commercial building automation such as energy monitoring, HVAC, lighting and access control, and for industrial applications such as process control, asset management, environmental management, and industrial automation.

All publications, patents, and patent applications cited in this specifications are herein incorporated by reference as if each individual publication, patent, or patent application were specifically and individually indicated to be incorporated by reference and set forth in its entirety herein.

Throughout the description and claims this specifications the word "comprise" and variations of that word such as "comprises" and "comprising", are not intended to exclude other additives, components, integers or steps.

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

It will be appreciated that the aforementioned features and advantages are presented solely by way of example. Accordingly, the foregoing should not be construed or interpreted to constitute, in any way, an exhaustive enumeration of features and advantages of embodiments of the present invention.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A modular apparatus comprising:

a master module comprising in an enclosure:

a battery compartment for housing a battery for providing Direct Current (DC) power;

a connector at an end of the master enclosure and coupled to the battery compartment for passing DC power via the connector;

software and a processor for executing the software, the processor is coupled to be powered from the DC power; and a payload coupled to the battery compartment for being powered by the DC power and to the processor for being controlled or activated thereby, a plurality of slave modules detachably connectable in series with the master module and with each other, each of the slave modules comprising, in a respective enclosure:

a first connector at a first end of the slave module enclosure;

a second connector at a second end of the slave module enclosure; and an annunciator adapted to perform a module-specific task coupled to the first or second connector to be powered therefrom, wherein the connectors are physically structured (i) to allow the slave modules to be detachably mechanically coupled to each other in any order and to allow any of the slave modules to be detachably mechanically coupled to the master module, and (ii) to electrically connect connectors of respective modules when mechanically attached to one another, wherein the module-specific task of the annunciator of at least one of the slave modules is to emit visible light and the annunciator of at least one of the slave modules comprises a visible light emitter, wherein, when the master module and the slave modules are mechanically connected in series, the slave modules are powered from the DC power, and wherein the payload is controlled or activated in response to a signal received by the master module from one of the slave modules, and wherein the master module or one of the slave modules is further operative for a wireless communication with a device and further comprises:

an antenna for coupling to a wireless signal; and a wireless transceiver coupled to the antenna for receiving or transmitting the wireless signal, the wireless transceiver is connectable to be powered from the DC power.

2. The apparatus according to claim 1, wherein the payload sequentially operates in response to the order in which the modules are connected.

3. The apparatus according to claim 1, wherein when the master module and the slave modules are mechanically connected in series, the annunciators sequentially operate in response to the order in which the modules are connected.

4. The apparatus according to claim 1, wherein the payload comprises a motor.

5. The apparatus according to claim 1, wherein the master module further comprises a driving motor and a wheel driven by the driving motor and supporting the master module, and wherein each slave module further comprises a set of wheels supporting the slave module.

6. The apparatus according to claim 1, wherein the annunciators of different ones of the slave modules are adapted to perform respectively different module-specific tasks.

7. The apparatus according to claim 1, wherein the processor is coupled to control or activate the annunciators when the slave modules are mechanically connected in a series to each other and to the master module.

8. The apparatus according to claim 1, wherein each of the connectors comprises a USB connector.

9. The apparatus according to claim 1, wherein the visible light emitter comprises a semiconductor device, an incandescent lamp, or a fluorescent lamp.

10. The apparatus according to claim 1, wherein the module-specific task of at least one of the annunciators comprises blinking by the visible light emitter.

11. The apparatus according to claim 1, wherein the module-specific task that at least one of the annunciators is adapted to perform is to emit audible sound and the annunciator of at least one of the slave modules comprises an audible sound generator.

12. The apparatus according to claim 11, wherein the sound generator is configured to produce music.

13. The apparatus according to claim 11, wherein the sound generator is configured to produce spoken words.

14. The apparatus according to claim 11, wherein the audible sound generator comprises an electromechanical or piezoelectric sound generator.

15. The apparatus according to claim 14, wherein the appearance of each of the slave modules or the module-specific task that each of the annunciators are adapted to perform, or relate to, a common theme.

16. The apparatus according to claim 15, wherein the appearance of each of the slave modules and the module-specific task that each of the annunciators are adapted to perform, relate to a common theme.

17. The apparatus according to claim 15, wherein the slave modules color, type, or shape, is associated with the theme.

18. The apparatus according to claim 15, wherein the theme is a specific type of animal.

19. The apparatus according to claim 1, wherein the payload is adapted to emit visible light and the annunciator of that module comprises a visible light emitter.

20. The apparatus according to claim 19, wherein the payload is adapted to emit audible sound and the annunciator comprises an audible sound generator.

21. The apparatus according to claim 1, wherein in each of the slave modules the second end is opposite to the first end, and wherein in each of the slave modules the first connector is opposite to the second connector.

22. The apparatus according to claim 1, wherein each of the second connectors of each of the slave modules comprises a first common type of connector chosen from a group consisting of a male connector and a female connector, and wherein each of the first connectors of each of the slave modules comprises a second common type of connector that is the other member of the group.

23. The apparatus according to claim 1, wherein all of the connectors are rectangular, square, or circular shaped.

24. The apparatus according to claim 1, wherein the slave modules are detachably connectable to each other and to the master module using interlocking, friction fit, or shaped lugs and mating cut-outs.

25. The apparatus according to claim 1, wherein the slave modules are detachably connectable to each other and to the master module using protrusions in one of the modules and cavities in another of the modules adapted to receive the protrusions in a frictional engagement.

26. The apparatus according to claim 1, wherein the connectors are physically structured to electrically connect the connectors of any pair of adjacently mechanically attached modules via two contacts capable of carrying both the DC power and digital data between the respective modules.

27. The apparatus according to claim 1, wherein the connectors are physically structured to electrically connect the connectors of any pair of adjacently mechanically attached modules via at least two contacts for carrying the DC power and at least two contacts for carrying bi-directional digital data.

28. The apparatus according to claim 1, wherein one of the slave modules comprises a sensor producing an output signal responsive to a physical phenomenon coupled to the first or second connector of the one of the slave modules.

29. The apparatus according to claim 28, wherein the sensor comprises a light sensor, a photocell, a temperature sensor, a proximity sensor, an electrical current sensor, or an electrical voltage sensor.

30. The apparatus according to claim 28, wherein the payload is controlled or activated in response to sensor output signal.

31. The apparatus according to claim 28, wherein the annunciator of the one of the slave modules is controlled or activated in response to sensor output signal.

32. The apparatus according to claim 28, wherein each one of the slave modules comprises a sensor producing an output signal responsive to a physical phenomenon coupled to the first or second connector of the respective one of the slave modules.

33. The apparatus according to claim 1, wherein the master module further comprising a first line receiver coupled to the connector for receiving digital data signal therefrom, and for controlling or activating the payload in response to the received digital data.

34. The apparatus according to claim 33, wherein the digital data signal in an unbalanced signal.

35. The apparatus according to claim 34, wherein the unbalanced signal is based on, or is according to, RS-232 or RS-423 standards.

36. The apparatus according to claim 33, wherein the digital data signal in a balanced signal.

37. The apparatus according to claim 36, wherein the balanced signal is based on, or is according to, RS-422 or RS-485 standards.

38. The apparatus according to claim 1, wherein each of the slave modules further comprising a first line receiver coupled to the first connector for receiving first digital data signal therefrom, and for controlling or activating the annunciator in response to the first digital data received from the first connector.

39. The apparatus according to claim 38, wherein the first digital data signal in an unbalanced signal.

40. The apparatus according to claim 39, wherein the unbalanced signal is based on, or is according to, RS-232 or RS-423 standards.

41. The apparatus according to claim 38, wherein the first digital data signal in a balanced signal.

42. The apparatus according to claim 41, wherein the balanced signal is based on, or is according to, RS-422 or RS-485 standards.

43. The apparatus according to claim 38, wherein each of the slave modules further comprising a second line receiver coupled to the second connector for receiving second digital data signal therefrom, and for controlling or activating the annunciator in response to the second digital data received from the second connector.

44. The apparatus according to claim 43, wherein the second digital data signal in a balanced or unbalanced signal.

45. The apparatus according to claim 1, wherein the master module further comprising a first line driver coupled between the processor and the connector for transmitting digital data signal to the connector, and for controlling or activating at least one of the annunciators.

46. The apparatus according to claim 45, wherein the digital data signal in an unbalanced signal.

47. The apparatus according to claim 46, wherein the unbalanced signal is based on, or is according to, RS-232 or RS-423 standards.

48. The apparatus according to claim 45, wherein the digital data signal in a balanced signal.

49. The apparatus according to claim 48, wherein the balanced signal is based on, or is according to, RS-422 or RS-485 standards.

50. The apparatus according to claim 1, wherein each of the slave modules further comprising a first line driver coupled between the first connector and the second connector, for transmitting a first digital data signal to the first connector.

51. The apparatus according to claim 50, wherein the first digital data signal in an unbalanced signal.

52. The apparatus according to claim 51, wherein the unbalanced signal is based on, or is according to, RS-232 or RS-423 standards.

53. The apparatus according to claim 50, wherein the first digital data signal in a balanced signal.

54. The apparatus according to claim 53, wherein the balanced signal is based on, or is according to, RS-422 or RS-485 standards.

55. The apparatus according to claim 50, wherein each of the slave modules further comprising a second line receiver coupled to the second connector for transmitting second digital data signal thereto.

56. The apparatus according to claim 55, wherein the second digital data signal in a balanced or unbalanced signal.

57. The apparatus according to claim 1, wherein the slave modules are interchangeable.

58. The apparatus according to claim 1, wherein the master module further comprising the antenna and the wireless transceiver.

59. The apparatus according to claim 1, wherein the payload or at least one of the annunciators is controlled or activated in response to data received from the device.

60. The apparatus according to claim 1, wherein wireless communication and the wireless signal are according to, are compatible with, or are based on, WPAN (Wireless Personal Area Network).

61. The apparatus according to claim 60, wherein the antenna is a WPAN antenna and the wireless transceiver is a WPAN transceiver.

62. The apparatus according to claim 60, wherein the wireless communication and the wireless signal substantially conform to, are compatible with, or are based on, ZigBee protocol according to IEEE 802.15.4-2003 standard, Bluetooth protocol according to IEEE 802.15.1 standard, or UWB (Ultra-WideBand) according to IEEE 802.15.3 standard.

63. The apparatus according to claim 1, wherein the wireless communication uses an unlicensed frequency band.

64. The apparatus according to claim 63, wherein the wireless communication and the wireless signal are according to, are compatible with, or are based on, WLAN (Wireless Local Area Network), the antenna is a WLAN antenna, and the wireless transceiver is a WLAN transceiver.

65. The apparatus according to claim 64, wherein the wireless communication and the wireless signal substantially conform to, are compatible with, or are based on, IEEE 802.11 standard, and use an Industrial, Scientific and Medical (ISM) frequency spectrum band.

66. The apparatus according to claim 1, wherein the wireless communication and the wireless signal are according to, are compatible with, or are based on, cellular communication, the antenna is a cellular antenna and the wireless transceiver is a cellular transceiver, and the wireless communication uses a licensed frequency band.

67. The apparatus according to claim 66, wherein the wireless communication and the wireless signal substantially conform to, are compatible with, or are based on, 2.5G or 3G.

68. The apparatus according to claim 67, wherein the wireless communication and the wireless signal substantially conform to, are compatible with, or are based on, GSM (Global System for Mobile Communications), GPRS (General Packet Radio Service), CDMA (Code Division Multiple Access), UMTS, DCS, or PCS.

69. The apparatus according to claim 1, further comprising a random signal generator for outputting a random signal or number couplable for activating or controlling the payload or at least one of the annunciators in response to the random signal or number.

70. The apparatus according to claim 69, wherein the random signal generator is based on a physical process that is one of a thermal noise, a shot noise, decaying nuclear radiation, a photoelectric effect, and a quantum phenomenon.

71. The apparatus according to claim 69, wherein the random signal generator includes software or firmware executed by the processor, and wherein the software or firmware includes an algorithm for generating pseudo-random numbers.

72. The apparatus according to claim 1, wherein the first connector comprises a plug, and wherein the second connector comprises a receptacle.

73. The apparatus according to claim 1, wherein the annunciator or the payload comprises an audible sound generator for audible signaling of a sound.

74. The apparatus according to claim 73, wherein the audible sound generator comprises an electromechanical or piezoelectric sound generator.

75. The apparatus according to claim 73, wherein the audible sound generator comprises a buzzer, a chime, or a ringer.

76. The apparatus according to claim 73, wherein the audible sound generator comprises a loudspeaker and a digital/analog converter coupled to the loudspeaker.

77. The apparatus according to claim 73, wherein the audible sound generator is operative to generate a single tone or multiple tones.

78. The apparatus according to claim 73, wherein the sound emitted from the audible sound generator is a characteristic sound of a household appliance, a vehicle, an emergency vehicle, an animal, or a musical instrument.

79. The apparatus according to claim 73, wherein the sound emitted from the audible sound generator comprises a song or a melody.

80. The apparatus according to claim 73, wherein the sound emitted from the annunciator comprises a human talking voice.

81. The apparatus according to claim 73, wherein the emitted human voice includes a syllable, a word, a phrase, a sentence, a short story, or a long story.

82. The apparatus according to claim 81, wherein the emitted sound is based on, or uses, a speech synthesis or a pre-recorded sound.

83. The apparatus according to claim 73, wherein the emitted sound is associated with a theme or a shape of the apparatus.

84. The apparatus according to claim 1, wherein the master module further comprising a push-button switch coupled to the processor, and wherein the payload is controlled or activated in response to the switch state.

85. The apparatus according to claim 1, wherein the master module further comprising a rotary dial coupled to the processor, and wherein the payload is controlled or activated in response to the rotary dial state.

86. The apparatus according to claim 1, wherein one of the slave modules further comprising a push-button switch, and wherein the respective annunciator is controlled or activated in response to the switch state.

87. The apparatus according to claim 1, wherein one of the slave modules further comprising a rotary dial, and wherein the respective annunciator is controlled or activated in response to the rotary dial state.

88. The apparatus according to claim 1, wherein one of the slave modules further comprising a first timer coupled to the first connector for receiving a first signal therefrom, and for producing a first delayed signal that is delayed by a first time period from the first signal.

89. The apparatus according to claim 88, wherein the first timer of the one of the slave modules is coupled for transmitting the first delayed signal to the second connector.

90. The apparatus according to claim 88, wherein the first timer comprises a resistor-capacitor (RC) circuit, a monostable circuit, or a delay line.

91. The apparatus according to claim 88, wherein the annunciator of the one of the slave modules is controlled or activated in response to the first delayed signal.

* * * * *